(12) United States Patent
Baker

(10) Patent No.: US 12,248,882 B2
(45) Date of Patent: Mar. 11, 2025

(54) LOCATING A DECISION BOUNDARY FOR COMPLEX CLASSIFIER

(71) Applicant: D5AI LLC, Maitland, FL (US)

(72) Inventor: James K. Baker, Maitland, FL (US)

(73) Assignee: D5AI LLC, Maitland, FL (US)

(*) Notice: Subject to any disclaimer, the term of this patent is extended or adjusted under 35 U.S.C. 154(b) by 21 days.

(21) Appl. No.: 18/196,855

(22) Filed: May 12, 2023

(65) Prior Publication Data

US 2023/0289611 A1    Sep. 14, 2023

Related U.S. Application Data

(63) Continuation of application No. 17/815,851, filed on Jul. 28, 2022, now Pat. No. 11,687,788, which is a
(Continued)

(51) Int. Cl.
*G06N 3/088* (2023.01)
*G06F 18/24* (2023.01)
(Continued)

(52) U.S. Cl.
CPC ............. *G06N 3/088* (2013.01); *G06F 18/24* (2023.01); *G06N 3/04* (2013.01); *G06N 3/044* (2023.01);
(Continued)

(58) Field of Classification Search
CPC ........ G06N 3/088; G06N 20/00; G06N 3/047; G06N 7/01; G06N 3/045; G06N 3/044;
(Continued)

(56) References Cited

U.S. PATENT DOCUMENTS

2002/0008657 A1  1/2002 Poore, Jr.
2004/0042650 A1  3/2004 Ii et al.
(Continued)

FOREIGN PATENT DOCUMENTS

WO    2019067960 A1    4/2019
WO    2020057867 A1    3/2020

OTHER PUBLICATIONS

Su, Jianlin. "O-GAN: Extremely concise approach for auto-encoding generative adversarial networks." arXiv preprint arXiv:1903.01931 (2019). (Year: 2019).*
(Continued)

*Primary Examiner* — Casey R. Garner
(74) *Attorney, Agent, or Firm* — K&L Gates LLP

(57) ABSTRACT

Systems and methods improve performance of a classifier, which comprises a neural network and is trained through machine learning. First and second scores are computed, by the classifier, for each a multiple data examples from a generator. The first score is indicative of whether the data example belongs to a first data cluster and the second score is indicative of whether the data example belongs to a second data cluster. The generator is trained with an objective such that, for each data example generated by the generator, the first and second scores computed by the classifier are equal. Partial derivatives from the classifier are back-propagated for multiple data examples generated by the generator, to obtain a vector, for each data example, that is orthogonal to a decision surface for the classifier. A problem with the classifier is detected based on changes in directions of the vectors. Upon detecting a problem, the classifier is adjusted to reduce errors by the classifier caused by overfitting training data.

36 Claims, 58 Drawing Sheets

Related U.S. Application Data continuation of application No. 17/810,778, filed on Jul. 5, 2022, now Pat. No. 11,531,900, which is a continuation of application No. 16/901,608, filed on Jun. 15, 2020, now Pat. No. 11,410,050, which is a continuation of application No. 16/645,710, filed as application No. PCT/US2018/053519 on Sep. 28, 2018, now abandoned.

(60) Provisional application No. 62/564,754, filed on Sep. 28, 2017.

(51) Int. Cl.
| | | |
|---|---|---|
| *G06N 3/04* | (2023.01) | |
| *G06N 3/044* | (2023.01) | |
| *G06N 3/045* | (2023.01) | |
| *G06N 3/047* | (2023.01) | |
| *G06N 3/063* | (2023.01) | |
| *G06N 3/084* | (2023.01) | |
| *G06N 7/01* | (2023.01) | |
| *G06N 20/00* | (2019.01) | |
| *G06F 12/0815* | (2016.01) | |
| *G06F 17/18* | (2006.01) | |
| *G06N 3/048* | (2023.01) | |

(52) U.S. Cl.
CPC ............. *G06N 3/045* (2023.01); *G06N 3/047* (2023.01); *G06N 3/063* (2013.01); *G06N 3/084* (2013.01); *G06N 7/01* (2023.01); *G06N 20/00* (2019.01); *G06F 12/0815* (2013.01); *G06F 17/18* (2013.01); *G06N 3/048* (2023.01)

(58) Field of Classification Search
CPC .......... G06N 3/04; G06N 3/063; G06N 3/084; G06N 3/048; G06F 18/24; G06F 12/0815; G06F 17/18
See application file for complete search history.

(56) References Cited

U.S. PATENT DOCUMENTS

| | | |
|---|---|---|
| 2005/0169529 A1 | 8/2005 | Owechko et al. |
| 2005/0216426 A1 | 9/2005 | Weston et al. |
| 2016/0224903 A1 | 8/2016 | Talathi et al. |
| 2016/0247326 A1 | 8/2016 | de Souza et al. |
| 2016/0379132 A1 | 12/2016 | Jin et al. |
| 2017/0337464 A1 | 11/2017 | Rabinowitz et al. |
| 2018/0218256 A1 | 8/2018 | Raviv et al. |
| 2019/0095798 A1 | 3/2019 | Baker |
| 2019/0197358 A1 | 6/2019 | Madani et al. |
| 2019/0197368 A1 | 6/2019 | Madani et al. |
| 2019/0370969 A1 | 12/2019 | Katzmann et al. |
| 2020/0051550 A1 | 2/2020 | Baker |
| 2020/0065625 A1 | 2/2020 | Kaufhold et al. |
| 2020/0090001 A1 | 3/2020 | Zargahi et al. |
| 2020/0090041 A1 | 3/2020 | Chakraborty et al. |
| 2020/0090045 A1 | 3/2020 | Baker |
| 2020/0097763 A1 | 3/2020 | Haerterich et al. |
| 2020/0111019 A1 | 4/2020 | Goodsitt et al. |
| 2020/0134451 A1 | 4/2020 | Baker |
| 2020/0143240 A1 | 5/2020 | Baker |
| 2020/0184337 A1 | 6/2020 | Baker |
| 2020/0210812 A1 | 7/2020 | Baker |
| 2020/0279165 A1 | 9/2020 | Baker |
| 2020/0279188 A1 | 9/2020 | Baker et al. |
| 2020/0285948 A1 | 9/2020 | Baker |
| 2020/0311572 A1 | 10/2020 | Baker |
| 2020/0327455 A1 | 10/2020 | Baker |
| 2021/0081761 A1 | 3/2021 | Baker |

OTHER PUBLICATIONS

Goodfellow et al., Generative adversarial nets. In Advances in neural information processing systems, pp. 2672-2680. 2014.

Hinton et al., Distilling the Knowledge in a Neural Network, Mar. 9, 2015, pp. 1-9 (https://arxiv.org/abs/1503.02531).

Bao et al., CVAE-GAN: Fine-Grained Image Generation through Asymmetric Training, arXiv preprint arXiv: 1703.10155 (2017).

Hoang et al., Multi-Generator Generative Adversarial Nets, arXiv preprint arXiv: 1708.02556 (2017).

Ren et al., Normalizing the Normalizers: Comparing and Extending Network Normalization Schemes, under review as a conference paper at ICLR 2017, ARXIV.ORG, Cornell University Library, 201 Olin Library Cornell University Ithaca, NY, 14853, Nov. 14, 2016, 15 pages.

Kie et al., Hyper-class Augmented and Regularized Deep Learning for Fin-grained Image Classification, IEEE Conference on Computer Vision and Pattern Recognition (CVPR), Jun. 7, 2015, pp. 2645-2654.

Nguyen et al., Dual discriminator generative adversarial nets. arXiv preprint arXiv: 1709.03831 (2017).

Ba et al., Adaptive dropout for training deep neural networks. In Advances in neural information processing systems, pp. 3084-3092. 2013.

Louizos et al., The Variational Fair Autoendcoder, arXiv preprint arXiv : 1511.00830 (2015).

Odena, Semi-supervised learning with generative adversarial networks. arXiv preprint arXiv: 1606.01583 (2016).

Pu et al., Variational Autoencoder for Deep Learning of Images, Labels and Captions. Variational autoencoder for deep learning of images, labels and captions. In Advances in neural information processing systems, pp. 2352-2360 (2016).

Kornish et al., DCNN Augmentation via Synthetic Data from Variational Autoencoders and Generative Adversarial Networks. In 2018 IEEE Applied Imagery Pattern Recognition Workshop (AIPR), pp. 1-6 . IEEE, 2018.

* cited by examiner

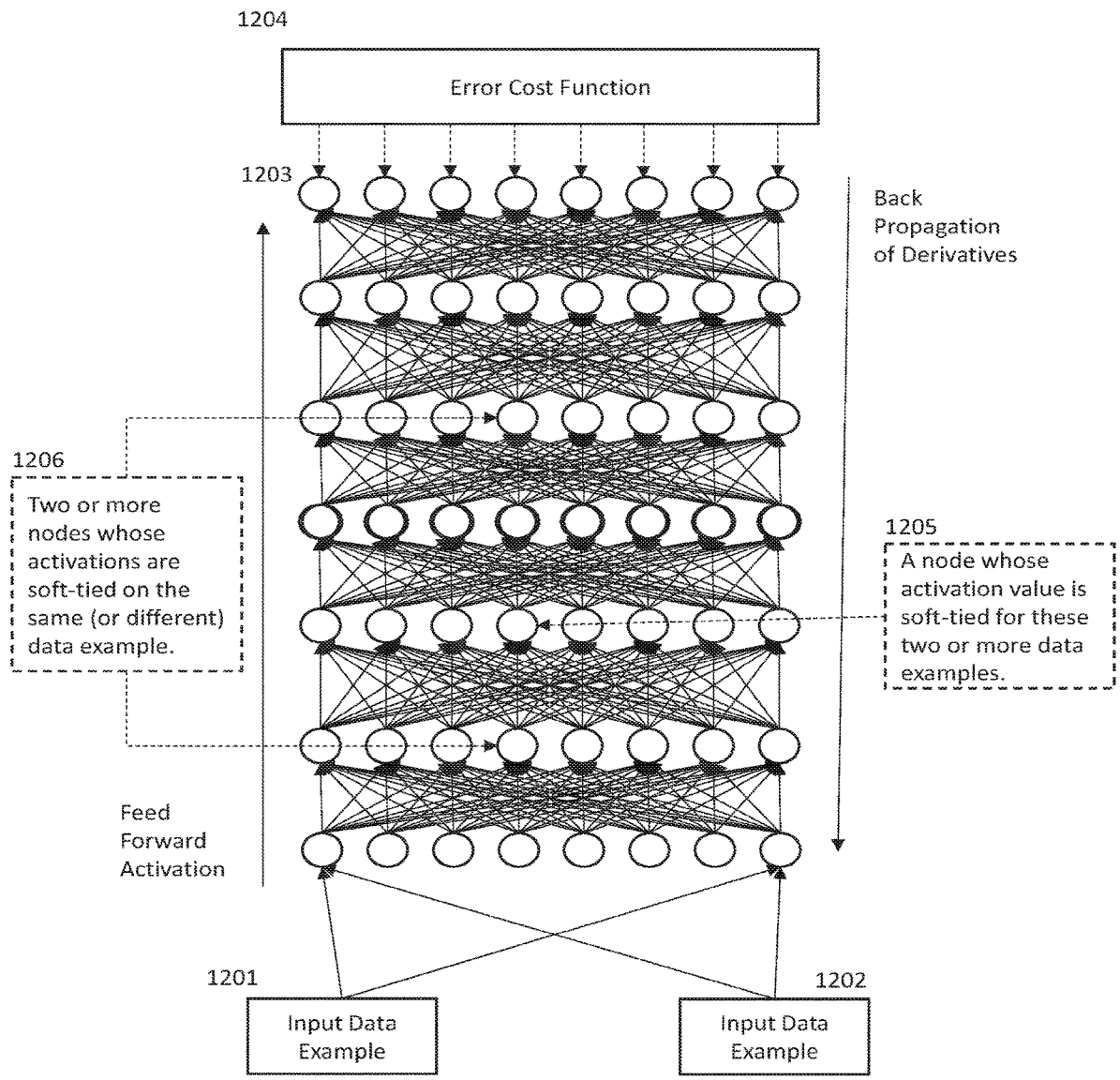

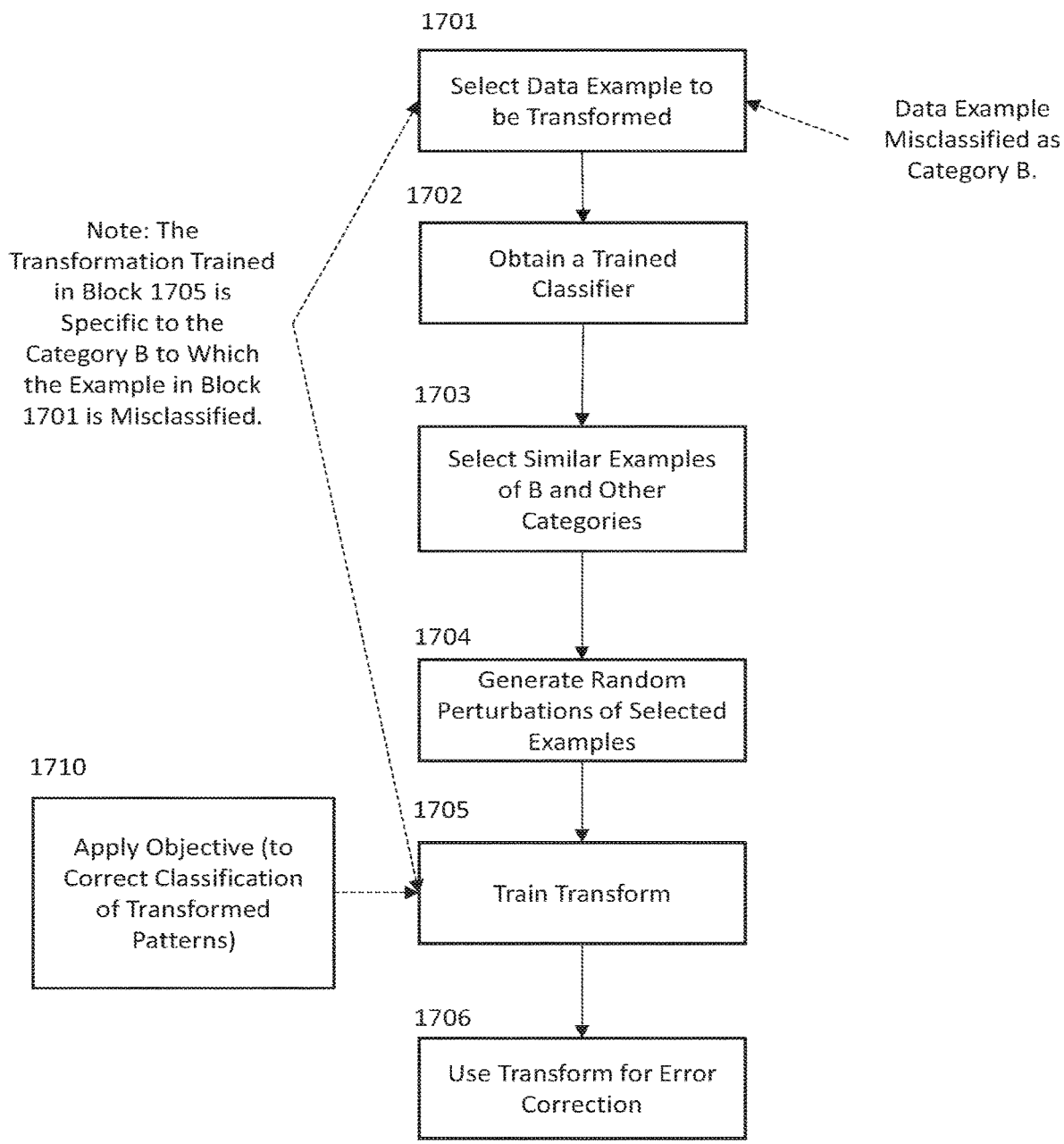

Find Change Elements for a Data Example

2402
- Arc:
  - Large Magnitude Derivative
- Node:
  - Large Magnitude Derivative
  - Indecisive
  - Has a Selected Arc

2405

Data Split: Cluster Data by Direction of Gradient, Excluding Gradients with Small Magnitude

2406

Copy Ensemble Member or Network Elements

2407

Initialize Expanded System to be Equivalent to Original System

2408

Train Original and Copies Selectively on Subsets of Data Split

2409

Optional: Add Selection Controls

2404

Train (Ensemble or New Network) on All Data

Smoother Learning:
- Temporarily increase temperature
- Gradient normalization by layer
- Nodes with objectives
- Dropout
- Noisy data selection
- Copying across layers

3902

Outside Knowledge:
- Transfer learning
- Soft ties to other networks
- Feature nodes (semi-supervised)
- Aligned networks

3903

Architecture:
- Incremental learning
    - A few layers at a time
- Data splitting
- Ensemble with combining network
- Soft ties within network
- Internal auto-encoders

3904

Creating Special Nodes:
- Feature nodes (unsupervised)
- Sparse node sets
- Softmax node sets
- Compound nodes
- Data selection nodes

LOCATING A DECISION BOUNDARY FOR COMPLEX CLASSIFIER

PRIORITY CLAIM

The present application is a continuation of U.S. patent application Ser. No. 17/815,851, filed Jul. 28, 2022, which is a continuation of U.S. patent application Ser. No. 17/810,778, filed Jul. 5, 2022, which issued as U.S. Pat. No. 11,531,900 on Dec. 20, 2022, which is a continuation of U.S. application Ser. No. 16/901,608, filed Jun. 15, 2020, which issued as U.S. Pat. No. 11,410,050 on Aug. 9, 2022, which is a continuation of U.S. patent application Ser. No. 16/645,710, filed Mar. 9, 2020, which is a national stage application under 35 U.S.C. § 371 of PCT application Serial No. PCT/US2018/053519, filed Sep. 28, 2018, which claims priority to each of the following applications: U.S. Provisional Patent Application No. 62/564,754, entitled AGGRESSIVE DEVELOPMENT WITH COOPERATIVE GENERATORS, filed Sep. 28, 2017; PCT Application No. PCT/US2018/051069, filed Sep. 14, 2018, titled MIXTURE OF GENERATORS MODEL; PCT Application No. PCT/US2018/051332, filed Sep. 17, 2018, titled ESTIMATING THE AMOUNT OF DEGRADATION WITH A REGRESSION OBJECTIVE IN DEEP LEARNING; and PCT Application No. PCT/US2018/051683, filed Sep. 19, 2018, titled ROBUST AUTO-ASSOCIATIVE MEMORY WITH RECURRENT NEURAL NETWORK, each of which is incorporated herein by reference in its entirety.

BACKGROUND

Machine learning is a process implemented by computers to self-learn algorithms that can make predictions on data through building models from sample data inputs. There are many types of machine learning systems, such as artificial neural networks (ANNs), decision trees, support vector machines, and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

SUMMARY

The present invention, in one general aspect, is designed to overcome limitations related to aggressively training machine learning systems. When training a machine learning system, there is always a trade-off between allowing a machine learning system to learn as much as it can from training data and overfitting on the training data. This trade-off is important because overfitting usually causes performance on new data to be worse. However, the various systems and methods described herein can be utilized, either alone or in various combinations, to separate the process of detailed learning and knowledge acquisition and the process of imposing restrictions and smoothing estimates, thereby allowing machine learning systems to aggressively learn from training data, while mitigating the effects of overfitting on the training data.

In another general aspect, the present invention is directed to computer systems and methods for cooperatively training multiple generators and a classifier. In various embodiments, the cooperative training includes: training, through machine learning, the multiple generators such that each generator is trained according to a first objective to output examples of a designated classification category; training, through machine learning, the classifier to determine, for each generated by the multiple generators, which of the multiple generators generated the example; and back-propagating partial derivatives of an error cost function from the classifier to the multiple generators.

The multiple generators can comprise at least first and second generators. In various implementations, training the multiple generators comprises training the first generator with an additional objective in addition to the first objective, where the second generator is not trained with the additional objective. A relative strength of the additional objective relative to the first objective can be controlled by a hyperparameter. Also, a value of the hyperparameter can be controlled with a learning coach, where the learning coach is machine learning system separate from the classifier and multiple generators, where the learning coach is trained to learn appropriate hyperparameter values for the first and second generators. In various implementations, the first generator comprises a GAN and the additional objective comprises an objective to avoid mode collapse by the GAN. In various implementations, the additional objective comprises negative feedback for the first generator when the first generator generates an example that does not belong to the designated classification category.

In various implementations, cooperatively training the multiple generators and the classifier comprises iteratively training the multiple generators and the classifier iteratively in a series of successive training rounds. In various implementations, the classifier comprises a neural network and a layer or node is added to the classifier between training rounds. In various implementations, an objective function and/or a hyperparameter is adjusted between training rounds.

In various implementations, the first and second generators have different network architectures. For example, the first generator can comprise a generative adversarial network (GAN) and the second generator can comprise a variational autoencoder (VAE). Other types of generators could also be used.

These and other benefits of the present invention will be apparent from the description that follows.

FIGURES

Various embodiments of the present invention are described herein by way of example in conjunction with the following figures, wherein:

FIG. 6A illustrates a flowchart of a process for soft-tying node activations, according to one aspect of this disclosure.

FIG. 17A illustrates a flowchart of a process for correcting difficult classification errors, according to one aspect of this disclosure.

FIG. 24 illustrates a flowchart of a process for data splitting and expanding a machine learning network or ensemble, according to one aspect of this disclosure.

FIG. 39 illustrates a flowchart of processes for training especially deep neural networks, according to one aspect of this disclosure.

DESCRIPTION

Figure 1A:
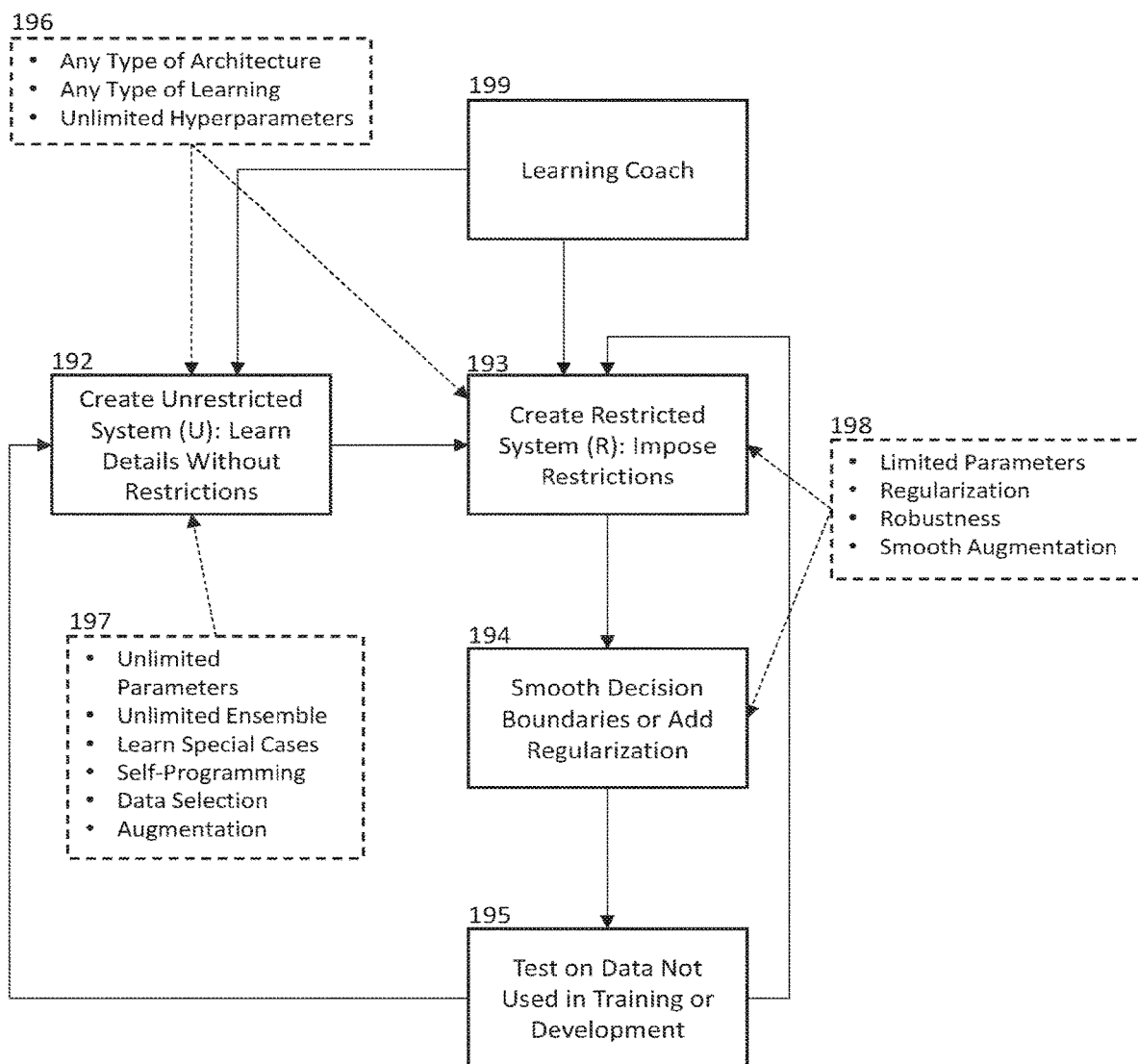
FIG. 1A illustrates a flowchart of a process for aggressively training a machine learning system, according to one aspect of this disclosure.

Each of the following patent applications are hereby incorporated by reference in their entirety: PCT Application No. US18/51069, filed Sep. 14, 2018, titled MIXTURE OF GENERATORS MODEL; PCT Application No. US18/51332, filed Sep. 17, 2018, titled ESTIMATING THE AMOUNT OF DEGRADATION WITH A REGRESSION OBJECTIVE IN DEEP LEARNING; PCT Application No. US18/51683, filed Sep. 19, 2018, titled ROBUST AUTO-ASSOCIATIVE MEMORY WITH RECURRENT NEURAL NETWORK; PCT Application No. PCT/US18/52857, filed Sep. 26, 2018, titled JOINT OPTIMIZATION OF ENSEMBLES IN DEEP LEARNING; and PCT Application No. PCT/US18/53295, filed Sep. 28, 2018, titled MULTI-OBJECTIVE GENERATORS IN DEEP LEARNING.

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are nonlimiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

The following description has set forth aspects of devices and/or processes via the use of block diagrams, flowcharts, and/or examples, which may contain one or more functions and/or operations. As used herein, the term "block" in the block diagrams and flowcharts refers to a step of a computer-implemented process executed by a computer system, which may be implemented as a machine learning system or an assembly of machine learning systems. Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

It should also be noted that throughout the various flowcharts and block diagrams presented herein, the different line types indicate the type of connections between the components of the described processes and systems. Specifically, solid lines in a neural network diagram generally indicate the combination of activation and then back propagation and dashed lines generally indicate back propagation and/or hyperparameter control.

The various aspects of the presently described processes and systems are based on the principle of aggressive development for machine learning. In machine learning, there is always a trade-off between the system learning as much as it can from the training data, on the one hand, and overfitting the training data, on the other hand. This trade-off is important because overfitting usually causes performance on new data to be worse.

Figure 29:
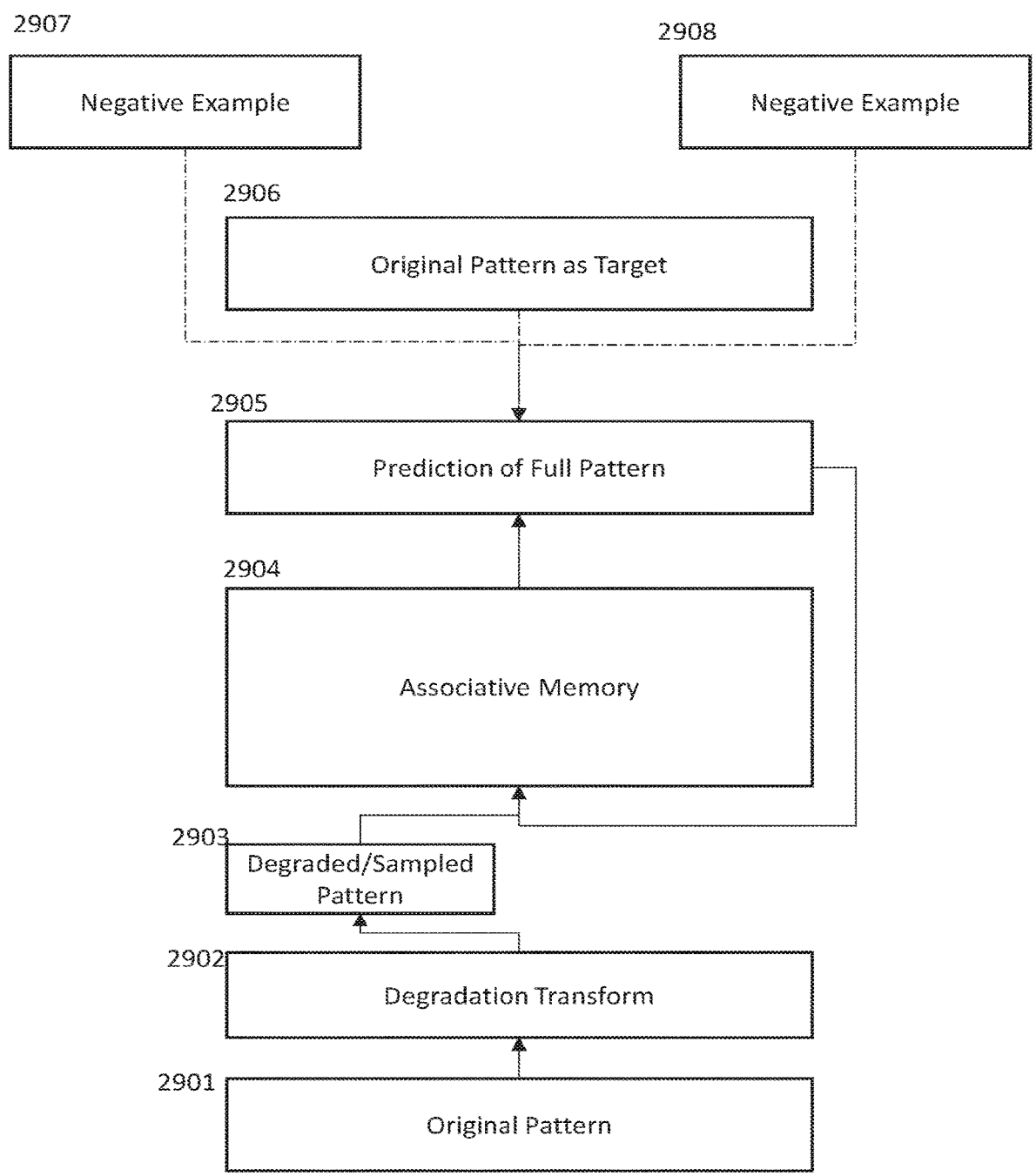
FIG. 29 illustrates a flowchart of a process for training a robust associative memory with corrective training, according to one aspect of this disclosure.
Figure 40:
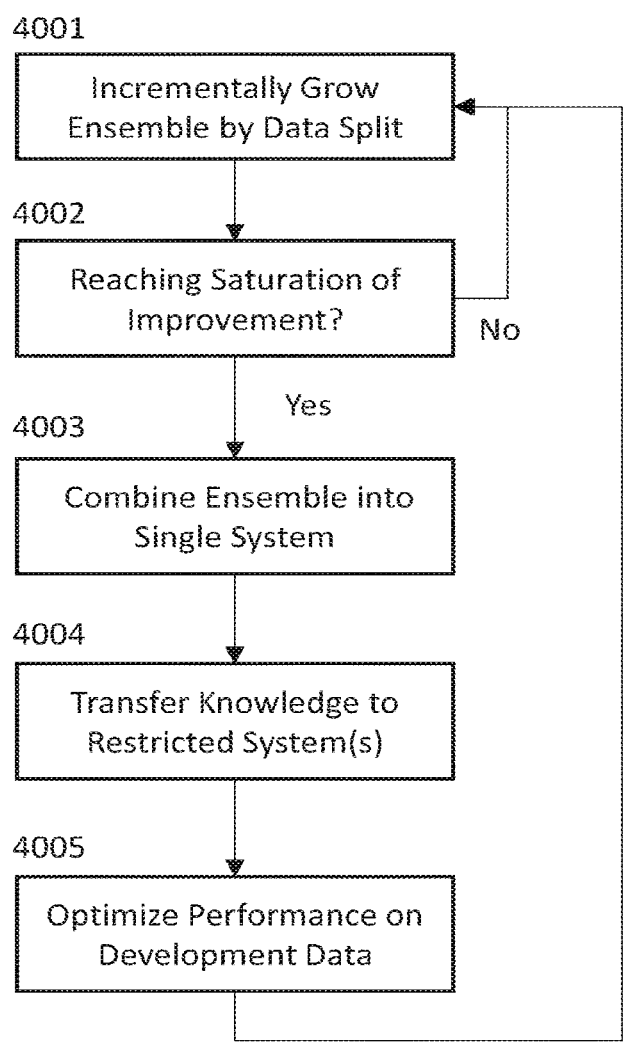
FIG. 40 illustrates a flowchart of a process for incrementally improving the performance of a machine learning system through creating and combining ensembles, according to one aspect of this disclosure.

A defining principle of aggressive development is the concept of separating the process of detailed learning and knowledge acquisition from the process of imposing restrictions and smoothing estimates to lessen overfitting. FIG. 1A is a high-level flowchart of an illustrative embodiment of this paradigm. The process illustrated in FIG. 1A could be performed by a computer system, such as the computer system 4100 shown in FIG. 41. In this illustrative embodiment, block 192 creates the relatively unrestricted classification system U. It is not necessarily completely unrestricted. It is less restricted than any system to be derived from it. Callout 197 lists some illustrative examples of the properties that the system of block 192 may have. For example, it may have an unlimited number of learned parameters. That is, through successive rounds of incremental development more learned parameters are added without a limit being imposed. In some embodiments of this invention, the ultimate example of a system U is a robust associative memory that essentially memorizes the training data, as illustrated in FIG. 29. An associative memory, also known as a content-addressable memory, retrieves data by association, rather than by an address or location as in a conventional computer memory. In other words, an associative memory does not know the location in its memory store for a given item of data; instead, it associates an input pattern with an output pattern. An associative memory functions by receiving an input search data (or tag) and then returning all data associated with the tag. A machine learning system, such as a deep neural network, can be trained to function as an associative memory, as described. In some embodiments, successive rounds of a process called data splitting are used, for example, by the process illustrated in FIG. 35. In some embodiments, there are successive rounds of growing an ensemble and then combining the ensemble into a single network, for example, as illustrated in FIG. 40.

In some embodiments, selection of properties for unrestricted machine learning system U and the process of iteratively building higher performance version of unrestricted machine learning system U may be controlled by a learning coach 199. A learning coach 199 is a separate machine learning system that learns to control and guide the development and training of one or more machine learning systems, such as the unrestricted machine learning system U of block 192 and the restricted machine learning system R of block 193. A machine learning system embodying a learning coach 199 is described in further detail in PCT Application No. US18/20887, filed Mar. 5, 2018, titled LEARNING COACH FOR MACHINE LEARNING SYSTEM, which is hereby incorporated by reference in its entirety.

Figure 21:
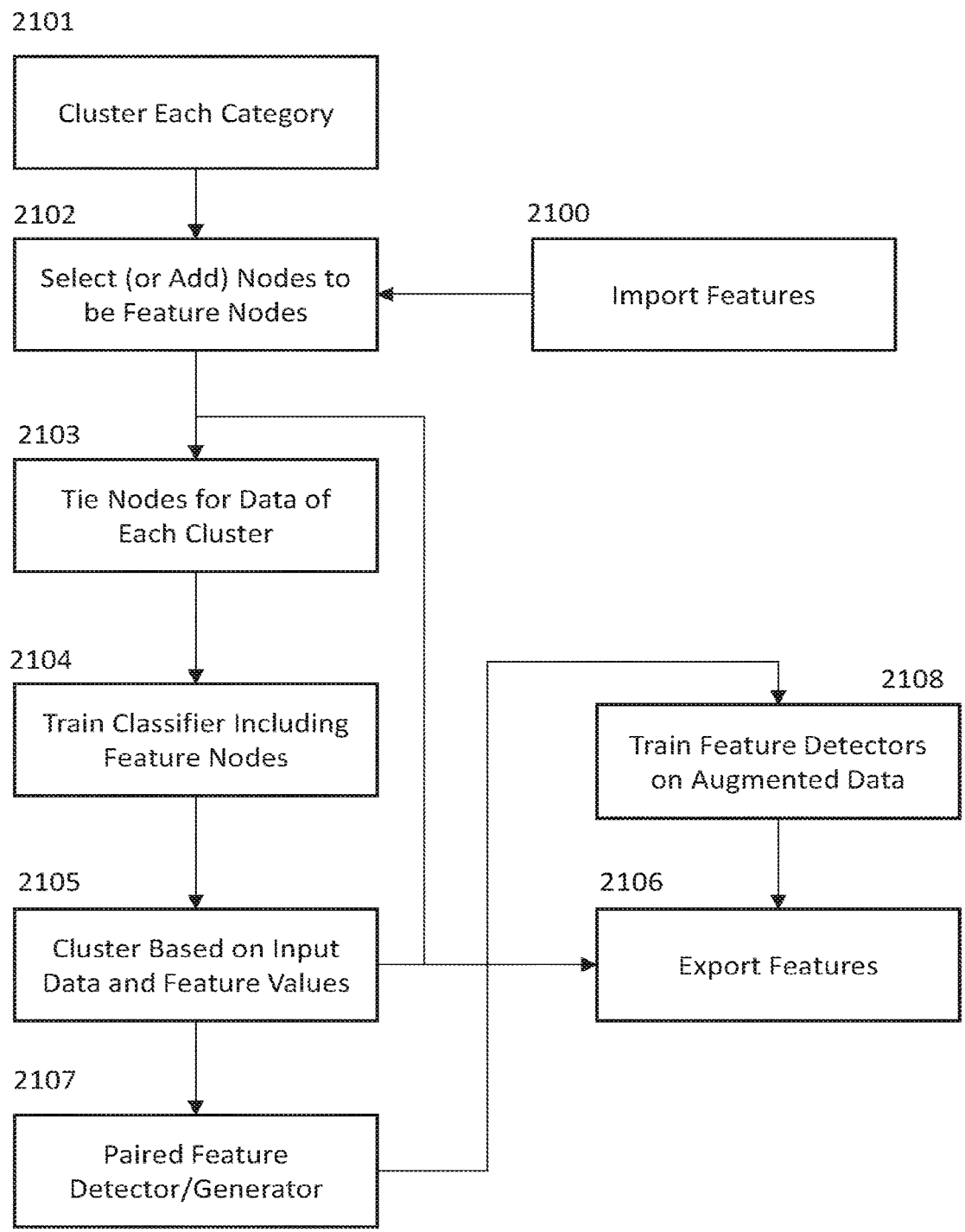
FIG. 21 illustrates a flowchart of a process for creating feature detection nodes, according to one aspect of this disclosure.

At block 193, the computer system 4100 creates the restricted systems R and imposes restrictions. In some embodiments, more than one restricted system R is created. In some embodiments, the restricted systems R are created and analyzed one at a time. In some embodiments, several restricted systems R are created and analyzed at the same time. In some embodiments, the systems that are called "restricted" in FIG. 1A differ from system U in more complex ways that are not necessarily considered restrictions. For example, system 193 in FIG. 1A may have more feature nodes. Feature nodes are illustrated in FIG. 21. Feature nodes generally have the effect of reducing the number of degrees of freedom of the parameters. However, the feature nodes themselves may overfit the data, so the relationship of features to overfitting is more complex than for some other techniques.

At block 194, the computer system 4100 smooths the decision boundaries and performs other actions to reduce any overfitting that occurred in spite of the restrictions. For example, block 194 may use the techniques illustrated in FIGS. 22 and 23 for testing the smoothness or irregularity of the decision boundary. In some embodiments, the restrictions in block 193 smooth the decision boundaries enough and block 194 is optional. Block 195 tests the performance of the current system configuration, preferably on data that has not been used in the training and development and then either returns control to block 193 to create another restricted system R or to block 192 to create another less restricted system U.

The process illustrated in FIG. 1A is thus an iterative loop in which, after each pass through the loop, either the unrestricted system U or the restricted system R is replaced. One characterization of the difference between the unrestricted system U and a corresponding restricted system R during a pass through the loop of FIG. 1A is a comparison of their respective performance on training data and on independent development test data. In general, the performance of any system on training data is expected to be better than its performance on independent test data, except for statistical fluctuations in performance from random sampling of the data. The consistent characteristic difference between unrestricted system U and a corresponding restricted system R during the same pass through the loop from block 192 to block 195 and back to 192 in FIG. 1A is that (1) the performance of the unrestricted system U on training data should be better than the performance of restricted system R on the same training data and (2) the performance of restricted system R on an independent development test set should be better than the performance of unrestricted system U, other than statistical fluctuation due to the random choice of data.

If the performance of the restricted system R on the training data is better than the performance of unrestricted system U beyond a specified level of statistical significance, then the restricted system R may be used to replace the unrestricted system U to become the unrestricted system U for the next pass through the loop. Similarly, if the performance of the unrestricted system U on the development test data is better than the performance of the restricted system R beyond a specified level of statistical significance, then restricted system U may be used to replace system R to become the new restricted system R for the next pass through the loop.

The goal of the iterative loop is to develop a system whose performance on independent development test data is as high as possible. The iterative loop is repeated until a stopping criterion is met. In various aspects, the stopping criterion may be, for example: (1) that there is not a statistically significant difference between the performance of unrestricted system U on training data and the performance of restricted system R on independent test data, (2) a predetermined performance goal has been achieved, or (3) a predetermined limit on the number of iterations or the amount of computation has been reached.

Callout 197 lists some example properties that are true of the unrestricted system U in some embodiments. For example, the unrestricted machine learning system U 192 can: (i) have an unlimited number of parameters (for example, if machine learning system U 192 is a neural network, an unlimited number of nodes and arcs may be added to the network), (ii) have an unlimited number of members in an ensemble, (iii) learn special cases (for example, machine learning system U 192 may build a subsystem to correctly classify an individual data item), (iv) be capable of self-programming (for example, if machine learning system U 192 is a neural network, a learning coach may change the architecture of machine learning system U 192), (v) be capable of data selection (in other words, a proper subset of the training data may be selected for training an individual element of machine learning system U 192, such as a node in a neural network with different subsets of the training data selected for different elements), and/or (vi) be capable of augmenting data (in other words, additional training data may be obtained by transforming or perturbing a training data item or by creating additional data with a generator). More details about these and other properties of unrestricted machine learning system U are discussed in association with FIGS. 1C, 1D, 1E, 1F, and other figures.

Callout 198 lists some example properties that are possessed by the restricted systems developed by blocks 193 and 194 in some embodiments. For example, the restricted machine learning systems can: (i) have limited parameters and limited degrees of freedom, (ii) have regularization applied, which may help restrict the number of degrees of freedom or may help smooth the decision boundaries and in general may decrease the tendency of the restricted machine learning system (developed by blocks 193 and 194) to overfit the training data, (iii) be trained for robustness (in other words, the restricted machine learning system may be trained to be robust against perturbations, transformations, and noise), and/or (iv) utilize smooth augmentation (for example, additional training data may be obtained by transforming or perturbing a training data item or creating additional data with a generator in a region of data space in which the decision boundary fails to be smooth because of the sparsity of the training data items). These and other properties of the restricted machine learning systems developed by blocks 193 and 194 are discussed in more detail in association with FIG. 1B and other figures.

Callout 196 lists some example properties that are generally true of both the unrestricted system U 192 and the restricted systems R (developed by blocks 193 and 194). For example, either system can be any type of machine learning classifier, including but not limited to: decision tree, support vector machine, random forest, hidden Markov process model, artificial neural network, or others. Each machine learning system may use any training algorithm appropriate for its type. Each machine learning system may have an unlimited number of hyperparameters. For example, if either the unrestricted machine learning system U 192 or the restricted machine learning system (developed by blocks 193 and 194) is a neural network, the neural network may have a hyperparameter (for example, learning rate) that has a customized value for each node in the network.

Many embodiments of this invention use generators. Many of the generators are deep neural networks. However, a generator may be used to support the development of any type of machine learning system; therefore, when a deep neural network generator is used in the development of a system, such as the unrestricted system U (192) of FIG. 1A or the restricted systems (193 and 194), there is no requirement that the unrestricted system or the restricted systems also be neural networks.

Figure 1B:
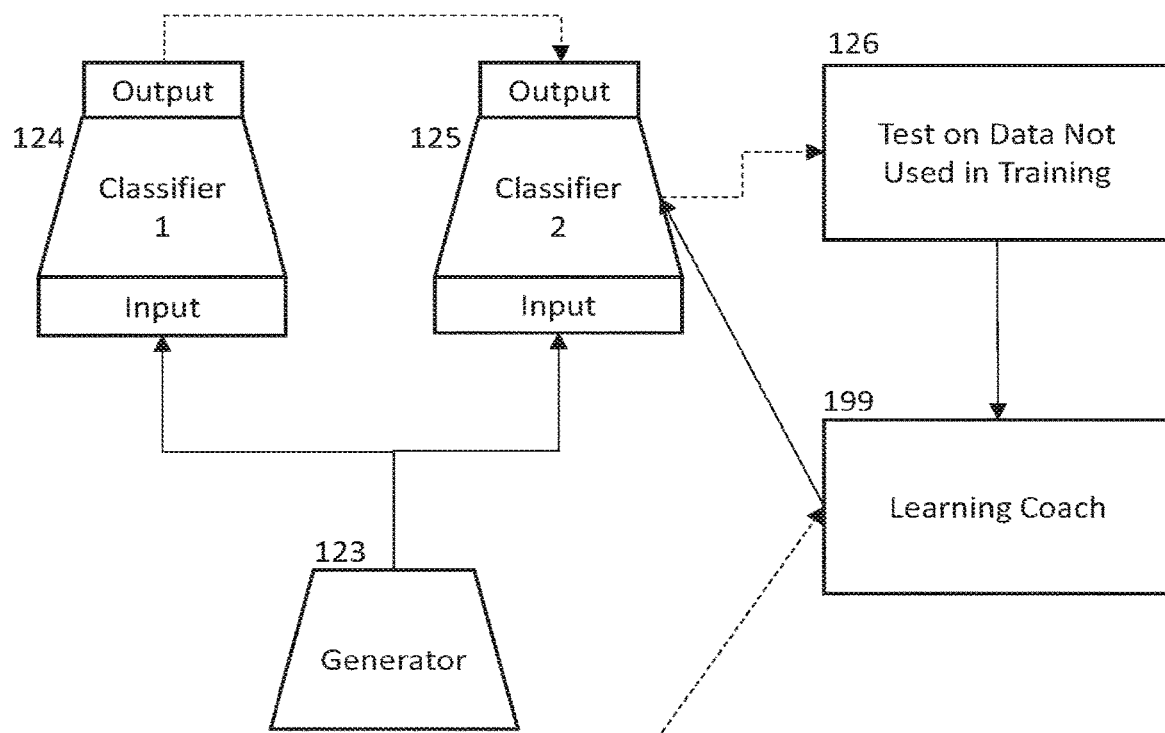
FIG. 1B illustrates a block diagram of a system for generating a restricted system from an unrestricted system utilizing a generator, according to one aspect of this disclosure.
Figure 27A:
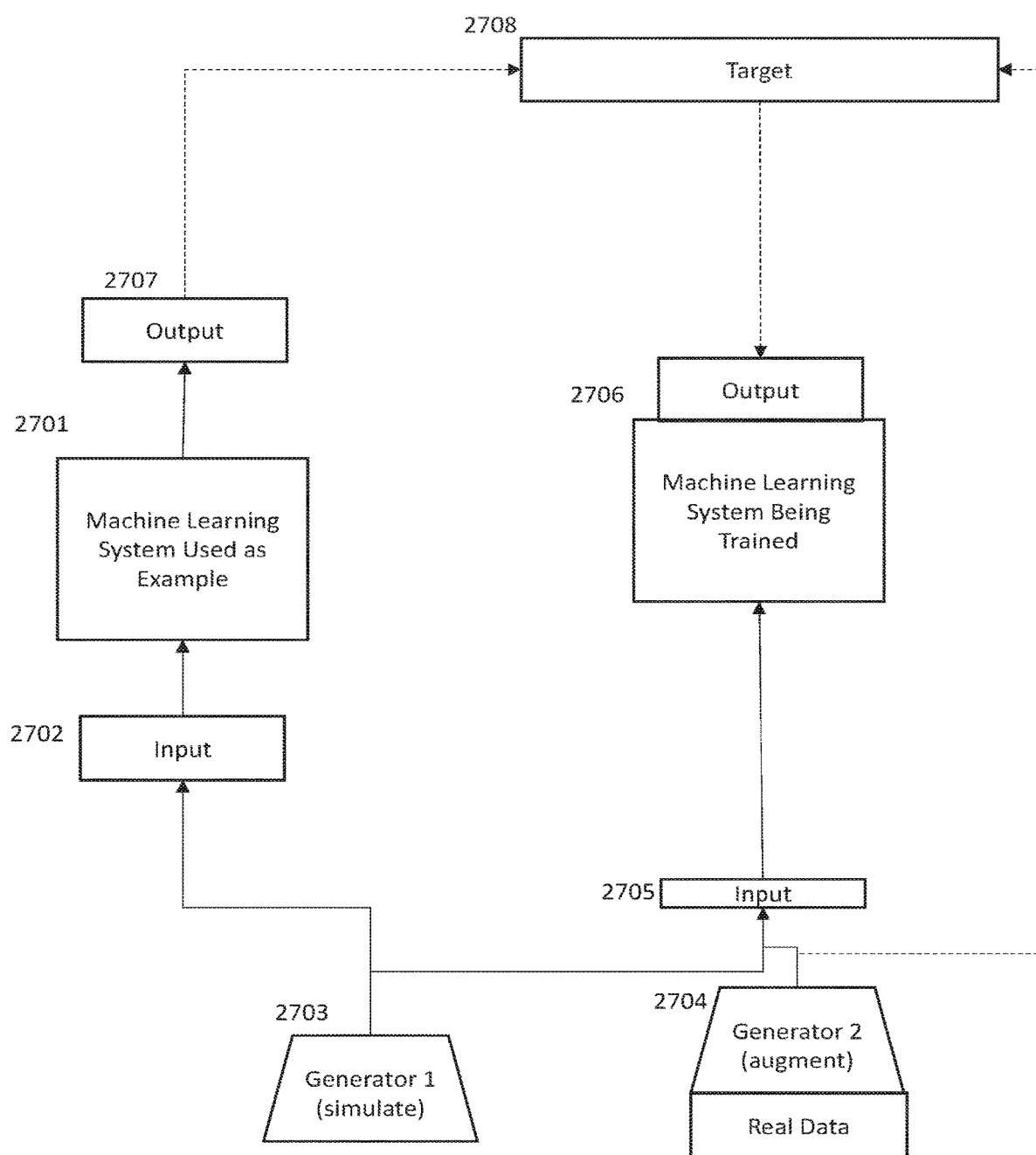
FIG. 27A illustrates a flowchart of a process for transferring learning, as facilitated by generators, according to one aspect of this disclosure.
Figure 27B:
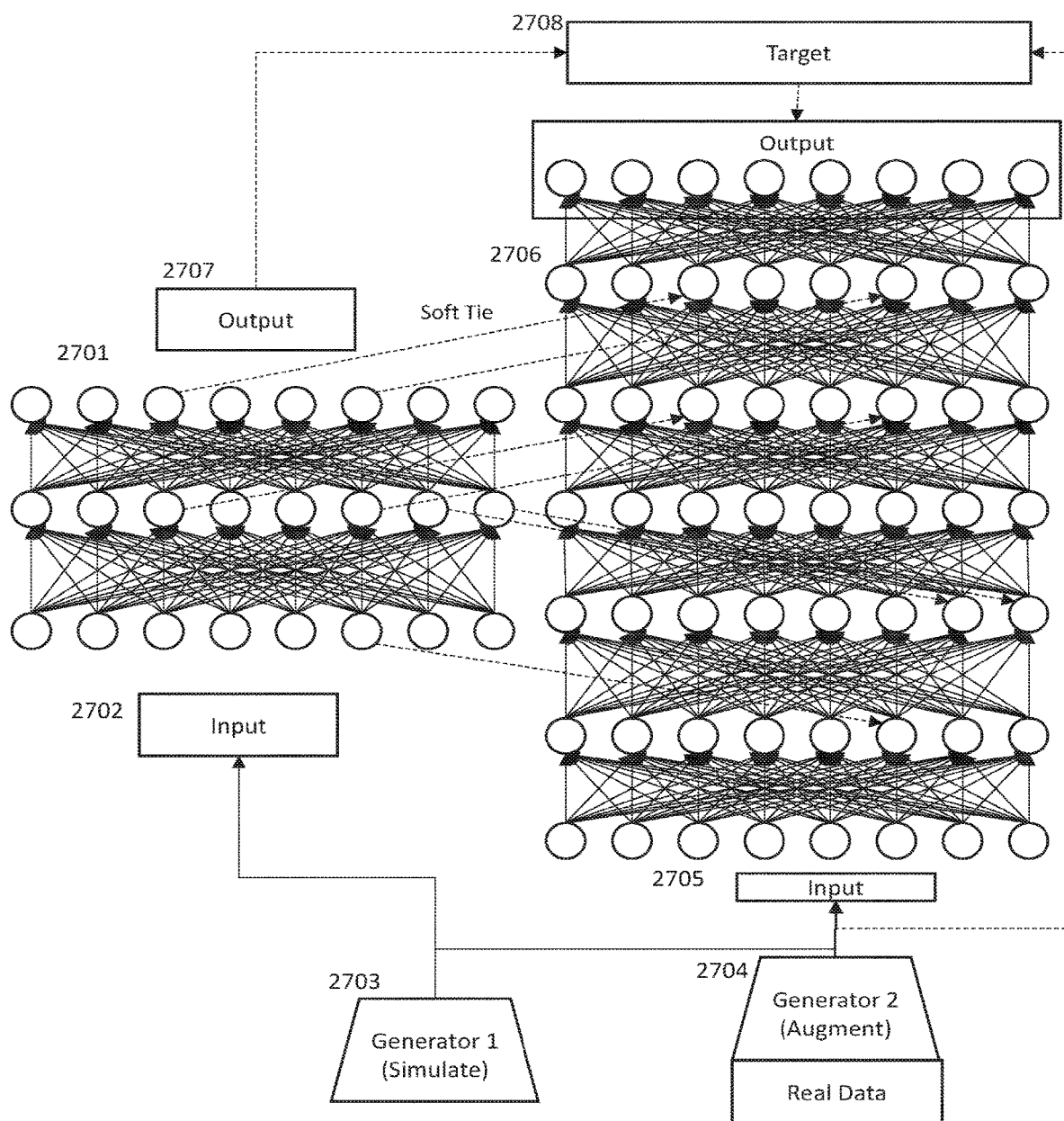
FIG. 27B illustrates a flowchart of a process for transferring learning between soft-tied neural networks, as facilitated by generators, according to one aspect of this disclosure.

A block diagram of one illustrative example of a way that a restricted system may be developed from an unrestricted system with the help of a generator 123 is shown in FIG. 1B. The process illustrated in FIG. 1B could be performed by a computer system, such as the computer system 4100 shown in FIG. 41. FIG. 1B illustrates transfer of knowledge from a first classifier 124 to a second classifier 125. This knowledge transfer could be called "transfer learning." However, the phrase "transfer learning" is sometimes afforded a technical definition in that art that differs from the process described here. Therefore, the process of knowledge transfer from classifier 124 to classifier 125 is herein referred to as "learning by imitation." Other illustrative embodiments of learning by imitation are illustrated in FIGS. 27A and 27B. This block diagram can be used to transfer knowledge between any two classifiers. For example, the first classifier 124 can be an unrestricted classifier and the second classifier 125 can be a restricted classifier. As an illustrative embodiment, the second classifier 125 can be trained as follows:

1. Generator 123 generates an unlimited number of data examples. Many embodiments of cooperative generators are illustrated in other figures.
2. Some of those data examples are classified by the first classifier 124.
3. Some of the data examples classified by the first classifier 124 and their associated classification categories output by the first classifier 124 form a training set for the second classifier 125. Other data examples and classification categories generated by the first classifier 124 are set as development, validation, and test data.
4. The second classifier 125 is trained using data examples from the first classifier 124 as a target output and assessed using independent test data. In other words, the target objective for the second classifier 125 is to produce the same output as the first classifier 124.
5. The second classifier 125 is tested on data that was not used in training by block 126.
6. The second classifier 125 differs from the first classifier 124. In some embodiments, for example, callout 127 lists some example restrictions that might be imposed on the second classifier 125 when the second classifier 125 is being trained as a restricted classifier in blocks 193 and 194 of FIG. 1A.

Figure 4:
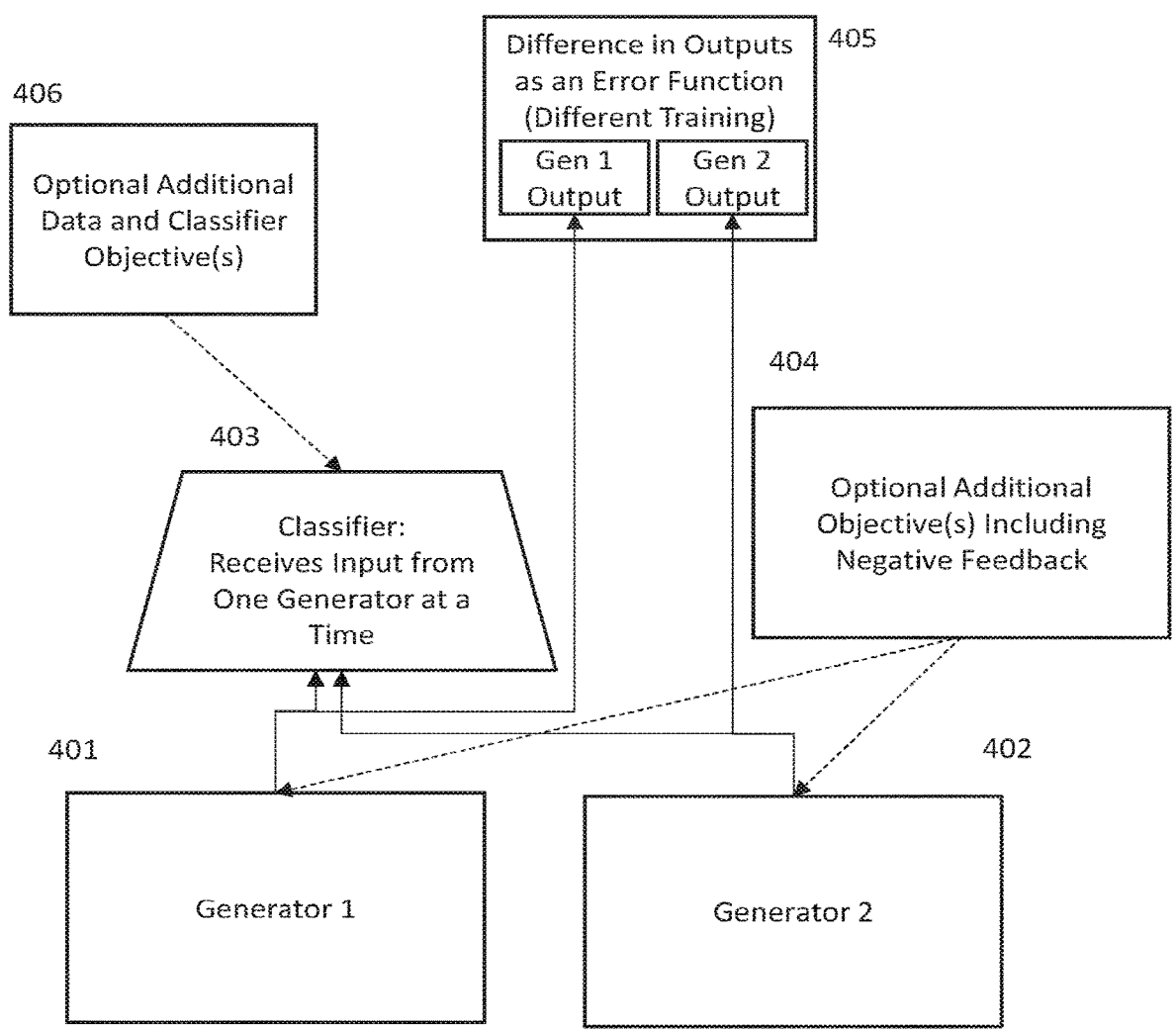
FIG. 4 illustrates a block diagram of a system for training cooperating generators, according to one aspect of this disclosure.

The following lists gives examples of restrictions that might be imposed on the second classifier 125 in some embodiments. Not all of these restrictions apply to all embodiments or to all types of machine learning systems. For example, many of these restrictions only apply to neural networks. For each type of machine learning system, this list is to be understood as selecting restrictions from among the ones that are applicable to that type of machine learning system. In some embodiments, the process of selecting among these potential restrictions may be managed by a learning coach 199 implemented on computer system 4100. For this selection process, a learning coach 199 may measure the performance on development data that is disjoint from the training data (as indicated by the connection from block 126 to the learning coach 199) and select restrictions that improve the performance on development data. Some example restrictions include:

1. Limited Parameters: The number of parameters or the effective number of degrees of freedom is reduced.
2. Multiple Objectives: The classifier is trained to meet other objectives in addition to the original classification task. Having additional objectives limits the ability of the classifier to overfit on the original task. An illustrative example of the use of multiple objectives is illustrated in FIG. 4, and another example in FIG. 34. Many of the generators discussed in this disclosure use multiple objectives to improve their ability to generalize beyond the training data.
3. Regularization: Smoothing the estimates of the learned parameters or limiting their range. There are many techniques of regularization. For example, L2 regularization adds an extra term to the cost function that is proportional to the sum of the squares of the learned parameters, pushing the parameters towards the value zero and thus preventing them from growing too large. Several forms of regularization are known to those skilled in the art of training neural networks.
4. Robustness: Various embodiments of this invention use techniques to make the learning more robust against noise or even deliberate adversarial examples. An extra benefit of making the learning robust is that it reduces the ability of the system to overfit. Examples of training for robustness in various embodiments are given in FIGS. 29, 32, and 33.
5. Smooth Augmentation: Various embodiments of this invention use generators to augment the training data for various purposes, including the simple need for more training data. However, as an additional benefit, augmenting an individual data example using a stochastic generator makes it necessary for the system to classify a set of data around the original data example, not just the individual data example by itself. Furthermore, a generator such as a SCAN (see FIG. 6C) or a MGM (see FIG. 20) can be controlled by hyperparameters to increase or decrease the standard deviation of the probability distribution of its generated examples. This property allows the implicit degree of smoothing in the decision boundary to be controlled.

6. Feature Representation: Explicitly representing one or more lower-level features with feature detection classifiers within a machine learning system tends to stabilize the training. An illustrative embodiment of feature discovery is illustrated in FIG. 21.

Figure 6B:
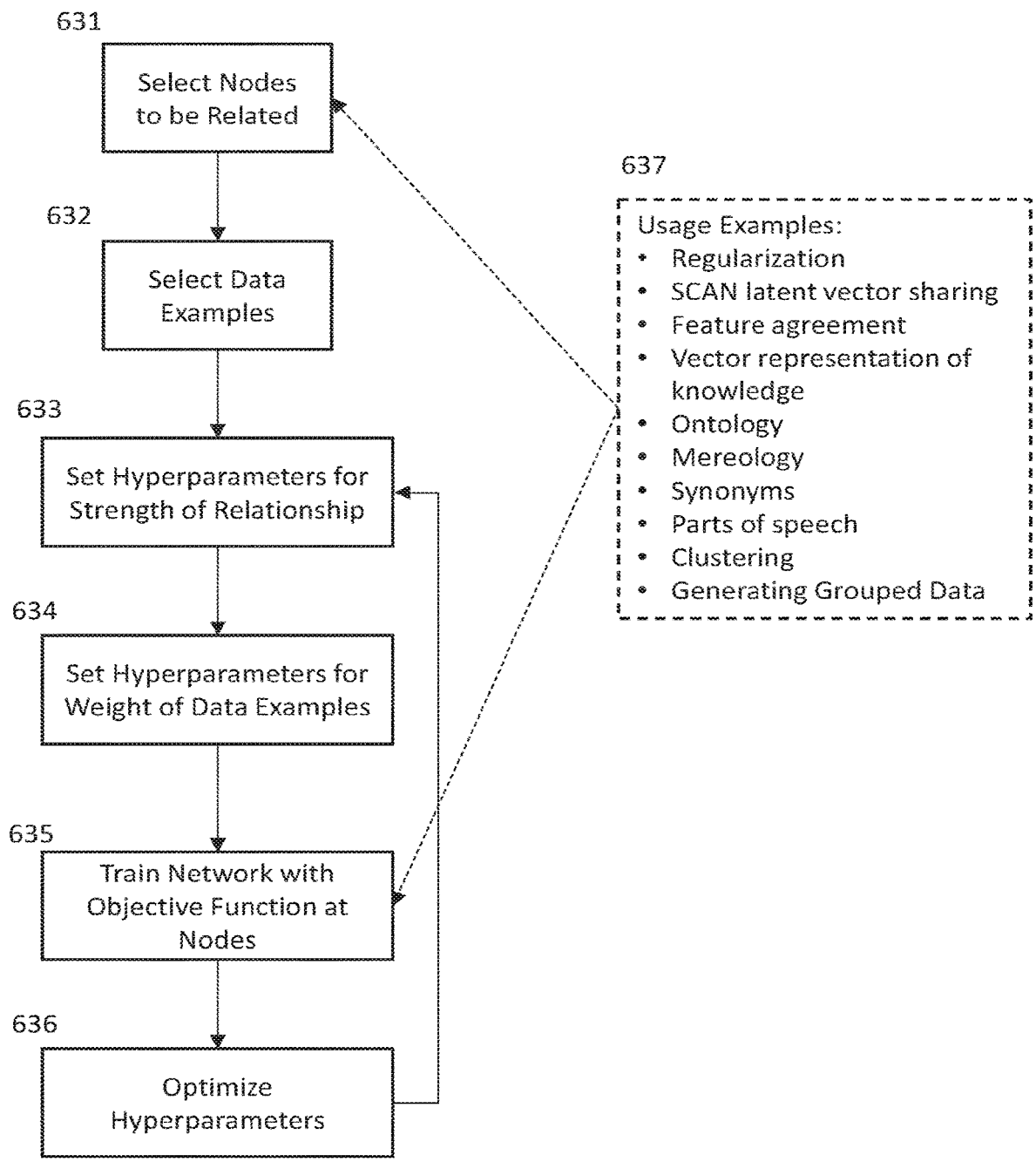
FIG. 6B illustrates a flowchart of a process for soft-tying node activations, according to one aspect of this disclosure.
Figure 6C:
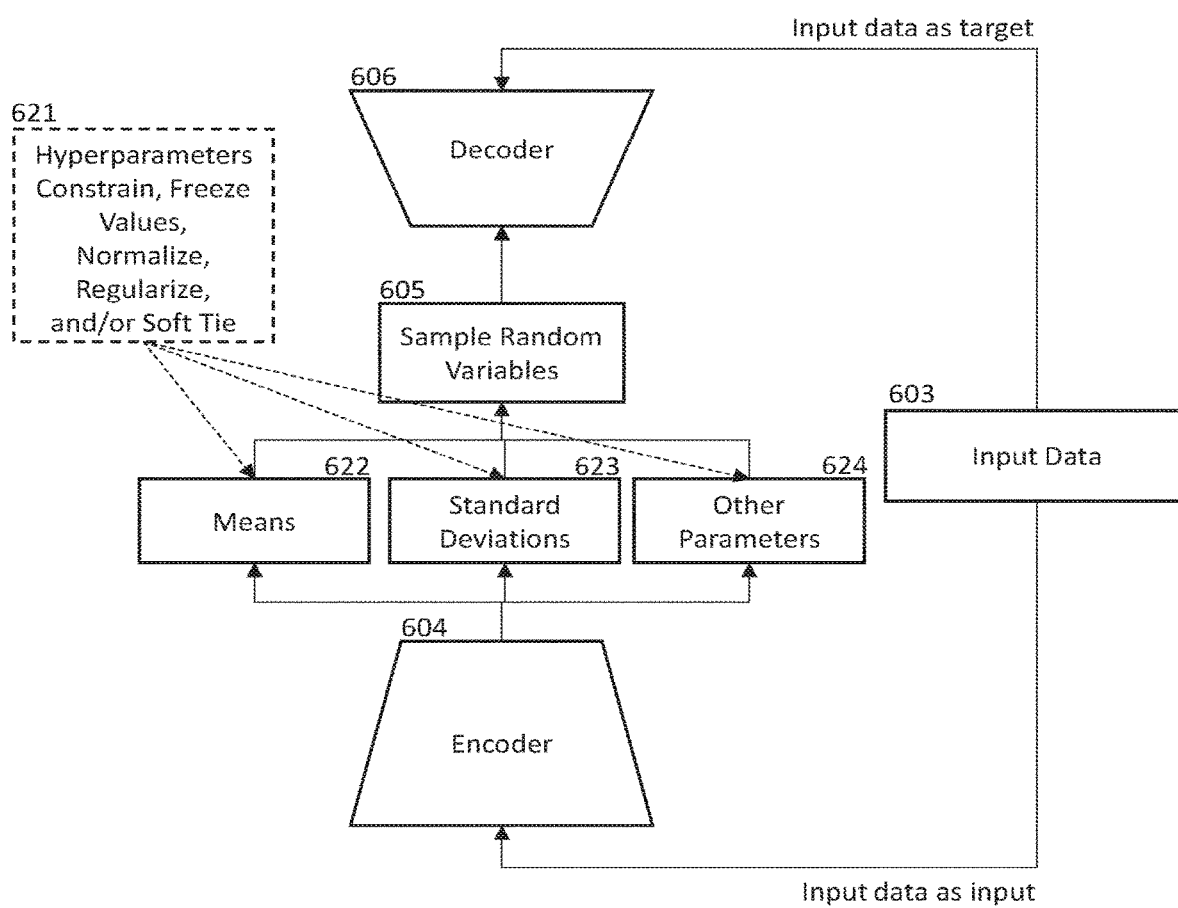
FIG. 6C illustrates a block diagram of a stochastic categorical autoencoder network (SCAN), according to one aspect of this disclosure.

7. Soft Tying: Soft tying is a technique in some embodiments of this invention related to neural networks. In some aspects, soft tying consists of adding a term (referred in some cases as a "relaxation term") to the cost function for each node in a set of nodes to penalize the nodes for having their activation values diverge from each other. Customized hyperparameters can limit the soft tying to particular data examples, for example, the data examples within a cluster. Illustrative embodiments of soft tying are illustrated in FIGS. 6A, 6B, and 27B. Soft tying is also used for training a SCAN, as illustrated in FIGS. 6C and 9. It is implicitly used for knowledge sharing in many other embodiments.

8. (Hard and Soft) Tying of Learned Parameters: Convolutional neural networks cause the connection weights in convolutional networks in different locations in an image to be identical and to share all their training data. Some embodiments of this invention generalize this process to include hard and soft tying and to allow arbitrary sets of learned parameters to be tied. With soft tying, a learned parameter may participate in multiple, overlapping soft tying sets. In neural networks, soft tying can be applied not only to learned parameters, such as connection weights, but also to values that are data dependent, such as node activations. The activation of a node for one data example can be soft-tied to the activation of the node in another data example, or to a set of data examples. The node activations of two or more nodes in a network or even in different networks processing the same data example can also be soft-tied. All instances of soft or hard tying reduce the effective number of degrees of freedom.

9. Shared Knowledge: Shared knowledge is knowledge about features or data examples that can be shared among parts of a machine learning system or among a number of cooperating machine learning systems. Various embodiments of this invention implement the integration of shared knowledge by adding terms to the cost function to help the system learn the imported knowledge. These added terms in the cost function have effects similar to the effects of extra objectives and regularization terms. They reduce the effective number of degrees of freedom of the parameters. An illustrative embodiment of one method for transferring and sharing knowledge is illustrated in FIG. 6F. Knowledge may also be shared by soft tying node activations. Knowledge may be transferred by learning by imitation, for example, as illustrated in FIGS. 1B, 27A, and 27B.

10. Dropout: Dropout is a technique that randomly selects nodes in a neural network and temporarily sets the activation values of those nodes to zero. This process forces the remainder of the network to learn to classify the data examples during the dropout without the help of the dropped nodes. Some embodiments of this invention expand the number of hyperparameters to customize the control of dropout. Some embodiments implement nonrandom, controlled dropout. Some embodiments implement generalizations to dropout, for example by making the probability of being selected from dropout vary from node to node, dependent on hyperparameters, and dependent on data conditions in some embodiments. Dropout is known to those skilled in the art of training neural networks.

11. Noise Applied to Node Activations: Some embodiments of this invention add noise to nodes in a neural network in a way similar to dropout. That is, some nodes are randomly selected for some form of disturbance to the activation value, except the form of disturbance is not limited to setting the activation value to zero. For example, a node may have its activation value multiplied by a random positive number in a specified range, or may have a random positive or negative number added to the input to the activation function, or other random changes may be made. Hyperparameters would control the type of change, the range of allows value for the changes, as well as the probability of making a change. As with the generalizations of dropout, these random changes in node activation vary from node to node and can be data dependent in some embodiments. In some embodiments, the application of noise to nodes in a network may be controlled by a learning coach.

Figure 34:
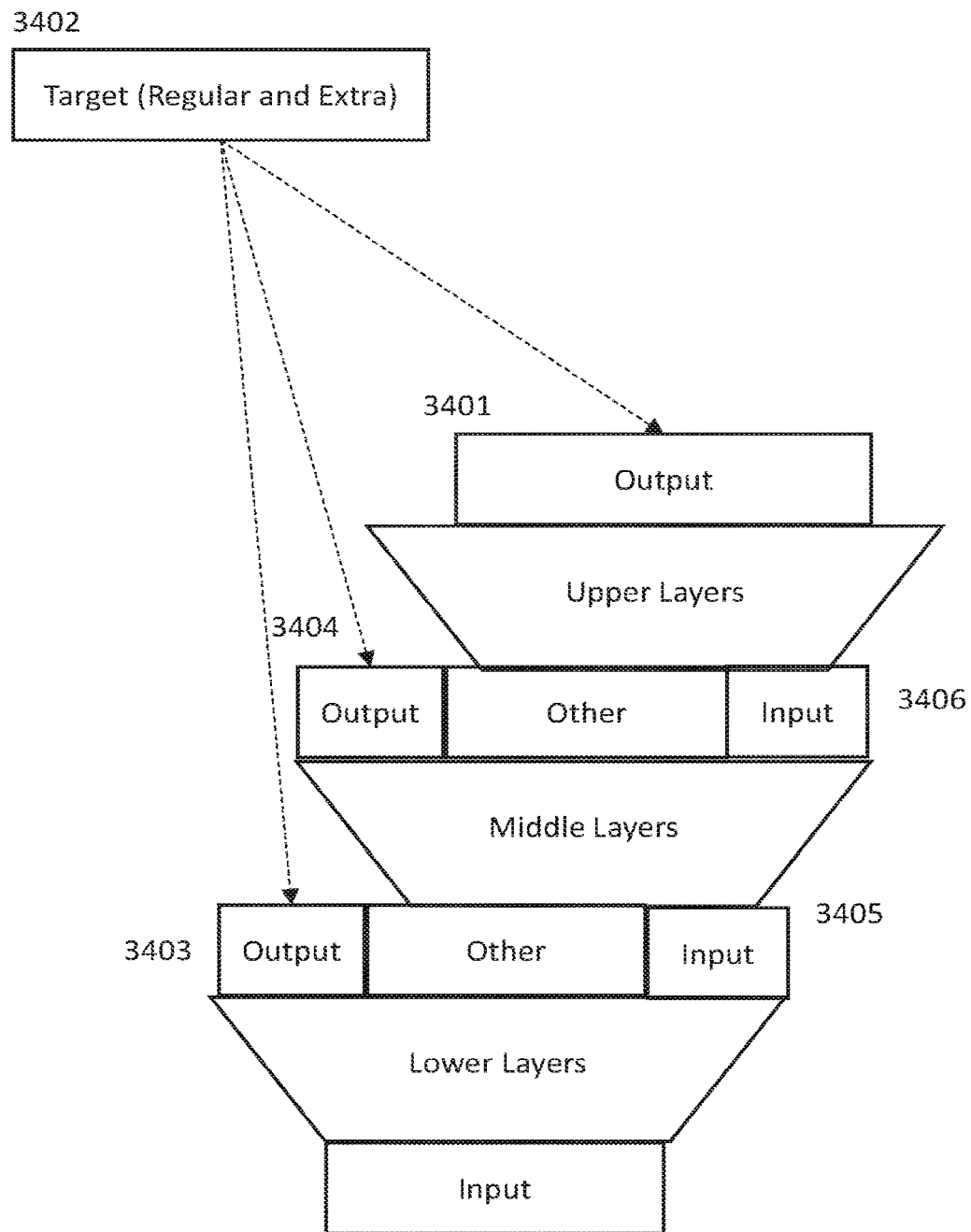
FIG. 34 illustrates a block diagram of a neural network including middle layers having objectives, according to one aspect of this disclosure.

12. Fixed Value Nodes: Fixed value nodes are nodes in inner layers that do not have any connections coming in from other nodes. The activation value of a fixed node does not depend on the activations of the lower layer. The activation value may be a copy of an input node, it may be set by an external specification, or it may be set by or added to a bias, which could be a learned parameter or can be set by a hyperparameter. With respect to back propagation, fixed nodes behave like input nodes in the middle layers of the network. However, they do not necessarily depend on the input. The addition of fixed nodes has a relatively neutral effect on the number of degrees of freedom but has a stabilizing influence on the learning process. An illustrative example of fixed nodes is shown in FIG. 34.

13. Objectives for Inner Nodes: Nodes in inner layers in a neural network may have multiple objectives just like output nodes can. Multiple objectives add additional terms to the cost function. The cost function of a local objective directly adds its derivative to the gradient being back propagated to the node. As with multiple output objectives, multiple objectives for inner layers effectively reduce the number of degrees of freedom. An illustrative example of objectives for inner nodes is shown in FIG. 34.

Figure 22:
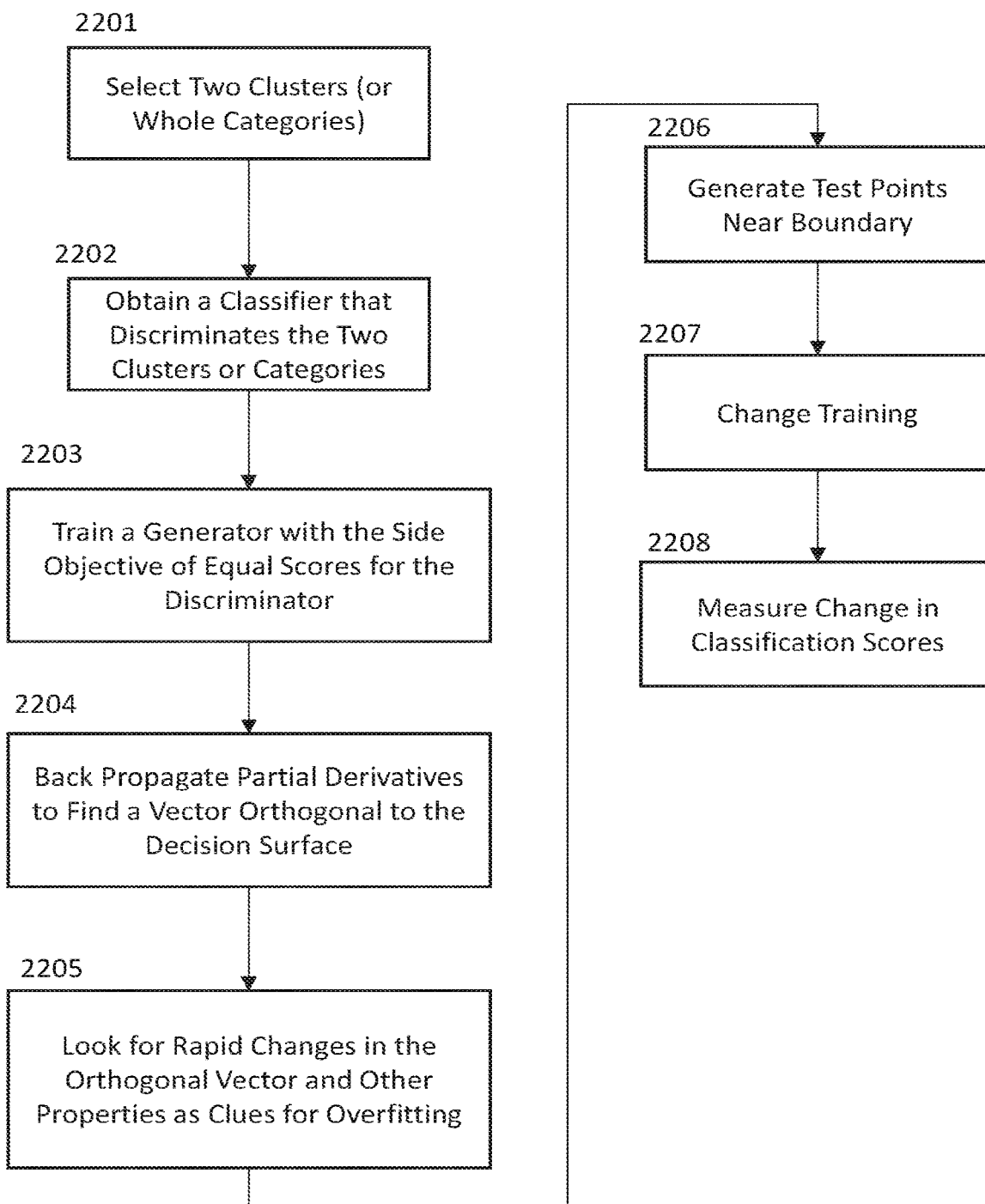
FIG. 22 illustrates a flowchart of a process for locating and generating a description of the decision boundary in a complex classifier, according to one aspect of this disclosure.

14. Smoother Boundary: Any specification of a smoother boundary can be directly trained by learning by imitation without having to find a set of parameter values that fit the boundary. The desired boundary does not even need to have a parametric representation. Learning by imitation will teach the machine learning system to approximate the desired boundary. An illustrative embodiment of generating the decision boundary to study its properties is shown in FIG. 22. Examples of diagnostics for the smoothness or irregularity of the decision boundary are presented in FIGS. 22 and 23. Illustrative examples of learning by imitation are shown in FIGS. 1B, 27A, and 27B.

15. Data Dropout: Data dropout is distinct from the process called "dropout," which refers to random dropout of nodes in a neural network. In contrast, "data dropout" refers to dropping out or lowering the influence of data examples under control of hyperparameters. Data dropout applies to all types of machine learning systems. The hyperparameter $d_m$, introduced in the pseudocode below, controls the "influence" weight of data example m. In an expanded set of hyperparameters in some embodiments of this invention, there is a hyperparameter $d_m$ for each data example. In training on data example m, any incremental update to any learned parameter is multiplied by the influence weight $d_m$ of the data example. By default, all influence weights are equal to one. The effect of any data example m can be increased or decreased by changing its influence weight. Setting $d_m$ to zero effectively drops the data example m. Dropping a data example nominally decreases the amount of training data. However, if a data example that is causing overfitting has its influence weight decreased or set to zero, that directly reduces the amount of overfitting. Data dropout may be controlled by a learning coach. For example, the change of the influence weight of a data item may be adjusted based on an estimate of the partial derivative of the performance on an independent test set with respect the change in the influence weight of a data item in the training set.

16. Random Changes in Labels, Feature Values, and Other Category-Valued Variables: Random changes to the category-valued variables help train the system to be robust against random or unexpected changes that occur with new data. These random changes also reduce the ability of the system to overfit. In some embodiments, these changes may be controlled by a learning coach. For example, a learning coach may explore the possible changes in these attributes through a process of reinforcement learning.

17. Decisive Nodes: In some embodiments, some or all nodes are selected to have a decisiveness objective, as defined in FIG. 32. Once a node is decisive on a set of data examples, it is less likely to change during further training. Decisiveness may be undesirable during early training. However, during later training decisiveness reduces the effective number of degrees of freedom. In some embodiments in which the size of a network is grown incrementally, it is desirable for nodes in the older part of the network to be trained to be more decisive before the network is expanded.

Figure 1C:
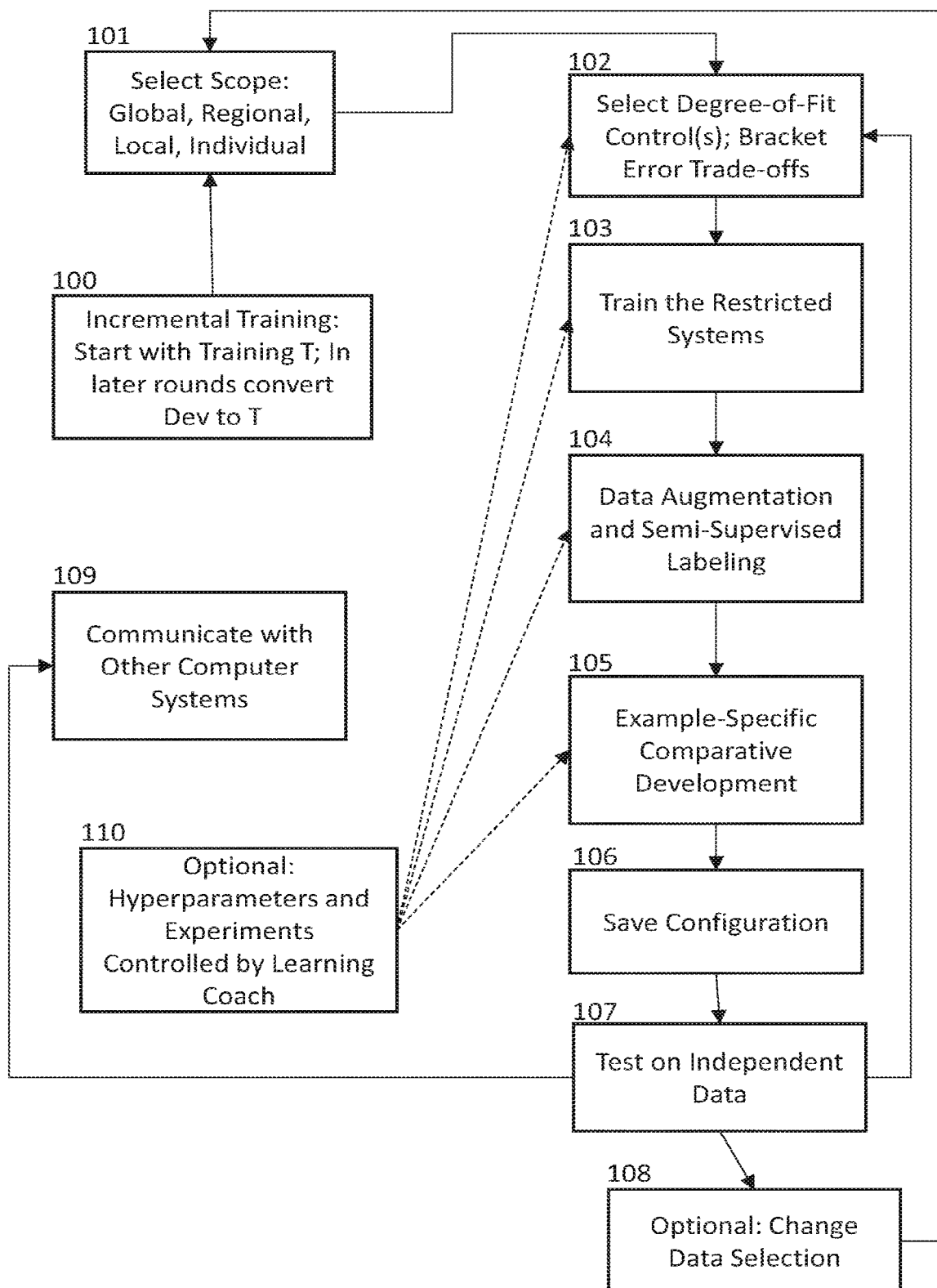
FIG. 1C illustrates a flowchart of a process for aggressively training a machine learning system, according to one aspect of this disclosure.

In block 193 of FIG. 1A or block 103 of FIG. 1C, any of the restricted systems being trained may embody any of the example restrictions in the list above or others. Any of these systems may be trained by learning by imitation as illustrated in, for example, FIG. 1B or FIG. 27A. Also, in some embodiments, many of them can alternately be trained by the learning by imitation procedure illustrated in, for example, FIG. 27B that applies more specifically to neural networks. The soft tying of nodes in FIG. 27B helps the network receiving the knowledge transfer the useful knowledge from the original network while satisfying whatever restrictions are imposed.

The paradigm of learning by imitation with restrictions in FIG. 1B is a very general paradigm that depends on having a quality generator. Many illustrative examples of novel methods of training cooperative generators are shown in FIGS. 4, 6C, 8, 9, 10, 11, 20, 36, 37, 38, and other figures in this disclosure. Additional methods of learning by imitation are illustrated in FIGS. 27A and 27B. A method for transferring the knowledge represented in a set of nodes is illustrated in FIG. 6F.

The technique of learning by imitation used in FIG. 1B may be used whenever the second classifier 125 differs from the first classifier 124 in any way. The second classifier 125 is not necessarily more restricted than the first classifier 124. For example, the second classifier 125 may have more learned parameters than the first classifier 124. As an example, FIG. 27B uses a variation of the technique in FIG. 1B to train a second classifier 2704, which is a neural network that has several times as many layers as the first classifier 2703.

Generally, in machine learning, some data is used for training the machine learning system, and some data is set aside for testing. It is prudent to reserve the test data for final testing, so that there is no chance that knowledge of the test data will influence design decisions. In order to be able to test performance of a system still under development, another set of data, called "validation" data is also preferably set aside for testing.

Preferably, the validation data should be treated like the test data. That is, it should not be used for development purposes other than testing the performance of the system under development. If data that is set aside from the training data is needed for any other purpose, it is called "development" data in this discussion. For example, development data may be used to determine the best values for control parameters, called "hyperparameters," that control the learning process. For example, the value of certain hyperparameters may affect the tendency of the learning process to underfit or overfit the training data. Validation data is often used for this purpose, but that mixes the development and testing, which can lead to problems when the development is too aggressive.

In this discussion, "overfitting" refers to the property that the system being trained learns detailed properties of the training data that do not generalize to new data. "Underfitting" refers to the property of not learning as much detail as possible about the properties that do generalize. Overfitting improves performance on training data but makes performance worse on new data. Overfitting and underfitting can be detected by testing on validation data or development data. However, as mentioned above, it is better to reserve validation data for final testing and to use development data for interim testing. If performance on the set aside development data is significantly worse on the development data test 126 than on training data (for example, using a null hypothesis test at a specified level of statistical significance), then (i) additional restrictions may be imposed on the second classifier 125 or (ii) the generator 123 may be used to generate additional data to be classified by the first classifier 124 and used as additional training data for the second classifier 125.

Complex, sophisticated machine learning systems and methods can, in effect, learn properties of the development data even though it is not explicitly used for training. This process can cause an effect similar to overfitting the training data. That is, the performance on the development data may no longer be representative of the performance on new data. For the purpose of this discussion, development work that has a danger of causing the performance on the development data to no longer be representative of the performance on new data is called "aggressive development." When a set of development data no longer accurately predicts performance on new data, it is replaced by a new development set.

Illustrative embodiments of the invention use aggressive development to achieve a lower error rate than is achieved by less aggressive development. They may use two or more sets of development data. For example, a second development set may be used to test whether aggressive development on a first development set has actually caused degraded performance on new data (i.e., the second development set). When this degradation happens, the aggressive techniques on the first development set can be scaled back, or other corrective measures can be taken, such as switching to the second development set.

FIG. 1C is an illustrative embodiment of the process of aggressive development as used in various embodiments of this invention. The process illustrated in FIG. 1C could be performed by a computer system, such as the computer system 4100 shown in FIG. 41. The process of aggressive development sets aside a set of data disjoint from the training data for validation tests. It also sets aside data for development. The development data is not only used for testing during development but is more actively used in the diagnosis and correction of errors. Therefore, there are multiple development sets, so that a new development set can be used when an earlier development set is no longer predictive of performance on new data.

At block 100, the computer system 4100 starts the development process using the designated training set T and the first development set $Dev_1$. Among other things, having multiple developments sets enables multiple rounds of development. It also enables a process called incremental development. Incremental development includes adding a set of development data to the training set and using a new development set. This shift of development set occurs when the first development set $Dev_1$ no longer accurately predicts performance on new data because development has indirectly tuned the system. When $Dev_1$ no longer accurately predicts performance on new data, the system converts $Dev_1$ to the training data by adding it to set T, retrieves a second development set $Dev_2$, and then repeats the described process for an n number of iterations, wherein $Dev_n$ corresponds to the development set for the nth iteration. Incremental development is explained in more detail with respect to FIG. 1F.

At block 101, the computer system 4100 selects the scope of the development. In the sense used in this block, "global" development refers to learned parameters and hyperparameters with optimization over the entire set of training data and the whole data structure of the machine learning system. "Regional" scope of development refers to development isolated to a region of the data space or to a specific subset of the data structure being trained. "Local" scope of development refers to development isolated to a set of data examples that, in some sense, are "close" to each other, i.e., neighbors within some threshold of distance or connected in a small number of steps in a graphical structure or some other measure of near neighbors. There is not necessarily any distinction between regional and local development, which together could be referred to as "intermediate" in scope. "Individual" scope of development refers to development focused primarily on a single data example or on a single element in a data structure, such as a single node and its connecting arcs. This division of levels of scope is only a guide as an aid to discussion. There is no firm operational distinction separating one scope of development from another. The important characteristic is that part of the development process is to work first at one level of scope and then to narrow the scope to do more detailed analysis.

The embodiment illustrated in FIG. 1C compares a less restricted system U to one or more other systems. Generally, the other systems are more restricted or differ from U in ways that tend to create smoother decision boundaries. In some embodiments, some of the other systems may use specialized techniques that tend to reduce overfitting but that, in some cases, may cause overfitting. Following the principle of aggressive development, system U is designed to use techniques that learn as much detail as possible even at the risk of overfitting. For example, in aggressive development, system U may be designed with an increase in the number of learned parameters and the complexity of the machine learning system. In the case of deep neural networks, system U may be designed with a great increase in the number of layers using techniques, such as the one shown in FIG. 27B. Each of the other systems is intended to correct problems caused by overfitting. For example, they try to smooth the decision boundaries by regularization or by reducing the number of degrees of freedom of the parameters, perhaps by directly reducing the number of learned parameters. In some embodiments, however, some of the other systems may make changes whose effect is more complex.

Figure 1D:
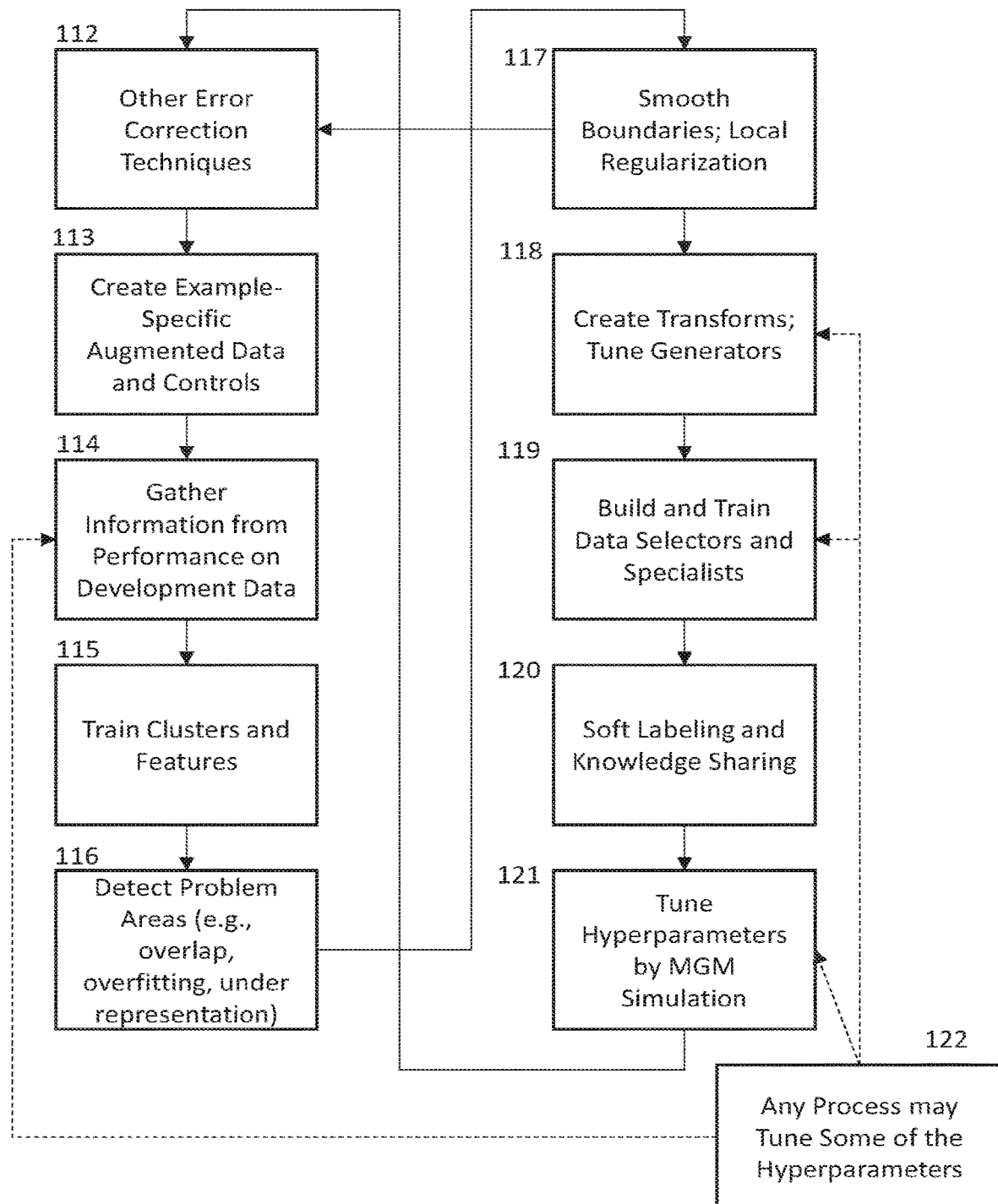
FIG. 1D illustrates a flowchart of a process for example-specific comparative development for aggressively training a machine learning system, according to one aspect of this disclosure.
Figure 1E:
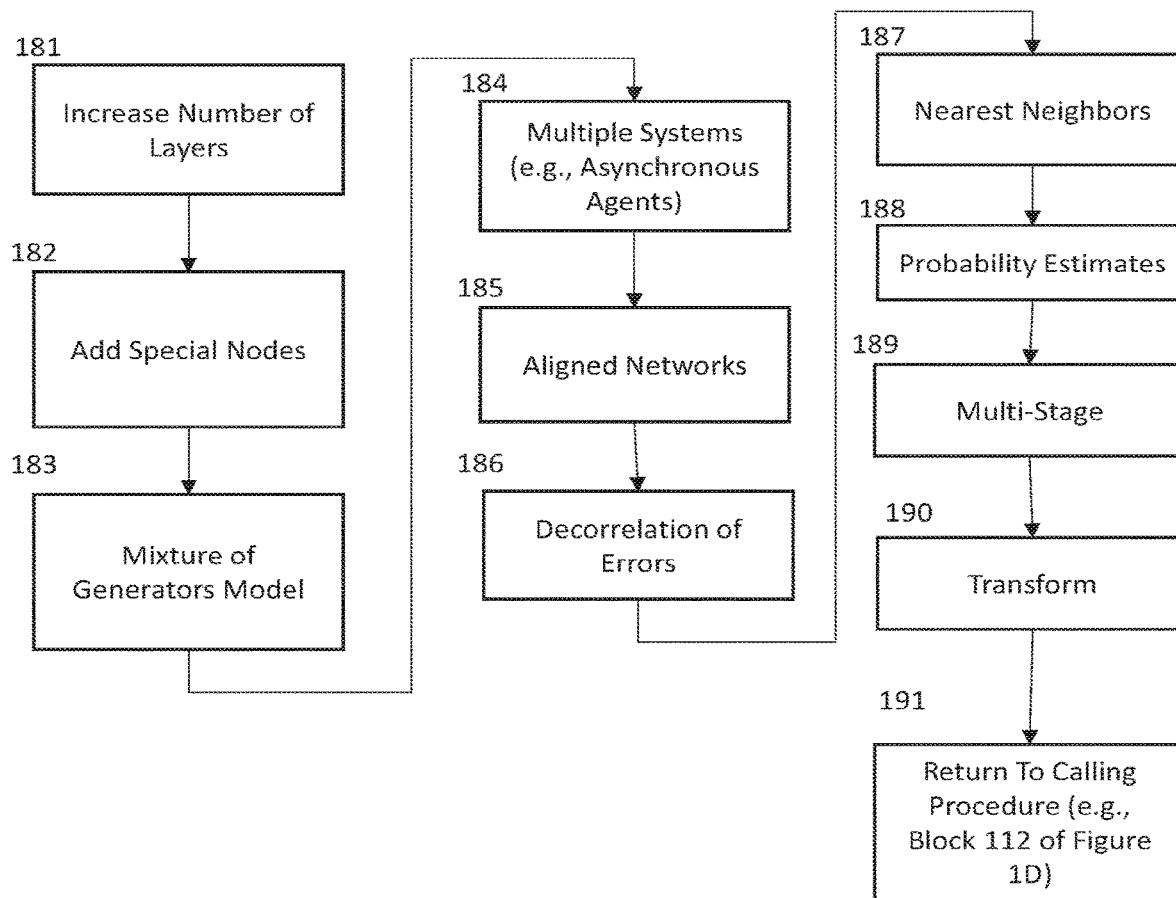
FIG. 1E illustrates a flowchart of a process for error correction techniques for aggressively training a machine learning system, according to one aspect of this disclosure.

The details of some embodiments of the training for aggressive development are illustrated in FIGS. 1D and 1E. The training techniques illustrated in FIGS. 1D and 1E can be used either within the paradigm of FIG. 1B or independently. For example, some of the systems that differ from system U may only differ in the settings of hyperparameters, such as the regularization parameter. In some embodiments, such systems can be trained directly on the same data as system U without learning by imitation. As another alternative, learning by imitation may be done using the embodiment illustrated in FIG. 27A. If the machine learning systems are neural networks, the embodiment illustrated in FIG. 27B may be used.

At blocks 102 and 103 of FIG. 1C, the computer system 4100 sets up a comparison between the results from system U and one or more other systems. At block 102, the computer system 4100 selects another system or systems to be compared to system U and the sets the value of any control parameter that might need to be set to bracket an error trade-off. For each pairing of system U with one of the other systems, the intent is to have the two systems bracket a range of system variations that create a situation of error trade-off. That is, system U should fix some of the errors made by the other system and vice versa. This choice is deliberate, because the comparison allows the data examples involved in errors to be examined in detail. At block 103, the computer system 4100 then trains the one or more systems that are to be compared with system U.

Figure 13:
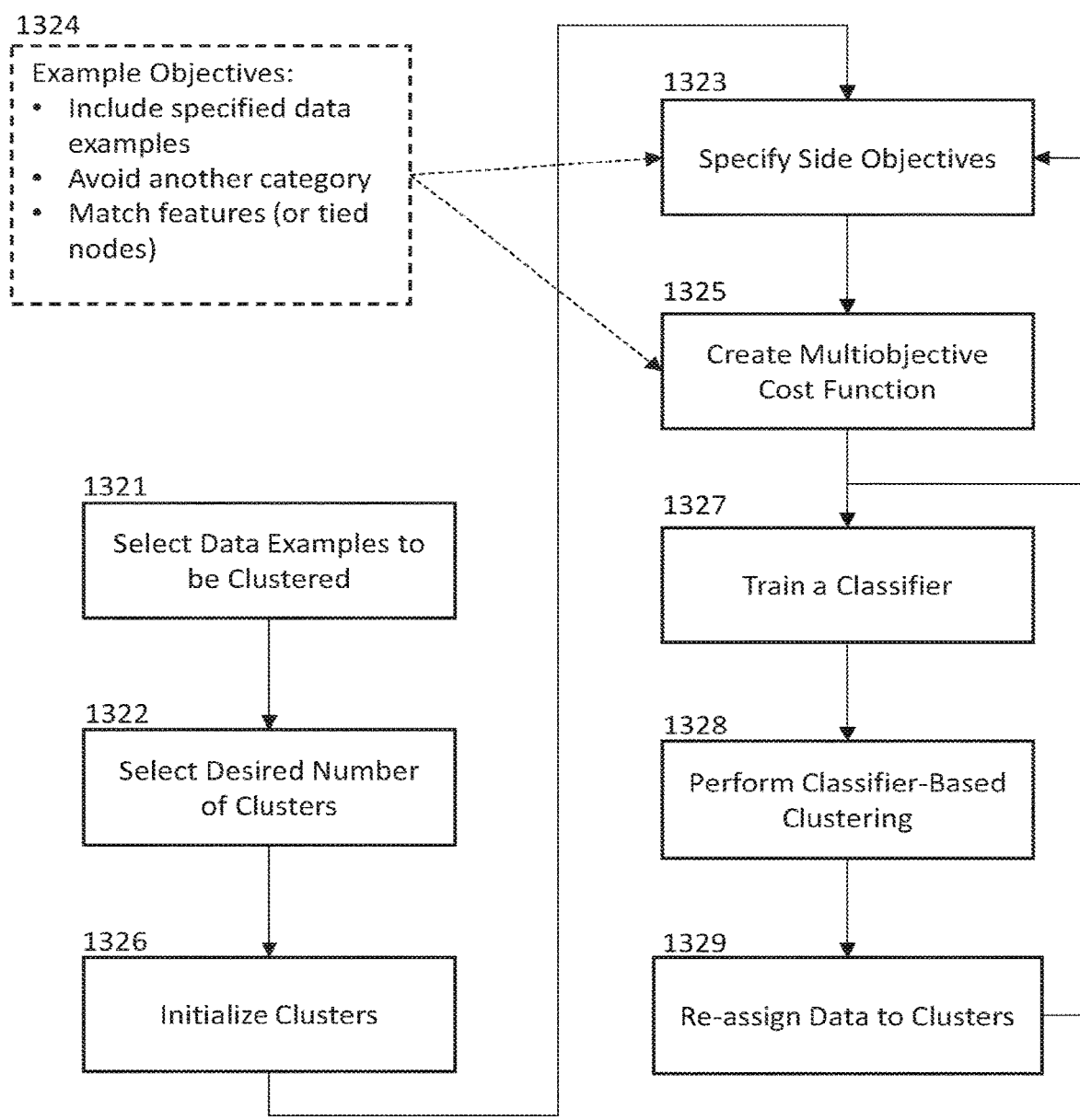
FIG. 13 illustrates a flowchart of a process of clustering including additional objectives, according to one aspect of this disclosure.
Figure 14:
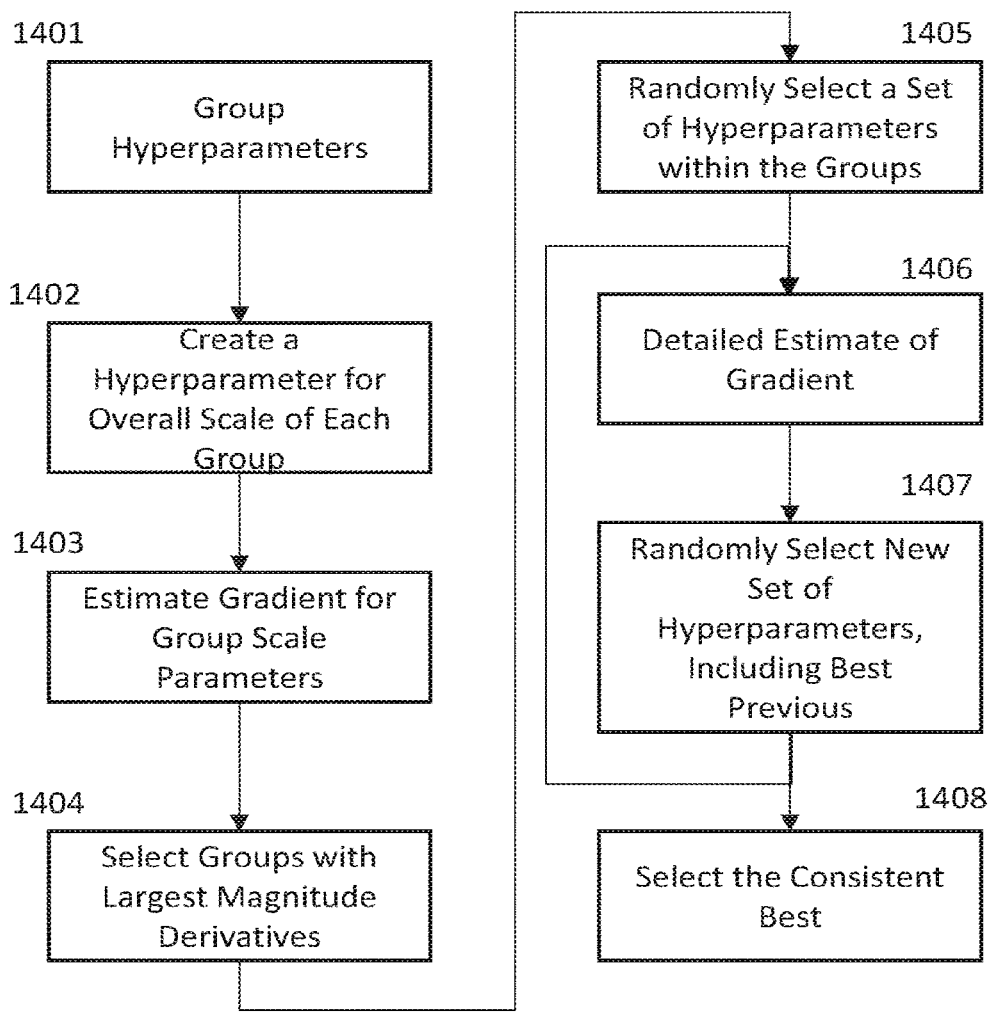
FIG. 14 illustrates a flowchart of a process for numerically estimating the gradients for a large number of experimentally estimated variables, according to one aspect of this disclosure.
Figure 15:
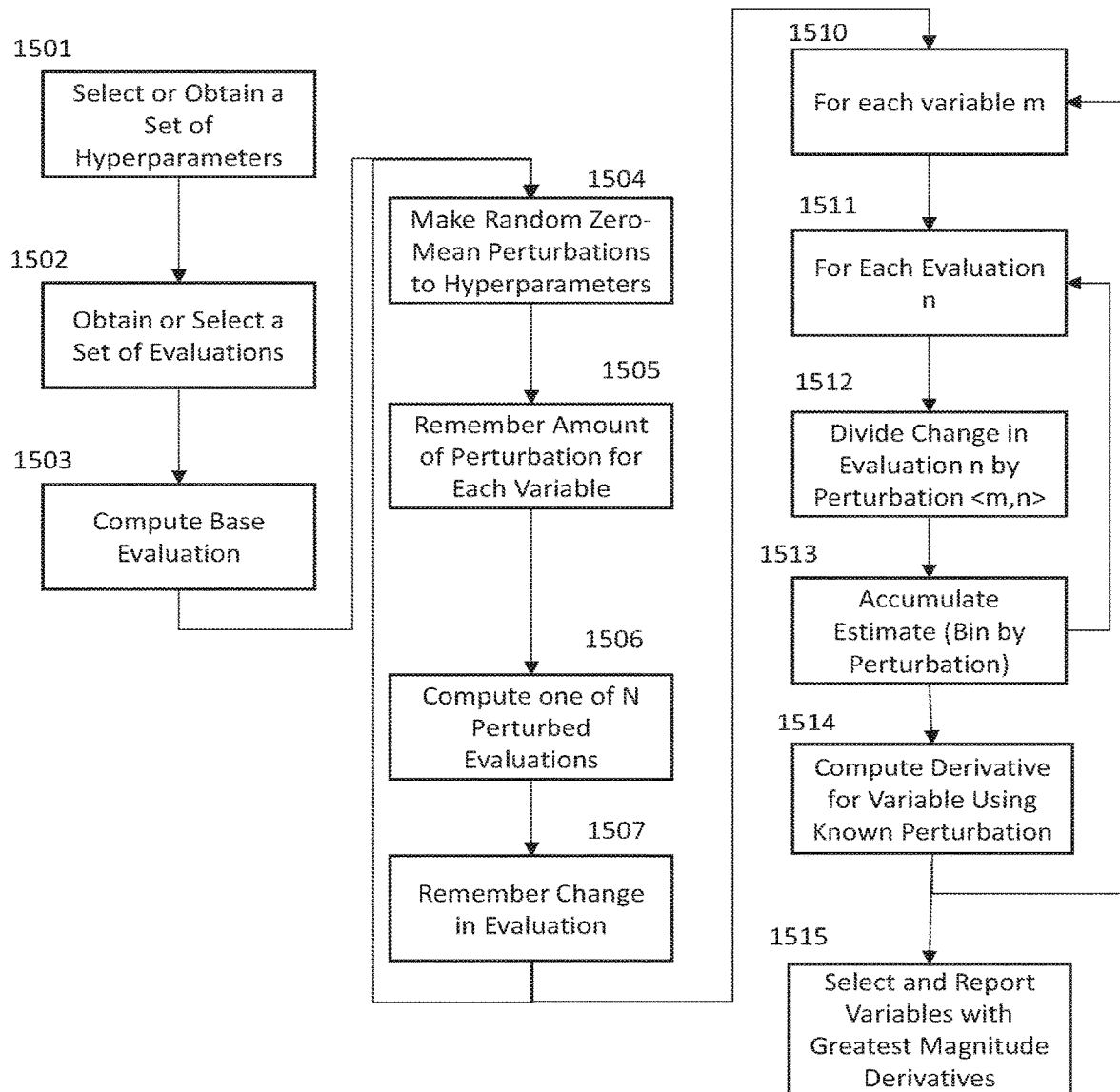
FIG. 15 illustrates a flowchart of the detailed estimation process of the process depicted in FIG. 14, according to one aspect of this disclosure.

At block 104, the computer system 4100 does data augmentation and semi-supervised labeling. The data augmentation makes use of the variety of generators that are explained in association with other figures. For example, the data augmentation may be done by a SCAN (see FIG. 6C) or a VAE. The semi-supervised labeling interacts with the automatic optimization of an expanded set of hyperparameters (for example, as illustrated in FIGS. 14 and 15) and also with the processes of clustering and feature detection (for example, as illustrated in FIGS. 13 and 21).

At block 105, the computer system 4100 does example-specific comparative development, which is illustrated in FIG. 1D. Block 106 then saves the configuration. That is, it saves a description of the current best system in sufficient detail to reproduce it. For example, it saves a description of the architecture of the system, the values of all the learned parameters, the values of all the hyperparameters, and a link, index of other indication of the contents of the training set and the development set.

After the configuration has been saved at block 106, block 107 tests the performance of the configuration on independent data, for example, a development set that hasn't yet been used (i.e., $Dev_{n+1}$ where $Dev_n$ is the most recent development set that has been converted to the training set T), or the validation set as a final test. The performance of this configuration can be communicated to other (e.g., external or outside) computer systems at block 109. A performance test on a development set may also be used internally for comparing the performance of different configurations.

In some aspects of the illustrated process, block 108 is omitted from or otherwise skipped during the execution of the process by the computer system 4100. At block 108, the computer system 4100 optionally changes the data selection. It may change the scope of development, or it may start a completely new round of development by adding the current development set to the training set and obtaining a new development set. In any case, it returns control to block 101.

Figure 2:
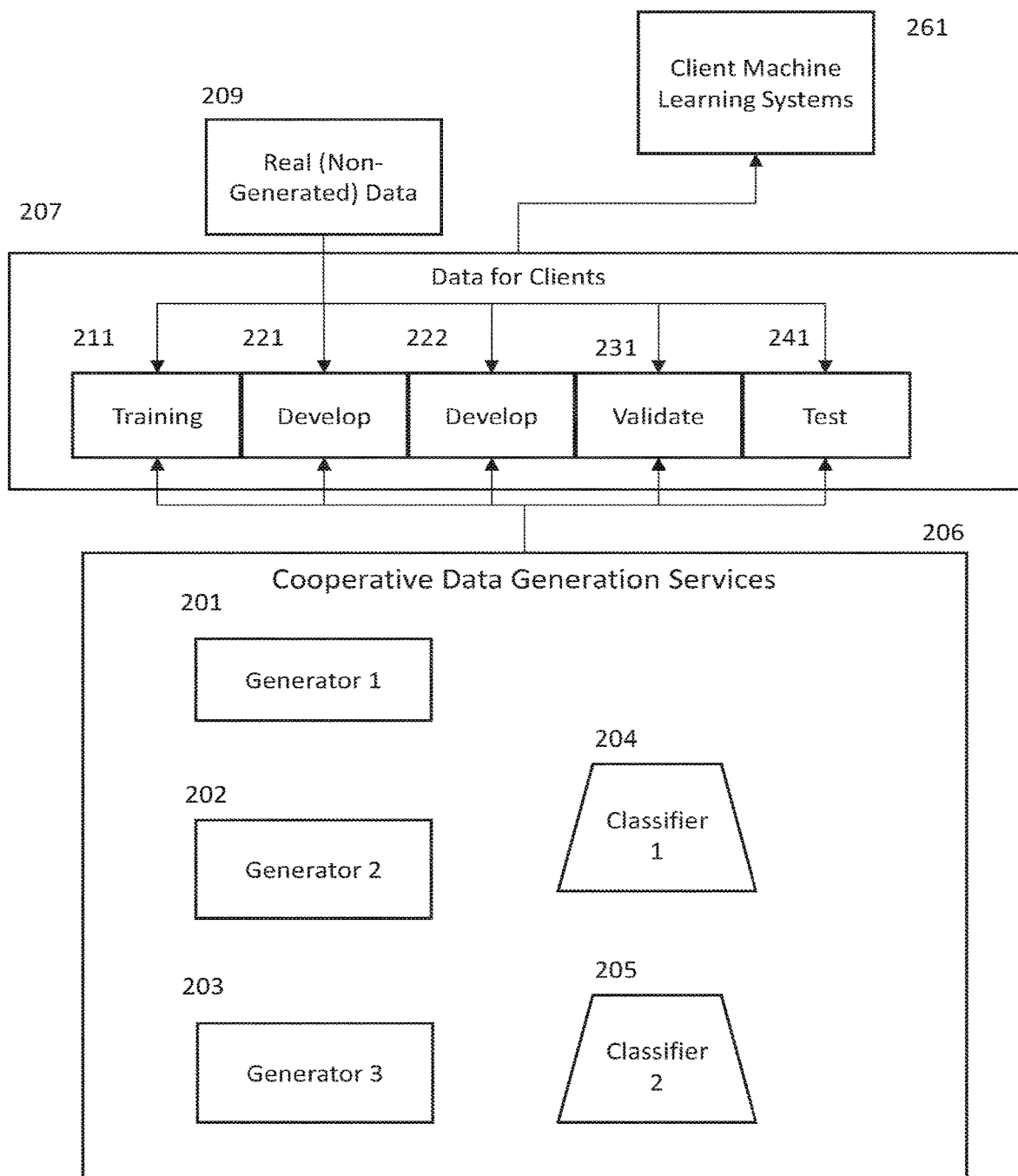
FIG. 2 illustrates a block diagram of a system for generating data for training a machine learning system, according to one aspect of this disclosure.
Figure 3:
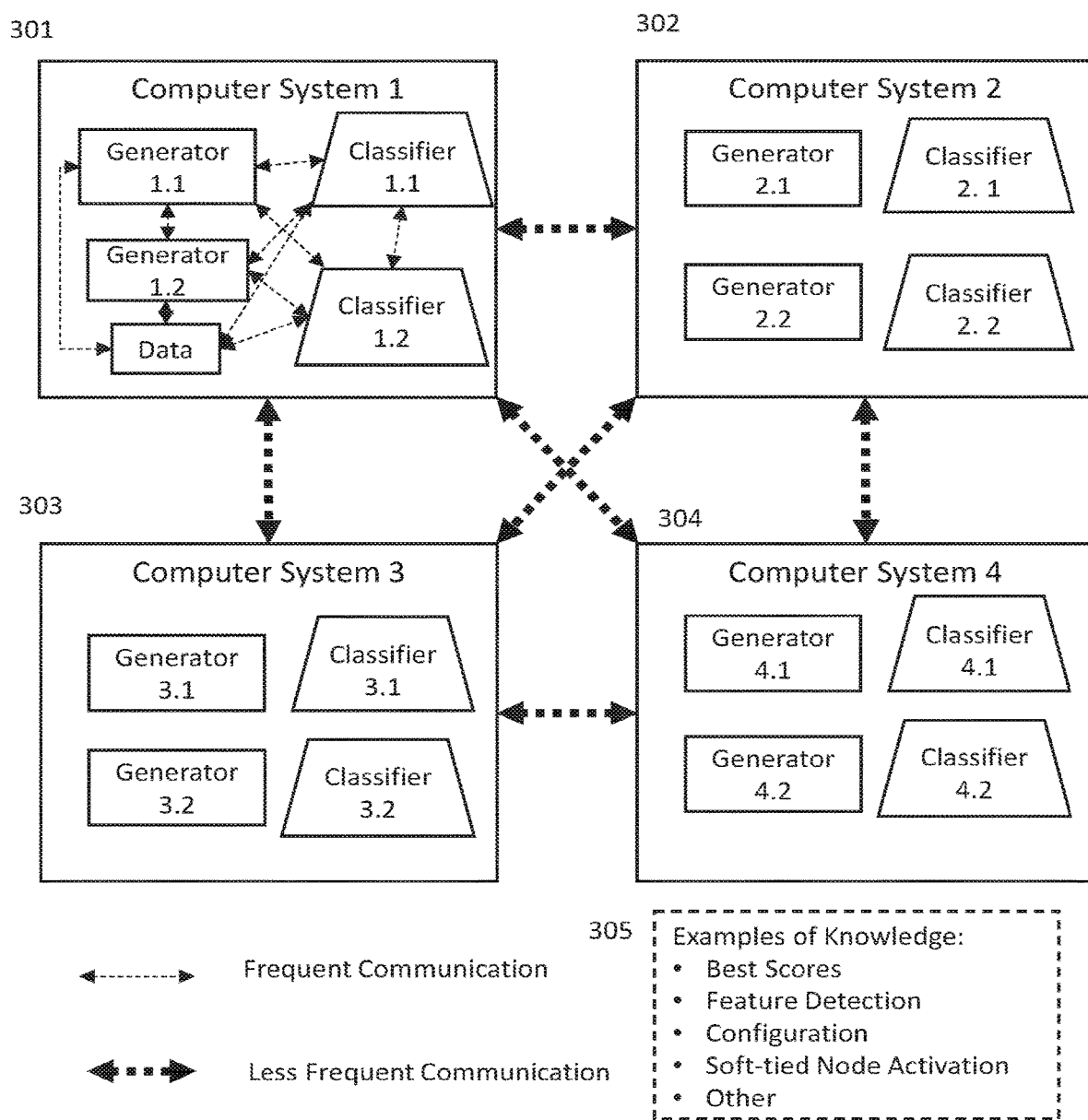
FIG. 3 illustrates a block diagram of multiple cooperating systems sharing knowledge, according to one aspect of this disclosure.

Besides configuration performance, the computer system 4100 can actively communicate other information at block 109. For example, as illustrated in FIGS. 2 and 3, the system illustrated in FIG. 1C may be just one system among many systems cooperating on the same task. In some embodiments, the computer system 4100 can share knowledge with these other systems at block 109. For example, the computer system 4100 can share knowledge it acquires from clustering and from developing feature detectors at block 109. One embodiment of clustering is illustrated in, for example, FIG. 13. One embodiment of feature detection, which interacts with and enhances clustering, is illustrated in, for example, FIG. 21. At block 109, the computer system 4100 may also request such knowledge from other systems, or receive it unsolicited. It may also share knowledge that the system acquires from its error analysis about individual data examples. It may also share configurations, for example the complete configuration saved in block 106, the configuration of a feature detector, or the configuration of certain support systems that are used in some embodiments that will be explained later. Illustrative examples of knowledge sharing and data sharing are presented in PCT Application No. US18/35275, filed May 31, 2018, titled ASYNCHRONOUS AGENTS WITH LEARNING COACHES AND STRUCTURALLY MODIFYING DEEP NEURAL NETWORKS WITHOUT PERFORMANCE DEGRADATION, which is hereby incorporated by reference in its entirety.

At block 110, the computer system 4100 optionally uses a learning coach to control the hyperparameters and the experiments. Block 110 may also optimize the hyperparameters directly using the general-purpose optimization procedure illustrated in FIGS. 14 and 15, which are described in additional detail below.

FIG. 1D is an overview of some of the techniques used in example-specific comparative development in various embodiments of this invention. The various techniques illustrated in FIG. 1D could be performed by a computer system, such as the computer system 4100 shown in FIG. 41. The illustrative embodiment illustrated in FIG. 1D includes many different exemplary techniques for improving performance of a classifier and illustrates them in a particular order. Other embodiments may use only a subset of the illustrated techniques and may use them in a different order. In some situations, some techniques may not be applicable or some embodiments may simply choose not to use them. Any subset of applicable techniques applied in any order will be operable and be an illustrative embodiment. In other words, various aspects of the systems disclosed herein can utilize any number of these error correction techniques, in any combination and in any order.

Except for block 112, all the techniques shown in FIG. 1D can be applied to any type classifier, not just to neural networks. For example, although the generators used for data augmentation are neural networks, they can generate data for any type of classifier. As another example, clustering can be done with any type of classifier and a neural network feature detector can be trained in conjunction with the clustering, as shown in FIG. 21. The clustering itself does not need to be done by a neural network. The neural network based feature detector can then label all the data examples with the feature value. Those labels can then be used to train any type of classifier by learning by imitation as illustrated in FIG. 1B or 27A.

The training and error correction techniques illustrated in FIGS. 1D and 1E do not require the paradigm of learning by imitation illustrated in FIG. 1B, but they are compatible with it. In general, the techniques in FIGS. 1D and 1E that increase the number of learned parameters or the degree of fit would be used in training the first classifier 124 in FIG. 1B, and those that restrict the degree of fit would be used in the training of the second classifier 125 of FIG. 1B. For those techniques that impose an objective in the training of the second classifier 125, that objective could be imposed as an additional objective in a multiple objective embodiment. The learning by imitation embodiment illustrated in FIGS. 27A and 27B can transfer knowledge from either a less restricted machine learning system to a more restricted machine learning system or from a more restricted machine learning system to a less restricted machine learning system.

Although a variety of different error correction techniques are discussed below in connection with FIG. 1D, the system can include additional, nonenumerated error correction techniques, represented by block 112. Some examples of these additional techniques are shown in FIG. 1E. Unlike the techniques shown in FIG. 1D, many of those shown in FIG. 1E are specific to neural networks because they operate directly on the nodes in the network. As with FIG. 1D, the techniques illustrated in FIG. 1E could be performed by a computer system, such as the computer system 4100 shown in FIG. 41.

A first error correction technique represented by block 113 of FIG. 1D creates example-specific augmented data and controls. The SCAN and the VAE of FIGS. 6C, 9, 12, 16, 36, 37, and 38 can generate data that is related to a designated example or a small set of examples. A hyperparameter can control the ratio of the standard deviation used during generation to the value of the latent variable during training, thus controlling the amount of spread of the generated data around the designated example. A separate hyperparameter can control each standard deviation, which is useful, for example, if some of the latent variables have been trained to be feature detectors, as can be done by SCANs. SCANs and VAEs can also be trained to avoid generating data examples that get classified as a different category or to avoid generating data that is like designated negative examples, as illustrated by block 608 of FIG. 6C.

The augmented data serves several purposes. First, large machine learning systems, especially large neural networks, need a large amount of training data. The performance of these machine learning systems gets better with the more data that is available. In general, generated data is not as useful as an equal amount of real data, but more data of any kind is always useful. For example, even noisy data and distortions make the trained system more robust and reduce errors caused by variability in real data. Example-specific generated data is even more useful in some embodiments because it can be targeted at specific problem regions.

Second, data augmentation from a stochastic generator fills in the data space with a smooth probability distribution, reducing the tendency for a classifier to overfit.

Finally, the ability of a SCAN or VAE to be trained to avoid negative examples can be used as a guide to the generation of examples that will help train a classifier to learn a manifold that steers around nearby clusters of other categories.

There is also a hyperparameter $d_m$, the influence weight, which controls the relative weight given to each data example during training. A training example that is causing errors due to overfitting can have its influence weight reduced to zero. A data example can even have its identity or label changed, for example, by a process of semi-supervised learning or partially supervised learning.

A second error correction technique represented by block 114 gathers information from the performance on the development data of system U and the other classifiers. The model for this activity is the system tuning that is normally done manually by a system developer. For example, block 114 tries to help the systems find problem areas that can be associated with data examples in the training set and then be fixed with the other techniques in FIGS. 1D and 1n FIG. 1E.

Aggressive development allows for the possibility that the relatively unrestricted system U makes some errors due to overfitting. Overfitting, by definition, is likely to produce errors on new data, such as the development data. At block 114, the computer system 4100 looks for errors that may be due to overfitting. For example, it can look for a data example $X_{DEV}$ in the development set that is misclassified by system U, but correctly classified by one of the other systems, system R. At block 114, the computer system 4100 then looks for one or more nearby examples $Y_{DEV}$ that are classified correctly by system U, but not by system R. The error on each data example $Y_{DEV}$ may have been corrected by the overfitting that caused the error on $X_{DEV}$ and perhaps on other data. The computer system 4100 then tries to find an example $Y_T$, a near neighbor to each data example $Y_{DEV}$ in the training set at block 114. Preferably, each example $Y_T$ is classified correctly by system U but incorrectly by at least one of the other systems, say system S, which may be the same as system R or different. The computer system 4100 then presents the data example $Y_T$ with the pair of trade-off bracketing systems U and S as a problem example to the techniques illustrated in the other blocks of FIG. 1D at block 114. Various embodiments of the invention can use the development data in other ways similar to this example to find problem cases that can be related to data examples in the training set.

Figure 25:
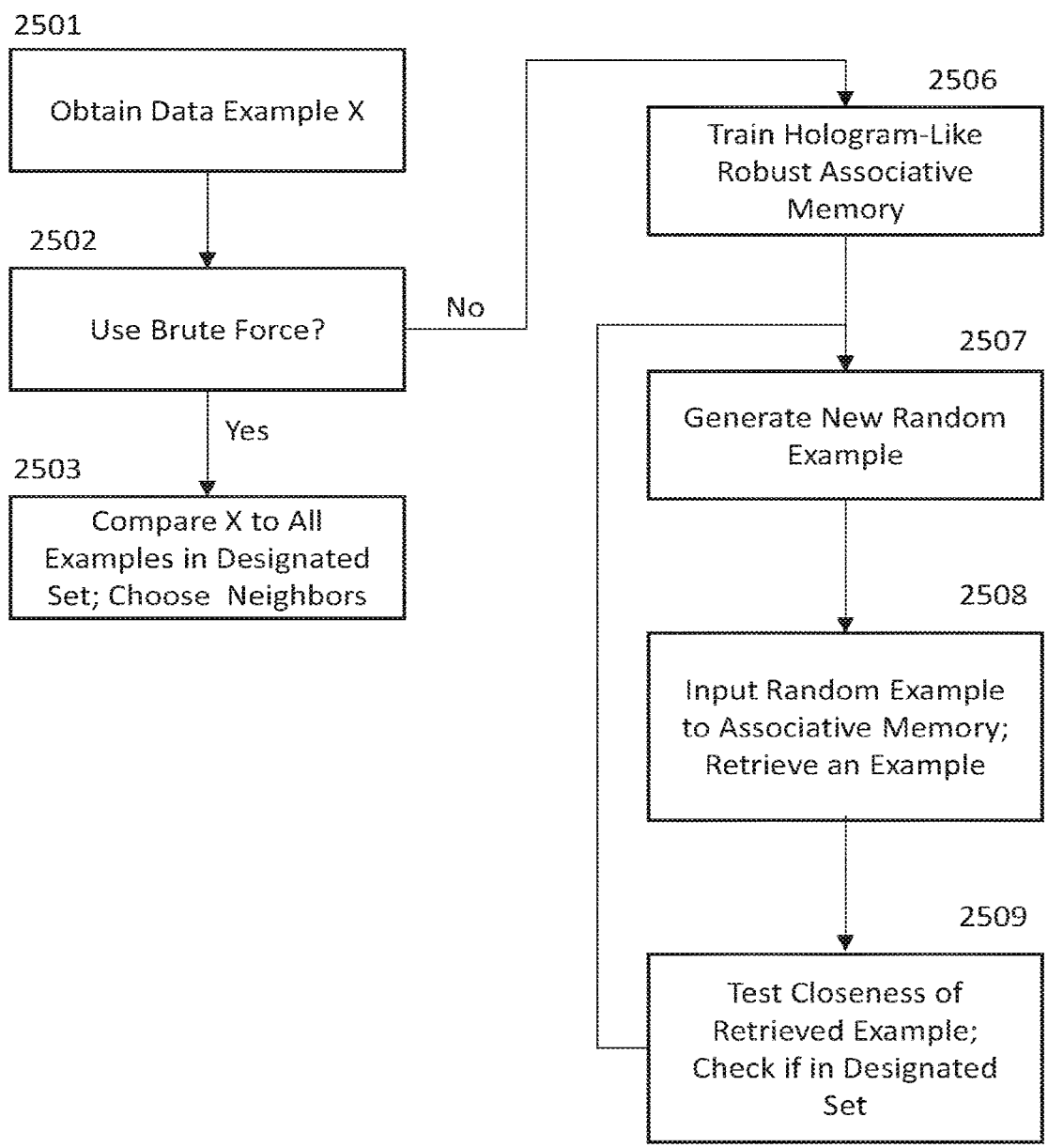
FIG. 25 illustrates a flowchart of a process of locating near neighbors in a data set to a data example, according to one aspect of this disclosure.

In the example, block 114 had to find a $Y_{DEV}$ near to $X_{DEV}$ and to find a $Y_T$ near $Y_{DEV}$. In a high-dimensional space it can be difficult to find data examples that are close to a given example. An illustrative embodiment of a technique to find data examples that are close to a designated data example is shown in FIG. 25.

A third error correction technique represented by block 115 trains clusters and features by, for example, using clustering, soft-tying, and other techniques illustrated in FIGS. 13 and 21. Clustering can be done by unsupervised learning, but being done in conjunction with feature discovery may produce more meaningful clusters. Feature detection, clustering, and soft tying of node activations all support and enhance each other. Soft tying of node activations is explained in FIGS. 6A and 6B.

Soft tying of nodes provides a form of regularization that also encourages better representation of knowledge, with feature detection as an example. Soft tying of node activations is an essential part of the training of SCANs. SCANs also support feature detection nodes as latent variables, and soft tying of clusters and categories, which is the source of the characterization "categorical" in the name SCAN. Hyperparameters can control the relative degree of soft tying for clusters and categories.

A fourth error correction technique represented by block 116 detects potential problem areas. First, at block 116, the computer system 4100 finds one or more data examples that are misclassified or that are seen to be a problem case in some other part of the analysis. For example, a data example that is classified correctly is still a problem case if it is suspected of causing overfitting errors. In some embodiments, data examples that are classified correctly may be regarded as problem cases if their score is a close call. A problem example may be a data example from either the training set T or the development set Dev. If the example is from the development set, there will be restrictions on the use of the information that is obtained in the analysis done by block 116. For example, rather than being used directly, the problem example may need to be used to find examples in the training set, using a process similar to the one described for block 114. In some embodiments, generated examples may be used.

For an example that is misclassified or a close call, two categories of interest are determined: category A, the correct classification for the data example, and category B, the category of the misclassification or close call. Block 116 finds the decision boundary between the two categories, for example by using the process illustrated in FIG. 22. In an illustrative embodiment, block 116 sends this decision boundary to block 117 to check for overfitting or other irregularities.

At block 116, the computer system 4100 uses a generator specific to category A and a generator specific to category B to generate a set of random examples similar to X. In various aspects, the generator is a form of stochastic autoencoder, such as a VAE or a SCAN. An illustrative SCAN is illustrated in FIGS. 6C and 9. The random data examples can be used to estimate the conditional probability distribution of each of the categories in the neighborhood of the example X. Block 116 tests how much these probability distributions overlap.

In one embodiment, the computer system 4100, at block 116, uses a procedure, such as the procedure illustrated in FIG. 25, to find examples from the training data T or the development data Dev that are close to the example X or, in some embodiments, close to the decision boundary in the region of X. The actual examples from the development set Dev cannot be used, but some embodiments may use qualitative conclusions made by block 116. The first qualitative judgement can be whether there are a significant number of data examples close to X or close to the decision boundary in the region of X. In some embodiments, the closeness measure in this qualitative judgement is not distance in data space, but rather how close the classification scores are to the boundary or to the score of X.

The data examples within some specified threshold of distance can be used to estimate the nonparametric a posteriori probabilities of the two categories in the region. If no other data examples from T or Dev are within some specified threshold distance from X, the data example X is designated as "isolated." In some embodiments, an isolated error may be ignored. In some embodiments, a single isolated error on training data or a small number of errors that are close together but otherwise isolated will be modeled and classified as an exception. For example, a special detector with a center-surround may be trained to detect the isolated example(s) and negatively trained on random examples that are nearby but somewhat separated. The center surround detector should be able to detect the example and new examples that are close enough without misclassifying examples of category B. The performance of the center-surround detector needs to be tested on data that has not been used in its training or development. As an alternative, an isolated error may be treated the same as a "Bayes error," as described in the next paragraph. Illustrative examples of center-surround detectors are used in FIGS. 18 and 20.

Figure 17B:
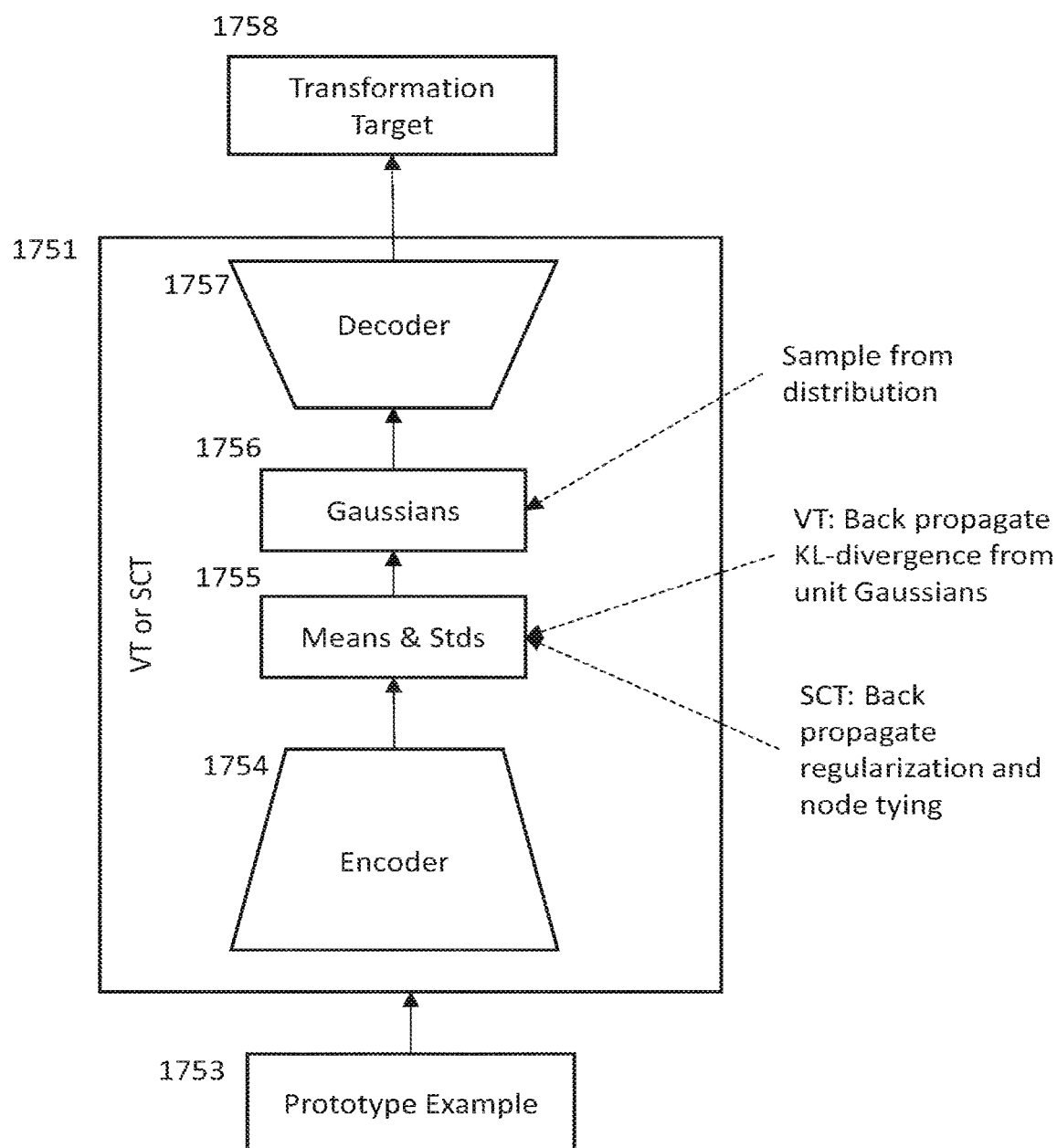
FIG. 17B illustrates a block diagram of a variational transformer (VT), according to one aspect of this disclosure.
Figure 17C:
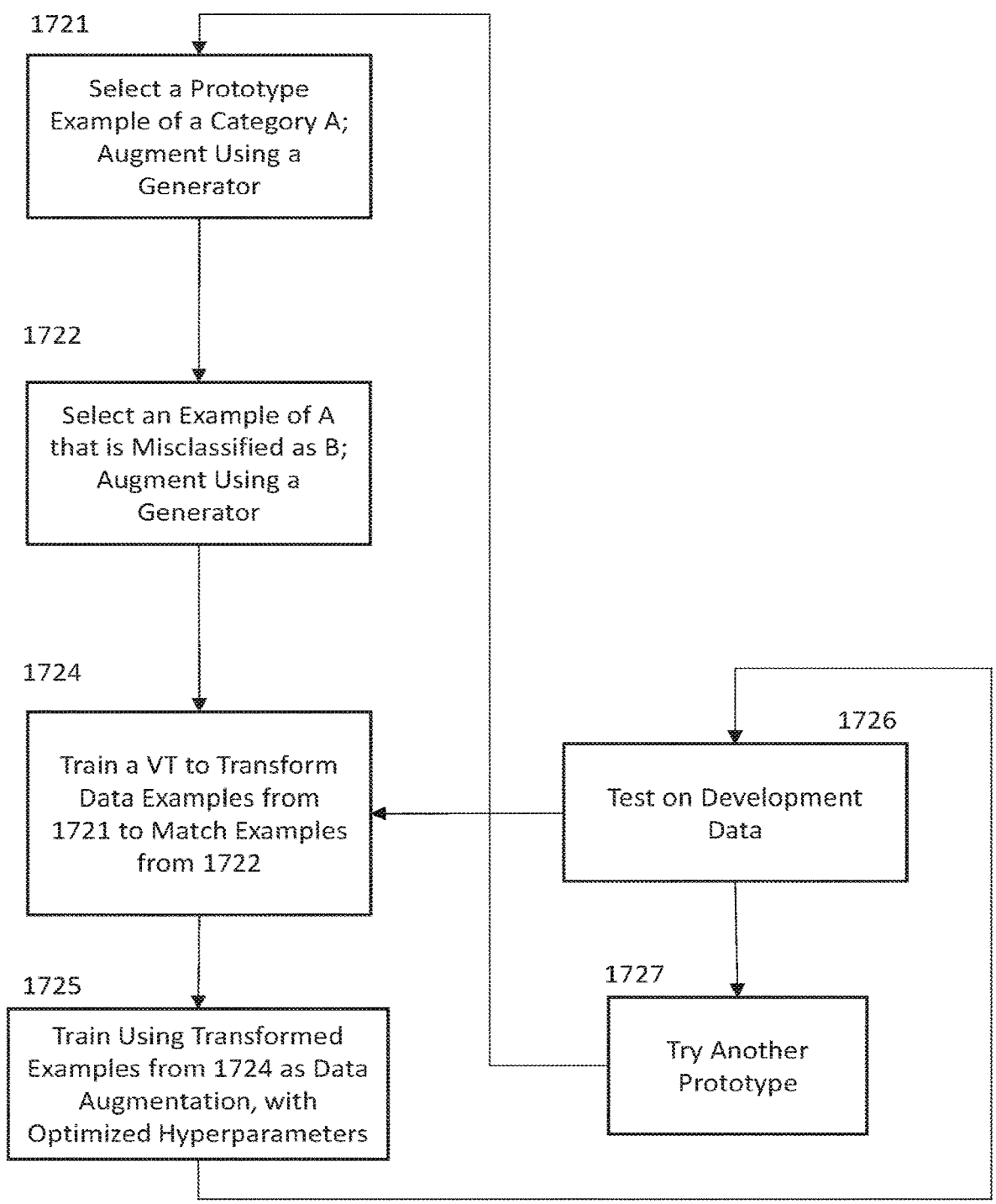
FIG. 17C illustrates a flowchart of a process for generating error-correcting transformations, according to one aspect of this disclosure.

If the a posteriori probability of category B is much greater than that of A, it is difficult to classify example X correctly without causing errors for examples of B. In this situation, data example X is called a "Bayes error." In a one-dimensional data space, the minimum possible error rate is called the "minimum Bayes error" rate. In a one-dimensional data space, the minimal error is achieved by leaving any "Bayes error" as misclassified. In a higher dimensional case, a "Bayes error" can be fixed, but needs special procedures, such as a change in the metric of the space or transformations, such as illustrated in FIGS. 17A, 17B, and 17C. Therefore, block 116 gives example X in this situation the qualitative designation as a "Bayes error."

If there are a sufficient number of examples from category A close enough to X, then X is designated as "clusterable." That is, if the category A examples are from T, some embodiments may be able to create a cluster model from those examples and X, such that the a priori probability of the cluster and the conditional probability of X within the cluster are high enough so that the a posteriori probability of X being category A as a member of the cluster is higher than the a posteriori probability of X being category B. Then example X can be classified as A without increasing the error rate. Since the conditional probability of X being within the cluster is affected by the shape of the cluster, some experimentation may be required in selecting which examples to include in the cluster. For example, a neural network can be trained to make this decision with an error cost function based on the conditional probability of X.

If the number of nearby examples of category A is sufficient that the a posteriori probability of X being from category A is greater than that of being from category B, then X is designated as an "unnecessary" error. It should be possible to fix the error on X without increasing the error rate. For example, X could simply be given extra weight in training, or randomly generated examples near X could be added to the training data. Perhaps the misclassification of X is due to underfitting and the error can be corrected simply by relaxing the regularization. If there is underfitting, the example X and perhaps other errors can possibly be fixed by adding additional learned parameters to the machine learning system, for example using one or more of the methods illustrated in FIG. 1E or FIG. 1F.

A fifth error correction technique represented by block 117 receives the decision boundary of a potential problem region from block 116. It also receives the information about the orthogonal vectors to the decision surface computed by the procedure illustrated in FIG. 22. Rapid changes in the direction orthogonal to the decision surface are an indication of overfitting. At block 117, the computer system 4100 also performs other tests for evidence of overfitting, such as testing the smoothness and consistency of the classification scores along a curve such as the one connecting two data examples, as described in FIG. 23.

Overfitting is easier to detect on the development data. At block 117, the computer system 4100 considers the victims of the overfitting rather than the data examples that cause it. In one illustrative embodiment, the computer system 4100, at block 117, adjusts the degree-of-fit control so that the less restricted system U makes errors on one or more data examples X in the development set Dev and one or the more restricted systems, say system R, corrects that error. In some embodiments, the example X is merely passed back to block 116. It is known, however, that regularization fixes the error in system R. In some embodiments, block 117 tries to fix the error using local regularization, either instead of or in addition to passing example X back to block 116. Note that the error on X is as a victim of overfitting rather than as a cause of overfitting, but block 116 is primarily aimed at correcting or avoiding the causes of overfitting. The extra errors made by R are caused by too much regularization, so regularization that is localized may perform better.

Regularization can be localized to apply only to certain data examples, or, in a neural network, it can be localized to apply to only certain nodes and connections. As an illustrative example, an embodiment will be described as having both forms of localization. In some embodiments, including machine learning systems that do not use a neural network, the data localization can be used by itself.

In the situation described, at least one data example X has already been found that is misclassified by system U. The illustrative embodiment will be described for example X. The same procedure can be applied to any other error made by system U that might be fixed by local regularization.

An illustrative example of local regularization first uses a stochastic generator to randomly generate a set of data examples related to data example X. Local regularization can be achieved by selecting some nodes in the network and soft tying the activation values of those nodes across X and the generated examples. The degree of smoothing can be controlled by either the strength of the tying or by the hyperparameters controlling the standard deviations of the generator. The standard deviations of the generator also control the degree of localization of the smoothing. Smoothing can also be achieved by averaging training across the generated data examples, which applies to any type of machine learning system.

At block 117, the computer system 4100 attempts to avoid the errors made by system R by replacing the global regularization in R with the local regularization described above.

A sixth error correction technique represented by block 118 attempts to correct some of the "Bayes errors" and other seemingly intractable errors. A data example that is difficult to classify correctly is often one that is a rare variant or distortion of its own category rather than being by chance a very good match for some other category. At block 118, the computer system 4100 attempts to find transformations that change a difficult pattern to look more like a normal instance of its category, changing it from a "Bayes error" to a clusterable example in the terminology of block 116.

In one embodiment, block 116 includes the procedure illustrated in FIG. 17A, which attempts to find such a transformation. The transformation is computed by a neural network. The generators used for data augmentation are also neural networks. However, the transformation works directly on the data and makes no assumption about the type of machine learning system doing the classification.

FIG. 17B is a VT, with an architecture similar to a VAE, except trained as a transformer rather than as an autoencoder. In some embodiments, the VT is used for a purpose like the transformation process described in FIG. 17A. However, in the illustrative embodiment shown in FIG. 17B, the transformer is used the other way around. In FIG. 17B, the VT is trained to transform prototype examples of the target category to look like the example patterns that are difficult to classify. The examples generated by the stochastic transformer in FIG. 17B are then used as augmented training data so that the classifier can correctly recognize other transformed examples.

Referring back to FIG. 1D, block 118 also has the responsibility to tune the generators used by itself and by some of the other procedures by, for example, tuning the hyperparameters utilizing the processes disclosed in FIGS. 14 and 15, which are described in additional detail below.

A seventh error correction technique represented by block 119 reduces the scope to a regional development scope by a different method than described so far. Rather than finding and concentrating on difficult individual examples, at block 119, the computer system 4100 takes the entire space of examples and breaks it down into smaller parts. At block 119, the computer system 4100 uses a separate support classifier, a data selector, to break up the data space and partition the data. The data selector assigns operational data into partition bins in the same way as it assigns training data. The data selector can be any type of machine learning system. It can be a different type from the main machine learning system, which can also be of any type.

In its simplest form, the data selector can be an arbitrary classifier that simply reproducibly partitions the data in a way that has nothing to do with the classification task of the main classification system. Even such an unrelated support classifier will achieve the effect of separating the data space into smaller regions that may be easier for the main classifier to handle.

A more sophisticated form of data selector is used in conjunction with a main classifier that is an ensemble. In this illustrative embodiment, the data selector is trained to predict which member of the ensemble will perform best at classifying each particular example. The members of the ensemble get trained on the examples assigned by the data selector. Even if the data selector is initially very poor at this prediction, if its predictions are consistent, they become a self-fulfilling prophecy as each member of the ensemble gets trained to specialize in the type of data that is sent to it by the data selector.

In a different form of specialization, the data selector itself could be a state-of-the-art ensemble classifier for the main classification task. It could then select data according to the classifications done by its members. The ensemble members of the main classifier (i.e., the second ensemble) could then specialize in verifying the results of the data selector (i.e., the first ensemble), with access not only to the original data but to the output scores and even the internal analyses of the members of the first ensemble. In addition, the second ensemble could have many more members, for example with a member specializing just to cases in which two particular members of the first ensemble disagree. Other members of the second ensemble, the main classifier, could specialize just in cases in which the two choices in a disagreement are a particular pair of categories. These illustrative examples and others are discussed in PCT Application No. US18/27744, filed Apr. 16, 2018, titled MULTI-STAGE MACHINE LEARNING AND RECOGNITION, which is hereby incorporated by reference in its entirety.

Although most of the training in various embodiments of this invention is nominally supervised learning in which all the data examples are labeled, ultimately all the labels are "soft." That is, a label can be changed if there is sufficient evidence that a change in the label will improve performance. Systems can share knowledge and opinions about labels, for example, communicated as indicated in block 109 of FIG. 1C. Block 120 manages the process of reviewing and changing labels, for example, by calling the procedures illustrated in FIG. 26 at various times in the development process.

Figure 19:
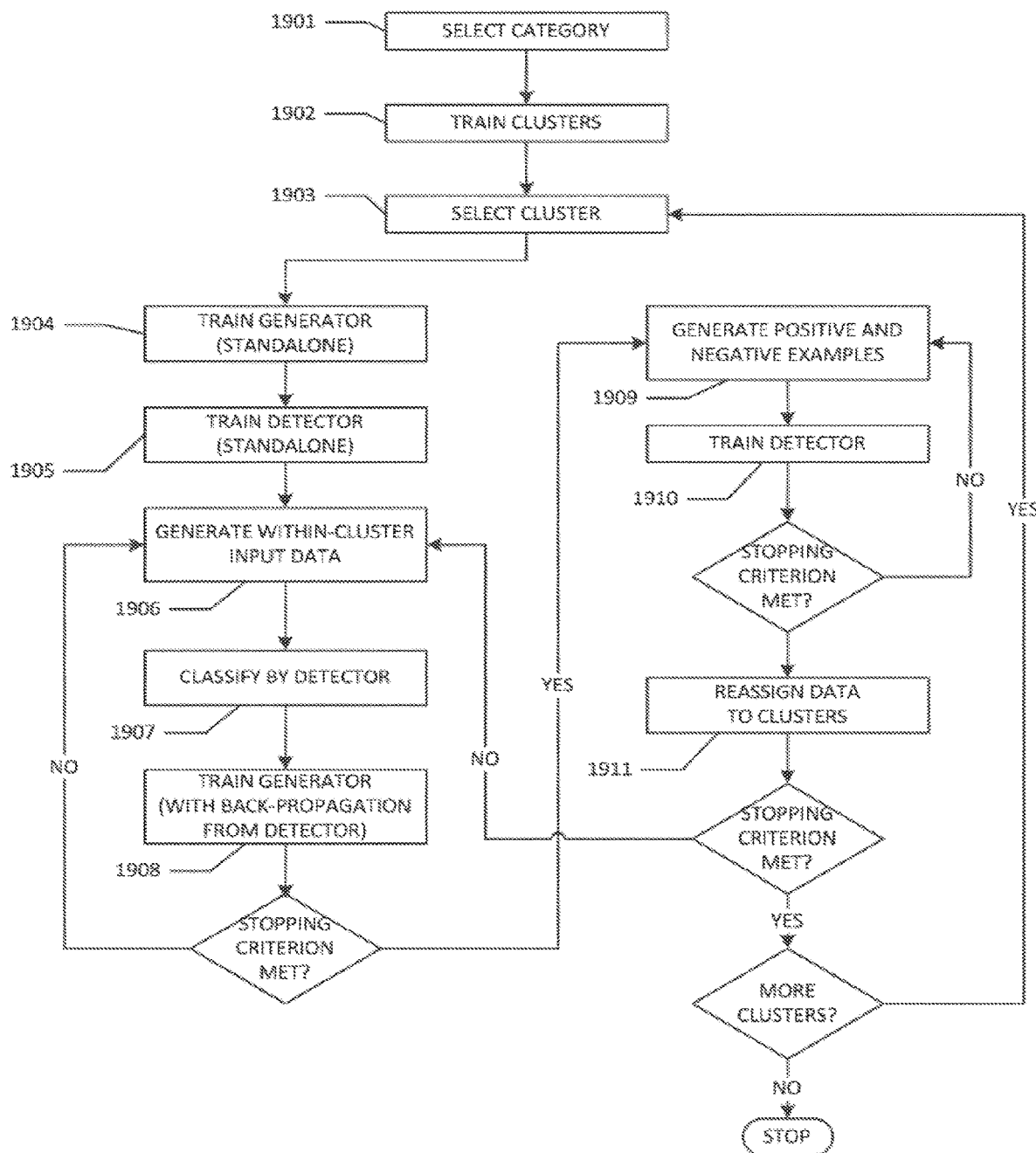
FIG. 19 illustrates a flowchart of a process for a MGM, such as the system illustrated in FIG. 18, according to one aspect of this disclosure.
Figure 20:
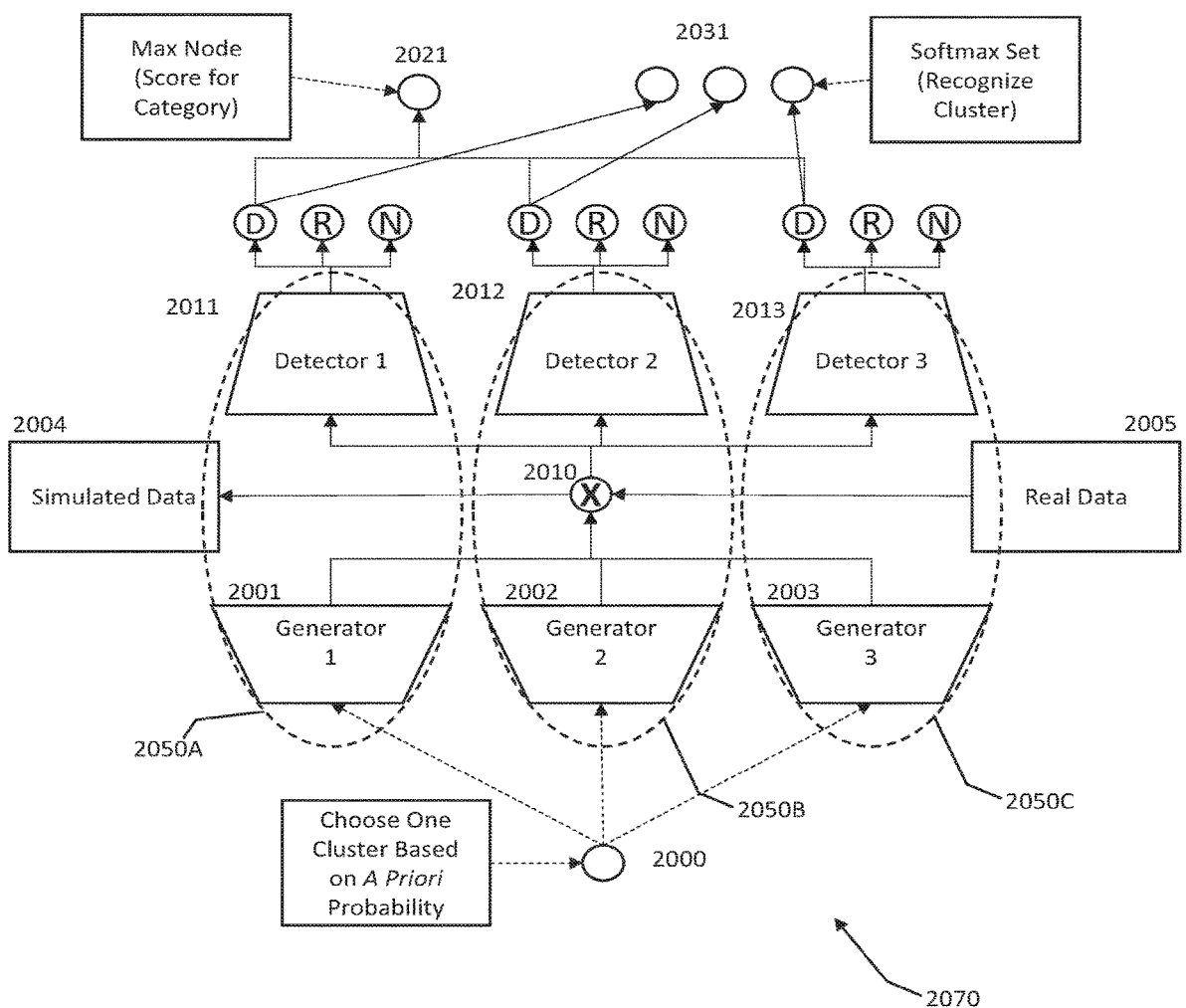
FIG. 20 illustrates a block diagram of a MGM, according to one aspect of this disclosure.

In some embodiments, block 121 uses the MGM illustrated in FIGS. 19 and 20. As illustrated in FIG. 20, an MGM contains both generators and detectors. An MGM can both generate simulated data and classify it.

In embodiments of block 121 including an MGM, the MGM can be used as a simulator and its use as a classifier is explained in further detail below in association with block 183 of FIG. 1E. In some embodiments, one of the generators in an MGM is trained to imitate each of the clusters in the main classifier. It does not matter what type of machine learning system the main classifier may be. If the main classifier uses clusters and can report which data examples are assigned to each cluster (and with what relative weight if the assignment is not all-or-none), then an MGM can be trained to imitate it.

Once an MGM has been trained to imitate the clusters, then the MGM can be used to guide the setting of hyperparameters by other procedures. For example, if any block wants to know the relative effectiveness of different types of regularization on the degree of underfitting or overfitting, it can first try testing the types of regularization on the simulator and, once it has narrowed down the choice, verify the final selection on the main classifier. This concept extends, for example, to any experimentation with any set of hyperparameters by any one of the processes. The amount of real training data is limited, but an MGM can generate an unlimited amount of data for development and experimentation. Block 121 manages the relationship with the MGM, so that the individual processes do not need to know the details.

As callout 122 indicates, any of the processes may tune some of the hyperparameters, for example, by using the procedures illustrated by FIGS. 14 and 15, or by simple trial and testing on the development data.

FIG. 1E is a flowchart of illustrative examples of various procedures used in some embodiments of this invention. As with FIG. 1D, the illustrative embodiment illustrated in FIG. 1E uses many different techniques or processes for improving performance of a classifier and illustrates them in a particular order. Various embodiments of the system can employ the processes described in FIG. 1E in any number, any combination, and in any order, at least for classifiers implemented as neural networks.

Many of the procedures illustrated in FIG. 1E assume the main classifier is a neural network. For example, block 181 adds layers to a neural network and block 182 adds nodes in response to specific situations. Block 183 uses the MGM either as the main classifier or as one system within the main classifier. Some embodiments of the invention are intended to apply to any kind of machine learning system and only use procedures that work on any type of machine learning system, such as those illustrated in FIG. 1D.

Figure 28:
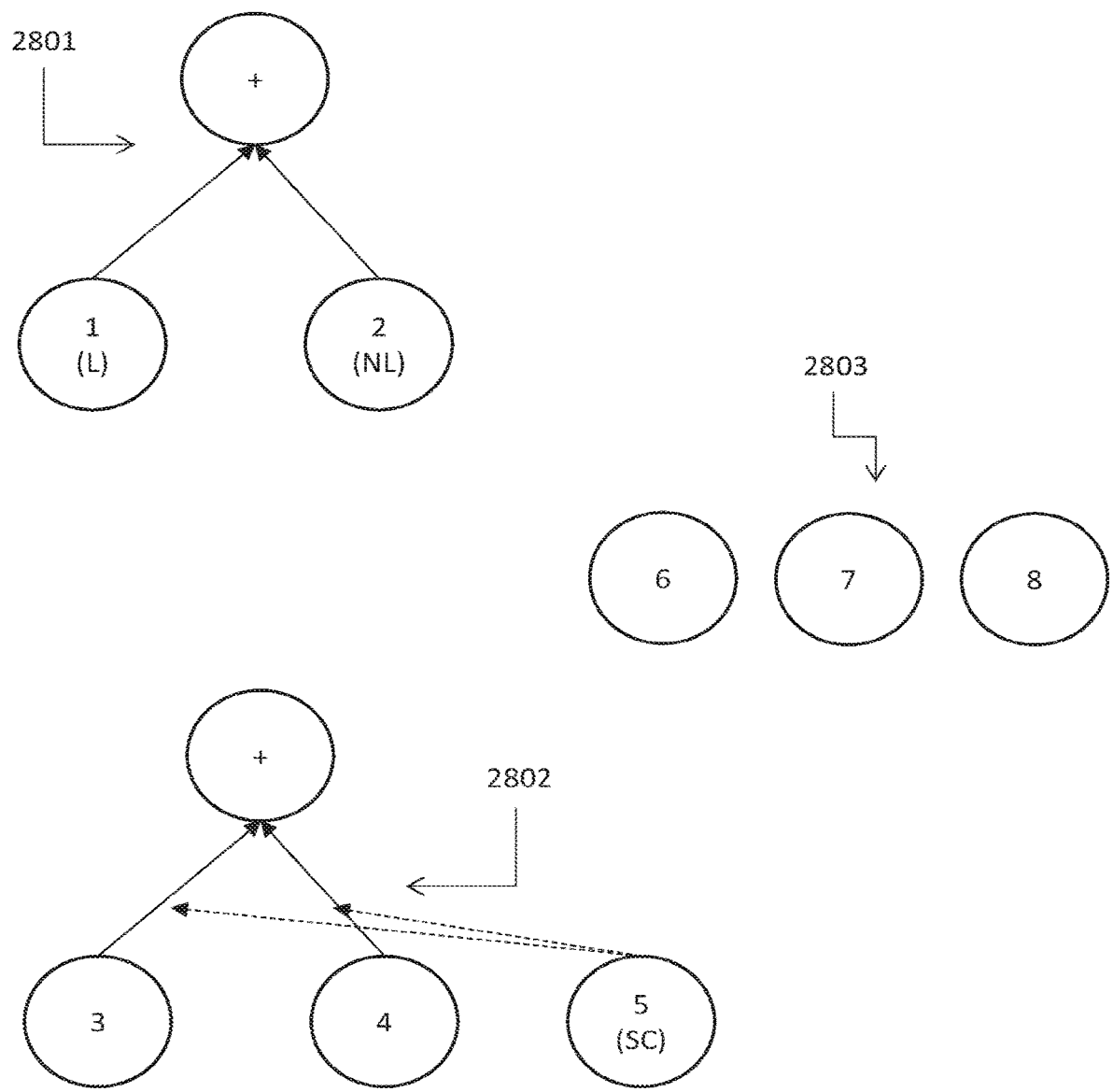
FIG. 28 illustrates a diagram of various combinations of nodes or compound nodes, according to one aspect of this disclosure.

A first process for improving the performance of a classifier is represented by block 181, which expands a neural network by adding one or more layers. The new layers may be added after the current output layer, just after the input layer, or at any intermediate layer. If the new layers are to be added to a network that has already been trained to convergence, a safe way to make the addition is to do the network expansion just before a data split, as used in block 152 of FIG. 1F and illustrated in FIG. 24. Other illustrative embodiments of data splitting and network expansion like the embodiment illustrated in FIG. 24 are presented in PCT Application No. US18/35598, filed Jun. 1, 2018, titled DATA SPLITTING BY GRADIENT DIRECTION FOR NEURAL NETWORKS, which is incorporated by reference in its entirety. Another illustrative example of adding layers to a network is shown in FIGS. 27A and 27B. Another illustrative embodiment of adding nodes is shown in FIG. 28.

A second process for improving the performance of a classifier is represented by block 182. At block 182, the computer system 4100 expands the network by replacing individual nodes with special units consisting of several nodes connected in special ways to construct various compound units. For example, a single sigmoid node may be replaced by a triple of nodes representing "Detect," "Reject," and "Neutral," respectively, as illustrated by, for example, 2803 in FIG. 28. This three-node structure can be used to replace output nodes in FIGS. 18 and 20. An illustrative description of a system for training the replacement nodes is explained with FIG. 18. As another example, a rectified linear unit (ReLU) may be replaced by a set of nodes, where each node within the set has a limited range and the nodes have monotonically increasing biases.

A third process for improving the performance of a classifier is represented by block 183. At block 183, the computer system 4100 uses the MGM as a classifier, either as the main classifier or as a member of an ensemble. The MGM was introduced as a simulator in block 121 of FIG. 1D and is illustrated in FIGS. 19 and 20.

A fourth process for improving the performance of a classifier is represented by block 184. At block 184, the computer system 4100 uses multiple systems. Illustrative configurations of multiple cooperating systems are shown in FIGS. 2 and 3. A more elaborate illustrative example of multiple systems, asynchronous agents, is described in further detail in U.S. Provisional Patent Application Ser. No. 62/515,142.

A fifth process for improving the performance of a classifier is represented by block 185. At block 185, the computer system 4100 uses aligned networks, which aids in the training of very deep neural networks. In some embodiments, aligned networks are used when the number of layers in a first network is expanded or contracted. The number of layers in a deep network may be expanded to increase its ability to learn complex nonlinear functions. In some embodiments, the number of nodes per layers is kept roughly the same or increased. In some embodiments, the number of nodes per layer is decreased to reduce the tendency to overfit. Whether the number of layers is expanded or contracted, in some embodiments, the training is done from scratch but with soft-tying of nodes in the first network to nodes in aligned layers in the second, expanded or contracted, network. In some embodiments, the second network is trained by learning by imitation, as illustrated in FIGS. 1B, 27A, and 27B. Aligned networks are discussed in more detail in PCT Application No. US18/37812, Jun. 15, 2018, titled ALIGNED TRAINING OF DEEP NETWORKS, which is hereby incorporated by reference in its entirety.

A sixth process for improving the performance of a classifier is represented by block 186. At block 186, the computer system 4100 uses selective training to attempt to train an ensemble or a set of nodes, which may be output nodes or feature detectors, to avoid having multiple nodes make the same mistake on the same data example. When two or more nodes make the same mistake, they receive feedback from an extra penalty term in the error cost function. Details of selective training for error decorrelation are discussed in PCT Application No. US18/39007, filed Jun. 22, 2018, titled SELECTIVE TRAINING FOR DECORRELATION OF ERRORS, which is hereby incorporated by reference in its entirety.

A seventh process for improving the performance of a classifier is represented by block 187. At block 187, the computer system 4100 finds near neighbors to a designated data example for several purposes in various embodiments of this invention. An illustrative embodiment of a method for finding data examples in a designated set, for example the training set T, is shown in FIG. 25. Finding near neighbors can be useful, for example, in block 116 of FIG. 1D. It can also be useful for k-nearest neighbor classification. Besides possibly being used as an operational classifier, k-nearest neighbor classification can be used as a diagnostic tool during development of other forms of classifiers. If a data example is misclassified, for example, it is useful to know whether near neighbors are also misclassified. Finding neighbors near a data example X that are in a cluster can help determine whether X is clusterable, for example, in some embodiments of block 116 of FIG. 1D. An example of an illustrative embodiment for finding near neighbors is shown in FIG. 25.

An eighth process for improving the performance of a classifier is represented by block 188. Finding near neighbors is also useful for making estimates of the local probability distribution. At block 188, the computer system 4100 estimates the probability density function of a category or cluster can be by counting the number of neighbors that are of that category or cluster within a region around a data example X and dividing by the volume of the region. Knowing the probability density function permits a maximum likelihood labeling of X. It also aids in diagnosing whether a misclassification of X is a "Bayes error."

A ninth process for improving the performance of a classifier is represented by block 189. At block 189, the computer system 4100 uses data selection, such as discussed with block 119 of FIG. 1D, to efficiently train and use large collections of cooperating classifiers in a configuration called a "multi-stage" system. A multi-stage system uses a potentially large number of final-stage classifiers, but uses data selection so that the amount of computation for either training or classification during operation is reduced to an amount that is comparable to the amount of computation required for a single system. Each of the, say N, final stage systems only needs to process a fraction of the data averaging 1/N. However, the N final stage systems have classification capabilities comparable to an N element ensemble. Multi-stage systems are discussed in further detail in U.S. Provisional Patent Application Ser. No. 62/486,650.

A tenth process for improving the performance of a classifier is represented by block 190. At block 190, the computer system 4100 uses transformations to correct errors, including errors that are otherwise difficult to correct. Two illustrative embodiments of block 190 use transformations to fix errors in which a data example X is an instance of a category A. The two illustrative embodiments use transformations differently and are designed for two different situations. In both situations, data example X is not a typical example of category A and is misclassified as category B.

In situation one, data example X is distorted or transformed in some way such that there are multiple examples of category B that are similar to X. This situation may be detected, for example, by the confidence estimation system illustrated in FIG. 1G. For example, the system in FIG. 1G might determine that the classification as category B has high confidence and that, in addition, the internal score for how well example X matches category B ranks acceptably in the distribution of such scores for true examples of category B. In this first situation, block 190 can further include a process, such as the embodiment illustrated in FIG. 17A, to find an inverse transform that changes data example X back to a pattern that is like other examples of category A. This inverse transform is trained to avoid changing any example of category B into a pattern than is like an example of category A.

Figure 18:
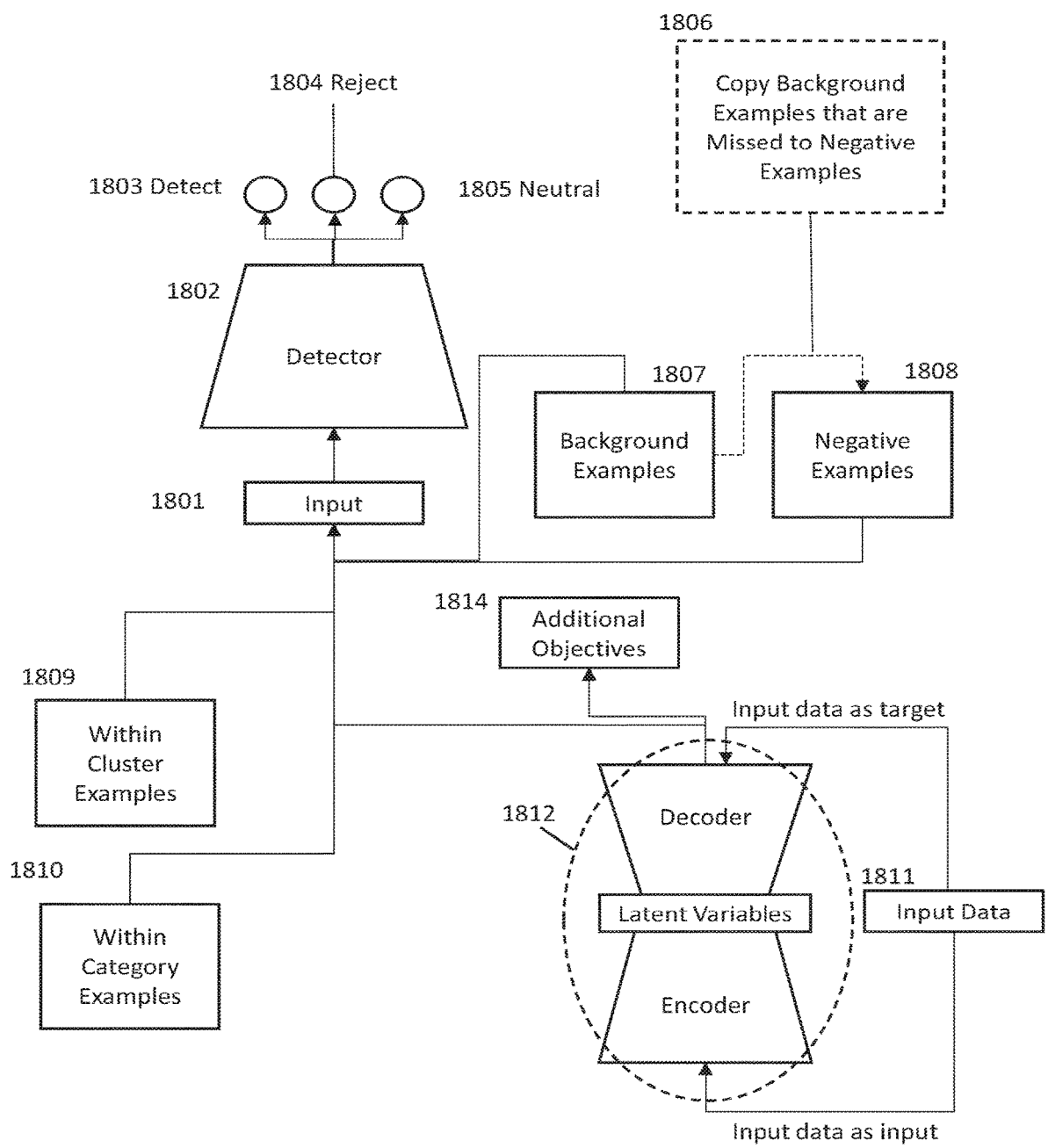
FIG. 18 illustrates a block diagram of a system for a mixture of generators model (MGM), according to one aspect of this disclosure.

In situation two, data example X is a rare example that is not a close match to any other example in category A but also is at best a mediocre match to any example in B. This situation also could be detected, for example, by the confidence estimation system illustrated in FIG. 1G. In this second situation, block 190 can include a process, such as the embodiment illustrated in FIG. 17C, to find a prototype example Y of category A and a stochastic transformer f, such that f(Y) is similar to X. Data augmentation examples similar to X are generated by stochastic transformer f(Z) for Z=Y and data augmentations of Y. Data augmentation examples produced by a stochastic generator or stochastic transform are kept similar to the designated target by reducing the standard deviation under control of a hyperparameter. These generated data examples are used as additional training examples for category A. Preferably, these data augmentation examples are generated by a transform f and data augmentation generator for Z that include training with examples of category B back propagated as negative examples, for example as illustrated in FIGS. 9 and 18.

Block 191 returns control to the calling procedure, for example block 112 of FIG. 1D.

Figure 1F:
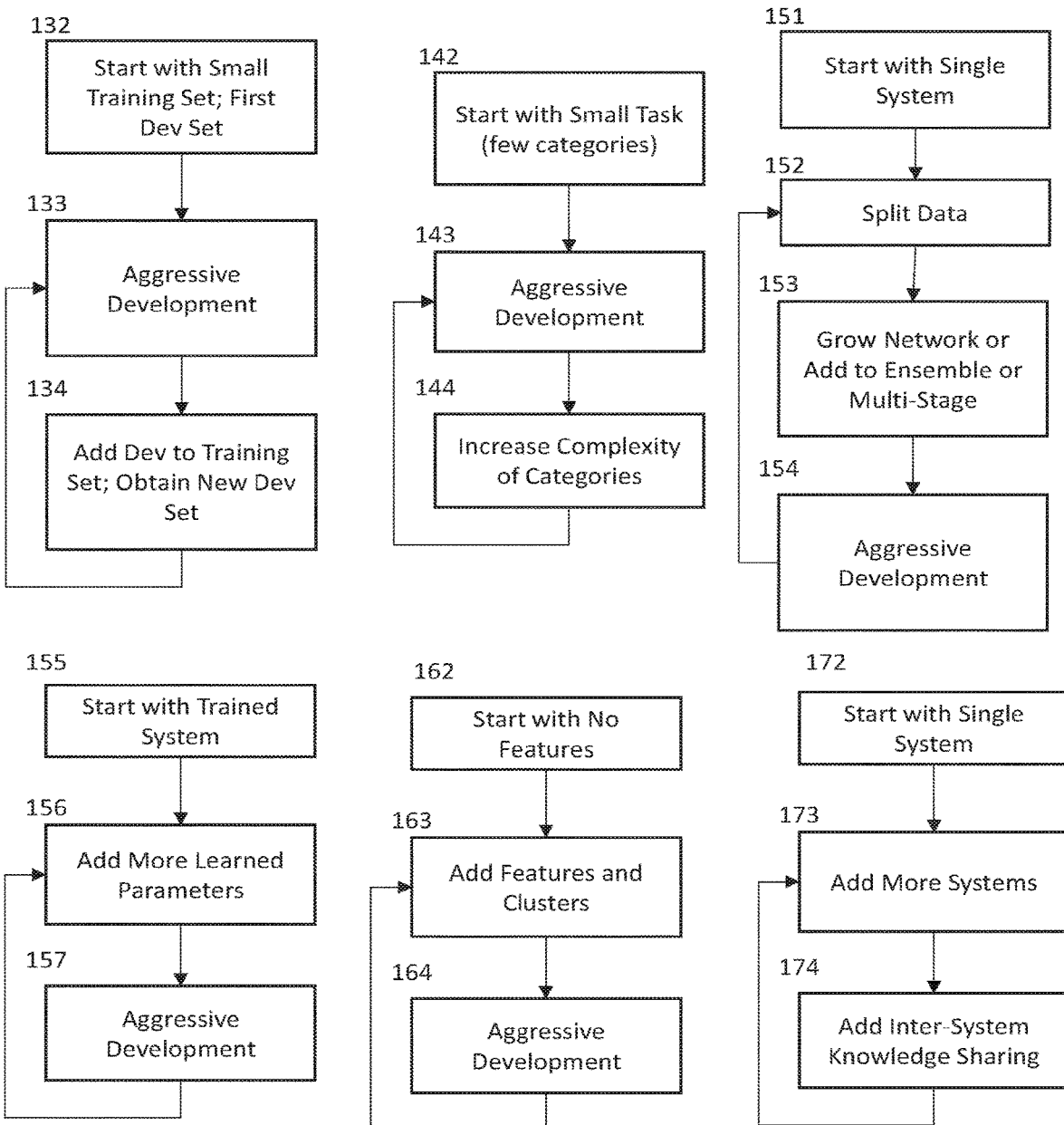
FIG. 1F illustrates flowcharts of multiple processes for incrementally developing a machine learning system, according to one aspect of this disclosure.

FIG. 1F illustrates a set of flowcharts of illustrative embodiments of a process called incremental development. The processes illustrated in FIG. 1F could be performed by a computer system, such as the computer system 4100 shown in FIG. 41. FIG. 1F shows six embodiments of incremental development. The first embodiment, shown in blocks 132, 133, and 134, is commonly used in various embodiments of this invention and is illustrated by the example shown in FIG. 2. In this embodiment, incremental development consists of starting with a small training set and the first of two or more development sets (block 132). Aggressive development is done with that designation of training and test data (133) then, in the illustrative example, the first development set is added to the training data and a new set of development data is obtained (134). Control returns to block 132 and the process is repeated until the development data is exhausted.

At blocks 142, 143, and 144, the computer system 4100 performs a similar process of incremental development, gradually increasing the complexity of the set of categories and, thus, the difficulty of the task.

The incremental development illustrated in blocks 151, 152, 153, and 154 is slightly more complicated. For this group of blocks 151, 152, 153, and 154, the computer system 4100 incrementally adds new members to an ensemble or grows any machine learning system by adding new elements. In an illustrative embodiment, new ensemble members or new elements are created by a process called "data spitting," which is illustrated in FIG. 24. As illustrated in FIGS. 24, 27A, and 27B, data splitting also enables growing the size of a neural network. Block 152 may do data splitting to incrementally growing the size of an ensemble, with or without also incrementally growing the size of the new network to be added to the ensemble.

Data splitting consists of splitting the training data into two or more subsets accompanied by adding new elements to the machine learning system. The new elements are copies of existing elements. For example, a new element can be a new member added to an ensemble. In some embodiments, a node in a neural network is copied along with its incoming and outgoing connections. More generally, in any type of machine learning system, the element to be copied is any element that can receive selective training on only a subset of the training data. In some embodiments of this invention, data splitting is done when it is detected that, on some data examples, stochastic gradient descent is trying to make changes in one direction for some examples and in a very different direction on other examples.

The data split enables the copies to be trained differently from the originals by training them selectively on different subsets of the split data. In a neural network, for example, an original node and a copy can be trained separately by intervening in the back-propagation process and allowing back propagation to only proceed to either the original or the copy, depending on which subset of the data split contains the current data example. After the original and copies are selectively trained enough to be significantly different, the entire system including both original elements and the copies can continue normal training on the entire training set. In some embodiments, the selective training is controlled by a data selector node, such as illustrated data selector node 2802 of FIG. 28.

At block 153, the computer system 4100 adds an element to any machine learning system, such as one or more nodes added to a neural network or a member added to an ensemble. If data selector nodes are added to an ensemble, they can also build a multi-stage classifier, which has comparable performance to an ensemble with less computation, as discussed with block 189 of FIG. 1E.

Blocks 155, 156, and 157 illustrate the process of adding more learned parameters, which applies to any type of machine learning system. This illustrative example of incremental development applies to generators as well as to classifiers. Adding more learned parameters to a system that has already been trained to a local optimum has several potential problems. Any change away from the local optimum may result in worse performance. In some systems, it might not be possible to initialize the new parameters to make the new, larger system compute exactly the same values as the old system. Even when it is possible to compute the same values, those settings for the new parameters may result in the new system also being at a local minimum or at least a stationary point in the new, larger parameter space. Therefore, in making one-time changes adding learned parameters to a machine learning system, it is common practice to redo the training from scratch. However, that approach still has several potential problems. First, it is computationally expensive. Second, retraining may fail to find a solution as good as the previous solution. For example, in training larger neural networks, it has been reported that not only does performance eventually saturate, as might be expected, but as the depth of the network is increased further, performance degrades, even on training data. Eventually, performance degrades catastrophically.

In incremental development, embodiments preferably do not retrain from scratch but rather train incrementally. For example, the new larger system can be initialized to imitate the smaller system. Some embodiments set the new parameter values to exactly copy the smaller system, if it is known how to do that. Some embodiments, either out of necessity or out of preference, learn to imitate the smaller system. For example, that imitation can be learned by learning by imitation, as illustrated in FIGS. 1B, 27A, and 27B.

If the new, larger system is at or near a stationary point, various embodiments of this invention use several tactics to escape from a local minimum or to get away from the slow learning near even an unstable stationary point. Some embodiments use the tactic of making one of more random perturbations of the parameters, trying to find a set of values that have performance at least nearly as good as the previous local optimum and with a gradient that within a few iterations leads the train away from the stationary point. Some embodiments keep a record of prior versions of the old, smaller system and restart the training not from scratch, but rather from an earlier configuration. The chosen earlier configuration is a configuration of the system prior to the point at which the training gets too close to the stationary point. Some embodiments restart the training with a data split, as explained for block 152.

For blocks 162, 163, and 164, the computer system 4100 incrementally adds features to a system. The process starts with no features, so block 164, which does aggressive development, comes after adding one or more features.

For blocks 172, 173, and 174, the computer system 4100 address a collection of cooperating systems that may be working on the same classification task or on different tasks, but that share feature detectors or other knowledge, such as semi-supervised labels on data. The set of blocks incrementally add to the collection of systems with which they communicate.

Figure 1G:
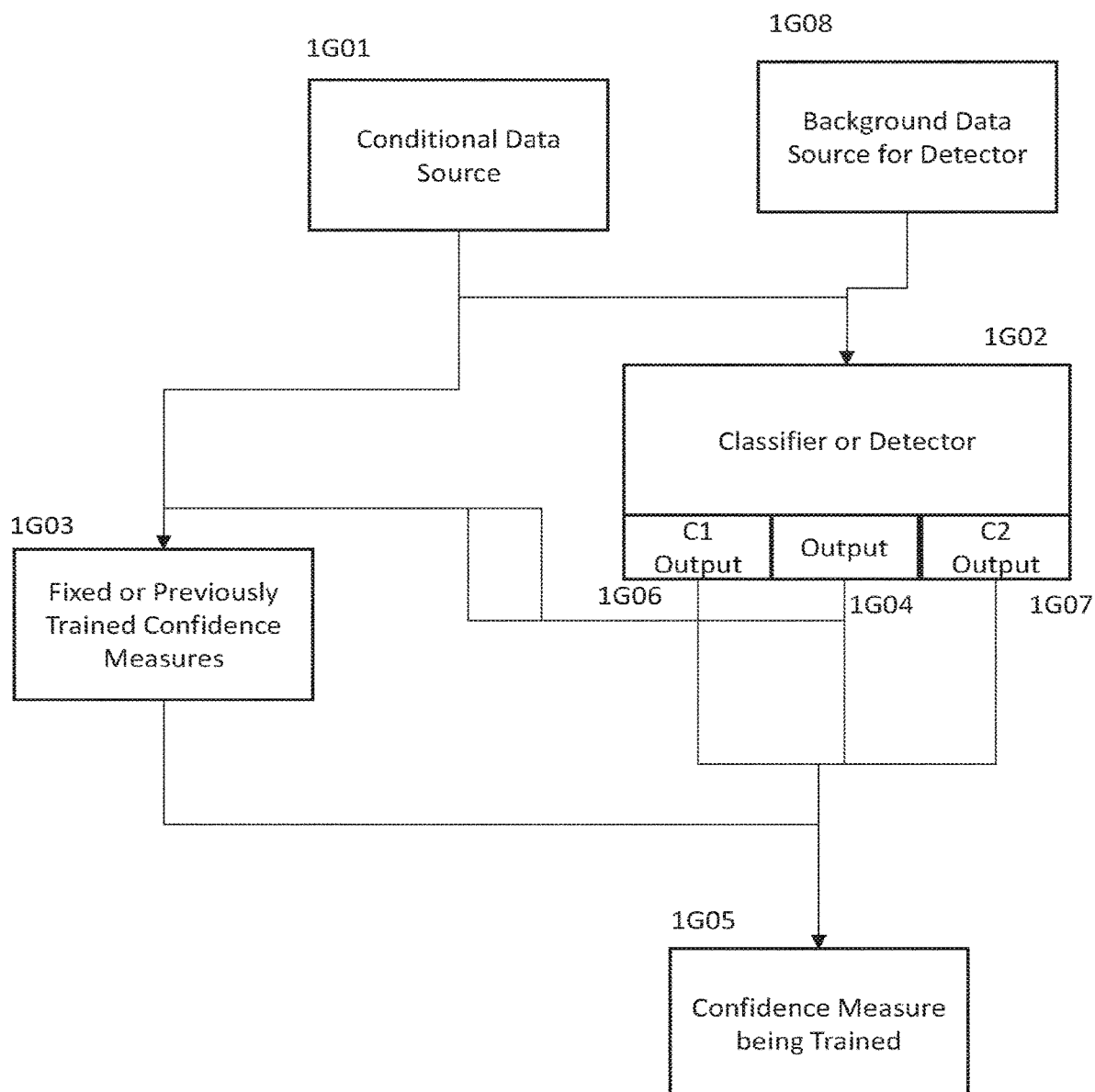
FIG. 1G illustrates a block diagram of a confidence estimation system, according to one aspect of this disclosure.

FIG. 1G is a block diagram of an illustrative embodiment of a method for training confidence measures used in various embodiments of this invention. The system and method illustrated in FIG. 1G could be performed by a computer system, such as the computer system 4100 shown in FIG. 41. The system shown in FIG. 1G also has additional capabilities. For example, it may be used as a diagnostic tool in analyzing misclassifications, helping answer questions such as "What is the cause of data example X from category A being misclassified as category B?" A confidence measure or related statistics can help distinguish between the two following causes: (1) Example X matches well as an instance of category A, but there are so many similar examples of category B that category B is selected; (2) Example X is a rare, noisy, or distorted pattern that gets a poor score as being from category A and a mediocre, but better, score as being from category B. A softmax output from a classifier, however, only reports the relative score of the best scoring answer compared to the other scores. It does not provide information about whether internal measures of how well example X matches category B are better or worse than normal.

The illustrative embodiment of FIG. 1G has several significant properties: (1) The final confidence estimate is based one or more confidence estimates (1G03 and 1G05); (2) The confidence estimate is defined and computed not as an absolute measure, but as an estimate with respect to a specified source of data 1G01; (3) The confidence estimate for a system operating as a classifier is a distinct concept from the confidence estimate of the same or a different system operating as a detector; (4) The confidence rating for a detector is also conditional on a specified source of background data 1G08; (5) The confidence estimate uses observations of the internal state of the classifier or detector 1G02 as well as its output scores and the data being classified; (6) The confidence estimator 1G05 may send cost function derivative feedback to auxiliary outputs (1G06 and 1G07) of the classifier or detector 1G02; (7) The classifier or detector 1G02 may use gradient descent to optimize the auxiliary outputs based on the cost function feedback from confidence estimator 1G05; (8) The confidence estimation system 1G05 may also compute other useful statistics and make them available.

The classifier or detector 1G02 may be any form of machine learning system that is trained by gradient descent. Confidence estimates are often discussed as if they are either absolute measures or measures specific to the classification or detection done on an individual data example. The discussion as an absolute measure is implicitly relative to a measure such the average performance across a possibly unnamed source of data, such as the training data or an independent validation set. The discussion of a confidence measure on an individual data example only makes sense if the data example is a categorical label that is a representative of all data examples in that category or if there is a parametric model for the probability of an error.

In embodiments of this invention, it is useful to have a measure of confidence of an individual classification or detection decision. The illustrative embodiment in FIG. 1G makes the confidence estimation conditional on the explicitly identified data source 1G01. If an estimate is desired that is more or less specific to an individual data example, then the data source 1G01 may be a stochastic generator that generates data augmentation designed to be in a small region around that individual data example. On the other hand, the confidence estimate can be a broad estimate conditional on some observable condition. For example, the confidence estimate can be conditional on the classification category of the classifier having a particular value. On training data or other labeled data, the confidence estimate can be conditional on the given label being a particular value.

For a detector, a numerical rating of the confidence of a detection also depends on the distribution of the data that could possibly be incorrectly detected as an instance of the target. For example, if the nontarget data is very similar to the target data, a detection should be less confident than if the nontarget data is very different, even if the detector and the data being detected are not changed. Therefore, for estimating the confidence of a detector, the illustrative embodiment in FIG. 1G represents the source of nontarget data 1G08 separate from 1G01, which for estimating confidence of a detector is a source of target data only. Thus, for estimating confidence in a detector, the system illustrated in FIG. 1G can vary the composition of the nontarget data 1G01 independently from the composition of the target data 1G01.

Block 1G02 is the classifier or detector being rated. Its regular output is 1G04. Classifier 1G02 also produces auxiliary output C1 (1G06), which is sent to 1G03, and auxiliary output C2 (1G07), which is sent to confidence estimation machine learning system 1G05, which is the confidence estimation system being trained.

Confidence estimates based on multiple criteria often perform better than estimates based on a single criterion. The illustrative embodiment in FIG. 1G allows for multiple criteria using block 1G03, which comprises previously trained confidence estimators as well as fixed, untrained measurements such as standard statistical tests. The previously trained confidence estimators in block 1G03 optionally use auxiliary output 1G06 from classifier/detector 1G02.

Confidence estimation system 1G05 receives output 1G04 from classifier/detector 1G02 and also its own auxiliary output 1G07 and optionally the auxiliary output 1G06 used by and previously trained by the confidence estimators in 1G03.

Confidences estimation system 1G05 back propagates the derivatives of its error cost function to the auxiliary output 1G07, which causes machine learning system 1G02 to learn to generate auxiliary output that is useful to confidence estimation system 1G05. In some embodiments, 1G05 also back propagates its error cost function to previously trained systems 1G03 and to auxiliary output 1G06.

Generally, confidence estimation system 1G05 preferably does not back propagate its error cost function to the regular output 1G04, on the principle that doing so would disturb the system being studied.

Confidence estimation system 1G05 comprises a confidence score computation that is trained with a target of 1 for a correct classification or detection and a target of 0 for an error. This confidence score computation is trained by standard machine learning techniques, such as back propagation for stochastic gradient descent for a neural network.

In some embodiments, the confidence estimation system 1G05 also comprises a nonlinear regression estimator that estimates a probability of error measure averaged over the probability distribution of the data sources. For example, the probability measure may be the probability of correct classification or detection or the logarithm of the probability of an error. For training this regression system, each training example measures the error rate of system 1G02 on a random sample from the data sources 1G01 and, in the case of detection, 1G08. System 1G05 then fits a regression curve for the probability of error as a function of the confidence score.

System 1G05 can collect information about the internal state of system 1G02 through its auxiliary output 1G07. In some embodiments, some of this information is collected passively. That is, some quantity that is computed internally by system 1G02 is observed and passed out though further processing to the auxiliary output 1G07, but back propagation of the error cost function from 1G05 is terminated before it affects the passively observed quantity. That is, if system 1G02 is, for example, a neural network and the error function from 1G05 is back propagated through part of the neural network of 1G02, the back propagation is not transmitted to any of the values that are being passively observed. In some embodiments, the passively observed variables may include variables that are not even visible to other elements of system 1G02. For example, 1G05 may passively observe the input to the activation function of a node. It may passively observe the raw score of an output node before the softmax normalization is applied.

In some embodiments, system 1G05 also collects statistics about the internal values it observes from 1G02. For example, it might collect a histogram or sufficient statistics for one or more of these observed variables. In some embodiments, such a statistical model for the raw score of an output node before softmax normalization allows system 1G05 to answer a question related to the question posed at the beginning of the discussion of this figure: "How well does this data example match the output category compared to the distribution of known examples of that category?" Some embodiments of system 1G05 use statistics related to this model distribution in the computation of the confidence score. In addition, some embodiments make this statistic externally available.

FIG. 2 is a block diagram of an illustrative embodiment of a system for generating data that can be used in various embodiment of this invention. The system illustrated in FIG. 2 could be performed by a computer system, such as the computer system 4100 shown in FIG. 41. Blocks 201, 202, 203, 204, and 205 are machine learning systems that cooperate to generate data to help train client machine learning systems 261. Blocks 201-205 are grouped together in a block 206 titled "cooperative data generation services." Although the cooperative data generation service 206 is depicted as including three generators (at blocks 201, 202, and 203) and two classifiers (at blocks 204 and 205), this embodiment is simply illustrative. In various embodiments, the cooperative data generation service 206 includes any combination of machine learning systems including one or more generators and zero or more classifiers. In some embodiments, the generators augment the data, as illustrated in, for example, FIGS. 1A, 1B, 1C, and 1D. In some embodiments, the generators cooperate with the classifiers to support learning by imitation, as illustrated in, for example, FIGS. 1B, 27A, and 27B. More generally, any type of generator can generate unlabeled data. Generators such as VAEs, SCANs, and MGMs can generate data for supervised training. With the help of a classifier, any type of generator can generate data for supervised training.

There are many possible type of generators, such as recursive neural networks (RNNs), hidden Markov process models (HMMs), VAEs, generative adversarial networks (GANs), Boltzmann machines, generative stochastic networks, fully visible belief networks, stochastic regression trees and others, including SCANs and MGMs, both of which are introduced in this disclosure. An illustrative SCAN is described in association with FIG. 6C. Illustrative examples of generators are shown in FIGS. 4, 6C, 8, 9, 10, 11, 20, 36, 37, and 38. The generators may also be application-specific synthesizers, such as speech or music synthesizers, optionally with noise added. Many, but not all, of these generator types are represented by specialized types of deep neural networks. In some illustrative embodiments of this invention, it is preferable to use more than one type of generator so that they learn from each other and benefit from cooperating. Illustrative examples of the ways in which these machine learning systems may cooperate will be described with respect to other figures.

Block 209 supplies "real" data, i.e., data that has not been generated by the cooperative data generation services 206, but that has been obtained by some other means. Embodiments of this invention, with multiple generators and classifiers cooperating in the data generation service can provide much more data for training and other development purposes.

Blocks 211, 221, 222, 231, and 241 represent various embodiments of the distinct ways in which the data may be used. In the art of machine learning, it is generally prudent to have separate training data 211 and test data 241. In machine learning, as in many other statistical estimation procedures, there are two distinct kinds of parameters. First, there are parameters that are to be learned or estimated. The values of these parameters describe the particular classifier or generator that is the end result of the learning process. Second, there are also parameters that control the learning process. These control parameters are called hyperparameters. When it is necessary to make the distinction clear, the ordinary parameters that are learned or estimated are called "learned parameters."

The values of the hyperparameters may be specified beforehand by the system developer. However, sometimes it is necessary to try various combinations of values for the hyperparameters to find the values that seem to be the most effective and efficient. When measuring the performance for a set of hyperparameter values, it is again prudent to perform the measurement using data that has been set aside from the training data. It should also be separate from the final test data. Such set aside data is called validation data 231.

In some embodiments of this invention, there may be millions or even billions of learned parameters. In some embodiments, there may also be millions or billions of hyperparameters. The best values for the hyperparameters may be found by an automatic or semi-automatic optimization process. In some embodiments, the training of the client systems may involve multiple rounds of training and performance testing. Therefore, in addition to setting aside validation data 231, additional data, called "development data" is set aside (221 and 222). Two sets of development data 221 and 222 are shown in FIG. 2, but more may be used. Similarly, there may be more than one set of validation data 231. The data blocks 211, 221, 222, 231, and 241 are grouped together into data block 207.

Generally, all the test data is real data, although there are some embodiments in which generated data may be used for testing. In many embodiments, at least some of the training, development and validation data is real data, not generated data.

In many situations, the amount of real data is limited. On the other hand, there is generally no limit to the amount of generated data that can be created by the cooperative data generation service. Although real data can be used for any of the purposes represented by blocks 211, 221, 222, 231, and 241, such use is optional for development (221 and 222) and validation data (231).

The cooperative data generation services (blocks 201-205) can supply extra training data 211, and can supply some or all of the development data (221 and 222) and validation data 231. In some embodiments, for example the procedure illustrated in FIG. 4, it can even provide test data.

The data represented by block 207 is supplied to block 261 for training and development of one or more client machine learning systems. The training and development process for a client machine learning system will be described in more detail with respect to other figures.

FIG. 3 is a block diagram of an illustrative embodiment of multiple cooperating systems sharing knowledge, such as in block 109 of FIG. 1. FIG. 3 is an illustrative example for the embodiment of any of the systems described in this disclosure. Some illustrative embodiments, however, run on a single computer system. The knowledge and data sharing of block 109 of FIG. 1 allows a variable rate of data communication with, for example, more data sent and received with other systems that have a high bandwidth connection and less data sent and received with systems that have a lower bandwidth connection.

For example, in the illustrative embodiment shown in FIG. 3, the systems shown together in any one of the blocks 301, 302, 303, or 304 may all be implemented on a single computer or a cluster of computers with a high data-bandwidth interconnection. Although only two classifiers and two generators are shown, any number of classifiers or generators may be grouped together in such a cluster. Within such a cluster, full configuration descriptions comprising millions or billions of bytes may be communicated as frequently as a system has a configuration it thinks worth communicating or as frequently as one system requests such a configuration from another. The systems within such a cluster can communicate data that requires fewer bytes even more frequently. For example, new best performance scores may be communicated wherever a new, better result is obtained, so that each system can keep track of its progress relative to the other systems, which will help it decide when to request more detailed data.

The blocks 301, 302, 303, and 304, on the other hand, may represent computers or clusters that are at more remote locations, connected by a wide area network or a packet-switched network such as the Internet. The communication between these blocks can be less frequent and/or be less data intensive. In particular, the data structures that require a large number of bytes, such as the configuration descriptions, may be communicated less frequently. Best scores can be communicated relatively more frequently, for example whenever there is a new best score for a cluster as a whole rather than every time a single system finds a new best score.

Callout 305 gives several examples of the kinds of knowledge that can be communicated. In addition to best scores and configurations, examples include feature detections and information relating to soft tying of nodes. Feature detection requires very few bytes to communicate the fact that a feature has been detected, just a label that identifies the type of the feature and an identifier or index to the data example. On the other hand, to enable detection of the feature on a separate system, it may be necessary to communicate the description of a fractional configuration, for example, a subnetwork of a neural network culminating in a feature-detection node. In addition, test results on development data may be shared as described in association with block 109 of FIG. 1C, hyperparameters may be shared (for example, the hyperparameters can be tuned as described in association with blocks 121 and 122 of FIG. 1D), and data weighting and labeling (for example, as described in association with blocks 113 and 114 of FIG. 1D) may be shared.

Soft tying of nodes is a type of knowledge specific to neural networks that does not necessarily have an equivalent for other types of machine learning system. Illustrative systems and processes for soft tying nodes are explained in more detail in association with FIGS. 6A and 6B. One example of soft tying of nodes involves tying the degree of activation of a node for one data example with the degree of activation of the same node for one or more other data examples during training. For this example, the necessary data to be communicated are the indexes for at least two data items and an identifier of the position of the node within the network. Thus, not many bytes need to be communicated to specify a small number of soft node ties. On the other hand, the possible number of tie specifications is the number of nodes times the number of subsets of the data. Some embodiments may have many node tying arrangements, and some may have only a few.

FIG. 4 is a block diagram of an illustrative example of the cooperation of two or more generators and a classifier, such as may be used in various embodiment of this invention. Each of the blocks 401, 402, and 403 is a machine learning system that could be implemented on a computer system, such as the computer system 4100 shown in FIG. 41. Block 403 is a classifier. That is, given an example of input data values, it attempts to determine the classification of that example. Block 401 and block 402 are both generators. That is, each of them is a machine learning system that has been trained to produce patterns matching a specified objective. In an illustrative embodiment, block 401 and block 402 are preferably two distinct types of generators. The types of generators can include, for example, RNNs, HMIs, SCANs, VAEs, or a generic generator from a random input vector such as used in a GAN. In various embodiments, the generators can be the same type or different types. For this illustrative example, there are at least two generators and at least one classifier; however, there is no upper bound on the number of generators or the number of classifiers.

At block 404, the computer system 4100 back propagates error cost partial derivatives from additional objectives. Extra objectives in addition to the main objective improve generator training in several ways. For any kind of generator, additional objectives can make the generator more robust and generalize better. In generators such as GANs, extra objectives can help avoid mode collapse. Mode collapse is a type of learning failure present in GANs in which the generator converges to a proper subset of the modes in a multimodal distribution. In any generator, an extra "avoidance" objective can help train the generator to avoid producing examples that are not desired. For example, in some embodiments, the first generator 401 and the second generator 402 may both have the task of generating examples of a designated classification category. As an additional objective, block 404 could include a classifier or detector trained to recognize the desired category. When an example generated by either generator is a poor match for the designated category, block 404 provides negative feedback to that generator.

The relative strength of any extra objective of block 404 is controlled by a hyperparameter. Setting the hyperparameter to zero is equivalent to disabling the side objective, including the negative feedback example. With no loss of generality, it is to be understood for every generator in embodiments of this invention that there may be an extra objective supplying negative feedback if the generator produces an undesirable example.

The three machine learning systems cooperate, helping each other in the learning process. Generators 401 and 402 generate training data for classifier 403. Classifier 403 supplies (the partial derivatives of) an error cost function for generators 401 and 402. Optionally, generator 401 and/or generator 402 may have additional objectives supplied from another source. In addition, in some embodiments, block 405 compares the output of the two or more generators and back propagates an error cost when they are different. Block 405 uses a different training process that will be described below. One of the properties of that training process is that it can train a GAN to avoid mode collapse.

The task of classifier 403 is to distinguish data generated by generator 401 from data generated by generator 402. For other embodiments in which there are more than two generators, the task of the classifier 403 can be expressed more generally as being to determine which generator from the set of generators produced the given data. Generator 401 and generator 402 generate training and development data to train classifier 403. Note that this is a special case of data block 207 of FIG. 2. All of the data, including all of the training data and all of the test data, is generated data. There is no "real" data, or to put it another way, all the generated data is real data for this generator-discrimination task.

Furthermore, there is an unlimited amount of such data. If more data is needed, generator 401 and generator 402 simply generate more data. This property is very important and extremely valuable. It greatly facilitates the learning process. Often, the number of learned parameters, and thus the capability, of a complex machine learning system is limited by the tendency of a system with too many parameters to overfit the training data. Various methods of regularization are used to limit the effective number of degrees of freedom, but that also limits the representational capability of the system. In the embodiment illustrated by FIG. 4, there is no limit to the amount of training data.

In an illustrative embodiment, the training of machine learning systems 401, 402 and 403 proceeds in multiple rounds, with the objective function of classifier 403 and possibly other hyperparameters adjusted between rounds. In an illustrative embodiment, preferably only one of the machine learning systems 401, 402 or 403 is being trained and updated in each round. For example, the machine learning systems can be trained in a round-robin fashion: first classifier 403 is trained and updated, then generator 401, then generator 402, then classifier 403 again, and so on.

In some aspects of the illustrated process, block 406 is omitted from or otherwise skipped during the execution of the system by the computer system 4100. At block 406, the computer system 4100 optionally supplies additional data and/or objectives for classifier 403. From the point of view of the classification task defined by block 406, classifier 403 can have more learned parameters than it would normally have for task 406 because classifier 403 has the additional task of discriminating the two generators and has an unlimited amount of training data for the generator-discrimination task.

When classifier 403 is being trained, it may be trained using any of the machine learning training techniques that are known to those skilled in the art of machine learning. For example, if classifier 403 is a deep neural network, it can be trained using stochastic gradient descent with updates done in minibatches and with the partial derivatives of the error cost function computed by back propagation, as illustrated in the following pseudocode:

---

Pseudocode of stochastic gradient descent with
gradient normalization and learning coach control

---

1. $a_{l-1,0}(m) = 1$, is constant, so $w_{l,0,j}$ is a bias for node j in layer l
2. For each epoch until stopping criterion is met
   a. Input a set (minibatch number t) of training examples; repeat for each minibatch in epoch
      1. For each training example m, set $a_{0,i}(m)$ and perform the following steps:
         i. Feedforward (softmax output): For each $l = 1, 2, ..., L - 1$ compute $z_{l,j}(m) = \Sigma_{i=0}^{n_l} W_{l-1,i,j} a_{l-1,i}(m)$, $a_{l,j}(m) = \sigma(z_{l,j}(m); T_{l,j,t})$;

ii. Softmax output: $a_{L,k} = e^{z_k/T_{L,k,t}} \Big/ \left( \sum_j e^{z_j/T_{L,j,t}} \right)$;

$s_{L,n} = 1$;

iii. Output error gradient (m):

a. $\delta_{L,j}(m) = -\dfrac{y_j(m) - a_{L,j}(m)}{n_L T_{L,j,t}}$ iv. Backpropagate error gradient: For each $l = L-1, L-2, ..., 2, 1$ compute $$\delta_{l-1,i}(m) = \left( a_{l-1,i}(m)(1 - a_{l-1,i}(m)) \sum_{j=1}^{n_l} w_{l,i,j} \delta_{l,j}(m) \right) \Big/ (s_{l-1} T_{l-1,i,t})$$

2. Compute gradient for minibatch:
        $\Delta_{l-1,i} = \Sigma_{m=1}^{M} a_{l-1,i}(m) \delta_{l,j}(m) / M$
     3. Compute momentum:
        $v_{l,i,j} \rightarrow v'_{l,i,j} = \mu_{l,i,j} v_{l,i,j} - \eta_{l,i,j} \Delta_{l-1,i}$
     4. Compute norm for layer:
        $s_l = \mathrm{Max}_i |\Delta_{l,i}|$
     5. Gradient descent: For each $l = L-1, L-2, ..., 2, 1$ update the weights
        $w_{l,i,j} \rightarrow w'_{l,i,j} = w_{l,i,j}(1 - \lambda_{l,i,j}) - v'_{l,i,j}$

---

A deep neural network is a layered network, such as illustrated in FIG. 6A, with more than one hidden layer, that is, more than one layer between the input and the output.

This pseudocode example uses sigmoid output nodes with a cross entropy error cost function. This is appropriate for stand-alone training of the generators, since their output is like a regression with the values normalized to fit a finite range. However, in cooperative training as illustrated in FIG. 4, the output error gradient for the output of classifier 403 is back propagated to compute the gradient with respect its input, which is also the output of one of the generators. The gradient of the output of each generator is then back propagated through its network. The sigmoid output is appropriate for training classifier 403 if there are only two generators. Otherwise, a softmax output would preferably be used. However, for the cooperative training of the generators, classifier 403 has a special error cost function, which will be discussed below. This pseudocode illustrates an expanded set of hyperparameters. Later figures will illustrate additional new hyperparameters.

Several aspects of the above pseudocode should be noted with respect to conventional processes for deep neural network training:

The hyperparameters $\lambda_{l,i,j}$, $\eta_{l,i,j}$, $\mu_{l,i,j}$ are customized, potentially with a distinct value for each learned parameter, that is for each connection <l,i,j> in the network.

Each node has a temperature $T_{l,i,t}$ that is customized to the node and that is customized to the minibatch t. The temperature adds an extra form of regularization and lets the network learn to match a probability distribution.

There is a layer-by-layer gradient normalization $s_l$. This normalization facilitates the training of deep neural networks with very many layers.

There is a relative weighting factor $d_m$ for each data example. This hyperparameter enables the system to fix individual examples of overfitting.

These specialized hyperparameters are optional and are presented in this pseudocode for illustrative purposes. They are used in some embodiments of the invention and not in others. The management of the large number of hyperparameters may be handled by a learning coach, a separate machine learning system that learns how to manage and optimize hyperparameters and to perform other operations that improve the learning process for a client machine learning system.

If any of the machine learning systems 401, 402, or 403 is a type of machine learning system other than a neural network, it may be trained by any of the methods appropriate to that type of machine learning system that are known to those skilled in the art of machine learning.

There is an advantage to having generators of two or more different types in the embodiment illustrated in FIG. 4, because the cooperative learning enables them to learn from each other's strengths and weaknesses. For example, a GAN is capable of producing very realistic images, but it cannot generate patterns specific to a given input pattern and it has tendency to suffer from a kind of learning failure called mode collapse. A SCAN or a VAE can generate data related to a given input pattern and is not subject to mode collapse. However, when generating images, for example, a VAE tends to generate blurry images that are less sharp and less realistic than those generated by a GAN. In this example, both generator types are deep neural networks and can be trained by the pseudocode shown above.

Training together as shown in FIG. 4 can help any one of these generator types to avoid its weaknesses and to learn to imitate the strengths of the others. Block 405 enhances the process of the two or more generators learning to imitate each other. However, an individual output of a stochastic generator rarely matches another random output, even when the two generators are identical. Embodiments of block 405 operate a constructive iterative matching process. Normal stochastic descent training computes one increment to an estimated gradient for each data example and updates the learned parameters, such as the connection weights in a neural network, once per minibatch. An illustrative embodiment of block 405 instead feeds back the error cost function and lets each generator resample multiple times to try to find an example that better matches the other generator(s). The iterative hand-shaking process is allowed to continue for some limited number of cycles, before the error function from block 405 is combined with the other back propagated error cost functions and the increments to the estimated partial derivatives with respect to the learned parameters are accumulated. Block 405 is optional, but when it is used, it forcefully prevents any generator from neglecting part of its data space. For example, it can prevent mode collapse in a GAN. Note that if the iterative resampling described for the illustrative example above is used, it helps the generators fool classifier 403.

The task of classifier 403 is to distinguish patterns generated by generator 401 from patterns generated by generator 402. In a training round in which classifier 403 is to be trained, 401 and 402 are used as the source of training data. Classifier 403 is trained by the same training algorithms that would be used for normal training of a classifier, except for differences that take advantage of the fact that there is a potentially unlimited amount of training and development data. For example, classifier 403 can have a larger number of learned parameters. If classifier 403 is a neural network, it can have more layers, more nodes per layer, and more connections between nodes than a classifier that has a more limited amount of training data. Whatever type of machine learning system classifier 403 may be, it may have more learned parameters and it has less need of regularization during its training because to the potentially unlimited amount of training data.

The task for each of the generators 401 and 402 is to learn from the strengths of the other and to learn to overcome their individual weaknesses. To help them do this, when one of the generators is being trained, classifier 403 is not itself being trained but instead it back propagates an error cost function that represents the goal of the generator being trained. For example, if generator 401 is being trained, classifier 403 back propagates an error function that rewards generator 401 for generating patterns that resemble those generated by generator 402 and punishes it for generating patterns that are recognizably different.

Although a single of round training of generator 401 or 402 may appear to be adversarial to classifier 403, it is important to understand that the multiround training process is fully cooperative and not adversarial. This point may seem subtle but it is important. In each round of training classifier 403, the generators help the classifier 403 learn whatever distinction there may be between the patterns that they generate. In each round, each generator is trained to be more like the other while still meeting any extra objectives supplied by block 404, which may be specific to each generator.

In multiple rounds, each of the three machine learning systems 401, 402, and 403 get better at their joint goal. In each round classifier 403 learns to distinguish smaller differences between the generators and then teaches them to reduce those differences. Thus, for the long-term goal, the generators want classifier 403 to be as accurate as possible and classifier 403 wants to get better and better at distinguishing slight differences. This shared cooperative goal means, for example, that, if a larger machine learning system 403 with more learned parameters can be more accurate, then that is to the advantage of all three machine learning systems.

This cooperative, shared goal contrasts with an adversarial relationship, such as in a GAN. A GAN can be viewed as generator consisting of a decoder with random input attempting to fool a classifier that distinguishes real from generated data. The situation is modeled as a two-person zero-sum game. As the name implies, this is a strict adversarial relationship. In a two-person zero-sum game, any gain for one player is a loss of the other.

With a finite amount of real data, in this adversarial relationship, the optimum strategy for the classifier is to memorize the training data and to reject as not real any pattern that is not in the training data. Complementary to this, the optimum strategy for the generator is also to memorize the training data and never to generate any pattern that is not an example from the training data. Furthermore, with enough parameters and no restrictions, a machine learning system such as a deep neural network can and will learn to memorize the training data. However, although these are optimum strategies for the game, such a generator and classifier are trivial and essentially useless. Therefore, restrictions are imposed in designing and training a GAN. The network is not allowed to be arbitrarily large, regularization is imposed, and training is often terminated before convergence.

Such restrictions are not necessary in the cooperative multiround training of the machine learning systems illustrated in FIG. 4. In fact, one of the generators, say 401, could even be a GAN with real-vs-generated discrimination as a side objective supplied from block 404. Not only is the multiround training still cooperative in spite of the GAN having an adversarial relationship with its own real-vs-generated discriminator, the system illustrated in FIG. 4 overcomes the normal problems in training a GAN.

With multiple rounds of training and a rich set of hyperparameters, it is prudent to repeatedly obtain a new set of development data, especially if a learning coach is automatically optimizing the hyperparameters or is making changes in the architecture of one or more of the machine learning systems 401, 402, or 403. This is a need that was anticipated in having multiple development data sets in data block 207 of FIG. 2. Fortunately, with the embodiment illustrated in FIG. 4, it is always possible to generate more development data.

As an illustrative example of FIG. 4, suppose generator 401 is a GAN and generator 402 is a SCAN. Under control of the hyperparameters, SCAN 402 can be designed to generate a wide range of patterns with high variability, even with only a limited number of input patterns. Since GAN 401 must learn to produce patterns similar to SCAN 402, it is not optimum for it to simply memorize the real training data used to train the real-vs-generated discriminator.

Furthermore, the amount of training data for classifier 403 is not limited. As a consequence, classifier 403 is not limited in size and complexity. For example, under control of a learning coach, classifier 403 could grow from one round to the next. If classifier 403 is a deep neural network, it could have extra nodes and extra layers added. As a consequence of having classifier 403 grow to be larger and more capable, generators 401 and 402 can also grow and become more capable, something that would cause problems with adversarial training of the GAN by itself.

SCAN 402 would also have a side objective. As an autoencoder, it would have the objective of reproducing its input data example. This attribute means that a SCAN can be trained to generate data examples that are all associated with a single classification category. If such a category-specific SCAN is used as generator 402 in FIG. 4, then generator 401, which might be a GAN or some other generator that is not category specific, would also learn in the multiround training to produce patterns mostly associated with the specific category. In some other embodiments, generator 402 may be a VAE, rather than a SCAN.

One remaining weakness in the embodiment illustrated in FIG. 4 is that, if one of the generators is a GAN, the amount of real data in the associated real-vs-generated discriminator would still be limited. This weakness will be addressed in FIG. 8.

The embodiment illustrated in FIG. 4, can use any other type of generator for generator 401 or generator 402. Whenever the two generators initially have different properties, they both will become more capable with the cooperative multiround training. The two generators do not need to be different types of generator to get this benefit. For example, they could both be the same type but with different architectures. They could have the same type and same architecture but have different ranges allowed for their hyperparameters, so they can be trained to imitate each other even though they cannot exactly copy each other.

Another interesting pairing pairs a generator based on a RNN with a SCAN. A generator based on a HMM with n-grams may be substituted for the RNN. A GAN or a VAE may be substituted for the SCAN. The RNN or the HMM has the capability, for example, of producing realistic looking text even though the passage usually does not make sense. They have similar capabilities for other kinds of sequences, including a sequential scan or wandering tour of an image. The probability distribution of each successive element of the sequence is dependent on the preceding context. A stand-alone SCAN, VAE, or a GAN does not have the inherent capability to learn this context-dependent behavior. On the other hand, they each have unique capabilities that are lacking in the RNN or HMM.

Some embodiments learn even more capabilities by having more than two generators, in which case the output of classifier 403 preferably would be a softmax function, representing the classifier choice of the single most probable generator for the given data example.

Either generator 401 or generator 402 could be a generator that has already been paired with another generator and trained by the system shown in FIG. 4. It would then have properties from two or more types of generator and could acquire more by being again paired with another type of generator.

Figure 5:
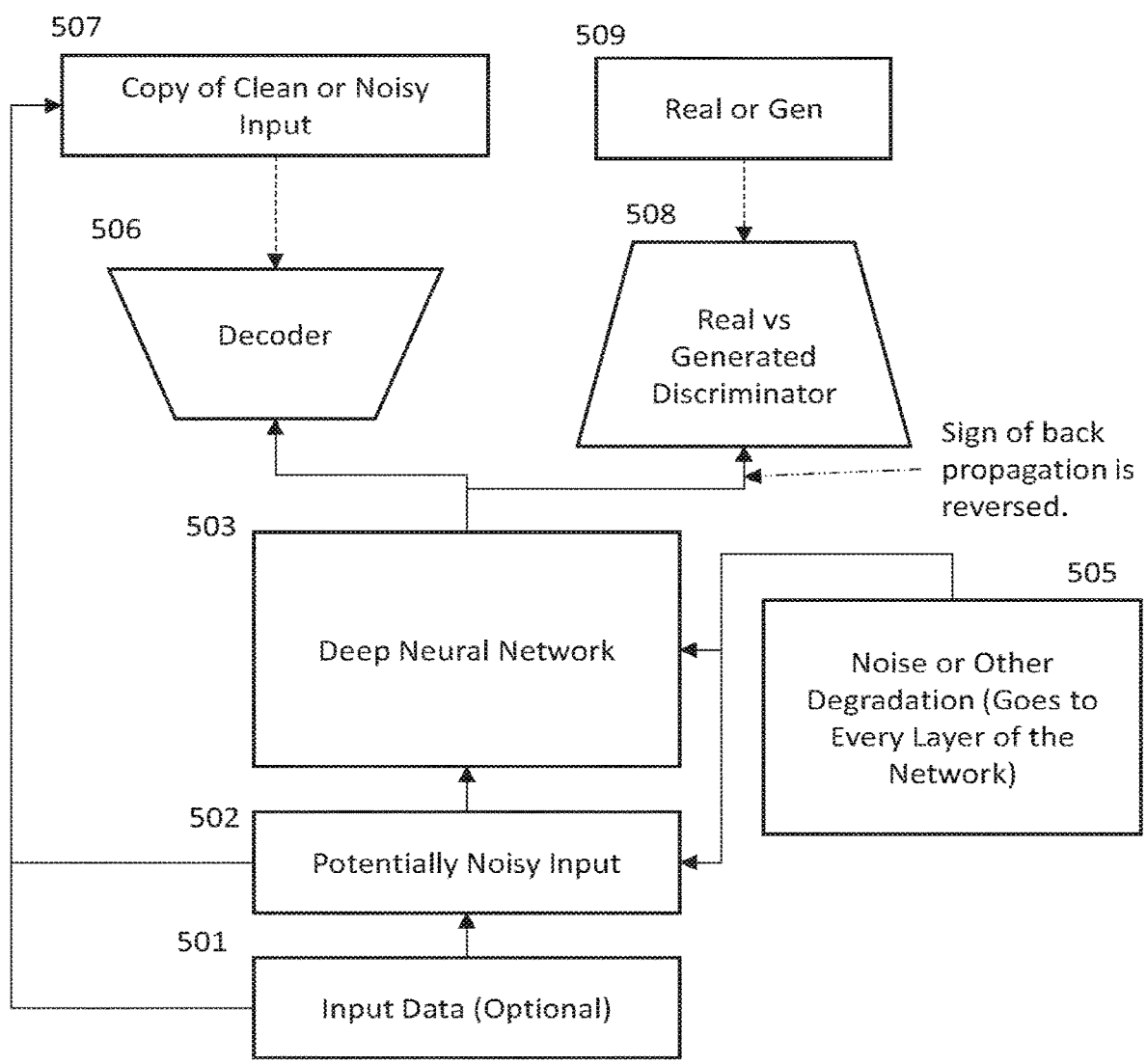
FIG. 5 illustrates a block diagram of a generic network architecture for a machine learning system, according to one aspect of this disclosure.

FIG. 5 illustrates a generic network that is useful in various embodiments of the invention. The system illustrated in FIG. 5 could be implemented on a computer system, such as the computer system 4100 shown in FIG. 41. With appropriate hyperparameter settings, it can emulate any of the following networks types: regular autoencoder, SCAN, VAE, denoising autoencoder, or GAN. As a generator in FIG. 4, the generic network in FIG. 5 can learn to imitate a SCAN, a VAE, or a GAN without even knowing what type it is imitating.

With different hyperparameters, the generic network in FIG. 5 can be a classifier with a regression-type output (an autoencoder or a denoising autoencoder) or a generator (a SCAN, a VAE, or a GAN). In block 501, it optionally takes a data example as input (autoencoder, denoising autoencoder, SCAN, VAE). In block 502, it may generate noise without any input (GAN) or add noise to the input (denoising autoencoder). Block 503 is a deep neural network that processes the noise or the clean or noisy input.

Within the network 503 there may be a bottle-neck layer separating the network into an encoder, the bottle-neck layer and a decoder (autoencoder). The bottle-neck layer may be replaced by a parameter-controlled noise vector generator (SCAN). The network in FIG. 5 has two objectives. If the network is emulating a conventional GAN, it uses the real-vs-generated objective 509, receiving back propagation through the real-vs-generated classifier 508. The signs of the partial derivatives at the input nodes to classifier 508 are reversed, so the objective for network 503 is to fool the real-vs-generated classifier 508. If it is emulating any of the other pure network types, it uses the objective 507, which has as its target either the clean input data 501 or the noisy data 502. This objective is back propagated through the decoder network 506.

However, the network in FIG. 5 does not have to merely emulate one of these single-objective network types. With multiple objectives and with tuned hyperparameters controlling the relative strength of each object, the network in FIG. 5 can be trained to perform better than any of the pure single-objective networks. In other words, with multiple objectives, the network can be trained to learn things that none of the individual networks can learn alone. In this discussion, a generator type that has been trained with multiple objectives in this way is indicated with + sign added to its name. Thus the network illustrated in FIG. 5 can be specialized to be an enhanced GAN (GAN+), an enhanced VAE (VAE+), or a SCAN+.

For example, starting with a network that emulates a GAN, adding an objective 507 will help prevent mode collapse. Block 505 can add noise anywhere in the network, with the standard deviation controlled by a hyperparameter that may be customized to each node. The amount or standard deviation of the noise for a node (if any) may be the product of a hyperparameter (which can be controlled and customized by a learning coach) and the level of activation of a control node (allowing the noise characteristics to be dependent on the data example). Allowing a learning coach to control customized hyperparameters enables the learning coach to optimize the performance of the network on development data. For example, the learning coach can measure the performance of the network on the real-vs-generated classification task evaluated on development data that is separate from the data used to train the real-vs-generated classifier.

Block 505 may also degrade the pattern in other ways than just adding noise. For example, if the pattern is an image, it may blur the image or it may sample the image at lower resolution. It may distort the image or move parts of the image around. If the pattern is text, it may change the order of the words or substitute one word for another.

The learning coach can control the amount of noise in the network, not only to prevent mode collapse, but directly optimizing the degree to which the network generates realistic output that generalizes to patterns not in the training data. Hyperparameters can also control the relative strength of the auto-encoding objective 507 (or each of multiple different objectives) and a learning coach can likewise control these hyperparameters, which further increases the tendency for the network to generalize.

On the other hand, starting with a network that emulates a SCAN or a VAE, adding the second objective of the real-vs-generated classifier 509 will help the enhanced SCAN or VAE generate more realistic patterns.

The ability of block 505 to add small to moderate noise to any node in the network is a tool to train the network to be more robust, a property that can easily be measured on independent development data but is hard to estimate from training data alone. A learning coach can have access to the development data so that it can optimize the hyperparameters controlling the noise to optimize the degree of robustness.

FIG. 6A illustrates a technique called soft tying of nodes that is used in various embodiments of this invention. FIG. 6A illustrates a deep feed forward neural network with seven hidden layers 1203 in addition to the input (1201 or 1202) and the output 1204. Various embodiments of the neural network can include any number of hidden layers 1203, however. Convolutional neural networks for classifying two-dimensional images generalize the notion of convolutional filters by having translational shifts of a neural network for a small local area all have identical weights for corresponding connections in each translational shift. In the terminology of this discussion, the constraint of identical weights is called "hard tying." With identical weights for all of their connections, the activation values of the nodes in each translational shift will have identical activation values. The process and neural network illustrated in FIG. 6A could be performed by a computer system, such as the computer system 4100 shown in FIG. 41.

In contrast, soft tying only applies to node activation values and only uses regularization, rather than forcing the values to be identical. Regularization for soft tying consists of adding a term to the error cost function that is minimized when the two or more soft-tied values are identical. Each soft tying regularization term has an associated hyperparameter, such as a multiplicative scale factor, that represents the relative strength or weight for the particular soft-tie error term. These hyperparameters regularize and encourage feature discovery. Soft tying is a generalization of hard tying because hard tying is the limiting case of soft tying as the tying regularization weight goes to infinity. Considering just pair-wise soft tying of the same node on different data examples (as illustrated by the dotted arrow from callout 1205), the potential number of additional hyperparameters is the square of the number of data examples times the number of nodes in the network.

Another kind of soft tying uses the same kind of regularization term but ties the activation values of two or more nodes in different positions either within a single network or among different networks on the same or different data examples, as illustrated by the dotted arrows from callout 1206.

In some embodiments, the activations of one or more nodes may be soft-tied for an entire set of data examples, such as all the data examples associated with a given classification category, or all the data examples in a given cluster. In some embodiments, a node may be soft-tied as a member of more than one group, with a different regularization strength for each set. For example, the strength may be strongest for the examples within a cluster, somewhat weaker for all the data examples of a classification category, and much weaker for the set of all data examples. When a set of nodes are soft-tied, the regularization term may be based on the difference between the node activation for the current data example and the mean activation or other characterization of the center of the set. The error term may be based on the mean-squared error, or any of the norms that are known to those skilled in the art of machine learning.

FIG. 6B is a flow chart of an illustrative embodiment of the process of determining the nodes to be associated by soft tying and the values for the associated hyperparameters. The process illustrated in FIG. 6B could be performed by a computer system, such as the computer system 4100 shown in FIG. 41. Block 631 selects the node or nodes to be related. The selection of which nodes should be related depends on the purpose of the node tying and sometimes on observations that have been made of the node activations.

At block 632, the computer system 4100 selects which data examples should have the activations of the node or set of nodes tied across these data examples. For example, if the node represents a feature, that feature may be present in some data examples and not in others. For example, "red" is a feature shared by red barns and red fire engines but is not shared by all barns or all fire engines.

At block 633, the computer system 4100 sets the values of hyperparameters that control the strength of the soft tying. If a feature is an obligatory feature for a category or if a node has learned that feature or is designated to learn that feature, then the activations of that node could be tied with high strength for data examples of the category. If the feature is optional for other categories, then those ties would have less strength. If the feature is unique to certain categories, and thus not expected in others, the node's activation for those other categories could also have strong ties because those activations are also expected to match to indicate that the feature is not present.

In some embodiments, the weight of each data example $d_m$ is set by other procedures outside of the process illustrated in FIG. 6. In some embodiments, the process in FIG. 6B may influence that decision. In those embodiments, that influence is done by block 634.

At block 635, the computer system 4100 trains the network, providing the soft tying term to the error function for each soft-tied node.

At block 636, the computer system 4100 optimizes the hyperparameters. In most embodiments, the hyperparameter optimization is done as part of an overall process, not done separately by the process shown in FIG. 6B. Whenever the hyperparameters optimization affecting the soft tying strength parameters to the data weight influence parameters is completed, the process returns to block 633.

Callout 637 lists some examples of situations in which soft tying of node activations might be done:

1. Regularization: Soft tying may be used extensively as a form of regularization. In several ways, it is more flexible than other forms of regularization. Because it applies to node activations rather than to connection weights, it can be applied selectively for some data examples and not for others.
2. SCAN latent vector sharing: Soft tying is the technique that enables SCAN to tie together the latent variables for a category or cluster.
3. Feature agreement: Soft tying is the tool that ties together a feature node across the data examples that exhibit that feature. Soft tying plays an essential role in discovering and training features in procedures such as those illustrated in FIGS. 13 and 21. Soft tying allows knowledge of features to be shared with other systems.
4. Vector representation of knowledge: A neural network can learn to represent knowledge explicitly and efficiently. For example, an autoencoder learns to represent the knowledge of its input as the vector of activation values in its bottleneck layer. This knowledge can be transferred, as illustrated, for example, in FIG. 6F.
5. Ontology: Knowing that an oak is a kind of tree and that a maple is a kind of tree, a machine learning system can look for features that they share. The nodes representing those features can be soft-tied across data examples, and even across modalities. For example, the features "branch" and "leaf" can be shared both in images and in text.
6. Mereology: A nose is part of a face. A system can learn that, in general, an image of a face will have a nose and can soft tie nodes that represent noses in different images of faces.
7. Synonyms: Synonyms have the same or similar meanings. Nodes that represent shared semantic properties can be soft-tied.
8. Parts of speech: Parts of speech can be described in terms of syntactic properties, which are shared by all words that have the same part of speech.
9. Clustering: Examples that are in the same cluster tend to share more features than examples that are in the same category but are not in the same cluster. Nodes in a cluster can be soft-tied with more strength than nodes not in a cluster. Cluster representations and soft-tied features can help train each other, as illustrated, for example, in FIGS. 13 and 21.
10. Generating grouped data: Soft tying nodes can help a system learn to represent and generate data organized into groups, as illustrated, for example, in FIG. 12.

The uses listed above are merely representative examples of the uses of soft tying of nodes. The techniques can be applied in many other examples.

If the purpose for soft tying in an illustrative embodiment is regularization associated with aggressive development, some embodiments may arbitrarily soft tie many nodes. The strength of the soft ties may then be controlled by the hyperparameters to adjust the amount of regularization across the range from under-fitting to overfitting. When the scope of the aggressive development is regional or local, as discussed in association with FIG. 1, the node tying may be limited by block 632 to data examples that are in the same region or local volume of data space.

In some embodiments, the purpose is to detect one or more features that may be shared by different instances of a category. For this purpose, one or more node positions in the network are selected at the beginning or early in the training process. If there are features that are shared by most instances of a category, the network training will learn to associate the nodes that have been soft-tied to represent these features. This process can be used, for example, when there is a known mereology, that is, when it is known that most objects in a given category have certain parts. This process can also be used to automatically discover new features that were not known a priori. In other cases, nodes may be selected based on criteria that are specific to a particular classification or generation task.

In some embodiments, if it has been determined that data examples for a category may be organized into clusters, then nodes whose activations are consistent among data examples within a cluster may be selected to be soft-tied. In some embodiments, the decision order may be reversed, with the clusters being determined by the degree of agreement among the node activations. Illustrative examples of the interaction of cluster training, feature training, and node tying are shown in FIGS. 13 and 21.

For SCAN, VAE, and other parametrized stochastic networks, in some embodiments each node that represents a latent variable for a parameter for the stochastic process may be selected as a node to be related and soft-tied across data examples in the same cluster or the same category. Examples of this type are used by some embodiments illustrated in FIGS. 12, 16, and 17.

FIG. 6C is a block diagram of an illustrative embodiment of a SCAN, a type of generator that has been mentioned several times in the preceding discussion. A SCAN is a type of autoencoder that can also be used as a generator and comprises, as shown in FIG. 6C, an encoder 604 and a decoder 606, and uses the following items: input data 603; a sample of random variables 605 specified by the parameters of a parametric probability distribution, such a measure of central tendency (e.g., means 622), a measure of dispersion (e.g., standard deviations 623); optionally other parameters 624; and hyperparameters 621 for the encoder and decoder networks 604, 606. An autoencoder is a type of network that is known to those skilled in the art of deep neural networks. An autoencoder network is sometimes said to learn by "unsupervised" training, because it does not require labeled training data. More precisely, an autoencoder network learns by "self-supervised" training. The learning of an autoencoder network may use stochastic gradient descent training just as in supervised training. However, the autoencoder provides its own objective target, which is just a copy of the input 103.

In this embodiment as well as in autoencoders in general, the input 603 is encoded by an encoder network 604 to a reduced representation in a bottleneck layer, herein represented in the form of sample random variables 605. In an illustrative embodiment, the random variables are represented as statistically independent random variables with a parameter distribution for each random variable. The distributions of the sample random variables 605 are represented by parameters related to their respective parametric probability distributions. Preferably, the parameters of each parametric distribution include a measure of central tendency, such as the mean 622, and a measure of dispersion, such as the standard deviation 623 and, optionally, other parameters 624, all controlled by hyperparameters 621. Means 622 and standard deviations 623 or variances are sufficient parameters, for example, for independent Gaussian random variables. Other examples of parametric distributions are discussed below. The encoder 604 generates the probability distribution parameters 622, 623, 624 from the input data 603 based on the controlling hyperparameters 621. The computer system implementing the system depicted in FIG. 6C (e.g., the computer system 4100 of FIG. 41) then generates sample random variables 605 (e.g., through a random number generator program) that adhere to or satisfy the probability distribution parameters 622-624 for input to the decoder 606. FIG. 6C shows that, and the description below assumes that, means 622 and standard deviations 623 are used, but in other embodiments, other statistics of central tendency than means may be used and other dispersion statistics may be used, such as variances in lieu of standard deviations. For some parametric distributions, (e.g., Bernoulli distributions and Poisson distributions), a single distribution parameter determines both the mean and the standard deviation. Such distributions are discussed as a special case below. It should therefore be recognized that the present invention is not necessarily limited to the use of means and standard deviations. Preferably, when a parametric distribution may be represented with parameters representing central tendency and dispersion or with another parametric representation, a parametric representation with parameters representing central tendency and dispersion is chosen. For example, a uniform distribution over the range [a, b] may be represented by the two parameters: (i) the midrange m=(a+b)/2 and (ii) the range r=(b−a), rather than by the parameters a and b.

Both the encoder 604 and decoder 606 may be implemented with neural networks. The statistics 622, 623, 624 (if any) are the output layer of the encoder 604 and the node activation values in blocks 622, 623 and 624 (if any) can also be called "latent variables" because their role is similar to that of latent variables in probabilistic inference. The sample random variables 605 (akin to a bottleneck layer) that satisfy the statistics 622-624 are then decoded by a decoder network 606 to produce an output that is as close as possible to a copy of the input 603. The autoencoder 604 is not in general able to produce an exact copy of the input because the sample random variables 605 are significantly restricted by the controlling statistics 622-624, preventing the autoencoder network 604 from representing the identity function. As can be seen in FIG. 6C, a SCAN is similar to a deterministic autoencoder, except the bottleneck layer has been replaced by stochastic sampling from the probability distribution 605, specified by the parameters of the probability distribution 622, 623, and possibly 624. A SCAN is similar to a VAE, except it uses a different regularization error term and introduces many hyperparameters for detailed control of the regularization.

Training an autoencoder, including a SCAN, generally comprises the steps of: obtaining a set of training data; for each item of training data conducting a feed-forward pass to compute node activations at each layer and generating an output from decoder 606; comparing the deviation of the generated output using the original input as the target; back propagating the error through the network; and performing weight updates for all network connections. This process is known to those skilled in the art of training autoencoders. Various standard techniques are typically incorporated into the training procedure, including performing weight updates after minibatches of training data, incorporating momentum into weight updates, weight decay, and other regularization procedures. Each of these optional techniques is known to those skilled in the art of training autoencoders.

To avoid the problem of the encoder network model simply learning the identity function, an autoencoder needs to have some form of restriction in the representational power of the code layer. In a deterministic autoencoder, this restriction typically takes the form of a bottleneck layer that requires a reduced representation of the data through requiring either (i) a much smaller number of nodes than the input, or (ii) activations of the bottleneck layer that are sparse, that is, the non-negligible activations of the nodes in the bottleneck layer are restricted to a small subset of nodes. VAEs replace the bottleneck layer with a stochastic representation of the distribution from which the data is drawn. The loss function used in training a VAE incorporates a measure of divergence between reconstructed data and the source data as well as a second term representing the Kullback-Leibler divergence between the latent variables in the stochastic layer and zero-mean unit Gaussians or other specified simple statistical distributions. Regularizing the latent variables serves the same purpose as the restrictions in the bottleneck layer of a deterministic autoencoder, thus discouraging simple memorization of the training data. One drawback with this approach is that it has the effect of reducing differences between the latent variables for different categories, decreasing their capacity to differentially represent distinct categories or classes in the data.

A SCAN removes the regularization in the latent variables of a VAE. As a result, a SCAN generates a much richer parametric family of distributions and more effective knowledge transmission from the encoder 604 to the decoder 606 than does a VAE. Hyperparameters 621 control or constrain the latent variables in the stochastic layer. To avoid the problem of the encoder network simply learning the identity function, a SCAN may have constraints on its latent variables. For example, the magnitude of the means or other measures of central tendency 622 may be constrained relative to the magnitude of the standard deviations or other measure of dispersion 623. Otherwise, the encoder could encode an arbitrary amount of information in the means and also scale the means to be very large relative to the standard deviations. This tactic would produce a network that would, in the limit, be equivalent to a deterministic autoencoder with no bottleneck. For example, the encoder could simply multiply each input by a very large factor S, use those values as the means and use a very small value for each standard deviation. The decoder could learn to divide each random variable by S and get the input values with a very small standard deviation. However, like the identity function for a deterministic autoencoder, this encoding and decoding strategy would not have learned a useful knowledge representation.

To prevent such a strategy, it is preferable to constrain some measure of the magnitude of the vector of means or other measure of central tendency compared to the magnitude of the vector of the standard deviations or other measure of dispersion. That is, for some norm, the vector of means should be constrained to have a norm no greater than some specified value, say 1.0, and the vector of standard deviations should be constrained to have a norm no less than some specified value, say 1.0. Some embodiments use a smaller norm for the standard deviations. For example, a SCAN used to generate data augmentation for individual data examples may use a smaller standard deviation, such as 0.1. The essential requirement is that both the means and standard deviations be constrained such that the means cannot grow arbitrarily large relative to the standard deviations (or other measures of central tendency and dispersion if used). Note that some parametric distributions, such as the Bernoulli distribution and the Poisson distribution, inherently satisfy such a condition, so no extra constraint needs to be applied in that case. These distributions do not need to have separate parameters representing the dispersion (e.g., the standard deviation 623).

Which vector norm to use is a design decision. Some embodiments of present invention can constrain the maximum absolute value of the means and the maximum absolute value of the standard deviations, that is, use the sup norm. Some embodiments can use the L2 norm and constrain the square root of average of the squares of the means and the square root of average of the squares of the standard deviations. Some embodiments can use the L1 norm and constrain the average of the absolute values of the means and the average of the absolute values of the standard deviations. Some embodiments can use a different norm for the means than for the standard deviations. Some embodiments can constrain the means to have a norm less than or equal to the specified constraint, while some embodiments can constrain the means to have a norm equal to the specified value. Some embodiments can constrain the standard deviations to have a norm greater than or equal to the specified value, while some can constrain the standard deviations to have a norm equal to the specified value. The specified value of each norm is controlled by a hyperparameter. Some embodiments have a hyperparameter for each mean and each standard deviation, whereas some embodiments can use a default value, say 1.0, for each norm.

Each of the procedures mentioned in the previous paragraph as used with the node activations representing the means 162 can also be done with the node activations representing the variances or standard deviations 623, and vice versa. However, the characteristics and the objectives are quite different, so different procedures are preferred. For example, the degree to which a generator used for data augmentation enhances robustness and encourages generalization depends to some extent on the ratio of the standard deviation to the mean. For this objective, the individual means 622 or their vector norm should be limited to be less than or equal to a specified value, but the individual standard deviations should be limited to be greater than or equal to some specified value.

Another aspect of the difference between the latent variables for the means 622 and the latent variables for the standard deviations 623 is that the means 622 are more effective than the latent variables for the standard deviations 623 at conveying information about the current pattern from the encoder 604 to the decoder 606.

In an illustrative embodiment, each latent variable associated with a standard deviation may be treated as a hyperparameter, rather than as a learned parameter. Equivalently an associated hyperparameter may specify the value of the latent variable. For example, in some embodiments, each standard deviation may be set to the value 1.0. The means 622 and the encoder 606 then learn to generate the desired patterns subject to that constraint.

The best value for the ratio of the standard deviations 623 to the means 622 depends to a significant degree on the purpose for the SCAN-based generator. Such external consideration can be handled better in the development process than in the back-propagation training. For example, if the generated data is to be used to represent greater variability to make a classifier more robust, then the standard deviation should be large enough to fill in most of the gaps in the training data without being so large as to create substantial overlap between the data generated for one category with the data generated for another. There is some intermediate value that represents the best trade-off. This trade-off is difficult to represent as an error cost objective, but the optimum value can be found by experimentation during development, which can measure the actual performance on development data. This experimentation is an example of hyperparameter tuning, which is known to those skilled in the art of machine learning. This hyperparameter tuning can be automated by a separate machine learning system, called a learning coach. A learning coach is a second machine learning system that is trained to help manage the learning process of a first machine learning system. Learning coaches are described in more detail in the following applications, which are incorporated herein by reference in their entirety: PCT Application No. PCT/US17/52037, filed Sep. 18, 2017, titled LEARNING COACH FOR MACHINE LEARNING SYSTEM; and PCT Application No. PCT/US18/20887, filed Mar. 5, 2018, titled LEARNING COACH FOR MACHINE LEARNING SYSTEM.

A similar trade-off optimization occurs if the SCAN-based generator is being used for data augmentation to smooth out the decision boundaries in a classifier and make them somewhat fuzzy. This technique lessens the tendency for training to overfit, even when there are enough learned parameters to do so. It is also clear that too much uncertainty at the decision boundary will be detrimental. The best trade-off value can be found by experimentation using development data. This experimentation is an example of hyperparameter tuning, which is known to those skilled in the art of machine learning.

The decoder 606 preferably is a multilayer, feed forward neural network and therefore is a universal approximator. Any d-dimensional distribution can be generated by taking a set of d normally-distributed variables and mapping the set through a sufficiently complicated function. Therefore, most embodiments use simple probability distributions for block 605, typically independent Gaussian distributions or uniform distributions, leaving it to the decoder 606 to transform the random samples 605 to more complex, non-independent distributions, if necessary. In these Gaussian-based embodiments, there are no additional probability distribution parameters 624.

In an illustrative embodiment, the probability distributions for the random sample variables 605 are independent Gaussians, and the latent variables are the means 622 and standard deviations 623. There is no loss of generality in assuming independent Gaussians, rather than, say, dependent Gaussians with a full covariance matrix, because the decoder 606 can effectively learn the transformation necessary to transform independent random variables to random variables with an arbitrary covariance matrix.

Figure 6D:
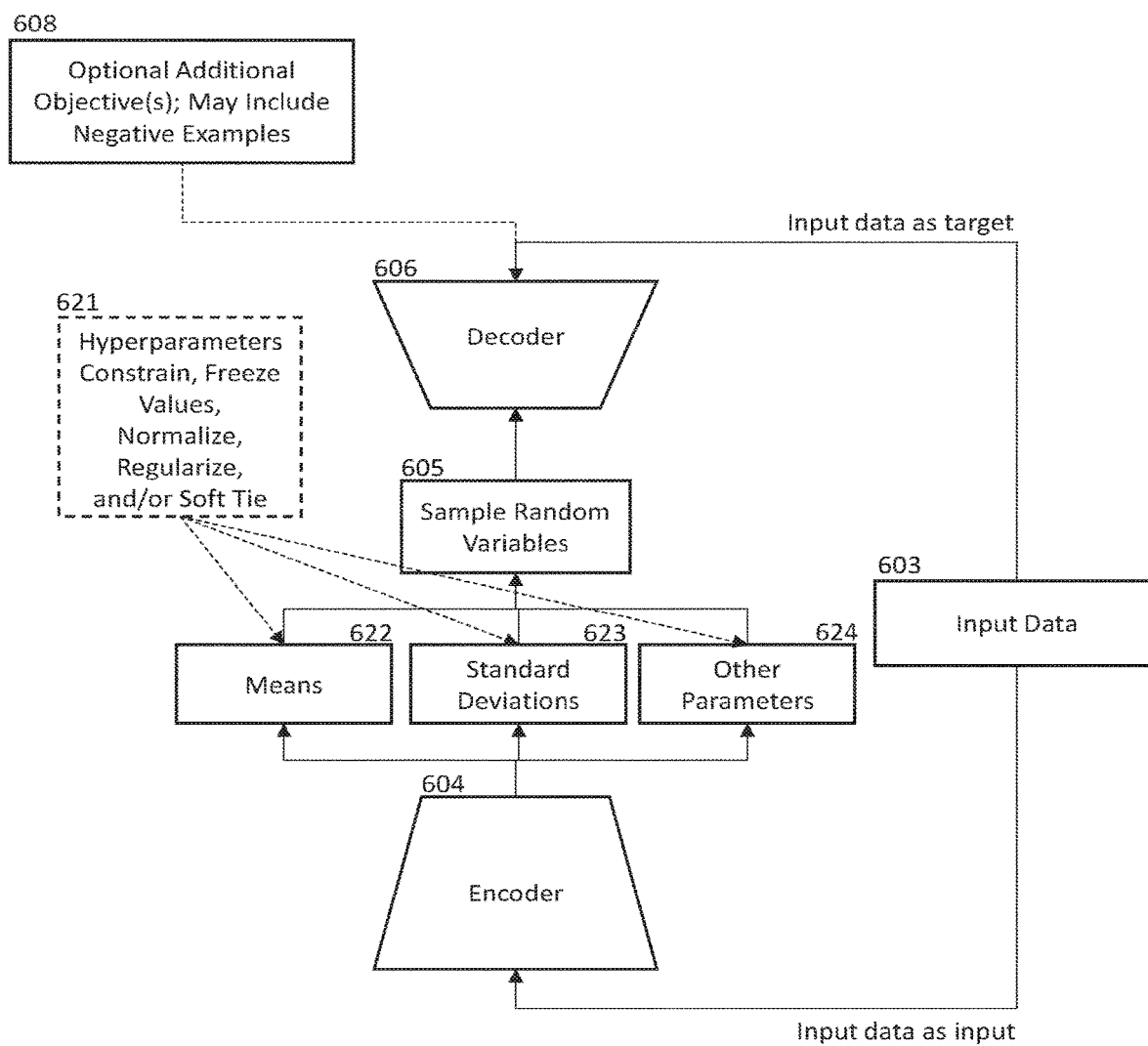
FIG. 6D illustrates a block diagram of an enhanced SCAN (SCAN+), according to one aspect of this disclosure.

FIG. 6D is a block diagram of an illustrative embodiment of a SCAN+. A SCAN+ is similar to a SCAN, as described in association with FIG. 6C, with the addition of additional objectives 608. An important additional objective is to avoid producing undesired examples. For example, if the embodiment shown in FIG. 6D is intended to generate examples of a designated category, then block 608 could include a classifier or detector that would back propagate through the SCAN an error cost gradient if a generated example from the SCAN matches a different category or is rejected by the detector 608. In some embodiments, negative examples from an external source are used for negative training. Gradients from the error cost function of the classifier can be back propagated through the example pattern even though the pattern came from an external source and was not produced by the generator.

In some embodiments, block 608 also includes one or more negative examples. A negative example is a data example that a generator is trained to avoid generating. In an illustrative embodiment, block 608 includes a classifier, identified as "Neg," that is trained to detect any of one or more negative examples. That classifier back propagates negative feedback to the decoder 606 when the classifier Neg detects any of the negative examples. As a classifier, Neg generalizes from its training examples and gives negative feedback to decoder 606 for any example the Neg classifies as a detection of a negative example. In some embodiments, negative examples are used to inhibit a generator that is trained to produce examples for a specified category from producing examples of any other category. Negative examples can also be used when a generator is used for data augmentation for one or more individual data examples.

In another illustrative embodiment, a SCAN+ may have a real-vs-generated discriminator as an additional objective 608, as in a GAN. In one embodiment, the real-vs-generated discriminator would not be in a two-person zero-sum game adversarial relationship with the discriminator, unlike a GAN. Because a SCAN or SCAN+ generates patterns specific to the set of data examples for which it has trained vectors of latent variables, in a preferred embodiment it can generate patterns specific to a set of data examples that is disjoint from the set of real examples on which the real-vs-generated discriminator is trained. This extra objective in block 608 helps the SCAN+ produce more realistic patterns without mode collapse. Generators with additional examples of multiple objectives are presented in FIGS. 6E, 9, 11, 18, 36, 37, and 38.

When the SCAN is to be used to learn or to help to discover clusters, the node activations for the means 622 can be temporarily be soft-tied for all data that is currently tentatively assigned to the same cluster. These ties should be changed whenever a data example is re-assigned to a different cluster.

In some aspects, each node that represents a mean value for one of the Gaussians is soft-tied to the corresponding node for other data examples. For example, the node activation for the current data example may be tied to all other examples from the same classification category with a strength determined by a hyperparameter which may be different for each category. It may also be soft-tied to every data example in the training data with a strength determined by another hyperparameter. This illustrative soft tying will regularize the mean values for any one target to agree across the data examples for that category, but also to be different for different categories. This behavior is in contrast to the regularization caused by the Kullback-Leibler divergence used in a VAE, which pushes all the means toward zero for all the data, which in turn tends to reduce the differences between the categories. Reducing the differences between the means reduces the amount of knowledge transfer from the encoder 604 to the decoder 606.

Soft tying of node activations for the means 622 can also help the system learn other knowledge, just as in deterministic networks. For example, if a feature is shared by several classification categories, all the data examples with that feature can be soft-tied. If the network has not yet learned to detect the feature, soft tying an arbitrary node across all data examples that are expected to have the feature can help the network learn to associate that node with the feature and to train itself to detect the feature.

Figure 6E:
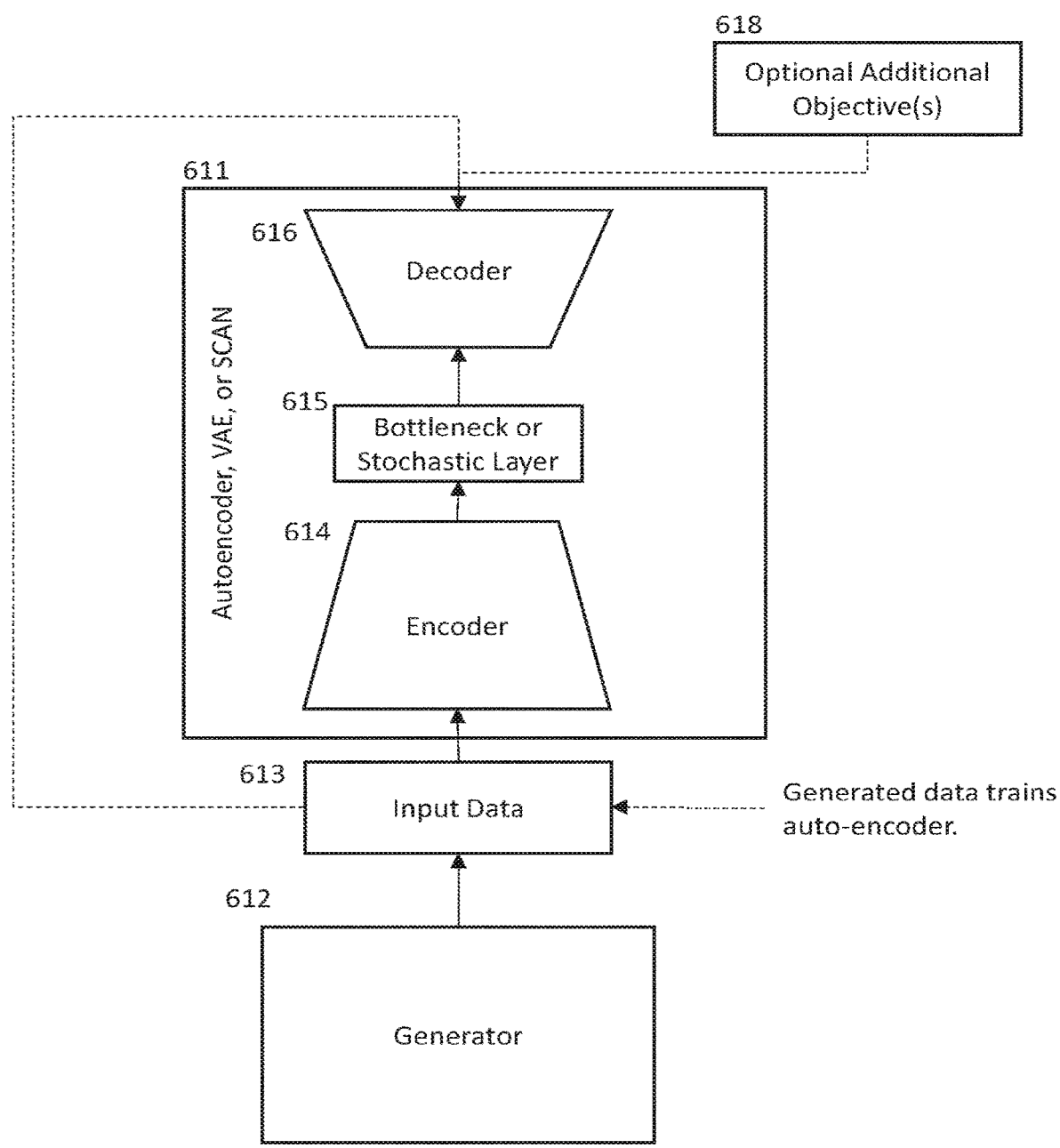
FIG. 6E illustrates a block diagram of several types of autoencoder network that are fed data via a generator, according to one aspect of this disclosure.
Figure 6F:
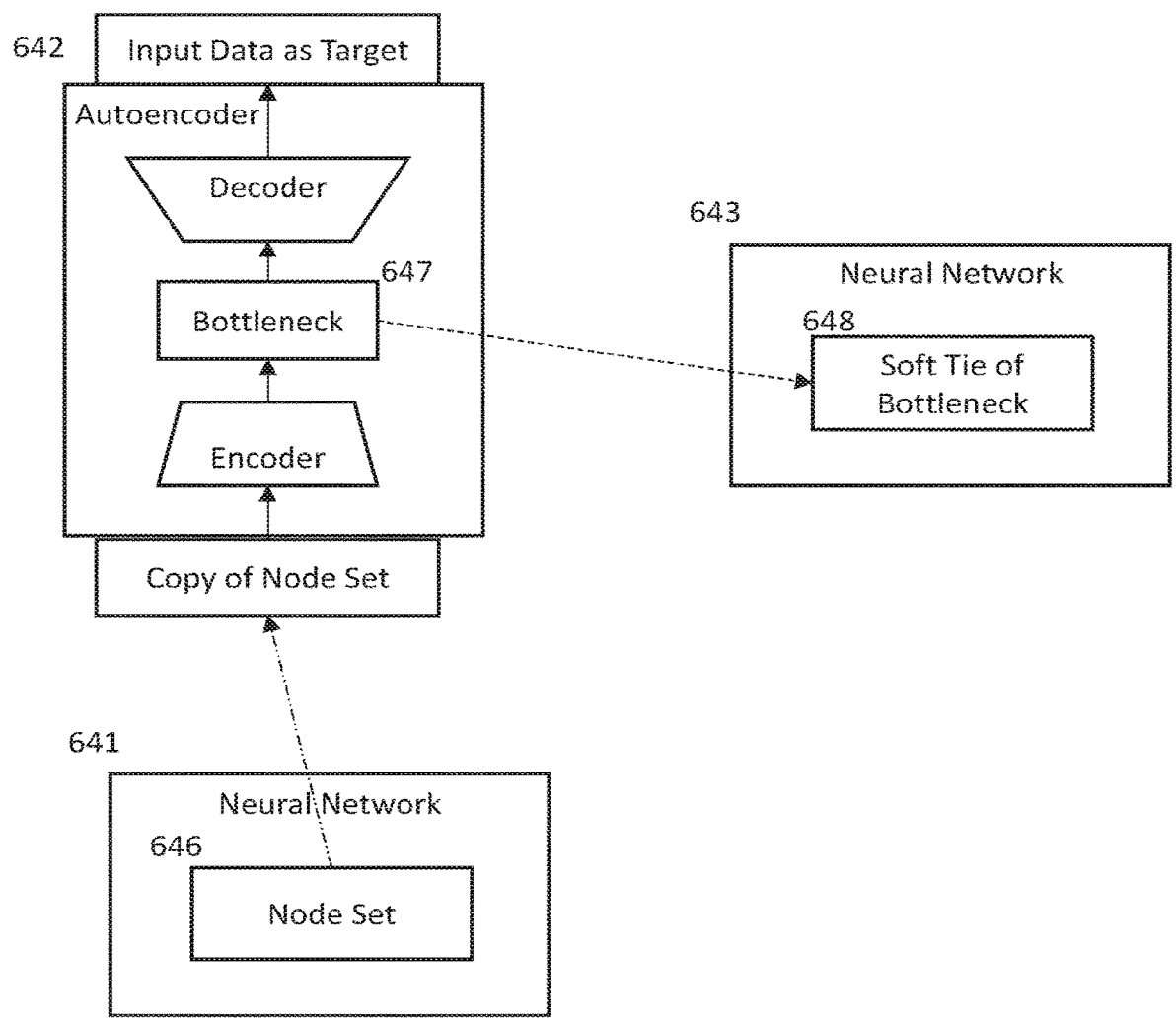
FIG. 6F illustrates a block diagram of a system for transferring knowledge between neural networks, according to one aspect of this disclosure.

FIG. 6E is an illustrative example of another combination of networks that is useful in various embodiments of the invention. FIG. 6E illustrates the point that an autoencoder or a stochastic autoencoder does not need real data for training. Learning to reproduce a pattern in spite of a bottle-neck or other restriction requires essentially the same capability when the pattern is a generated pattern as when the pattern is a real pattern. FIG. 6E trains an autoencoder 611 by providing as input data 613 data that is produced by a generator 612. An autoencoder consists of an encoder 614, a bottle-neck layer 615, and a decoder 616. It is trained by back propagation from an error function that compares its output with a copy of the input 617 and, possibly from additional objectives 618.

The important properties that allow the autoencoder to be trained using generated data are 1) the objective 617 is known because it is simply a copy of the input, and 2) the task that the autoencoder must learn is similar on generated data to the task on real data. The SCAN, the VAE, and the generic noisy network of FIG. 5 share these properties, assuming that the generic noisy network gives significant strength to the autoencoder objective.

Therefore, for any of these network types, the training data can be supplied from a generator. That means that the embodiment shown in FIG. 6E is another case in which there is an unlimited amount of training data, which in turn means that, no matter how large the network, enough training data can be generated so that the network does not have the capacity merely to simply memorize the training data.

Memorizing the training data is not an issue when the only objective is the auto-encoding objective 617. However, it may be important in avoiding overfitting to an objective from 618.

FIG. 6F is a block diagram of an illustrative embodiment that demonstrates an example of efficient representation and transfer of knowledge. Block 641 is an arbitrary neural network. It can be either a classifier or a generator. Block 646 is an arbitrary set of nodes within network 641. For example, block 646 can be all the nodes in a single inner layer of network 641.

Block 642 is an autoencoder with bottleneck layer 647. For example, bottleneck layer 647 may be a layer with substantially fewer nodes than the input. As another example, bottleneck layer 647 may have any number of nodes but have a hard constraint or a regularization term that causes it to learn a sparse representation, that is, a representation with only a small number of nodes activated above a specified threshold. As a third example, bottleneck layer 647 may have a reduced number of degrees of freedom because of soft tying of its nodes. In various embodiments, autoencoder 642 may be a separate stand-alone network, part of network 641, or part of another network.

The nodes in the bottleneck layer 647 are soft-tied to the set of nodes 648 in network 643. Network 643 may be the original network 641, or may be a separate network. For example, network 643 may be a network on a computer system that is only connected to the computer system running network 641 by a data communication channel with limited bandwidth.

The knowledge represented by node set 646 (and in turn by the bottleneck layer 647) is efficiently and effectively transferred to network 643. The transfer process is much more efficient, for example, than learning by imitation such as represented in FIG. 1B, 27A, or 27B.

Figure 41:
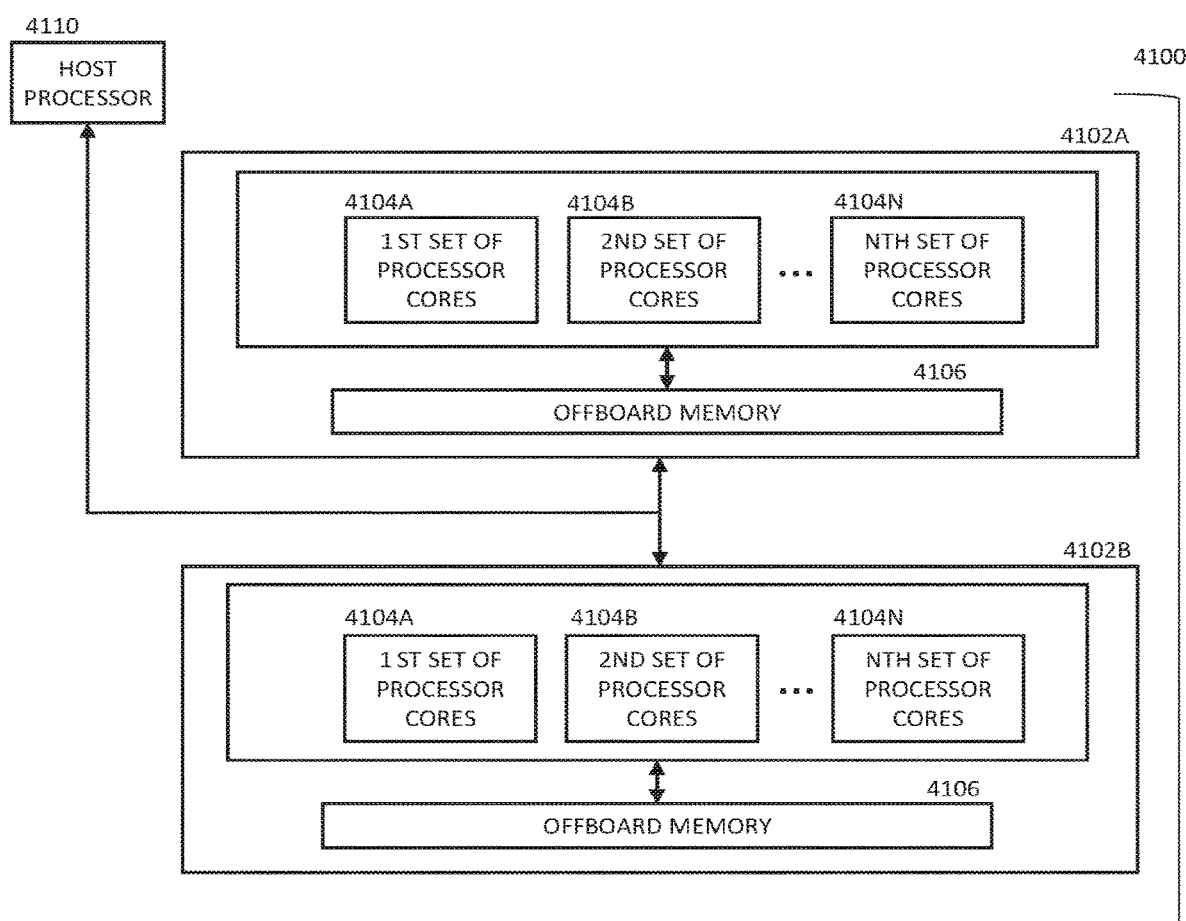
FIG. 41 illustrates a diagram of a computer system that may be used to implement various aspects of the present disclosure.

The various systems and processes illustrated in FIGS. 6C-6F could be implemented on a computer system, such as the computer system 4100 shown in FIG. 41.

FIGS. 7-9C are block diagrams of machine-learning data-generator systems according to various embodiments of the present invention. The machine-learning data-generator systems may be implemented on a computer system, such as the computer system 4100, illustrated in FIG. 41.

Figure 7:
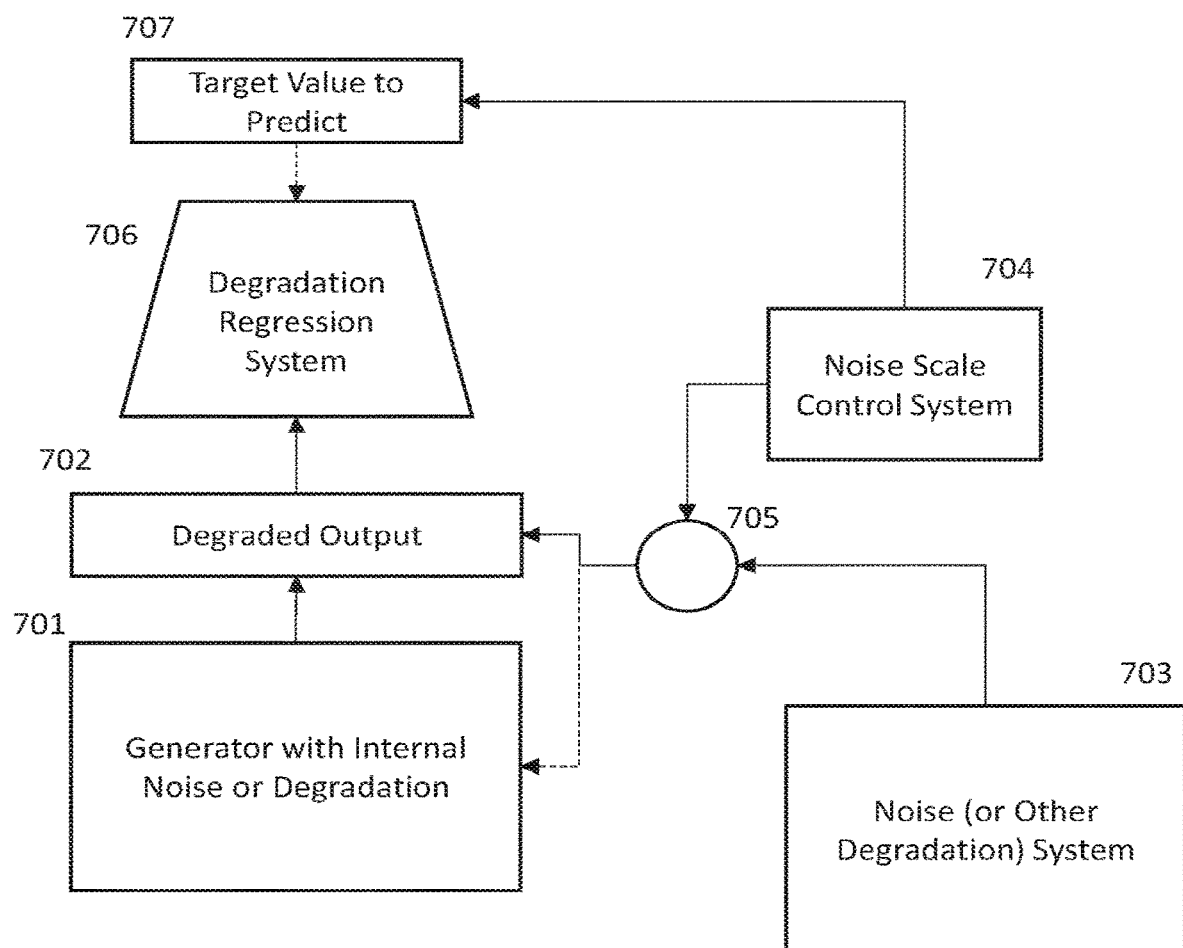
FIG. 7 illustrates a block diagram of a system including a degradation regression machine learning system, according to one aspect of this disclosure.

FIG. 7 illustrates another aspect of the present disclosure that is useful in various embodiments. The system illustrated in FIG. 7 includes a data generator 701, which may be any type of generator, such as an autoencoder, a VAE, a GAN, or a SCAN. A noise system 703 produces noise or other degradation, either to apply internally to the generator 701 (e.g., an internal layer of the neural network of the generator 701, as indicated by the dashed line from the scaling unit 705 to the generator 701) or to apply to the generator output 702 as indicated by the solid line from the scaling unit 705 to the generator output 702). The noise system 703 preferably always produces noise or other degradation at or near a constant level in a specified metric, such as the L2 norm.

A noise scale control system 704 sets a scale factor that scales the amount of noise or other degradation from the noise system 703. The amount of noise/degradation from the noise scale control system 704 can vary for each output of the generator 701. The scaling operation is done in a scaling unit 705. For example, the scaling unit 705 could multiply the amplitude of the noise from the noise system 703 by a number (e.g., the scaling factor from the noise scale control system 704) between 0 and 1. Alternately, the scaling unit 705 could apply any monotonic scaling with a range from zero to some positive number, where a scaling of zero corresponds to no noise or other degradation, and where the amount of noise/degradation increases with increasing scaling factors. Again, the amount of noise/distortion can vary for each degraded output pattern 702 from the generator 701. In some embodiments, the generator 701 may be a stochastic generator with control of the degree of dispersion of the probability distribution of the samples that it generates. In such embodiments, the noise scale control system 704 may also directly control the degree of dispersion of the generator 701.

The system also includes a regression-type machine learning system 706. Machine-learning regression systems learn, through training, to predict a value given some input. In this case, the regression-type machine learning system 706 attempts to estimate the scale factor of the noise/degradation that has been applied output pattern. If the scale factor is varied for each degraded output pattern 702, the regression system 706 learns to estimate the scale factor for each degraded output pattern 702 that is input to the regression system 706. During training of the regression-type machine learning system 706, the noise scale control system 704 supplies to block 707 the numerical value of the scaling factor for the noise or other degradation as the target value for the regression system 706 to predict based on the input pattern 702. The regression-type machine learning system 706 is thus trained to estimate the scale factor, which controls the amount of noise/degradation in the input pattern 702. Any suitable machine-learning system can be used for the regression system 706, although in a preferred embodiment, the regression type machine learning system 706 comprises a multilayer feed-forward neural network that is trained with stochastic gradient descent. A multilayer feed-forward neural network and the training of a feed-forward neural network through stochastic gradient descent is described in more detail in connection with FIG. 42.

Since one type of degradation may create effects that match a different scale from a second type of degradation, in some embodiments multiple regression-type machine learning systems are trained, one for each type of noise of degradation being modeled.

Although the term "degradation" is used, in some embodiments noise system 703 does not produce noise but instead applies some parametrized transformation to the output 702 of the generator 701. For example, if the input data to the noise system 703 is an image, the noise system 703 may translate the image or rotate the image. In such embodiments, the noise scale control system 704 controls the amount of translation, rotation, or other transformation.

Notice that, like an autoencoder system, the regression system 706 can be trained on generated data, not just on a limited amount of real world training data. Thus, there is no limit to the amount of training data that can be made available for training the regression system 706. No matter how many learned parameters are in the regression-type machine learning system 706, enough training data can be supplied so that regression-type machine learning system 706 cannot merely memorize the training data.

In addition, there is no limit to the amount of data that can be generated as development data to test the performance of the regression system 706 on new data disjoint from the training data. Development testing, among other things, allows regularization and other hyperparameters of the regression system 706 to be optimized to reduce or eliminate overfitting, especially when combined with the capability to generate additional training data whenever development testing indicates the need. Development testing also can measure, and therefore optimize, the ability of the regression system 706 to generalize to new situations or to data in new regions of data space.

The ability to generate new training and development data as needed is important in many applications. For example, the regression system 706 can be used in place of a real-vs-generated discriminator in a GAN or in any multi-objective machine learning system that comprises a real-vs-generated discriminator. A real-vs-generated discriminator of sufficient complexity may learn to memorize all or some of the real training data. In that case, both the discriminator and the generator trained as its adversary would have poor generalization capabilities. Limiting the complexity of the discriminator or not training it to convergence may lessen this memorization effect but would compromise its ability to discriminate between the real and generated examples. Using the degradation regression system of FIG. 7 instead of an adversarial discriminator avoids this compromise.

Figure 8:
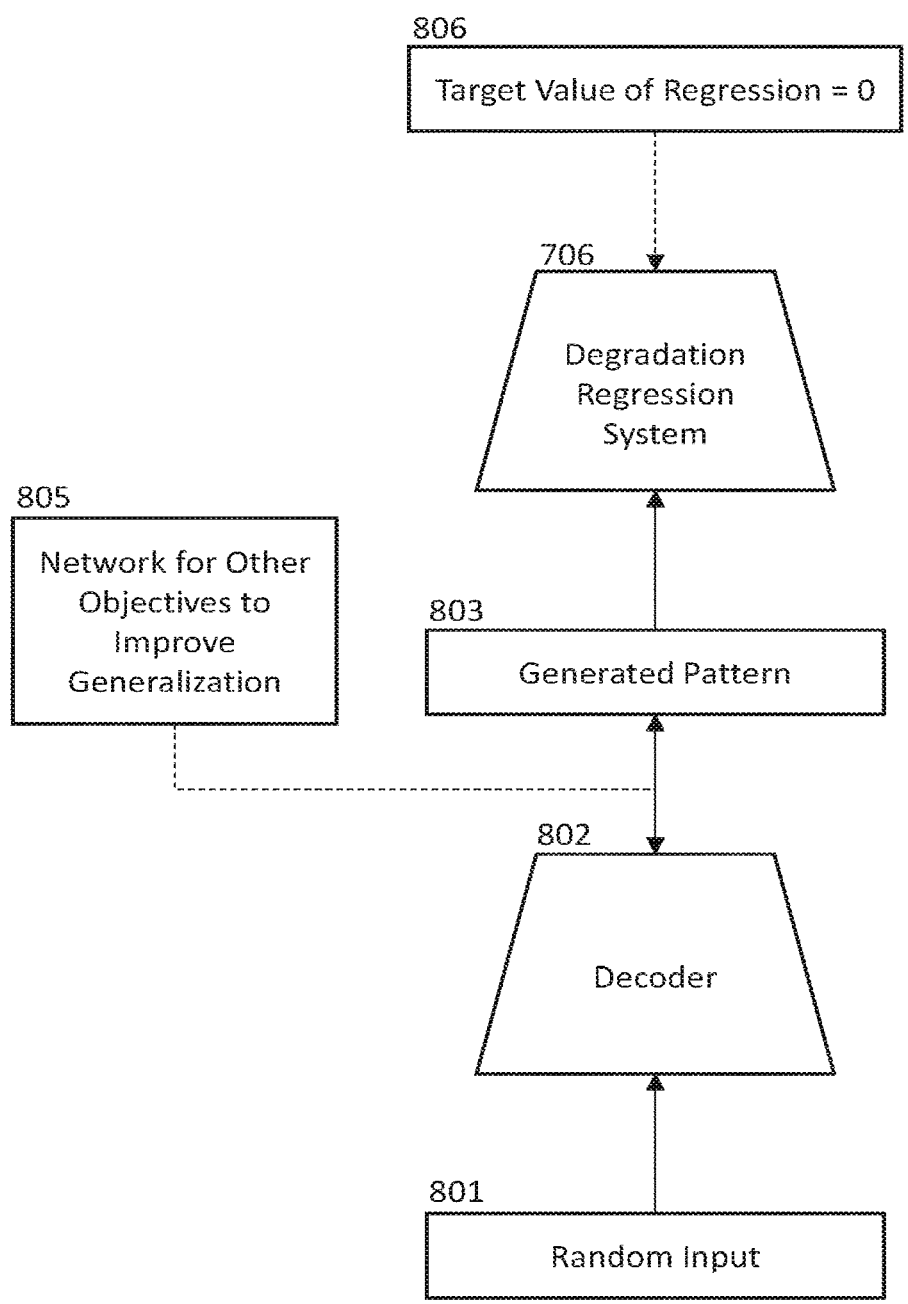
FIG. 8 illustrates a block diagram of the degradation regression machine learning system depicted in FIG. 7, according to one aspect of this disclosure.

FIG. 8 is an illustrative example of the post-trained use of the degradation regression system 706 from FIG. 7. In the illustrative embodiment shown in FIG. 8, the already-trained regression system 706 (e.g., trained according to the process shown in FIG. 7) is paired with a decoder 802 that generates output patterns 803 from random input data 801. The regression system 706 back propagates an error function, so the decoder 802 must be a type of machine-learning system that supports back propagation, such as a feed forward neural network. A multilayer feed-forward neural network and the training of a feed-forward neural network through stochastic gradient descent is described in more detail in connection with FIG. 42.

Because the decoder 802 generates output patterns 803 from random inputs 801, the decoder 802 is analogous to the generator for a GAN, except that in FIG. 8, the real-vs-generated discriminator of a GAN has been replaced by the regression system 706, which may have been trained as in FIG. 7. Because the regression system 706 is not trained to be adversarial to the generator (e.g., the decoder 802), it is not proper to call the embodiment illustrated in FIG. 8 an adversarial system, even though it is superficially similar to a GAN.

The output 803 of the decoder 802 is fed as input to the regression system 706, which feeds the activation forward to the regression system output, which is an estimate of the degree of degradation in the generated patterns 803. The regression system 706 then back propagates an error cost function based on the target 806 with a target regression value of zero. The value of zero, meaning an estimated degradation of zero, is the objective of the generator/decoder 802. Although the regression system 706 back propagates the error cost function, the regression system 706 is not being trained in the embodiment illustrated in FIG. 8. Rather, it has already been trained by a process such as shown in FIG. 7. Instead, the regression system 706 back propagates the partial derivatives of the error cost function to its input block, the generated patterns 803, which is the output from the decoder 802.

The error cost function derivatives from the regression system 706 are then back propagated through generator/decoder network 802, which is then trained by stochastic gradient descent. Back propagation and stochastic gradient descent are known to those skilled in the art of training neural networks and are described in association with FIG. 42. Although the components are similar, the training behavior of the system shown in FIG. 8 is completely different from the training behavior of a GAN. Because regressions system 706 is not adversarial to the generator/decoder 802, the regression system 706 is not trained toward simply memorizing its training examples, the optimum solution to the two-person, zero-sum adversarial game inherent to training GANs. Instead, the regression system 706 is trained to generalize from its training data and is tested on independent development data. Furthermore, the regression system 706 has an unlimited amount of training data and development data, as described above in connection with FIG. 7.

The generator/decoder 802 is trained by the backpropagation from the regression system 706 the same way that the generator in a GAN is trained from the negative of the back propagation from a real-vs-generated classifier. However, because the regression system 706 is trained to generalize from its training data, the generator/decoder 802 of FIG. 8 learns to do that too.

Some embodiments optionally include a network 805, which back propagates an additional objective for training the generator/decoder 802 that further increases the tendency for the generator/decoder 802 to learn to generalize from its training data. The additional objective may be back propagated through the additional neural network 805. For example, the network 805 may comprise a real-vs-generated discriminator, such as used in a GAN, which is known to those skilled in the art of deep learning. As another example, the network 805 may comprise a classifier. In general, one or more additional objectives from the network 805 reduces the ability of the generator/decoder 802 to train to overfit its training data and thus helps the generator/decoder 802 to learn to generalize.

Besides being used to replace the real-vs-generated classifier in any system that uses such a classifier, the degradation regression system 706 can be added as an additional objective to any system that does not use a real-vs-generated classifier.

Figure 9A:
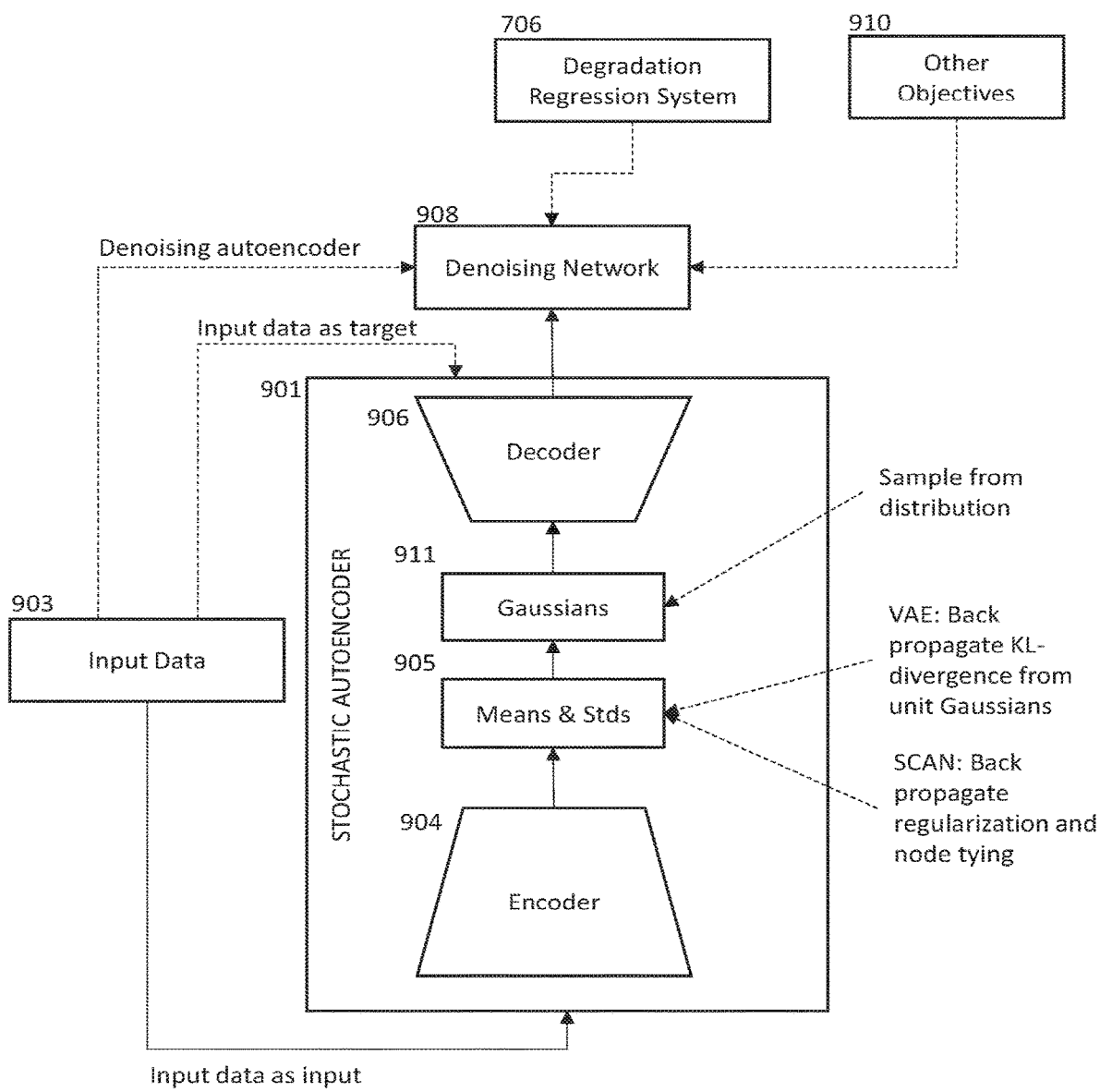
FIG. 9A illustrates a block diagram of a stochastic autoencoder implemented with the degradation regression machine learning system depicted in FIG. 7, according to one aspect of this disclosure.

FIG. 9A shows an illustrative embodiment in which the degradation regression system 706 is added to a stochastic autoencoder 901, such as a VAE or a SCAN, which are discussed in connection with FIGS. 6C, 9, 12, 16, 36, 37, and 38 and will be discussed in further detail below. The stochastic autoencoder 901 is used as a generator in the embodiment shown in FIG. 9A. In this embodiment, a machine learning denoising network 908 may also be added. Training of a VAE performs averaging over randomly generated samples. The averaging in this training generally results in output patterns being somewhat blurred. This blurring is one of the disadvantages of a VAE compared, for example, to a GAN. Preferably, the degradation regression system 706 is trained on data examples in which some or all of the examples of degradation are examples of the output of a VAE compared to its input. In this case, the denoising network 908 learns to remove the blurriness in the output of the stochastic autoencoder 901, particularly when the stochastic autoencoder 901 is implemented with a VAE, in addition to any other degradation or transformation.

As shown in FIG. 9A, the stochastic autoencoder 901 comprises an encoder 904 and a decoder 906. During training, the encoder 904 receives input patterns 903 and outputs parameters of a parametric probability distribution, such as means and standard deviations 905, from which a sample of random variables 911 (e.g., a Gaussian distribution) is generated. The decoder 906 learns to output the input patterns 903 from the sample of random variables 911.

During generation, the encoder 904 and the training data 903 are not used; only the decoder 906 is used to generate output from the set of random variables 911, which are based on the parameters of the parametric probability distribution 905. These components and the training process are known to those skilled in the art of training stochastic autoencoders, such as VAEs. In the embodiment shown in FIG. 9A, the training of the stochastic autoencoder 901 is modified to include back propagation from the degradation regression system 706, as well as back propagation through the denoising network 908, in addition to the normal error cost function from the input 903 directly back to the output of the stochastic autoencoder 901.

When used in the training of the stochastic autoencoder, the degradation regression system 706 has preferably already been trained. The degradation regression system 706 preferably back propagates from the objective of zero degradation, as described previously.

In some embodiments, the denoising system 908 has also already been trained and when used in training the stochastic autoencoder 901. In some embodiments, however, the stochastic autoencoder 901 can be been trained first and used in training the denoising system 908. In some embodiments, both the denoising system and the stochastic autoencoder 901 are trained together. For example, the denoising system 908 could be incorporated into the decoder 906. In such embodiments, when training the stochastic autoencoder 901, the input data 903 is supplied to the layer in the decoder 906 below the denoising subnetwork 908.

In some embodiments, the input data 903 is supplied as a target after the denoising system 908, instead of or in addition to being supplied before the denoising system 908. For example, in a denoising autoencoder, noise may be added between the input 903 and the encoder 904, and the input 903 may be supplied as a target after denoising system 908. As another example, where for example the stochastic autoencoder 901 in a VAE, the input 903 may be supplied as a target after the denoising system 908 and the denoising system 908 may be trained to remove the blurriness often present in images generated by a VAE.

In embodiments in which noise system 703 of FIG. 7 produces transformations of the output, such as translations or rotations, rather than a degradation, then in FIG. 9A, the denoising system 908 is trained to perform the inverse transformation rather than as a denoising system.

The degradation regression system 706 in FIG. 9A is used for training the stochastic autoencoder 901 and is, therefore, preferably not trained during the training process illustrated in FIG. 9A. Optionally, the denoising network 908 may have additional training during the training of the stochastic autoencoder 901 illustrated in FIG. 9A.

Optionally, block 310 can back propagate additional objectives to the stochastic autoencoder 901. For example, the block 910 may comprise an adversarial real-vs-generated discriminator, the output of which being back-propagated to the stochastic autoencoder 901. Back propagation from a real-vs-generated discriminator increases the tendency of the stochastic autoencoder 901 to generate realistic data. Further, the capability of the regression system 706 to train the stochastic autoencoder 901 to generalize better solves some of the problems of a pure GAN. As another example, block 910 may back propagate from the objective of a classifier. In this example, the stochastic autoencoder 901 is trained to generate data that can more easily be classified correctly.

In various embodiments, the stochastic autoencoder may comprise a SCAN, which is similar to a VAE, except that the parameters output 905 by the encoder 904 in a SCAN are parameters to control the parametric probability distribution of the stochastic layer 911 are not regularized to minimize the Kullbach-Leibler divergence as in a VAE. Instead, in a SCAN, hyperparameters directly control the relative magnitude of the means relative to the standard deviations 905. SCANs are described in more detail in U.S. patent application Ser. No. 16/124,977, filed Sep. 7, 2018, titled STOCHASTIC CATEGORICAL AUTOENCODER NETWORK, which is incorporated by reference herein in its entirety. The training of a SCAN or other stochastic autoencoder is similar to the training described above for a VAE.

Figure 9B:
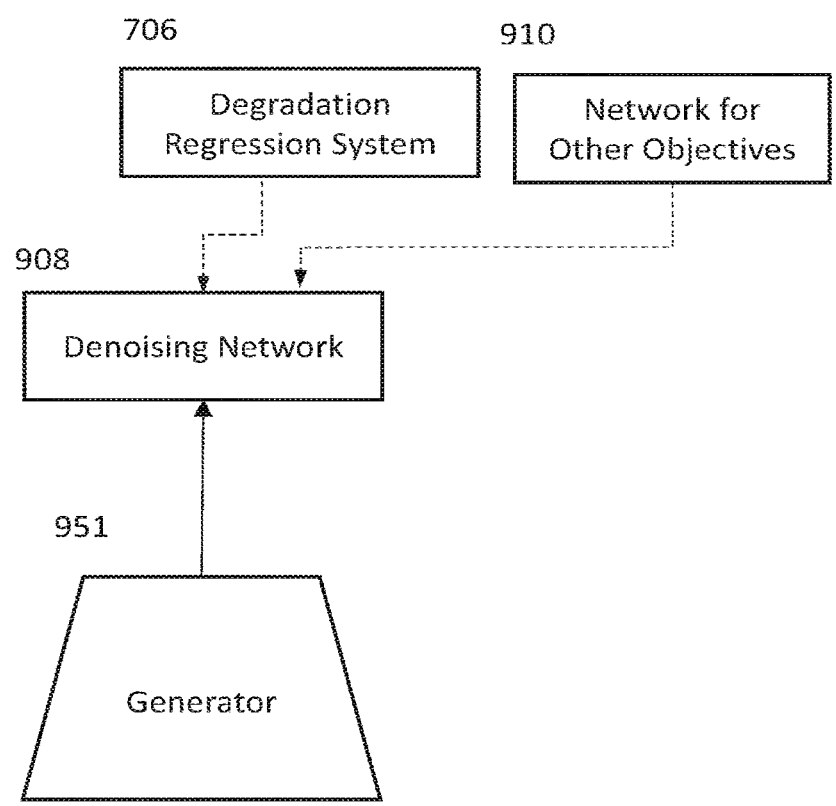
FIG. 9B illustrates a block diagram of an implementation of the degradation regression machine learning system depicted in FIG. 7, according to one aspect of this disclosure.

FIG. 9B shows an illustrative embodiment in which training similar to that described in FIG. 9A for a VAE or SCAN may be applied to any generator 951 that can be trained by back propagation. The embodiment of FIG. 9B employs the denoising system 908, the regression system 706, and other objectives 910 in FIG. 9A. The denoising system 908 and the generator 951 are trained the same way as the denoising system 908 and the stochastic autoencoder 901 are trained in FIG. 9A. In some embodiments, the denoising system 908 is optional, or equivalently, the generator 951 is trained like the generator 802 of FIG. 8, except that the generator 951 may have a different design than the generator 802 of FIG. 8.

Figure 9C:
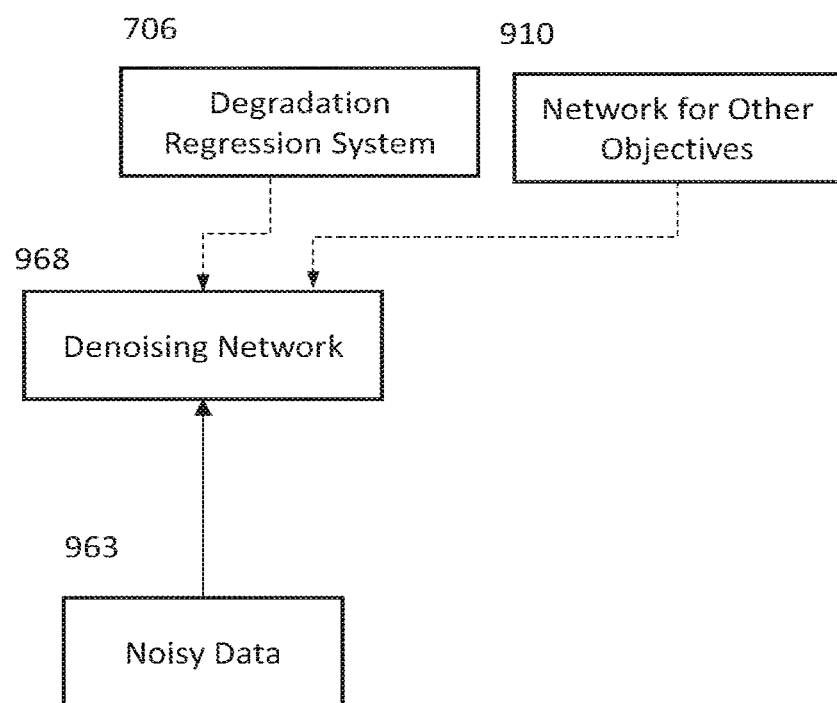
FIG. 9C illustrates a block diagram of an implementation of the degradation regression machine learning system depicted in FIG. 7, according to one aspect of this disclosure.

FIG. 9C shows an illustrative embodiment in which a denoising system 968 is trained to reduce noise from any source of noisy data. In this embodiment, the regression system 706 and other objectives 910 are the same as the regression system 706 and other objectives 910 in FIG. 9A. In this embodiment, however, the training of the denoising system 968 may be limited to the amount of noisy data 963 that is available as training data, which limits the ability of the denoising system 968 to learn to generalize, compared to other embodiments.

Figure 10:
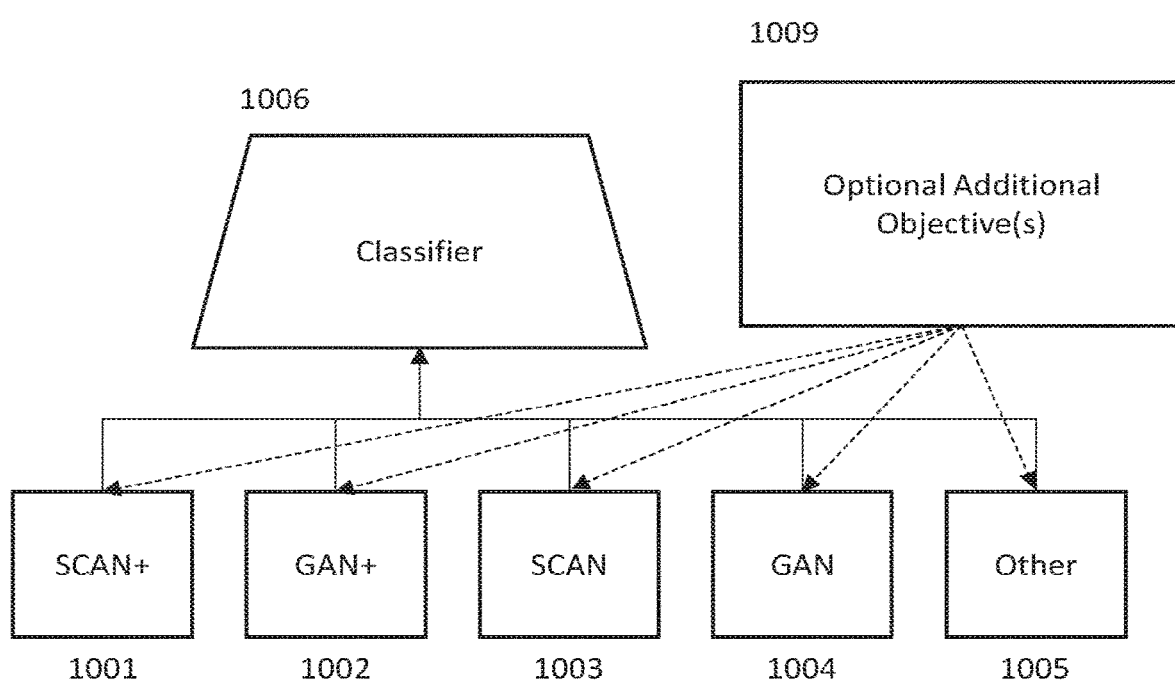
FIG. 10 illustrates a block diagram of a system for training cooperating generators, according to one aspect of this disclosure.

FIG. 10 shows an illustrative embodiment of the training of cooperative generators similar to the one shown in FIG. 4. The system illustrated in FIG. 10 could be performed by a computer system, such as the computer system 4100 shown in FIG. 41. The embodiment shown in FIG. 10 explicitly shows a regular SCAN (1003), a SCAN that has been enhanced as shown in FIG. 9A (SCAN+ 1001), a regular GAN (1004), a nonadversarial generator (GAN+ 1002) trained with a degradation regression system in place of the adversarial real-vs-generated discriminator as illustrated in FIG. 8, and possibly other generators 1005. In some embodiments, VAEs may be used instead of, or in addition to, SCANs. In some embodiments, block 1009 back propagates additional objectives. The system illustrated in FIG. 10 is trained in the same way as the system illustrated in FIG. 4, except classifier 1006 has an output node for each generator and preferably uses a softmax output function with a maximum likelihood error cost function.

Figure 11:
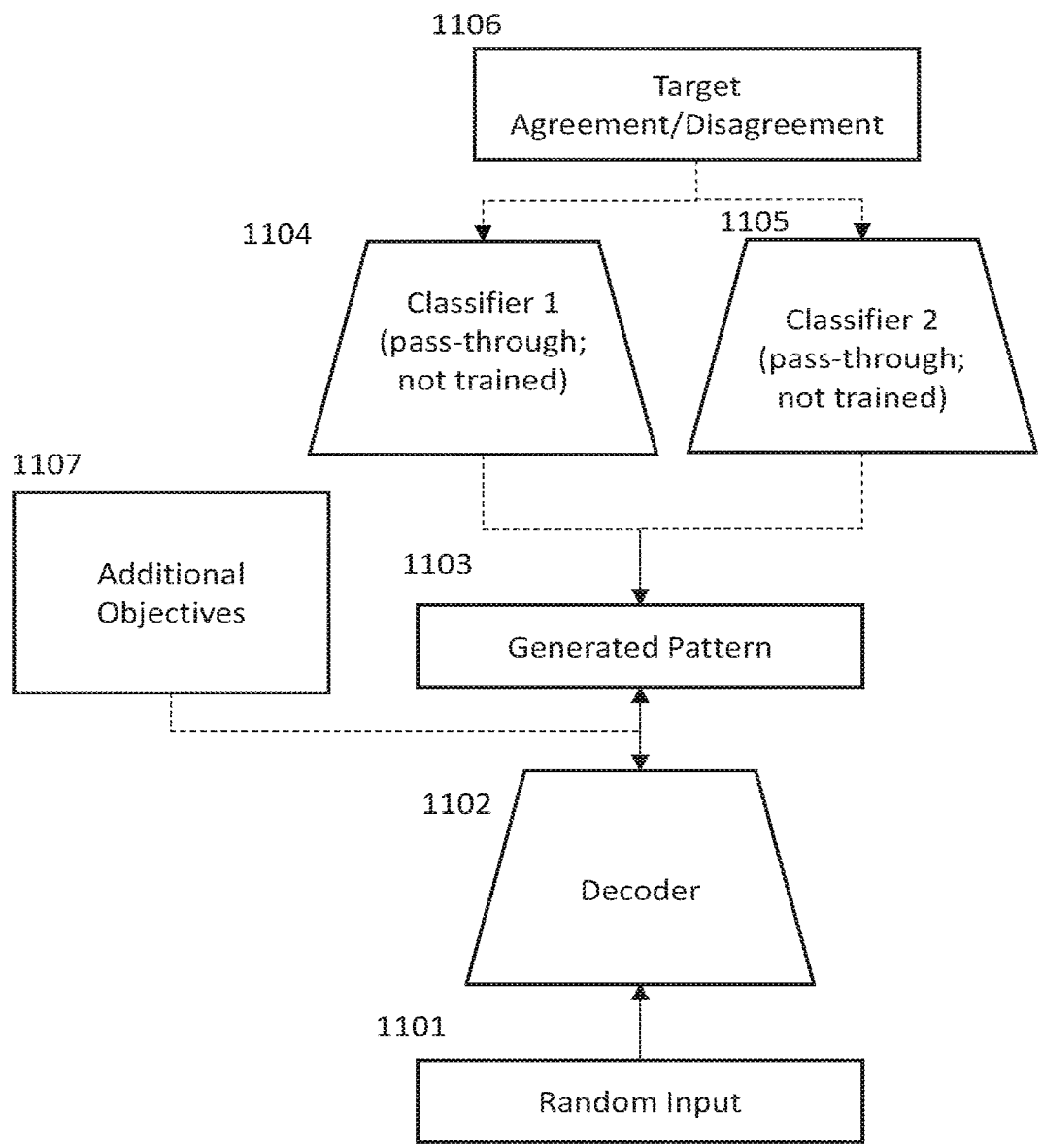
FIG. 11 illustrates a block diagram of a semi-adversarial network, according to one aspect of this disclosure.

FIG. 11 is a block diagram of an illustrative embodiment of a type of generator that is similar to a GAN, but that has a type of objective that is not subject to mode collapse. The process illustrated in FIG. 11 could be performed by a computer system, such as the computer system 4100 shown in FIG. 41. This type of generator will be called a "semi-adversarial" network. Alternately, it could be called a "semi-cooperative network." Blocks 1101, 1102, and 1103 generate a pattern by decoding a random input, similar to a GAN. However, instead of a real-vs-generated discriminator, blocks 1104, 1105, and 1106 back propagate an objective representing some target amount of agreement or disagreement among the two or more classifiers represented by blocks 1104 and 1105. In some embodiments, block 1107 back propagates additional objectives.

Various embodiments of this invention represent different possibilities of the design of the objective function 1106 and the training process for blocks 1104 and 1105.

In one illustrative embodiment, blocks 1104 and 1105 are trained as ordinary classifiers on separate data. In this embodiment, blocks 1104 and 1105 back propagate an objective from block 1106, but are not trained based on that back propagation. Thus, like blocks 403, 706, 804, and 912, in FIGS. 4, 7, 8, and 9, respectively, they are not subject to mode collapse. Like the embodiments illustrated by FIGS. 4, 7, 8 and 9, this embodiment could be called cooperative learning.

In some other embodiments, blocks 1104 and 1105 are trained at least in part during back propagation from an objective that is training decoder block 1102. For example, in one embodiment, blocks 1104 and 1105 may be two members of an ensemble that are trying to learn to provide relatively independent knowledge and not to both make the same mistake on any data example. Thus, besides their normal training as classifiers, they may also have some training in which their objective is to disagree on data on which they are both wrong. Thus, on such data, the objective cost function from block 1106 may reward differences in their output activations. With a sign reversal, the back propagation to the generated pattern 1103 and then to the decoder block 1102 will reward reducing those differences. That is, block 1102 is trained to generate data on which blocks 1104 and 1105 make the same mistake, while blocks 1104 and 1105 learn to give different answers on that hard-to-classify data. This training is adversarial, but does not lead to mode collapse, because generating data examples identical to the original classification data for training blocks 1104 and 1105 in general does not meet either the objective for blocks 1104 and 1105 in this adversarial training or the objective for block 1102. Another embodiment of training two members of an ensemble not to make the same mistake is discussed in reference to block 186 of FIG. 1E.

One embodiment of FIG. 11 is particularly valuable in various embodiments of other systems discussed herein. This embodiment handles the case when 1104, classifier 1, and 1105, classifier 2, are nearly identical. In this case, back propagating an objective that is trying to move the activation of the maximum output in one direction for classifier 1 and in the opposite direction for classifier 2 will lead to partial derivatives with respect to an input variable that tend to have the opposite sign and comparable magnitude. An illustrative embodiment for such a case does not back propagate a full dimensional gradient. Instead it only back propagates dimensions in which the partial derivatives back propagated from the two classifiers have the same sign or in which one of them has substantially larger magnitude.

Figure 12:
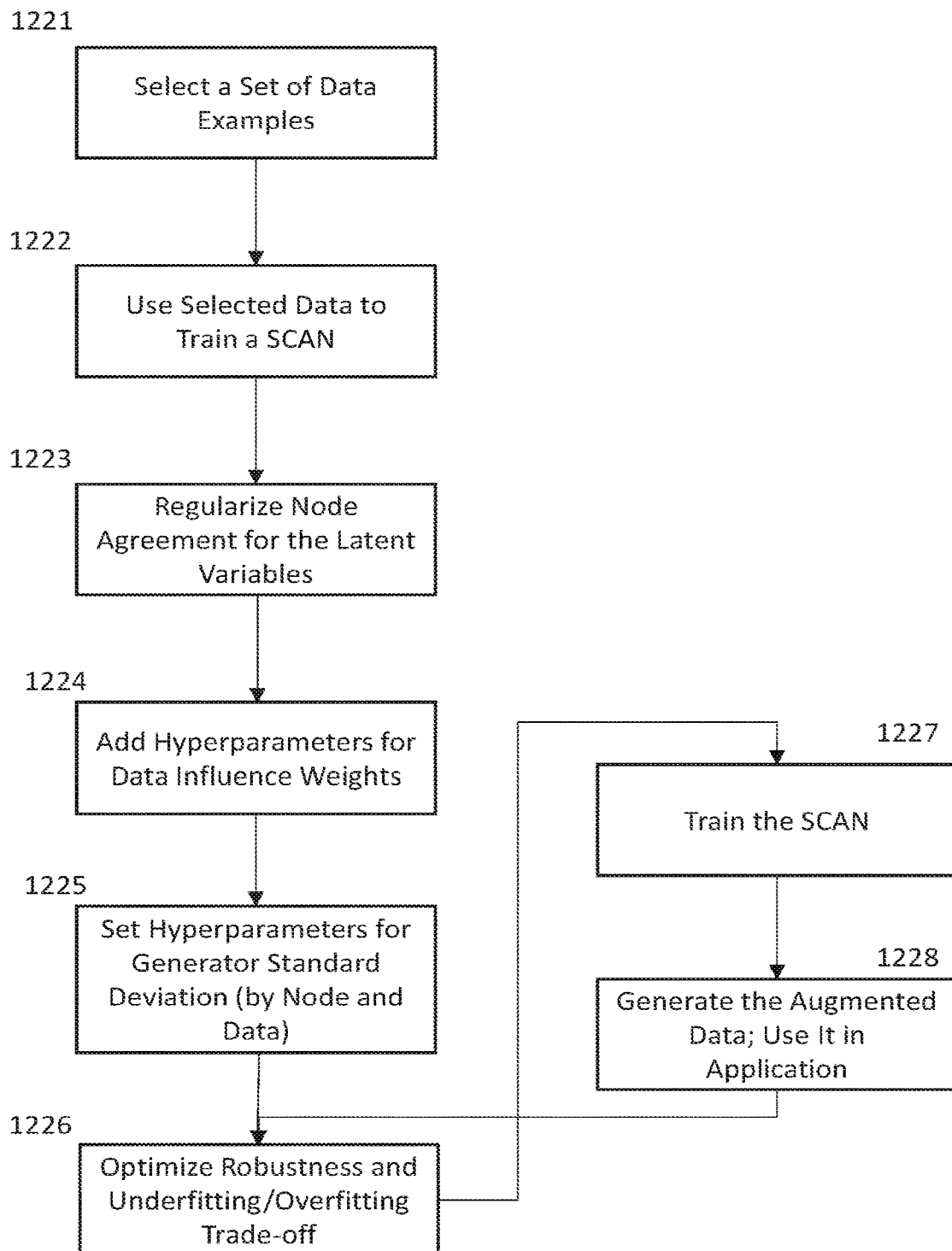
FIG. 12 illustrates a flowchart of a process to augment a selected set of data using a generator, according to one aspect of this disclosure.

FIG. 12 is a flowchart of an illustrative embodiment using a generator to augment a selected set of data. The process illustrated in FIG. 12 could be performed by a computer system, such as the computer system 4100 shown in FIG. 41. At block 1221, the computer system selects the set of data to be augmented. The selected set of data can be all the data in a training set, all the data in a single classification category, the data in a data cluster, or any other set with a known selection criterion. In some embodiments, it may be one of the sets mentioned above subject to one or more extra conditions, such as that the selected data also be close to a given data example or that it be close to a given decision boundary.

At block 1222, the computer system 4100 uses the selected data to train a SCAN, as described, for example, in association with FIG. 6C. The training of the SCAN uses a number of hyperparameters as described below.

At block 1223, the computer system 4100 sets hyperparameters to control a form of node activation regularization for the SCAN herein called "soft tying." Soft-tying is described in greater detail above. If the set of data is a cluster or local to a data example, then preferably the nodes corresponding to the latent variables are soft-tied across all the data. If the data set is more diverse, then data examples within a cluster can be soft-tied with a greater strength and larger groups can be soft-tied with a lesser strength.

At block 1224, the computer system 4100 sets hyperparameters for "data influence" weights data examples in the selected data. In an illustrative embodiment, there is one such weight for each data example. The contribution of each data example to any quantity that is summed across the data examples is multiplied by this weight. This is equivalent to having the example occur as many times as indicated by the weight. In some embodiments, an automatic procedure, which may be controlled by a learning coach, can adjust this parameter on an example-by-example basis to improve performance. For example, it can lower the weight given to a data example that seems to be causing an increase in the error rate by causing overfitting.

At block 1225, the computer system 4100 sets hyperparameters for the latent variables representing dispersion (e.g., standard deviations or variances). As an illustrative example, these latent variables can all be set to the same value, which is controlled by a hyperparameter. This choice is adequate for many purposes. However, as with all the hyperparameters, the hyperparameters for the dispersion (e.g., standard deviation) latent variables may be optimized and fine-tuned by a learning coach.

At block 1226, the computer system 4100 optimizes at least one hyperparameter (e.g., a "data fit" hyperparameter) controlling the degree of fit and the trade-off between overfitting and underfitting the input data. In some embodiments block 1226 may have a direct way of measuring or estimating this trade-off. In other embodiments, it measures the effect on performance by experimentally completing blocks 1227 and 1228 and using the generated data in its intended application. As such, at block 1226, the computer system may measure the performance in that application and use such performance measurements to perform the tuning in block 1226. This iterative optimization process is indicated by the loop back from block 1228 to block 1226.

At block 1227, the computer system trains the SCAN using the selected data and the specified hyperparameter values (e.g., including the data fit parameter). Then at block 1228, the computer system generates the augmented data using the SCAN trained at step 1227 and uses it in the intended application or as a practice application for development.

FIG. 13 is a flowchart for an illustrative method of clustering that is useful for various embodiments of this invention. The process illustrated in FIG. 13 could be performed by a computer system, such as the computer system 4100 shown in FIG. 41. The method illustrated in FIG. 13 uses a classifier to do the clustering and also to optimize one or more other objectives, in addition to the clustering requirement.

The basic cluster learning operation is performed by the computer system 4100 as represented by the iterative loop from block 1327 to block 1329. A cluster is characterized by which data examples are assigned to the cluster. The assignment may either be deterministic, in which each data example is assigned to one and only one cluster, or may be weighted or probabilistic, in which each data example is assigned to any number of clusters with the degree of each assignment indicated by a number between 0 and 1. In the illustrative embodiment, the numbers representing the degree of assignment for a data example are constrained to sum to 1.

Given an existing clustering, at block 1327, the computer system 4100 trains a classifier to attempt to recognize the cluster assignment values. The existing assignment, which is the target objective for the classifier, may be either deterministic or weighted. The cluster learning being done by the iterative loop 1327-1329 is unsupervised learning because there is no external specification of categories. Within block 1327, the current cluster assignment is the output target for supervised training for the machine learning system that implements the classifier.

For each data example, the classifier attempts to classify the data example consistent with its current cluster assignment. As an illustrative example, the classifier trained at block 1327 can be a machine learning system with an output node for each cluster, with a softmax function as the output activation function. That is, each output should be nonnegative and the outputs are constrained to sum to 1. The classifier trained at block 1327 can be trained, for example, by stochastic gradient descent on a maximum likelihood cost function.

Once a classifier has been trained at block 1327, the classifier is used by the computer system 4100 at block 1328 to classify the data, possibly including new data that has not previously been classified.

At block 1329, the computer system 4100 then recomputes the assignment of data examples to clusters. In one illustrative embodiment, the assignment weight for each cluster for a data example is set to the activation value of the corresponding output node. In another illustrative embodiment, the assignment is deterministic and each data example is assigned to the cluster corresponding to the output node with the highest activation value, with a random choice in case of ties.

Although the basic clustering operation of blocks 1327-1329 can be done with unsupervised learning, it can also be supervised or semi-supervised. For example, separate output nodes can be assigned for each category. In an illustrative embodiment, the re-assignment performed in block 1329 can be performed subject to the constraint that each data example with a known category can only be assigned to a cluster corresponding to an output node corresponding to the known category label. Unlabeled data examples can still be assigned unsupervised.

Control returns to block 1327 until some convergence or other stopping criterion is met.

The other blocks of FIG. 13 deal with initial setup and with tasks beyond the basic clustering operation.

At block 1321, the computer system 4100 selects the data examples to be clustered.

At block 1322, the computer system 4100 selects the desired number of clusters. The clustering will group the selected data into exactly the specified number of clusters. Separate testing can be done to decide whether to split or merge certain clusters as a second-pass adjustment. Block 1322 can also specify the architecture for the machine learning system to be used as a classifier. In some embodiments, that architecture may be changed during the training in block 1327.

At block 1326, the computer system 4100 initializes the assignment of data to clusters. For example, if there are N clusters, each data example can be assigned to cluster j with a weight of 1/N plus a random number between $-\varepsilon$ and $+\varepsilon$, where $\varepsilon$ is a small positive number.

At block 1323, the computer system 4100 specifies any objectives that are desired in addition to the clustering, and block 1325 represents them as additional terms in the error cost function for training classifier 1327. In the illustrative embodiment, the clustering is done by a classifier trained by stochastic gradient descent, so any additional objective can simply be added as an additional term to the error cost function for the gradient descent.

Callout 1324 gives some examples of side objectives that are useful in various embodiments of this invention.

The first example in block 1324 provides a capability that is useful in various embodiments of this invention. In the error analysis and error correction of blocks 103, 104, and 105 of FIG. 1A, there may be an individual data example X that is difficult to classify correctly without overfitting and causing other errors. One way to potentially fix this error is to find a nearby cluster of data examples from the same category as X. If X is grouped with the cluster, it may be possible to train the classifier to classify it correctly without overfitting to it as an individual example. The example X may be grouped with a specific cluster, for example, simply by intervening in the cluster assignment performed in block 1329.

However, the goal is to correctly classify example X without causing extra errors due to overfitting. As an illustrative example, this goal can be approached by adding an additional objective to classifier 1327. First identify one or more data examples Y that are likely to be misclassified if a classifier is trained to overfit based on training on example X. Add one or more additional output nodes to classifier 1327 to represent the data examples Y. The classification of the examples Y will be regarded as overfitting only if their correct category is different from the category of X and they are misclassified as being the same category as X. An extra term is added to the error cost function to represent the objective that the examples Y should all be classified by classifier 1327 as one of the extra nodes and not as one of the output nodes representing the clusters of the category of X. That is, not only should the assignment in block 1329 of the examples Y be supervised as explained above, but also during training of classifier 1327 there should be a term in the error cost function for any activation of any output node corresponding to a cluster of the category X when the data example is from Y.

The second example in block 1324 also relates to avoiding overfitting. The idea again is that an individual difficult data item will be less likely to cause overfitting if it is modeled as a member of a larger cluster rather than in isolation. In this second example, rather than force assignment of a problem example into a specific cluster, add a term to the cost function to discourage the clustering operation from creating clusters with single data examples or a small number of data examples. For example, a term can be added to the error cost function for classifier 1327 that rewards maximizing the entropy of the distribution of the data examples among the clusters.

Another example is specific to embodiments in which classifier 1327 is a neural network. In some embodiments, it is useful to soft tie node activations for some data examples, for example as discussed in association with FIGS. 6A and 6B. Soft tying of node activations is useful in general as a method of regularization. However, there are embodiments of soft tying that are particularly useful in connection with clustering as used in various embodiments of this invention. As an illustrative example, clustering can be used in error analysis and in correcting overfitting errors in blocks 104 and 105 of FIG. 1. In this illustrative example, clustering is being done for data examples from a single category C with some data examples from other categories such the data examples Y discussed above. The data examples Y are merely to be distinguished from the data category C, but not to be clustered.

In this illustrative embodiment, some node activations are soft-tied across all the data examples from category C, for regularization. Further soft tying is done to help find nodes that represent distinctive features, distinguishing category C from other categories, or distinguishing one cluster from another within category C. First find nodes that are likely to be good representatives of distinctive features. For example, select nodes that are strongly activated on a substantial fraction of the data examples for category C. These nodes are candidates to represent features that distinguish category C from other categories. Soft tie the node activations of these nodes across all data examples from category C.

Next, select nodes that are strongly activated in some clusters but not in others. These nodes are candidates to represent features that distinguish one cluster from another. At first make the strength of the soft tying low enough so that it does not dominate the clustering objective but strong enough so that it has some influence. As the assignment of data to clusters becomes more stable, the strength of the soft tying may be increased. The soft tying and the feature discovery support each other. Further discussion of feature detection will be given in association with FIG. 21. In this example of soft tying, the tying weight depends on the cluster assignment. When a side objective of this type is being used, block 1329 passes control back to block 1323, including block 1323 and block 1325 in the iterative loop.

FIGS. 14 and 15 are flowcharts for a method for numerically estimating the gradients for a large number of experimentally estimated variables, such as the hyperparameters in various embodiments of this invention. FIG. 14 is a flowchart of the overall process. FIG. 15 is a flowchart of the detailed estimation process that occurs in block 1403 and block 1406 of FIG. 14. Each of the processes illustrated in FIGS. 14 and 15 could be performed by a computer system, such as the computer system 4100 shown in FIG. 41.

Some embodiments of this invention have millions of hyperparameters. Experimentally estimating the partial derivatives of so many hyperparameters would be prohibitively expensive. Block 1401 groups the hyperparameters into disjoint subsets, where each subset contains related hyperparameters for which it is meaningful to apply a multiplicative scale factor. The techniques of FIGS. 14 and 15 can also be used to estimate the gradient of any differentiable deterministic or stochastic function.

Various embodiments of this invention have a large number of hyperparameters for a variety of reasons that lead to natural groupings of the hyperparameters. By way of example, the following list shows several ways the number of hyperparameters is expanded in embodiments of this invention in an illustrative example of a neural network:
- Conventional hyperparameters that are customized to each individual learned parameter (such as a connection weight in a neural network) or data structure element (such as a node in a neural network):
  - Learning rate ($\eta_{l,i,j}$)
    - Learning rate schedule ($\eta_{l,i,j,t}$)
  - Regularization parameter ($\lambda_{l,i,j}$)
  - Momentum parameter ($\mu_{l,i,j}$)
- Parameters that may be used as learned parameters, but that are instead controlled as hyperparameters:
  - Temperature (for example of a sigmoid node in a neural network) ($T_{l-1,i,t}$)
  - Cluster assignment weight of a data example ($d_m$)
- Hyperparameters for new concepts:
  - Strength of a soft tying of node activations ($w_{m,n,l,j}$)
  - Constraints for latent variables in a SCAN
  - Standard deviation scale during generation by any stochastic generator
  - Data weight during error analysis and correction ($d_m$)

Other types of machine learning systems have comparable customized and expanded sets of hyperparameters. Each line item in this list forms a natural group. Smaller groups within such a line item can be created by holding one or more subscripts constant.

At block 1402, the computer system 4100 creates a group-level hyperparameter as the scale factor for each of the subsets created in block 1401.

Block 1403 and block 1404 use the procedure detailed in FIG. 15 to estimate the partial derivatives of each of the group-level hyperparameters created in block 1402 and to select the ones that have the largest absolute value.

As an illustrative example, at block 1405, the computer system 4100 randomly selects some of the individual hyperparameters from the groups selected in block 1404. Some embodiments, for example those that have separate information about the influence of the individual hyperparameters, may use a deterministic selection method instead of or in addition to the random selection. Some embodiments of the system may skip or not include blocks 1401 to 1404 and instead directly select individual hyperparameters.

At block 1406, the computer system 4100 uses the procedure detailed in FIG. 15 to estimate the partial derivatives of selected individual hyperparameters.

At block 1407, the computer system 4100 selects a new set of individual hyperparameters, including new hyperparameters that haven't yet been tested and the best of the hyperparameters from previous tests in block 1406. The hyperparameters with partial derivatives with the largest absolute values are selected. The gradient is estimated as a vector with these estimated large absolute value partial derivatives and with the other partial derivatives set to zero.

The estimated partial derivatives are random variables, so repeated testing of the selected hyperparameters with large magnitude partial derivatives reduces the size of the confidence interval in estimated value of those partial derivatives. The standard deviation of the estimate of the partial derivative of each hyperparameter is essentially independent of its expected value, so the relative size of the confidence interval is smaller for the larger magnitude partial derivatives, even before the repeated testing. The loop back from block 1407 to block 1406 indicates this repeated testing, which is combined with testing new individual hyperparameters.

When a stopping criterion is met, block 1408 selects the hyperparameters that have consistently tested to have partial derivatives that are relatively large in absolute value.

FIG. 15 is a flowchart of the details of the process of estimating the partial derivatives of the hyperparameters. Block 1501 selects a set of hyperparameters or receives such a selection from an external source, such as block 1402, 1405 or 1407 of FIG. 14.

At block 1502, the computer system 4100 obtains or selects a set of evaluations to be performed. In some embodiments, these evaluations may be evaluations of a complex deterministic or stochastic function whose derivatives are not available in closed form. In these embodiments, the function may be any function of many variables. The variables are not necessarily hyperparameters. Even for a complex deterministic function, the estimate from the process of FIG. 15 will be stochastic because of the random perturbations in block 1504.

In most embodiments of aggressive development, the evaluations will be experimental runs of a machine learning system with specific values for the selected hyperparameters. For example, the function to be optimized may be a measure of the speed or efficiency of the learning process controlled by the hyperparameters. In embodiments of aggressive development, the function to be optimized may be the performance on held out development data of the machine learning system that has been developed by the process illustrated in FIG. 1, with some of the hyperparameters controlling the error detection and error correction in blocks 103, 104 and 105.

At block 1503, the computer system 4100 performs a base evaluation of the function or objective to be optimized, with the specified values for the hyperparameters.

Note that any hyperparameter can be redefined with an arbitrary scale change. Preferably all the hyperparameters naturally have comparable scales or have previously been rescaled to be comparable.

At block 1504, the computer system 4100 makes a zero-mean random perturbation in each of the hyperparameters. The magnitude of the perturbation is constrained to be small so that, unless the first derivative is very close to zero, the change in the function value due to the first derivative will dominate the changes due to higher order derivatives. The perturbations may be selected from a bounded continuous distribution or may simply be selected from a small set of non-zero integer multiples of a small number, for example, perturbation=k*ε, for a random k.

By the central limit theorem, the sum of a large number N of such perturbations will be a Gaussian distribution with a mean of zero and a variance equal to N times the variance of a single sample. The standard deviation of such a sum grows proportional to the square root of N.

A different random perturbation is generated for each hyperparameter for each of N evaluations. At block 1505, the computer system 4100 remembers the amount of each of these perturbations so that they can be used by the computer system 4100 at block 1512.

At block 1506, the computer system 4100 computes one of N evaluations. Each of the hyperparameters receives a perturbation in each evaluation, so in each evaluation the difference from the base evaluation is the sum of the effects of the perturbations of all the hyperparameters.

At block 1507, the computer system 4100 remembers the change in the evaluation for the perturbed hyperparameters compared to the base evaluation. This quantity will also be needed in the inner loop block 1512.

At block 1510, the computer system 4100 starts a loop over all the hyperparameters or other variables for which a partial derivative is to be estimated.

At block 1511, the computer system 4100 starts an inner loop over the N evaluations that have been done. This loop will be executed M*N times, where M is the number of variables and N is the number of evaluations. However, it is the evaluations that are the most expensive part of the computation and there are only N+1 evaluations.

At block 1512, the computer system 4100 makes an estimate of the partial derivative of variable m for evaluation n by dividing the change in value of evaluation n compared to the base by the perturbation for variable m in evaluation n. The expected value of this statistic is the partial derivative of variable m because the other variables are all perturbed by a zero-mean random amount. By the central limit theorem, the standard deviation of this statistic is proportional to the square root of the number of variables times the average absolute value of the partial derivatives of the other variables.

At block 1513, the computer system 4100 accumulates these estimates for all the evaluations and returns control to block 1511 until all N evaluations have been accumulated for variable M. Then control is passed to block 1514.

At block 1514, the computer system 4100 computes an estimate of the partial derivative for variable m averaged over all the evaluations by dividing the accumulation from block 1513 by N. This statistic has an expected value equal to the partial derivative with respect to variable m, with a standard deviation proportional to the square root of M times the average absolute value of the partial derivatives with respect to the other variables divided by the square root of N.

The procedure in FIG. 15 is intended only to make accurate estimates for a small percentage of the partial derivatives, namely those with the largest absolute values. Thus, N can be smaller than M to the degree to which the absolute values of this small percentage of variables is larger than the average absolute value of the other variables.

At block 1515, the computer system 4100 selects and reports these variables for which the partial derivative has magnitude greater than a specified value, where the specified value is selected large enough so that the magnitudes of the partial derivatives for the selected variables is statistically larger than the standard deviation of the estimate.

The number of variables used in an instance of the procedure illustrated in FIG. 15 is reduced by the grouping and selection illustrated in FIG. 14. The repetition of blocks 1406 and 1407 and the selection of block 1408 tend to weed out variables that by chance get a large magnitude partial derivative estimate in a single run of the process of FIG. 15.

Figure 16:
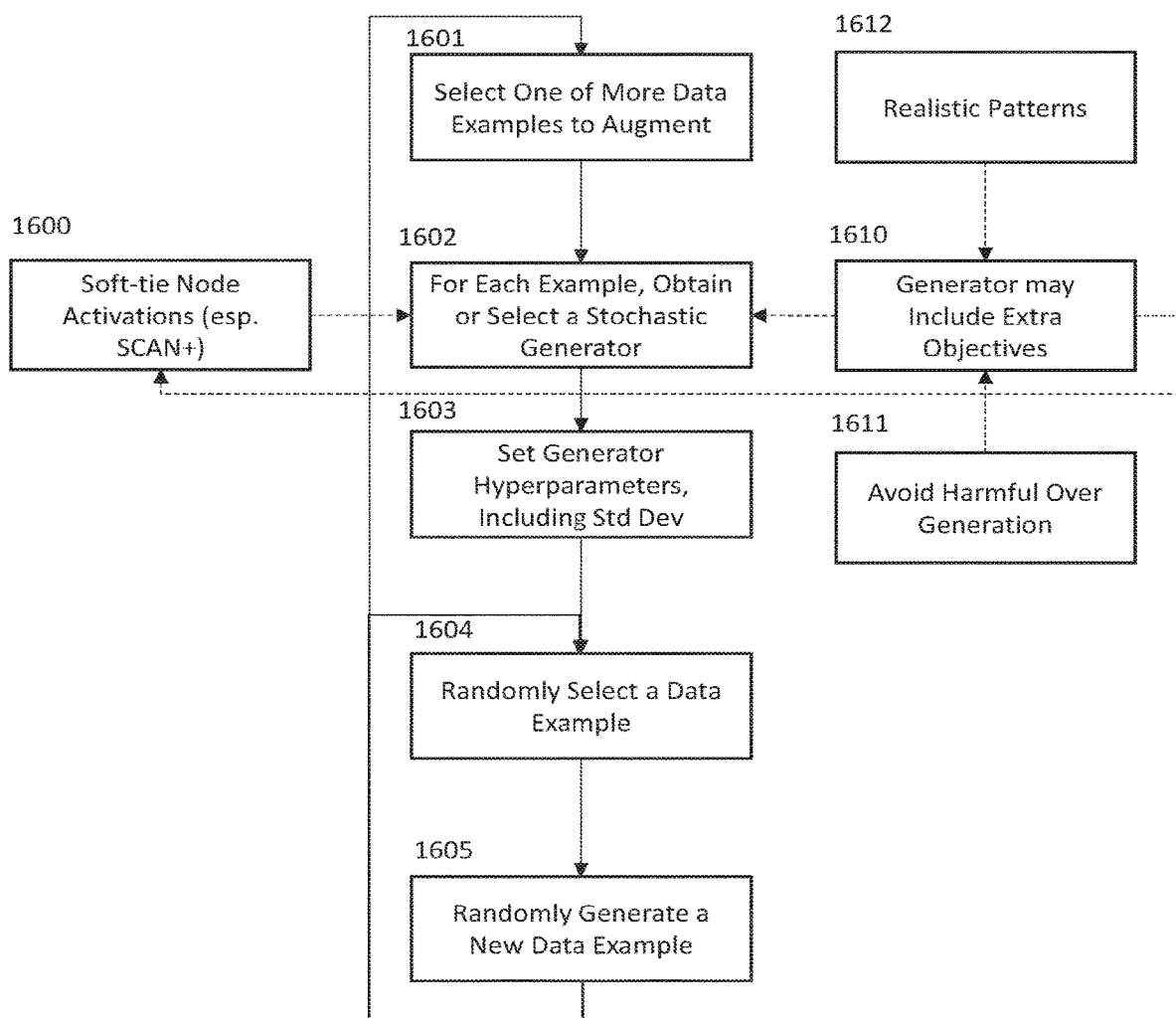
FIG. 16 illustrates a flowchart of a process for using generators for data augmentation, according to one aspect of this disclosure.

FIG. 16 is a flowchart illustrating a process for using generators for data augmentation that is used in various embodiments of this invention. The process illustrated in FIG. 16 could be performed by a computer system, such as the computer system 4100 shown in FIG. 41. At block 1601, the computer system 4100 selects one or more particular data examples to augment.

At block 1602, the computer system 4100 selects which generator to use, depending on the application and the purpose of the generation. In some embodiments, the generator is trained on data examples that are all from the same class as the selected example. This training restriction can be done for many types of generators, including GANs, VAEs, and SCANs. In addition, for VAEs and SCANs, the vector of latent variables associated with the selected data example is used in some embodiments. The benefit of this selection is greater for SCANs, since the SCAN latent variable vectors can be trained to be more distinctive, using appropriate soft tying and side objectives. The KL-divergence regularization of VAEs tends to decrease the distinctiveness of the latent vectors.

At block 1603, the computer system 4100 sets the values of hyperparameters that control the standard deviation or other measure of the amount of spread in the probability distribution of the generated sample. Note that, for generators that have hyperparameters that control the standard deviation during training, the hyperparameters set in block 1603 are different and their purpose is to allow the spread of the data generated for augmentation to have greater or lesser amount of spread than during the training of the generator. In addition to a side objective, this is one of the tools that enables data augmentation to be tuned to optimize a trade-off between data augmentation that will help a machine learning system to learn to generalize and data augmentation that generates examples that might increase confusion with other categories.

If more than one data example is selected in block 1601, the computer system 4100 selects one of them at random at block 1604.

At block 1605, the computer system 4100 uses the selected generator to randomly generate a new data example related to the one selected in block 1604. Block 1605 loops back to block 1604 until a stopping criterion is met. Then it loops back to block 1601 to select more data examples to augment, until a second stopping criterion is met.

At block 1610, the computer system 4100 implements or includes extra objectives to overcome weaknesses of generator 1602 or to give desired extra properties. For example, a GAN or GAN-like generator could include an extra objective to avoid mode collapse, such as trying to confuse a "which generator" classifier as in FIG. 4, or to avoid a plagiarism detector as in FIG. 37. In some embodiments, a SCAN or VAE generator has an objective from block 1612 that increases the ability of the generator to generate realistic patterns. For example, in these embodiments, 1612 may have a real-vs-generated classifier or may have a degradation regression system as illustrated in FIG. 9A. In some embodiments, block 1611 supplies additional objectives that help prevent the generator of block 1602 from generating patterns that are not desired, such as the negative feedback discussed in FIG. 4 and the negative examples discussed in FIG. 18. For example, in some embodiments, block 1611 back propagates a penalty term when generator 1602 generates a data example that is classified as being like one of a set of negative examples, including negative examples encountered in prior training.

Figure 38:
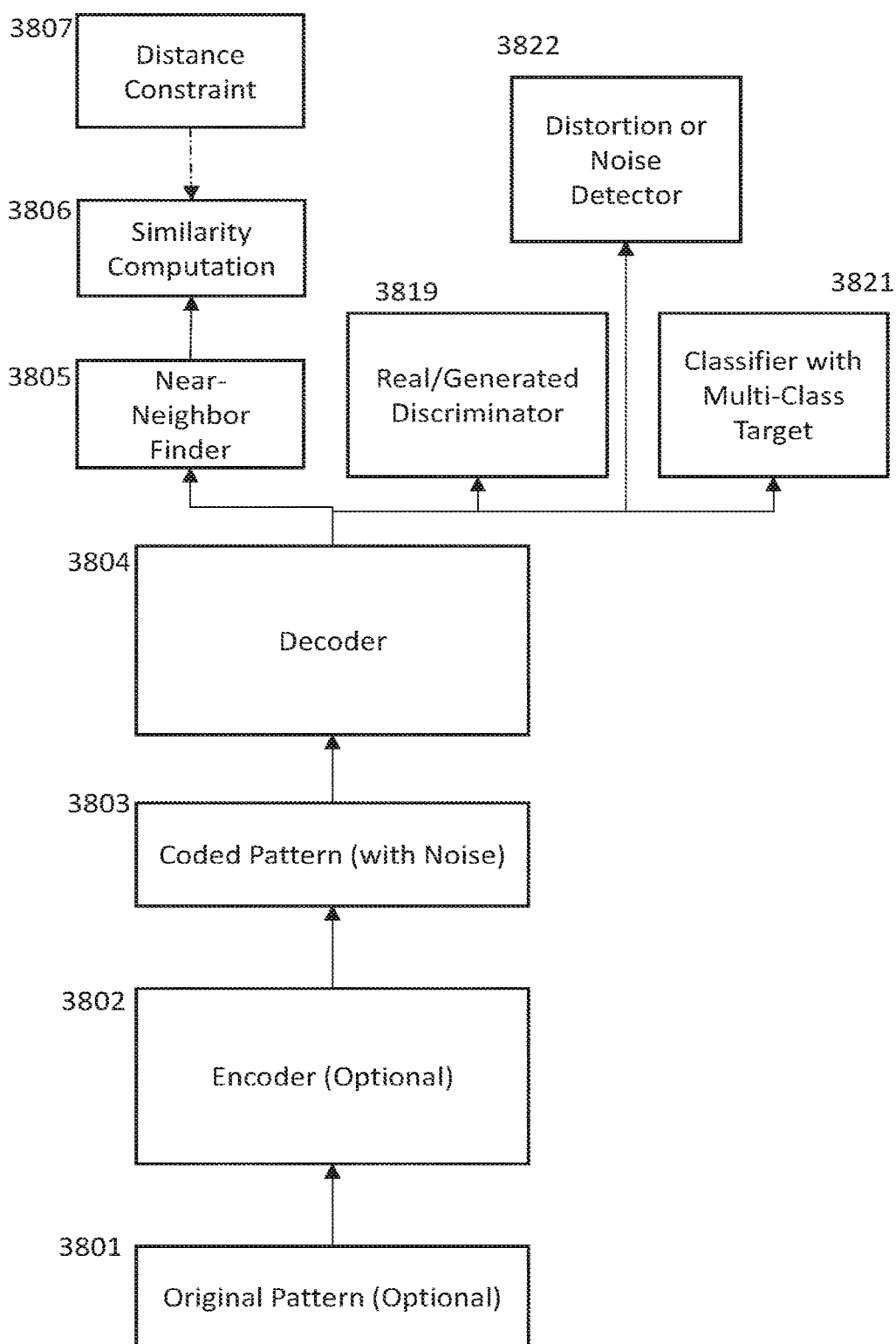
FIG. 38 illustrates a block diagram of a generator including a real-vs-generated discriminator, according to one aspect of this disclosure.

At block 1610, the computer system 4100 may also implement other objectives, such as the objectives of blocks 3821 and 3822 of FIG. 38, or the objective of getting targeted agreement or disagreement among classifiers as in FIG. 11.

In some embodiments, the computer system 4100 soft ties node activations at block 1600. The latent variables are soft-tied in a SCAN. Other nodes may also be soft-tied. Any of the generator types may have soft-tied nodes.

SCANs with the capability of soft tying their latent variables 1600 and the enhanced generators of various kinds in FIGS. 8, 9, 10, and 11, with extra objectives 1610 including the generation of more realistic patterns 1612 and the ability to limit harmful overgeneration 1611 are especially good for this purpose. The SCAN+ generators have all these capabilities.

FIG. 17A is a flowchart of an illustrative embodiment of a process that is used to correct difficult classification errors in various embodiments of this invention. The process illustrated in FIG. 17A could be performed by a computer system, such as the computer system 4100 shown in FIG. 41. The concept of FIG. 17A is that a pattern may be transformed or distorted in a way that makes it difficult to recognize. If the transformation is rare, or not present at all in the training data, then it is hard for a machine learning system to learn to classify it directly. Even if an example of the transform occurs in the training data, it is difficult for the machine learning system to learn to apply that transform to other data, generally. If the transform is rare, it is also likely that an attempt to learn to correctly classify an example of the transform will lead to overfitting and cause other errors. FIG. 17A avoids these problems by using a different approach. It uses a generator to generate enough examples to train a model of the inverse of the transform. It then can apply that inverse transform to an individual difficult-to-classify example. In the terminology introduced in the discussion of FIG. 1, FIG. 17A is targeting an individual difficult-to-correct error, possibly during development at local or individual scope.

At block 1701, the computer system 4100 selects a data example, preferably a data example on which a main classifier makes an error. If more than one data example is to have this error correction process applied, each can be done in a separate application of the process shown in FIG. 17A. Let A represent the correct category for the data example and let B represent the category that the example is misclassified to be.

At block 1702, the computer system 4100 obtains a trained classifier. This classifier is just an aid in supplying a cost function for the training of a transform in block 1705. In some embodiments, the classifier in block 1702 is the main classifier for which error correction is being performed. In some embodiments, the classifier selected or created in block 1702 is a simpler classifier trained just on data in a local region and just on the category of the example selected in block 1701 and the categories with which it might be confused.

At block 1703, the computer system 4100 selects similar examples of category B and other categories. In some embodiments, the similar examples are selected by finding nearest neighbor by whatever criterion the embodiment uses for measuring nearness. In some embodiments, one or more data examples from category B are selected and more are generated using data augmentation as described in FIG. 1A, 1B, 1C, 12, and 16. These examples are selected in order to constrain the transform to be trained in block 1705. An objective of that training will be finding a transformation that avoids causing any of these examples to be misclassified as category A. The category B examples are the most important. The other categories are optional in some embodiments.

At block 1704, the computer system 4100 generates random perturbations of the examples selected in block 1703. As an illustrative example, these perturbations could be generated by the process illustrated in FIG. 16. As another example, if the pattern is an image or a speech or audio signal, the perturbations could be generated simply by adding random noise to the signal or image.

In one aspect, block 1704 is omitted from the process executed by the computer system 4100 if the density of other category examples in the volume of data space containing the data example from block 1701 is sufficiently high. There need to be enough examples selected in 1703 or generated in 1704 so that the transform in block 1705 (described below) learns to make a transformation that will generalize to new data. If there are gaps among the examples in block 1704, the transform may merely learn to transform the data example into one of those gaps.

At block 1705, the computer system 4100 trains a transform. For example, the transform could be represented by a neural network that takes the data example selected in 1701 as input and generates another pattern as output. The transform could be any trainable generator or pattern translator that accepts a pattern as input and transforms it into another pattern. Block 1710 applies an objective to the process in block 1706 of correcting the classification of transformed patterns.

The training by the computer system 4100 at block 1705 uses the classifier obtained in block 1702 and back propagates partial derivatives from a target that represents the correct category of the example that has been transformed. That is, the transformation should transform the example selected in block 1701 into a pattern that is correctly recognized as an instance of its category, while the transformation of each the other category examples selected in block 1703 is still recognized as an instance of its own category, as are any of the patterns generated in block 1704. In other words, the application of the transformation should correct the error in the example selected in block 1701 without introducing any new errors among the examples selected in block 1703 or generated in block 1704. For this goal to be achievable, the standard deviation of the generator in block 1704 may need to be reduced.

At block 1706, the computer system 4100 uses the transform for error correction. The process in block 1706 is somewhat like data augmentation, except it is done at classification time rather than during training. It does not generate additional training data. Instead at classification time, the transform is applied to selected instances of category B. For example, if the process of FIG. 17A is done during development of local scope, then only data examples in that local scope that are classified as category B are selected to be transformed. If the transform of a selected example is classified as category A, then the classification for the example is changed to A. This process leads to error correction. At operation time, the transform is applied to data examples that are classified as category B. A second round of classification is then done on the transformed data. The transform has been trained to transform examples of category A such that they will be correctly classified in this second round. It has also been trained to transform data examples from category B in such a way that they are still classified as category B in the second round after they have been transformed.

Limiting the data examples for such a transformation is one of the reasons that the concept of local and regional scope was introduced in FIG. 1. The use of transformations from FIG. 17A is an instance of aggressive error correction. The performance of any such transformation must be verified on development data.

FIG. 17B is a block diagram of another type of stochastic transform generator 1751 that is useful in various embodiments of this invention. The system illustrated in FIG. 17B could be implemented on a computer system, such as the computer system 4100 shown in FIG. 41. The encoder 1754, the latent variables 1755, the Gaussian distributions 1756, and the decoder 1757 are the same as the corresponding components of a VAE or a SCAN. However, rather than being trained as a stochastic autoencoder, with the output target being a copy of the input, system 1751 is trained with pairs of patterns. For each training example, there is an input pattern 1753 and a separate pattern 1758 as the output target. Because it is similar to a variational or SCAN, but is trained as a transform rather than as an autoencoder, it will be called a VT or a stochastic categorical transformer (SCT), respectively.

FIG. 17C is a flowchart of an illustrative embodiment for generating transformations that can correct errors in various embodiments of this invention. The process illustrated in FIG. 17C could be performed by a computer system, such as the computer system 4100 shown in FIG. 41. Let the classifier whose classification error is being corrected be called C.

At block 1721, the computer system 4100 selects a prototype example of a specific category, which will be called category A. In various aspects, the computer system 4100 uses a generator, such as a VAE+ or a SCAN+, to augment the selected prototype. Preferably the selected prototype is correctly classified by classifier C.

At block 1722, the computer system 4100 selects a data example that is in category A but that is misclassified as being in category B. Let the example be denoted by X. Block 1722 also uses a generator to augment example X. Preferably, the generator is trained including data examples near X that are categories other than A as negative examples. Negative examples can be included in the training of a generator, for example, as illustrated in FIGS. 9 and 18. These data augmentations of X are provided for the purpose of having sufficient training data to train the VAE+ or SCAN+ transformer in block 1724.

At block 1724, the computer system 4100 trains a VT or a SCT using as training data ordered pairs, with the input to the transformation selected from the augmented data generated by block 1721 and the output target randomly selected from the augmented data generated by block 1722. In addition to the positive training examples, the VT or SCT transformer is also preferably trained with negative examples of categories other than A for data examples near X. The trained VT or SCT is then used to generate augmented data by randomly selecting its input from the augmented data generated by block 1721.

At block 1725, the computer system 4100 trains a classifier, augmenting the training data for the classifier by the output examples generated by the VT or SCT of block 1724, with optimized hyperparameters.

At block 1726, the computer system 4100 tests, on development data, the performance of the classifier trained in block 1725. Block 1726 can either pass control back to block 1724 or pass control back to block 1721 via block 1727 to generate another VT for testing. Block 1726 stops when a stopping criterion is met and indicates the best performing classifier.

FIGS. 18 and 19 represent an illustrative embodiment of a system and method for pairing a generator with a detector that is useful in various embodiments of this invention. The illustrated method is used in the illustrative embodiment of FIG. 20 to build a MGM. FIG. 18 is a block diagram of an illustrative embodiment, and FIG. 19 is a flow chart of an illustrative example of training the system. In the illustrative embodiment, the detector 1802 and the generator 1812 are trained to detect and generate data related to a single cluster. The cluster may have been trained by unsupervised learning on unlabeled data, or the cluster may be a cluster within a single category of labeled data. The systems and processes illustrated in FIGS. 18-20 could be performed by and/or implemented on a computer system, such as the computer system 4100 shown in FIG. 41.

Block 1801 in FIG. 18 represents the input to the detector 1802. The detector has three possible outputs. Output 1803 represents a detection event. Activation of this output represents detection. For example, the range of activation values may be 0 to 1, with activations greater than some threshold, say 0.5, representing detection and activations less than that threshold representing lack of detection, if output 1803 were the only output node and had a sigmoid activation function. A conventional detector only needs one output, which would be equivalent to output 1803. This illustrative embodiment, however, represents additional information about the nondetections (e.g., reject or neutral) and uses that information in its training process. Output 1804 represents detection of a negative example, and output 1805 represents a neutral nondetection. Each of the three options, detect, reject, or neutral is trained by supervised training from examples of the three types of events, as explained in association with blocks 1807, 1808, 1809, and 1810 of FIG. 1. In some embodiments, each of the three output nodes is trained separately; for example, they may each be trained with a sigmoid activation function. In some embodiments, the three nodes are grouped together with a softmax computation applied to their activations. Training with sigmoid activations or softmax activations for output nodes are known to those skilled in the art of training neural networks. In either case, the activation of each output node is in the range [0,1]. With the softmax activation, the activations of the three nodes are constrained to sum to 1.0. The output is said to designate a detection, a rejection, or a neutral output according to which of the three nodes has the maximum activation. The use of a softmax normalization does not change the identity of which output node has maximum score. With sigmoid outputs, the maximum activation may be any number in the range [0,1]. With a softmax normalization, the maximum score must be at least ⅓. Moreover, there may be differences in the training such that one representation may be preferred in some embodiments and the other representation may be preferred in other embodiments.

Block 1801 receives its input from any of several sources. It receives within-cluster data from block 1809. When there is labeled data, it receives data from the same category as the cluster, but that is not in the cluster, from block 1810. Also, it can receive general background data (i.e., data that is not from the category) from block 1807. When data from block 1807 is misclassified as a detection by the detector 1802, the computer system 4100 causes the misclassified data to be copied from block 1807 to block 1808 (as indicated by the callout 1806). Data that has been copied to block 1808 is used in continued training of the detector 1802 as an example for which the target output of the detector 1802 is 1804 "Reject." The target output for within-cluster input data from block 1809 is "Detect." The target output for within-category input data from block 1810 is "Neutral," but in various embodiments classification of input data from block 1810 as a detection does not cause the example to be copied by the computer system 4100 to block 1808 as a negative example.

The target output of the detector 1802 for background data from block 1807 is also "Neutral." As mentioned above misclassification of this data as a detection causes the misclassified data to be copied by the computer system 4100 to block 1808 as a negative example. However, if background data is classified as "Reject," that classification is accepted. In some embodiments, when background data is classified as "Reject," no back propagation is done from the nominal target of "Neutral."

Block 1801 can also receive input from the generator 1812. In some phases of training for some embodiments, in the detector 1802 the computer system 4100 also back propagates partial derivatives as part of the training of generator 1812. The generator 1812 may be any form of generator. In some embodiments, it is a stochastic autoencoder, for example a VAE or a SCAN, receiving its input from block 1811. Use of a VAE as a generator is known to those skilled in the art of neural networks. Although the illustrative embodiment shown in FIG. 18 uses a stochastic autoencoder as generator 1812, with an encoder and decoder, it is to be understood that some other form of generator may be used. When generator 1812 is an autoencoder or another form of generator that can be trained on designated training data, preferably it is initially trained just on data from the cluster. In some embodiments, when there is too little data in the cluster, the generator 1812 may also be trained on data from the category. As a generator, once it has been trained, it may be constrained to only use latent variables corresponding to data from the cluster. As will be seen in FIG. 19, in some embodiments, subsequent training of generator 1812 will include both positive and negative examples.

Although FIG. 18 only shows one detector 1802 and one generator 1812, in some embodiments a plurality of generators may be paired with a single detector 1802; or a plurality of detectors 1802 may be paired with a single generator 1812. In embodiments where there are multiple generators, the generators may be all of the same type or of more than one type. In the paired training, if block 1812 is an autoencoder, it has multiple objectives, the input as a target, and back propagation from the detector 1802, and possibly additional objectives 1814. Thus, in the terminology of FIG. 10, generator 1812 is an enhanced generator such as a VAE+ or a SCAN+.

FIG. 19 depicts a flowchart of an illustrative embodiment of the paired training process. In block 1901, the computer system 4100 selects a category. In block 1902, the computer system 4100 trains clusters within the category. Any clustering algorithm known in the field can be used in block 1902. As illustrative examples, the clustering can be done as K-means clustering or Expectation-Maximization clustering for a Gaussian Mixture Model. The clusters trained in block 1902 may later be modified by the computer system 4100 in block 1911. In block 1903, the computer system 4100 selects one of the clusters trained at step 1902 so that the generator-detector pair (e.g., generator-detector pairs 2050A-C in FIG. 20) for the selected cluster can be trained through steps 1904 to 1911, as described below. If there are multiple clusters, and hence multiple corresponding generator-detector pairs, steps 1904-1911 can be completed for each such cluster/generator-detector pair.

In block 1904, the computer system 4100 trains the generator 1812 of FIG. 18, with the training examples for the selected cluster, on a stand-alone basis. That is, the generator 1812 is trained without back propagation from the corresponding detector 1802 of FIG. 18. Further training of the generator 1812 will be done in block 1908. In block 1905, the computer system 4100 trains the detector 1802 of FIG. 18 on a stand-alone basis with the real training examples for the selected cluster In some embodiments, in training detector 1802 in block 1905, the computer system 400 may also use data examples generated by generator 1812 as initially trained in block 1904. In block 1906, the computer system 4100 uses the generator 1812 of FIG. 18 to generate data that represents data from the selected cluster (i.e., "within-cluster" data). That is, the vector of latent variables that is used is the latent vector for a data example from the cluster. In block 1907, the computer system 4100 classifies the data generated by the generator 1812 at step 1906 using the detector 1802 of FIG. 18 trained at step 1905. In block 1908, the computer system 4100 trains the generator 1812, which includes back propagation from detector 1802. The process loops back and repeats blocks 1906, 1907 and 1908 until a stopping criterion is met. As illustrative examples, a stopping criterion may be (i) convergence, (ii) a specified limit on number of iterations, or (iii) early stopping because of degradation on validation data.

If the stopping criterion is met, the process advances to block 1909, where the computer system 4100 uses the generator 1812 with latent variables, both from the cluster and from other clusters, to generate within-cluster (positive) and out-of-cluster (negative) data. Then, in block 1910, the computer system 4100 trains the detector 1802 on the data generated by the generator 1812 in block 1909. The process then loops back to get more training data from block 1909 until a stopping criterion for training the detector 1802 is met. As illustrative examples, a stopping criterion for training the detector at step 1910 may be (i) convergence, (ii) a specified limit on number of iterations, or (iii) early stopping because of degradation on validation data.

Once the stopping criterion for training the detector 1802 is met, the process advances to block 1911, where the computer system 4100 uses the updated detector 1802 to classify the data from the category and to reassign data into or out of the cluster. The process then returns control to block 1906 to generate mode within-cluster data until a stopping criterion is met. As illustrative examples, the stopping criterion may be (i) convergence, (ii) a specified limit on number of iterations, or (iii) early stopping because of degradation on validation data. Once the stopping criterion is met, the process may be repeated, one at a time, for any additional clusters that were trained at step 1902 in order to generate the generator-detector pair for those additional clusters.

FIG. 20 is a block diagram of an illustrative embodiment of a generative model of a category as a mixture of clusters, with each cluster represented by a generator-detector pair as illustrated in FIGS. 18 and 19. Since each category of input data is modeled as a mixture of clusters and there is a generator-detector pair 2050A-C for each cluster. As such, the system 2070 is called a MGM. In FIG. 20, there are only three clusters, all in the same category; hence, only three generator-detector pairs 2050A-C are shown, but it is to be understood that there may be any number of clusters/generator-detector pairs per category and any number of categories.

Each generator-detector pair 2050A-C may comprise one generator and one detector as shown in FIG. 20, and there preferably is one generator-detector pair 2050A-C for each cluster in the category. With reference to FIG. 20, there are assumed to be three cluster and hence three generator-detector pairs 2050A-C, namely: generator 1 (block 2001) and detector 1 (block 2011) form the generator-detector pair 2050A for cluster 1; generator 2 (block 2002) and detector 2 (block 2012) form the generator-detector pair 2050B for cluster 2; and generator 3 (block 2003) and detector 3 (block 2013) form the generator-detector pair 2050C for cluster 3. The generator-detector pairs 2050A-C are trained by, for example, the computer system 4100 as described in connection with, for example, FIGS. 18 and 19. Once trained, the system 2070 illustrated in FIG. 20 can be operated by computer system 4100 as a generator, as a cluster classifier, or as a category classifier. The computer system 4100 can also continue training the detectors 2011-2013 in stand-alone mode, without updating the cluster definitions.

Under control of, for example, the computer system 4100, a transmission switch 2010 (implemented in software) makes different connections among the elements in FIG. 20 depending on the operation being performed by the system 2070. During system training, illustrated in FIGS. 18 and 19, each generator (e.g., the generator 1812 in FIG. 18 or the generators 2001, 2002, or 2003 in FIG. 20) is connected to its corresponding detector (e.g., the detector 1802 in FIG. 18 or the detectors 2011, 2012, or 2013 in FIG. 20).

To generate data representing a category, in a node 2000, the computer system 4100 selects one of the clusters of in the category. Each cluster is selected based on its a priori probability. Using the generator for the selected cluster, say generator 2 for cluster 2 (and so on), the computer system 4100 generates a data example for the selected cluster (e.g., cluster 2) that is sent to the transmission switch 2010. At the switch 2010, the computer system 2100 sends the generated data to block 2004 for external use when the system 2070 is operated as a generator.

When the system is operating as a classifier, at the switch 2010 the computer system 4100 can receive real data or generated data from block 2005. The real or generated data 2005 can be stored in an on-board and/or off-board of the computer system 4100. If the data 2005 is generated data, it may be generated by a data generator (not shown). The switch 2010 sends the data from block 2005 to each of the detectors 2011-2013, one for each cluster. As in FIG. 18, in the illustrative embodiment, each of the detectors 2011-2013 has three possible outputs, representing "Detect," "Reject" and "Neutral," which are represented by the nodes marked D, R and N, respectively, in FIG. 20.

From each cluster detector 2011-2013, the computer system 4100 preferably feeds the "Detect" activation to two nodes. One destination is "Max Node" 2021. The activation of Max Node 2021 is the maximum of the activations of the "Detect" outputs of all the clusters in a specific category. For example shown in FIG. 20, the activation value of the Max Node 2021 equals the single greatest activation value for the Detect outputs for detectors 1-3 2011-2013. The activation of the Max Node 2021 may be used as the score for the category in a category classification task. The Max Node 2021 preferably receives back propagation during training for the classification task and in turn the computer system 4100 back propagates the error cost function derivatives to the detector 2011-2013 that has the maximum value.

The second destination, in the cluster classification mode, is a dedicated node in the node set 2031. There is one node in the node set 2031 for each detector 2011-2013, and hence has one node for each cluster in the specified category. The computer system 4100 sends the "Detect" activation of each cluster detector 2011-2013 to its respective, dedicated node in the node set 2031. In the illustrative embodiment, the computer system 4100 performs a softmax operation for the node set 2031; that is, it normalizes the activations of its nodes to sum to one. During training, the node set 2031 is trained by the computer system 4100 for cluster classification. For each data example, the target for the node set 2031 is a value of one for the correct cluster and a value of zero for all the other nodes. In the node set 2031, the computer system 4100 back propagates this objective to the cluster detectors 2011, 2012 and 2013, respectively.

Thus, under control of the computer system 4100, there are three modes of operation for transmission switch 2010: (1) training, (2) generation, and (3) classification. In addition, there are two sub-modes for classification: (i) category classification and (ii) cluster classification, which are controlled by the computer system 4100 selecting either the node set 2031 or the node 2021, respectively, as the output of the system.

This continued training refines the ability of the detectors to classify the cluster as defined and continues to train the category classification. In an illustrative embodiment, the cluster definitions are also updated by returning to the process of paired generator detector training illustrated in FIG. 18.

Although the illustrative embodiments described above in connection with FIGS. 18-20 have been primarily described with neural networks as generators and, specifically, with a VAE as an example of generator 1812, it is to be understood that other types of generators may be used. For example, a different type of stochastic autoencoder, called a SCAN, may be used. A SCAN has the same form as a VAE but uses a different objective and imposes different constraints on the parameters of the parametric probability distribution of the stochastic layer in the autoencoder. SCANs are described in more detail in U.S. patent application Ser. No. 16/124,977, filed Sep. 7, 2018, titled STOCHASTIC CATEGORICAL AUTOENCODER NETWORK, which is hereby incorporated by reference in its entirety.

As another example, a GAN may be used in the systems and processes described in connection with FIGS. 18-20. A GAN uses a stochastic layer and a decoder network, such as the generator 1812 in FIG. 18, but with no encoder. In training a GAN, an adversarial classifier is also trained, although that is not shown in FIG. 18. The adversarial classifier attempts to discriminate between real data and synthetic data that are produced by the GAN generator. The GAN generator is trained with the objective of fooling the adversarial classifier. In the systems illustrated in FIGS. 18 and 20, a GAN generator, in addition to the objective of fooling its associated adversarial classifier, would preferably also have, in various embodiments of the invention, the objectives of the VAEs other than the autoencoder objective of having its output match its input. A GAN does not have an encoder, so the input to its decoder is directly related to a stochastic layer without being related to an encoded input data example.

In some embodiments, the mixture of generators may include generators of a plurality of different types (e.g., VAE, SCAN, GAN). In such embodiments, if a generator is not capable of being trained to generate data items only representing a specific cluster or category, then in the embodiment illustrated in FIG. 18, that generator may be paired with another generator that is capable of being trained to generate data items representing a specific cluster or category in order to generate the data examples required in blocks 1906 and 1909 of FIG. 19.

FIG. 21 is a flowchart for an illustrative embodiment of a method for creating feature detection nodes based on, and supporting, clustering. The process illustrated in FIG. 21 could be performed by a computer system, such as the computer system 4100 shown in FIG. 41. The process of FIG. 21 uses soft tying of nodes, so it is specific to neural networks or other machine learning networks to which node tying applies.

The flowchart in FIG. 21 can be started in either of two ways. At block 2101, the computer system 4100 begins by clustering the data examples of each classification category. Any clustering algorithm known in the field can be implemented by block 2101. As an illustrative example, the clustering may be done as illustrated in FIG. 13. As another illustrative example, the clustering in block 2101 can be done using paired generators and detectors, as illustrated in FIGS. 18, 19, and 20.

For the other entry point, at block 2100, the computer system 4100 skips this initial clustering. Instead it imports feature specification from an external source, or uses one of the other methods described below to find features without first clustering. In this illustrative embodiment, a feature specification consists of specifying which examples in a set of data examples exhibit the feature and which ones do not. There are several sources from which feature specifications may be imported. Note, for example, that the embodiment illustrated in FIG. 21 exports feature specifications in block 2106. Thus, block 2100 can, for example, import feature specifications that have been learned and exported in a previous application of the process illustrated by FIG. 21.

Another source for an external specification for a feature is a special classifier that is a dedicated feature detector. This external classifier is trained on labeled data examples of the feature and can then automatically label any other data examples. The labeled examples can be used to train a feature detector node by learning by imitation as illustrated in FIGS. 1B, 27A, and 27B. In some embodiments, as illustrated in FIG. 34, a feature node in a middle layer of a deep neural network has an objective and error cost function for detection of the feature as specified for each data example as well as the objective back propagated from higher layers of its network. In some embodiments, feature detection is represented by a single node with an activation function, such as a sigmoid. In some embodiments, it is represented by a more complex structure such as the triple-node structure of 2803 in FIG. 28, which represents rejection of false detections, as well as detections.

Either entry point 2100 or 2101 can be used alone, or they can both be used with clusters obtained in block 2001 and an external feature specification obtained in block 2100.

In the illustrative embodiment, at block 2102, the computer system 4100 selects nodes in an existing network to become nodes representing features. In some embodiments, it adds extra nodes as feature nodes in order to retain any existing knowledge in a network that has already been trained.

At block 2103, the computer system 4100 soft ties all data examples in each cluster for each of the feature nodes. This block is skipped in the first pass if only entry point 2100 is used and clusters have not yet been formed.

At block 2104, the computer system 4100 trains the classification system, including the soft-tied feature nodes. In some embodiments, training is based on MGM training, as illustrated in FIGS. 18, 19, and 20.

At block 2105, the computer system 4100 does clustering based on the data and in addition on the activation values of the feature nodes. The soft tying of the node activations within a cluster regularizes the feature learning. The feature values help define more distinctive clusters.

Control loops back to block 2103, at which point the computer system 4100 continues training the classifier and the features and to continue updating the clusters until a stopping criterion is met. Depending on criteria set by the embodiment, block 2105 proceeds directly to block 2106 or goes to block 2107 to train paired feature detectors and generators as illustrated in FIG. 18.

At block 2107, the computer system 4100 uses the technique of a paired generator and detector from FIG. 18 to generate more data for training the feature detector. An advantage of the technique of FIG. 18 is that it includes training on negative examples, allowing the generator to generalize without over generalizing.

At block 2108, the computer system 4100 trains the detector on the augmented data and then passes control to block 2106.

At block 2106, the computer system 4100 exports the specifications for each of the feature nodes.

FIG. 22 is a flowchart for an illustrative embodiment of a process for locating and generating a description of the decision boundary in a complex classifier. The process illustrated in FIG. 22 could be performed by a computer system, such as the computer system 4100 shown in FIG. 41. In some embodiments of this invention, it is useful to know the position and some properties of the shape of the decision boundary. However, with a machine learning system with millions of parameters, there is usually no explicit representation of the decision boundary. The illustrative embodiment of FIG. 22 applies to any type of machine learning system, except for blocks 2204 and 2205, which require back propagation. These blocks can be skipped, or in block 2202, a discriminator that allows back propagation, such as a neural network, can be trained by learning by imitation to imitate the decision boundary of the original system.

At block 2201, the computer system 4100 selects two clusters or two categories. Some embodiments preferably select two clusters that represent two different categories and that include some points that get misrecognized as the other category. Selecting clusters rather than whole categories keeps the analysis to a local region and simplifies the analysis by eliminating some of the causes for a complex decision surface. The remaining causes for a complex decision surface are overfitting and other problems that are the subject of the diagnosis. Some embodiments of clustering algorithms may select two clusters that represent the same category.

At block 2202, the computer system 4100 obtains and trains a classifier that discriminates the two clusters. This discriminator needs to back propagate derivatives in block 2204. If the original system cannot do that, this discriminator can be a new system, such as a neural network, trained to imitate the original system. To imitate the original system, a generator can generate an arbitrarily large number of data examples near the decision boundary, so the imitation can be arbitrarily precise.

At block 2203, the computer system 4100 trains a generator that has a side objective of generating examples such that the discriminator from block 2202 scores the two clusters with equal scores, for example that both get a score of 0.5 in a softmax. In other words, the generator is trained to generate data examples that are near the decision surface.

At block 2204, the computer system 4100 back propagates partial derivatives from the discriminator to obtain a vector that is orthogonal to the decision surface.

At block 2205, the computer system 4100 looks for rapid changes in the direction of the orthogonal vector, as an indication of overfitting or some other problem. Block 2205 may also characterize the decision surface and its shape and smoothness in other ways. For example, in some embodiments, the computer system may fit a hyperplane to the set of generated data examples and measure the spread from the hyperplane at block 2205.

At blocks 2206, 2207, and 2208, the computer system 4100 tests the stability of the boundary under changes in the training conditions whether the changes be changes in the data, changes in the hyperparameters, changes in the architecture of the machine learning system, or substitution of a completely different machine learning system trained on the same data or on different data sampled from the same distribution.

At block 2206, the computer system 4100 generates data examples near the decision boundaries using, for example, a SCAN or a VAE, with any of the enhancements discussed in other figures. It can use any kind of generator that can be controlled to generate examples near a given example.

At block 2207, the computer system 4100 makes some change in the training conditions. The change can be large or small. For example, it can be a small change in a single hyperparameter to estimate a partial derivative. At the other extreme, it can be a completely different machine learning system trained on different data drawn from the same distribution.

At block 2208, the computer system 4100 tests the stability of the decision boundary under the change by measuring the change in classification scores at the test point examples generated in block 2206.

Figure 23:
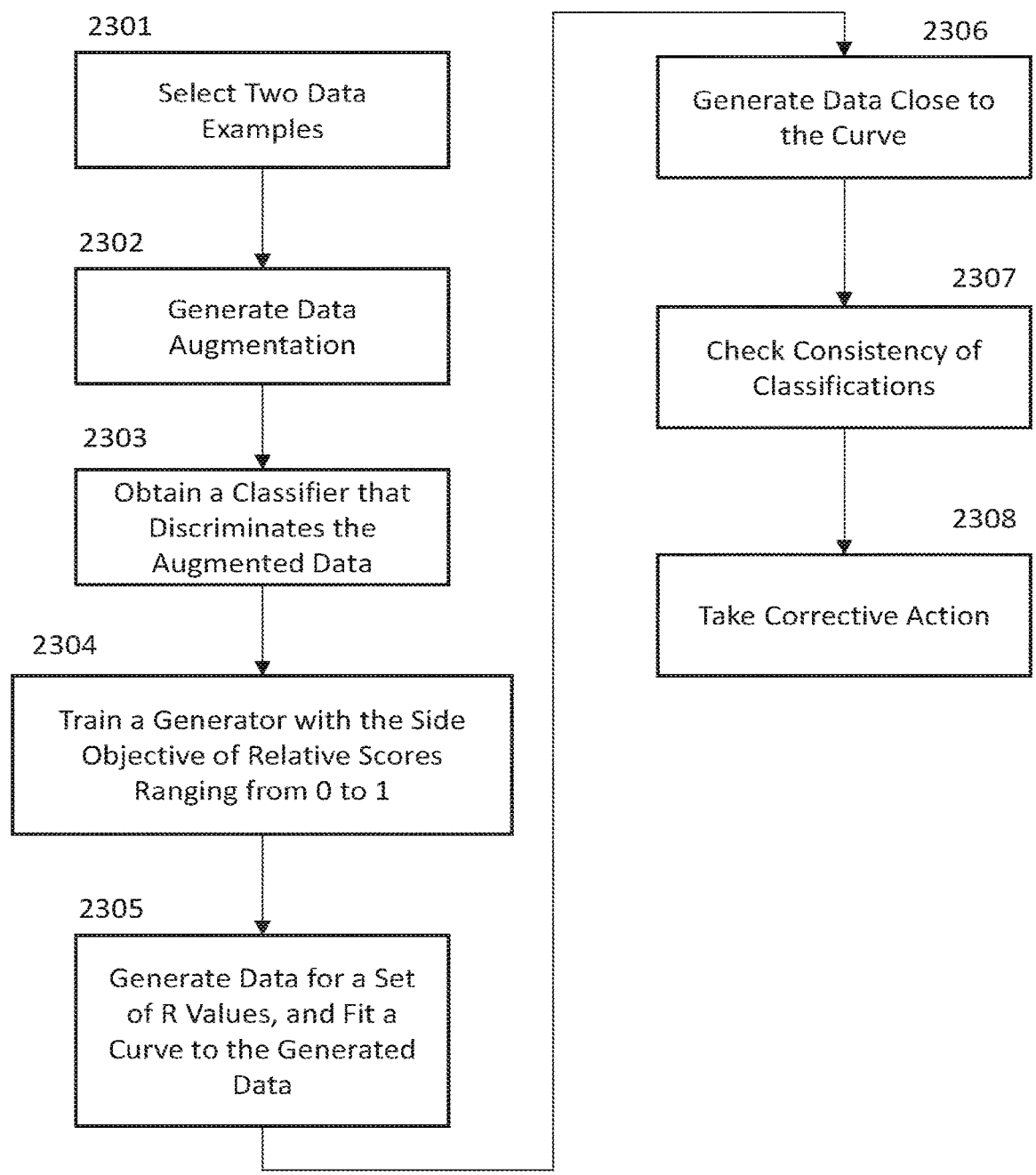
FIG. 23 illustrates a flowchart of a process for generating examples connecting two data examples, according to one aspect of this disclosure.

FIG. 23 illustrates a flowchart of a process for generating examples connecting two data examples. The process illustrated in FIG. 23 could be performed by a computer system, such as the computer system 4100 shown in FIG. 41. The process of FIG. 23 generates data examples that provide points along a curve connecting two specified data points. In some embodiments, it is useful, for example, to test whether the transition between one classification and another is smooth and monotonic or if it fluctuates. However, a linear interpolation between the two original data points may be unrealistic because most of the points in the very high dimensional space do not have the characteristics of real data. In contrast, the generator used in FIG. 23 can have side objectives to make its generated data examples more realistic, such as the generators in FIGS. 8, 9, and 10 or other generators with similar side objectives.

At block 2301, the computer system 4100 selects two data examples.

At block 2302, the computer system 4100 generates more examples as data augmentation of the two selected examples.

At block 2303, the computer system 4100 obtains or trains a discriminator for the augmented data. For any data example X, let S1(X) be the score of the first data example and S2(X) be the score of the second data example. The generator corresponding to block 2304, described below, can use the statistic $R=S1(X)/(S1(X)+S2(X))$.

At block 2304, the computer system 4100 trains a generator with multiple objectives. One of the objectives is that the statistic R has a specified value between 0 and 1. In some embodiments, a separate generator may be trained for each desired value of R.

At block 2305, the computer system 4100 generates data for a set of R values covering the range 0 to 1 and fits a curve to the generated data.

At block 2306, the computer system 4100 generates more data examples along the curve.

At block 2307, the computer system 4100 checks for consistency of the classifications along and near the curve.

At block 2308, the computer system 4100 takes corrective action, if necessary. For example, it may increase the amount of regularization. Note that FIG. 23 tests the need for corrective action in a small local area rather than applying increased regularization throughout the data space.

FIG. 24 is a flowchart of an illustrative embodiment of a process for safely changing a neural network to fix problems with individual data examples even though the neural network has already been trained to convergence. The process illustrated in FIG. 24 could be performed by a computer system, such as the computer system 4100 shown in FIG. 41. The illustrative embodiment implements a process called data splitting, which has been described in association with block 152 of FIG. 1F. It is "safe" in the sense that the new network (or new ensemble) improves performance at least on training data. Since there are more parameters, the new network may overfit the data and perform worse on new data. The process illustrated in FIG. 24 fits into the paradigm of aggressive development and is useful in various embodiments of this invention in which the overfitting is handled by the techniques illustrated in FIG. 1A and others. In some embodiments, the process illustrated in FIG. 24 can be used to build the unrestricted system U of block 192 of FIG. 1A.

Although the illustrative embodiment shown in FIG. 24 is specific to neural networks, data splitting can be applied to any type of machine learning system that has a differentiable objective function, as explained in association with block 152 of FIG. 1F. In an illustrative embodiment of data splitting applied to a general machine learning system, the machine learning system creates an ensemble or adds members to an existing ensemble, rather than working with one or more individual nodes or connections as in FIG. 24.

When a network is expanded such that the addition to the network can represent the identity, the expanded network is capable of computing anything that the smaller network can compute. Therefore, the performance of the expanded network with optimum settings for its parameters is at least as good as the optimum performance of the smaller network, at least on training data. However, when very deep networks are further expanded and retrained, they often perform worse than the smaller network, sometimes catastrophically worse, even on training data. One problem is that it is difficult for the expanded network to learn everything that the smaller network has learned and also to learn to represent the identity on the expanded part.

Starting with a fully trained instance of the smaller network, it is possible to initialize the expanded network, copy all of the parameters of the smaller network and initialize the expanded part to be the identity. This is the process that is done in block 2407 of FIG. 24. For example, a ReLU can be initialized with a bias such that the output of the ReLU is the same as its input. Any neuron, for example a sigmoid neuron, can be replaced by a combination of the original neuron plus a linear unit and a summing neuron, such as the structure shown in 2801 of FIG. 28, with the connection from the sigmoid neuron to the summing neuron initialized to zero. In some embodiments, instead of the linear neuron shown in 2801 a ReLU or some other activation function that can be initialized to represent the identity is used. In this way, any desired expansion to a network can be initialized to be equivalent to the identity.

There is still a remaining problem. In the scenario described, the original network has already been trained to convergence. The expanded network initialized as described will be at or near a stationary point, probably a local minimum. The stationary point may also be a local minimum in the error cost function of the expanded network. The process illustrated in FIG. 24 avoids this problem by first training (2408) at least the expanded part of the new network on a selected subset of the training data (2405), producing a network configuration that is not at the stationary point and that already has improved performance on the selected subset.

The process in an illustrative embodiment begins by working on a single data example that is misclassified by the original network. In some embodiments, the process begins with more than one misclassified data example. In some embodiments, criteria other than misclassification are used to specify the one or more selected data examples. For example, a data example may be selected because many nodes are indecisive on that data example, as defined with FIG. 32.

In an illustrative embodiment, at block 2401, the computer system 4100 identifies the change elements in the network for the designated one or more data examples. Block 2401 includes criteria 2402 for selecting the change element in the network. In one embodiment, a connection weight or the arc associated with the connection is selected as a change element if the partial derivative of the error cost function with respective to the connection weight has a large absolute value. Other embodiments may use one of more of the following examples of criteria 2402 for selecting a node as a change element (in addition to or in lieu of whether the partial derivative of the error cost function with respective to the connection weight has a large absolute value): (1) the error cost function combined with any other objectives for the node has a derivative with respect to the activation value of the node that has an absolute value above some specified threshold; (2) the node is indecisive in the sense defined with FIG. 32; or (3) the node has an incoming or outgoing connection that has been identified as a change element.

At block 2405, the computer system 4100 finds other data examples that share some of the same change elements. It doesn't matter whether the partial derivatives on the other data items have the same sign as the derivatives for the data example in block 2401.

At block 2406, the computer system 4100 optionally clones the original network. Only the new copy will be expanded. If the original network is not cloned, it will be replaced by an expanded network in which the selected change elements have been copied. A copy of a connection is created by copying each of the nodes that it connects.

At block 2407, the computer system 4100 expands the network as described above, producing a new expanded network that is initialized to do the same computation as the original network. In some embodiments, this expanded network is used as a new member in an ensemble. In some embodiments, this expanded network replaces the previous network.

At block 2408, the computer system 4100 initially trains the new network just on the data selected in block 2405. In some embodiments, the training performed by the computer system 4100 at block 2408 uses all the data but gives extra weight to the data selected in block 2405.

In some embodiments, if the original network has been cloned, the computer system 4100 adds a combining network that determines how much weight to give each of the two networks in the combined score at block 2409. The combining network is initially trained to prefer the original network on all data except the data selected in block 2405 and to prefer the new network on the selected data.

After an amount of data selective training determined by a hyperparameter, conventional training is resumed. At block 2404, the computer system 4100 trains the ensemble and combining network, or the expanded replacement network, on all the data.

FIG. 25 is a flowchart of an illustrative embodiment of a process for finding near neighbors to a data example X in a designated set of data examples. The process illustrated in FIG. 25 could be performed by a computer system, such as the computer system 4100 shown in FIG. 41. The designated set might, for example, be the set of training data T or the set of development data Dev. The example X is not necessarily in the designated set. For example, it might be a data example produced by a stochastic generator. Finding near neighbors can be useful in various embodiments of this invention.

At block 2501, the computer system 4100 obtains a data example X.

At block 2502, the computer system 4100 asks whether the search should use brute force. If so, control proceeds to block 2503. If not, control proceeds to block 2506.

At block 2503, the computer system 4100 compares X to every example in the designated set and selects the closest ones. This brute force process is a reasonable choice if the designated set is small. However, in some applications the training set T, for example, may be very large. Some image classification tasks, for example, have over one million images.

At block 2506, the computer system 4100 trains an associative memory. The associative memory should be the type that can retrieve a stored pattern from an incomplete or noisy version of the pattern. An example of such an associative memory is given in FIG. 29. The associative memory only needs to be trained once for any one designated set.

At block 2507, the computer system 4100 generates a random pattern similar to X. Preferably the generator should be based on a stochastic autoencoder, for example, a SCAN.

At block 2508, the computer system 4100 presents the random example to the associative memory and retrieves the associated output pattern.

At block 2509, the computer system 4100 measures the closeness of the retrieved example and whether it is in the designated set. For example, a hash function can be used to efficiently check if the example is in the designated set. Not all retrievals from the associative memory will be in the designated set and not all of them will be close to X. In any case, multiple examples are desired, so control is returned to block 2507 to repeat the loop until the desired number of examples is found.

Many embodiments of this invention use supervised learning. That is, they use labeled training data. However, for some data examples, the nominal label might not be certain. For example, a generated data example Y associated with a data example X with a known label A may be different enough from X that A is not the correct label for Y. Data examples that have been manually labeled may have been labeled incorrectly. There may be data examples that have been labeled automatically by some process such as semi-supervised learning.

Figure 26:
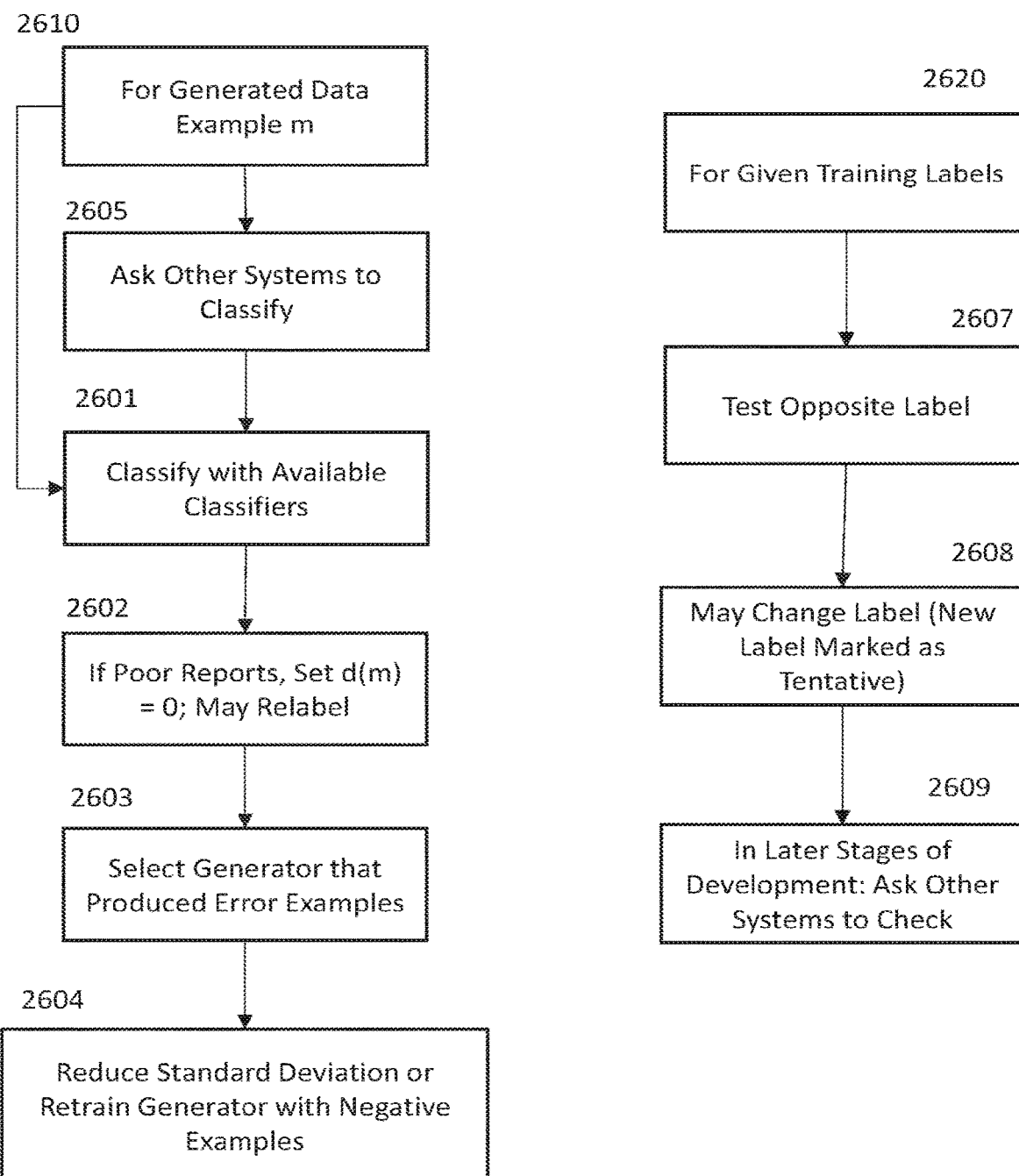
FIG. 26 illustrates a flowchart of a process for altering soft labels and sharing knowledge, according to one aspect of this disclosure.

FIG. 26 discloses one process for addressing issues with potentially mislabeled labeled data by working with soft labels, that is, data examples with labels that may be changed. The process illustrated in FIG. 26 could be performed by a computer system, such as the computer system 4100 shown in FIG. 41. FIG. 26 has two procedures for deciding whether to drop a suspect data example or change its label. A labeled data example is determined to be suspect by various diagnostic procedures. For example, a labeled data example m is suspect if the optimum value of its influence weight hyperparameter $d_m$ is close to 0 or is negative. It is also suspect if it is experimentally determined that the classification performance is improved if the nominal label is changed.

If the data example is generated data or data labeled by semi-supervised learning, then the procedure beginning in block 2610 is used. If the data example is training data supplied with a designated label, then the procedure beginning with block 2620 is used.

From block 2610, the process proceeds to block 2605, at which the computer system 4100 asks other systems to classify the data example. In some embodiments of this invention, different systems differ in the way they partition the training and development data or the order in which they use the sets of development data. In such embodiments, it is a judgement call whether to use the information from block 2605. Some embodiments may skip this block.

In the procedure starting from block 2610, only generated data is to be labeled.

However, knowledge about how another system classifies a generated data example might give away information about nearby data examples that are in the training data of the other system. This danger may be significant, for example, with a lot of queries in a task with a small, low dimensional data space. The danger of giving away forbidden information is less if the data space is high dimensional and only a small number of queries of this type are used. If all systems set aside the same validation and test data, then the final validation and test remain valid.

At block 2601, the computer system 4100 classifies the data with the available classifiers.

At block 2602, the computer system 4100 compiles the information. If the report is worse than some criterion set by the designer, then $d_m$ is set to 0, dropping the example from future training. In some embodiments, a test is run to see if the classification performance is improved if the label is changed. If so, then the label is changed, but the new label is marked as tentative. A tentative label may be changed back whenever changing it back improves the classification performance.

At block 2603, the computer system 4100 selects the generator that produced the error examples.

At block 2604, the computer system 4100, in some embodiments, reduces the standard deviation of the generator. However, the generator standard deviation is a hyperparameter subject to be changed in an optimization of hyperparameters. In some embodiments, nearby examples of other categories are used as negative examples to train the generator.

In the procedure beginning at block 2620, control proceeds to block 2607, at which the computer system 4100 tests performance when the label for the suspect data example is changed. If the result of the test is positive at a magnitude greater than ε, which may be based on statistically significance, some embodiments may change the label (e.g., by the computer system 4100 at block 2608). The new label is marked as tentative.

In embodiments in which multiple systems use the same training data, or in later stages of incremental development in which many other systems will have used the data example as training data, the systems that have used it as training data are asked by the computer system 4100 to report their experience with the label at block 2609. If a consensus agrees, the label is changed.

FIGS. 27A and 27B are block diagrams of an illustrative embodiment of learning by imitation facilitated by generators. The elements of FIG. 27B are the same as the elements of FIG. 27A, except FIG. 27B, is specific to neural networks and includes soft ties between nodes in network 2701 and network 2706. The systems and processes illustrated in FIGS. 27A and 27B could be implemented on a computer system, such as the computer system 4100 shown in FIG. 41. Both the embodiment in FIG. 27A and the embodiment in FIG. 27B may be used, for example, to transfer knowledge from a less restricted machine learning system, such as system U in FIG. 1A, to a more restricted system. Either embodiment may also be used, for example, to transfer knowledge from an ensemble to a single classifier. The embodiment of FIG. 27A may be used to transfer knowledge from one type of machine learning system to another type of machine learning system.

In either FIG. 27A or 27B, block 2703 is a generator or simulator. For example, 2703 may be a SCAN, as illustrated in FIG. 6C, or an MGM, as illustrated in FIG. 20. Generator 1, block 2703, generates data for machine learning system 2701 to classify and for machine learning system 2706 to imitate the classification done by machine learning system 2701.

In either FIG. 27A or 27B, block 2704 is a generator that augments real data. For example, block 2704 may be, for example, an enhanced VAE+, an enhanced SCAN+, or a MGM.

At block 2702, the example machine learning system 2701 receives input from generator 1 2703.

As indicated by block 2705, the training machine learning system 2706 may receive input from either generator 1 or generator 2. When block 2705 receives input from generator 1, target 2708 for machine learning system 2706 is the output 2707 produced by machine learning system 2701 from the same input. When block 2705 receives augmented real data from generator 2, target 2708 for machine learning system 2706 is the category of the data example of real data that was the basis for the augmented data produced by generator 2.

The embodiment illustrated in FIG. 27B is specific to neural networks and includes soft tying of nodes between the two networks. The networks as drawn show the example of a network with fewer layers transferring knowledge to a network with an expanded number of layers. However, the embodiment illustrated in FIG. 27B may also be used to transfer knowledge from a network with more layers to a network with fewer layers. The embodiment illustrated in FIG. 27B can transfer knowledge from any neural network classifier to any other neural network classifier. It should be noted that the number of layers in the networks 2701, 2706 is merely illustrative and the networks 2701, 2706 can have any number of layers.

FIG. 27B illustrates, for example, learning by imitation from an original network 2701 to the expanded network 2706, supported by two generators. An example of the use of the embodiment illustrated in FIG. 27B is the expansion of a neural network following a data split. If it is done at the time of a data split, the selected subset of the data split is initially used to generate more than its proportionate share of the data in the real data augmented by generator 2 2704. Generator 1 2703 generates data for transferring as in FIG. 1B. Generator 2 2704 augments real data so there is an unlimited amount from each generator. In addition to the output objectives received from the output classification of network 2701 and the category labels from the augmented real data 2704, there is internal soft tying of nodes in the original network to nodes in the expanded network. In some embodiments, the soft tying is not applied for the problem data that is used to make the data split.

For purposes of illustration, FIG. 27B only shows a few arrows indicating nodes that are soft-tied from the original network to the expanded network. However, in some embodiments all the nodes of the smaller network will be tied to one or more nodes in the larger network. Also, although any node in the original network 2701 can be tied to any node in the expanded network 2706, in many of the embodiments in which network 2706 has more layers, for each layer in the original network 2701, there will be one or a small number of layers in the new network 2706 that is a copy of that one layer in the original, with each node in the original network 2701 initially soft-tied to the corresponding node in each copy of the layer. In some embodiments, preferably the strength of the soft tying is gradually decreased during the training of the new network 2706.

The technique illustrated in FIG. 27B can also be used to transfer knowledge from any network to any other network trying to learn the same classification task. For example, the technique of FIG. 27B can be used to transfer knowledge from the relatively unrestricted system U in the aggressive development illustrated by FIG. 1C to any of the other networks that are more restricted than system U.

Although FIG. 27B is shown making a dramatic expansion in the number of layers, in some embodiments, only one layer is added at a time. FIG. 27B can also be used when only a local change is made, such as adding or deleting a single node. In some embodiments, when a local change is made, outside the area of the local change all of the nodes are initially soft-tied to the corresponding nodes in the new network with relatively strong ties.

In some embodiments, the soft ties illustrated in FIG. 27B are eventually reduced to zero strength during the course of training, for nonlocal changes as well as for local changes.

FIG. 28 shows illustrative examples of combinations of nodes or compound nodes that are useful in various embodiments of this invention. The depicted nodes can be utilized in machine learning networks implemented by a computer system, such as the computer system 4100 illustrated in FIG. 41. The first example 2801 is a compound node consisting of a nonlinear (NL) node (i.e., node 2), such as a sigmoid, paired with a linear (L) node (i.e., node 1), also called a linear companion. In some embodiments, a linear companion is added to a nonlinear node to avoid the "vanishing gradient" problem that sometimes occurs when a node with an activation function such as a sigmoid is trained to saturation. If the pair is replacing an existing single nonlinear node, the connection weight for the linear node is initially zero. In some embodiments, a compound structure such as example 2801 is used when a new layer is added to a network during incremental development such block 181 of FIG. 1E or block 153 or 156 of FIG. 1F. In such an embodiment, node 1, the linear companion node, is initialized to the identity and the weight of the nonlinear node is initially 0.

The second example 2802 is for a compound of three nodes replacing a node that is being split in a data split such as in FIG. 24 and in block 152 of FIG. 1F. Node 5 is a special control (SC) node. A special control node controls the weight of the connections, self-programming data selection. If a node is being split at a data split, the special control node is initially trained to implement the data split. The special control node's activation value p is substituted as the connection weight for node 3 and (1−p) is substituted for the connection weight for node 4. If node 5 has an activation of 0 or 1, it effectively selects one of the two other nodes and drops out the other. In a data split, node 5 is initially trained to select the original node, say node 3, for the regular data and to select the other node, node 4, for the special split data.

Example 2803 is an example of three-node structure that serves as a detector. The nodes in this three-node detector structure are used as output nodes in FIGS. 18 and 20. In some embodiments, this three-node structure is used as a feature detector in inner layers of a deep neural network. In some embodiments, such a detector is trained somewhat differently from a conventional classifier. In a conventional classifier, the correct classification is given as a target for supervised training. In a two-class classification problem, typically a sigmoid output node is used with a target value of 1 for one class and 0 for the other. In some embodiments, a detection may represent one category D of many categories and the problem is to detect instances of category D and to reject all others. However, in the training data for a detection problem there might be no categorical labels to distinguish among all the other categories.

In some embodiments of this invention, the three-node structure 2803 is used. For a training example with the label for category D, the target output is 1 for node 6 ("Detect") and 0 for the other two nodes. However, in an illustrative embodiment, the target output for a data example not in category D is modified depending on the amount of activation for node 6. In this illustrative embodiment, if node 6 is highly activated by an example that is not in category D, it is desired that the example be trained to be actively rejected. That is, the target for this example should be for node 7 to be active.

If node 6 has an activation above a threshold specified by a hyperparameter for an example that is not in category D, then the target value of node 7 ("Reject") is 1 and is 0 for the other two nodes. However, if the activation of node 6 is below the threshold, then this example does not need to be actively rejected, so the target value for node 6 is 0, but the target values for nodes 7 and 8 are controlled by hyperparameters as a design decision that controls relative proportion of reject examples. For example, if the "Reject" label is only to be used when required to reject a high activation of node 6, then in this case of a low activation of node 6, both node 7 may have a target of 0 and node 8 may have a target value of 1. If a relatively higher proportion of "Reject" labels is desired, then node 7 and node 8 may both have a target value of 0.5 in this case. The goal is for node 6 to be trained to detect instances of category D, for node 7 to learn to actively reject data examples that are incorrectly recognized as category D or close to being incorrectly recognized as category D, and for node 8 ("Neutral") to absorb most of the other data examples, but the relative proportion between "Reject" and "Neutral" can be independently controlled by the hyperparameters.

In some embodiments, these compound node structures are introduced into a network as an addition to the network during incremental development. In some embodiments, a local change of replacing a single node with a compound node structure such as in the examples just discussed is simply followed by ordinary training, preferably with a data split if the compound structure allows for that. In other embodiments, learning by imitation such as illustrated in FIG. 1B or FIG. 27A is used.

FIG. 29 is an illustrative embodiment of a robust associative memory with corrective training. The system and process illustrated in FIG. 29 could be implemented on a computer system, such as the computer system 4100 shown in FIG. 41. The associative memory 2904 is a large machine learning system, for example a deep neural network. In a sense, an associative memory represents the ultimate of a machine learning system overfitting its training data. The task of an associative memory is to memorize its training data. A robust associative memory, such as illustrated in FIG. 29, not only memorizes its training data, it is able to retrieve an example from its training data given only a partial, degraded input. In FIG. 29, the dashed arrows represent backpropagation for training and the solid arrows represent feedforward for activation, with backpropagation in the opposite direction.

FIG. 29 illustrates the training of the robust associative memory. Each training example is presented multiple times with random degradations. The original input data pattern (2901) is degraded and/or transformed or distorted (2902). Then a subset of the degraded pattern is sampled (2903). The associative memory machine learning system is trained to predict the full pattern (2905) with the original, undegraded input data example as its target (2906). The predicted pattern (2905) is also fed back as input to the associative memory (2904). With each round of feedback, the associative memory (2904) refines its prediction (2905) of the full, undegraded pattern. In this recursion, the associative memory may, for example, recover part of the missing parts and remove part of the noise and distortion in the first round of the recursion. With that more complete, somewhat cleaner input, it then recovers more in the next round, and so on. The memorized patterns are the fixed points of this recursive process.

The training process illustrated in FIG. 29 also includes negative feedback from negative examples, such as 2907 and 2908. For example, the recursive function implemented by the associative memory 2904 may have other fixed points in addition to the memorized training data examples. In some embodiments, the associative memory is trained to eliminate such extra fixed points by training it not to generate them as output by negative feedback from them as negative examples (2907 or 2908). Another example use of negative feedback is to get associative memory 2904 to forget or erase the memory of a pattern it has been previously trained to remember. Another example, in some embodiments of this invention, is to train a separate associative memory to learn all the patterns in one classification category but not to learn examples from any other category. The negative examples then give negative feedback to output that matches a different category than the intended category, for example, as judged by an independent classifier.

In some embodiments of this invention, an associative memory as illustrated in FIG. 29 is used as the ultimate unrestricted classifier system U from which other, more restricted systems are derived, for example as used in blocks 192 and 193 of FIG. 1A.

Figure 30:
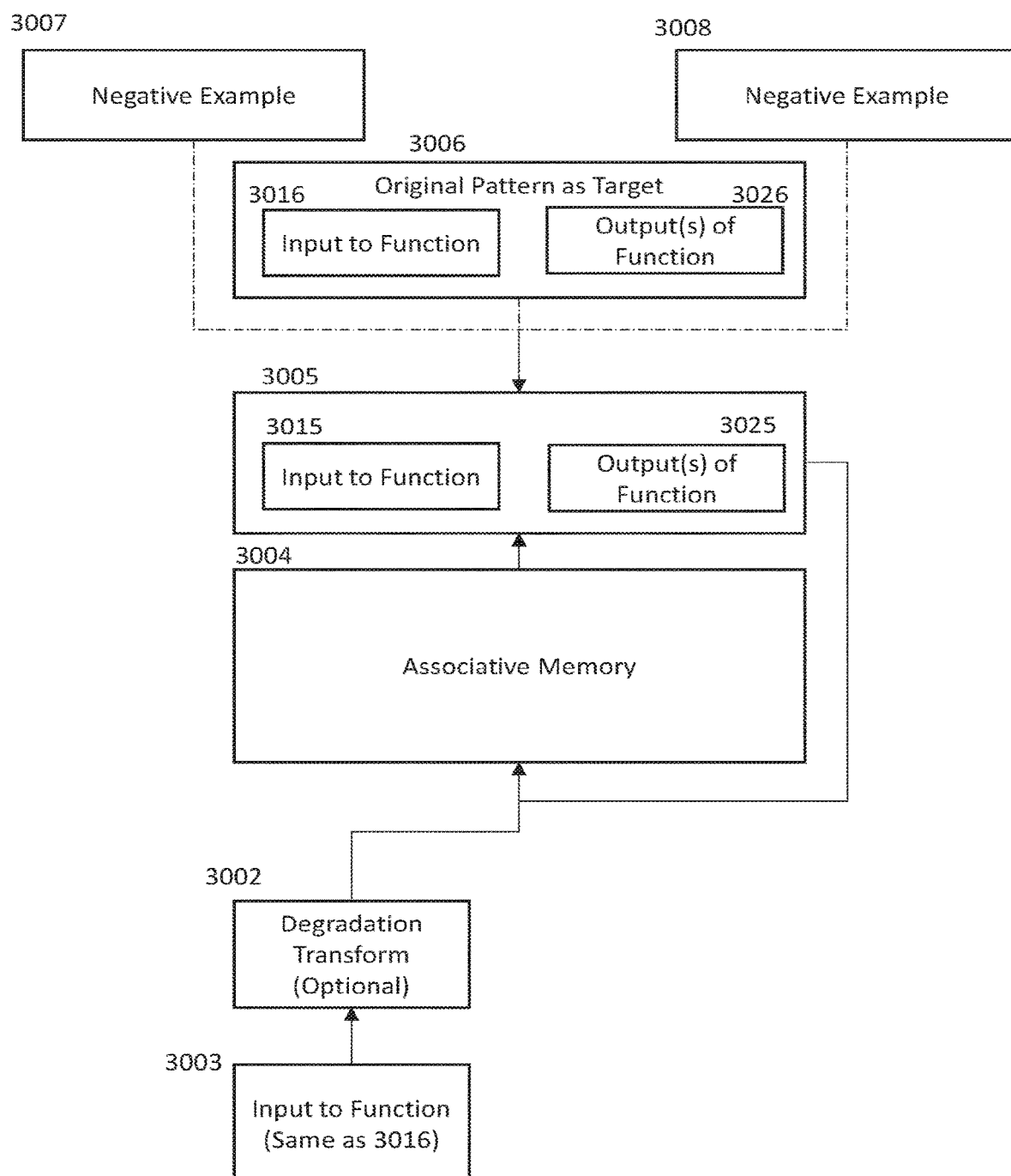
FIG. 30 illustrates a flowchart of a process for training an associative memory to memorize a function or multivalued relation, according to one aspect of this disclosure.

An associative memory can also memorize a function or a multivalued relation (e.g., a set of transformations), for which an illustrative embodiment is shown in FIG. 30. The input and the output of the function or relation can be vector-valued, so the function or relation may, for example, represent a transformation of the data space of a machine learning system. The blocks and functions of the illustrative embodiment shown in FIG. 30 are similar to the corresponding elements in FIG. 29, with one major exception: The sampling of a random subset of the input pattern that occurs in block 2903 of FIG. 29 is replaced by the fact that the associative memory in FIG. 30 is only provided the input to the function or relation. In some instances in some embodiments, the associative memory is only provided a degraded version of the input.

In some embodiments of this invention, an associative memory as illustrated in FIG. 30 is used to memorize a set of transformations such as those discussed in FIGS. 17A, 17B, and 17C. A set of transformations learned by an instance of FIG. 30 may, for example, be used to learn a set of transformations to be used in block 2902 of FIG. 29. It can even learn a set of transformations to be used in another instance of FIG. 30.

A robust associative memory limits its overfitting because of the noise, distortion, and subsampling of the input. In some embodiments, the amount of noise, distortion, and subsampling is deliberately reduced to produce a more unrestricted system U in aggressive development such as illustrated in FIG. 1A. In other embodiments, even a system U may be desired to have more restrictions or a different architecture than the associative memory of FIG. 29. In such cases, the desired system U can be trained from an associative memory such as FIG. 29 by learning by imitation, for example as illustrated in FIGS. 1B, 27A, and 27B. In some embodiments, an associative memory such as FIG. 29 is also used to train the more restrictive systems created, for example, in block 193 of FIG. 1A. This training by learning by imitation from an associative memory may be in place of, or in addition to, the learning by imitation from the relatively unrestricted system U.

Figure 31:
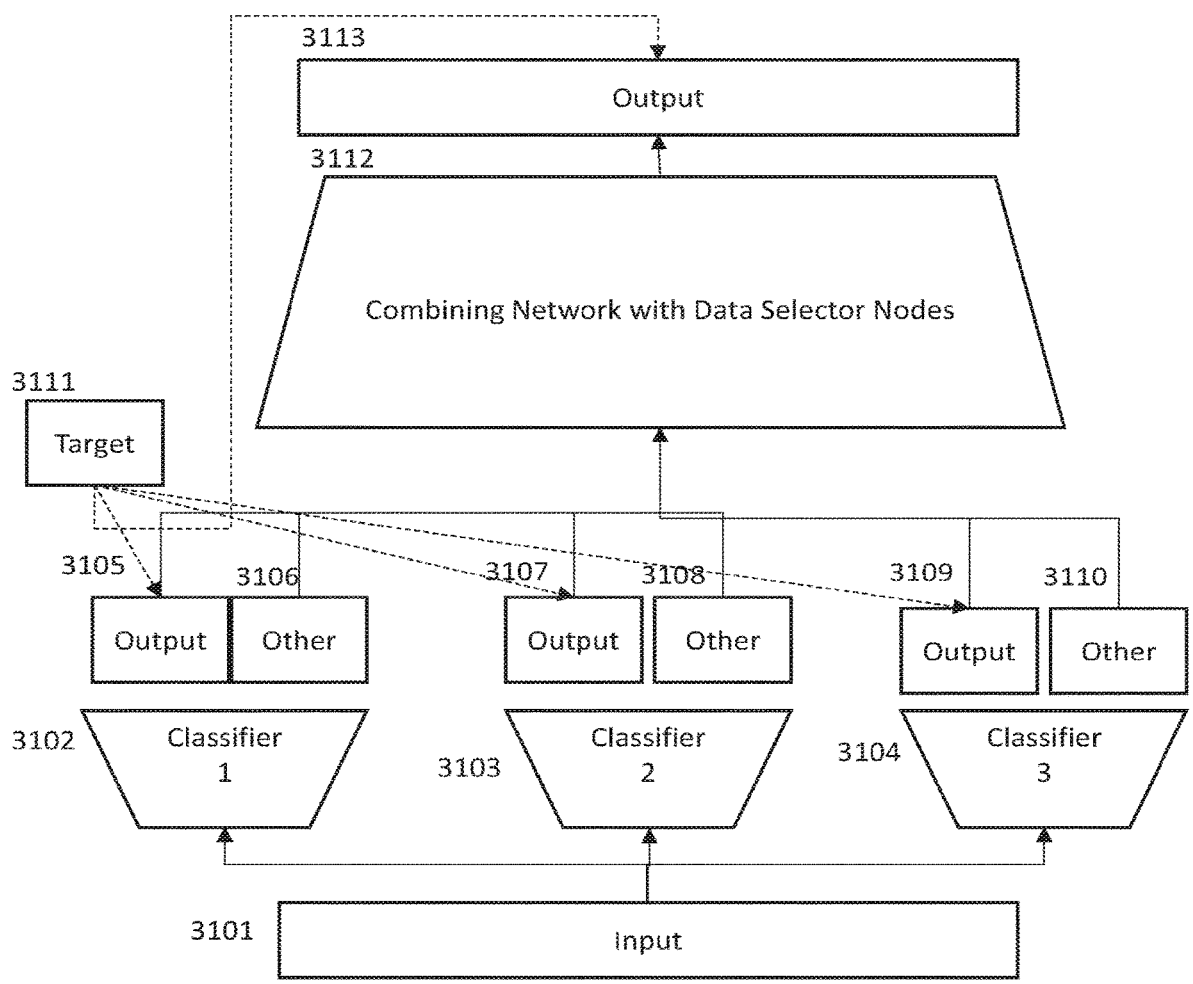
FIG. 31 illustrates a block diagram of an ensemble of classifiers with a combining network, according to one aspect of this disclosure.

FIG. 31 is a block diagram of an illustrative embodiment of an ensemble of classifiers with a combining network. The system illustrated in FIG. 31 could be implemented on a computer system, such as the computer system 4100 shown in FIG. 41. In some embodiments, the combining network is initialized to match the normal voting or combining rule for the ensemble. The combining network then trains using stochastic gradient descent to improve the performance. FIG. 40 illustrates the use of the technique of FIG. 31 for multiple rounds of incremental development and improvement in performance.

In an illustrative embodiment, a combining network 3112 with output 3113 is added to an ensemble of trained classifiers, 3102, 3103, and 3104 with outputs 3105, 3107, and 3109. Although only three ensemble members are shown, the ensemble may have any number of members.

Block 3101 provides the input for each classifier in the ensemble. Block 3111 provides the output target for each member of the ensemble as well as for the combining network 3112.

In the illustrative embodiment, the combining network is a feedforward neural network with optional special function nodes, such as $y=x^2$ and $y=\log(x)$. In some embodiments, the special function nodes are used to represent the normal combining rule for the ensemble. The combining network 3112 is trained using back propagation to compute the partial derivatives for stochastic gradient descent. In some embodiments, combining network 3112 also contains data selector nodes, such as shown in 2802 in FIG. 28.

Back propagation from the combining network 3112 causes the ensemble member networks 3102, 3103 and 3104 to be jointly trained to optimize their combined objective, i.e., the target 3111 for the output 3113 of the combining network 3112. With this back propagation, the combining network 3112 is much more than a combining network that merely optimizes itself.

The aforementioned joint optimization also provides a performance improvement beyond the performance that can be achieved by training the ensemble members separately, even when using a technique, such as boosting, in which a new ensemble member is trained to optimize the incremental performance improvement, given the all previous ensemble members. When ensemble members are added incrementally, and the combining network 3112 is then optimized, the joint optimization through the combining network 3112 adds the additional step of optimizing every existing ensemble member based on all of the ensemble members that were added later. Furthermore, back propagation from combining network 3112 can also achieve this joint optimization for other ensemble building techniques in which new ensemble members are trained independently or otherwise not trained to optimize the incremental performance given previous ensemble members.

In this illustrative embodiment, in addition to the regular output nodes of each ensemble member being matched against the target output 3111, each member of the ensemble also has an added set of output nodes (3106, 3108, and 3110), marked "other," supplied as additional input to the combining network 3112. These additional nodes are trained by back propagation from the combining network 3112 without any error cost function from the target output 3111. They are trained to learn whatever produces the best combined output 3113. The combining network can train these nodes to get information from the internal nodes of each network member that will enable the combining network to make changes in how it combines the scores from the ensemble members. For example, the combining network may be able to learn to compute a confidence score for each ensemble member and give the ensemble member an appropriate weight in the combined score. The confidence score and how to use it can be learned automatically without human-supplied rules. Through this mechanism, the capabilities of the combining network are a superset of anything that could be computed in a conventional fixed ensemble voting rule or other combining rule.

Figure 32:
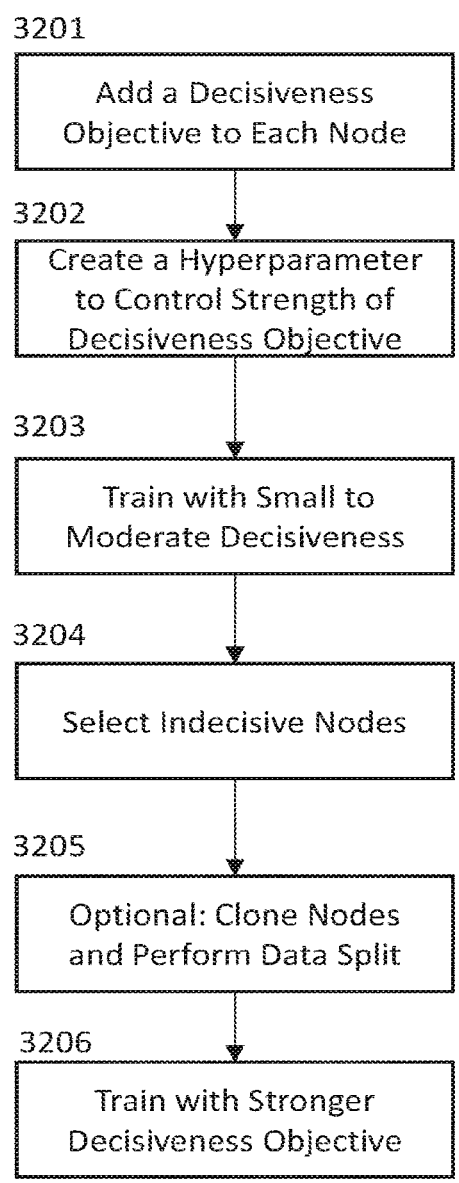
FIG. 32 illustrates a flowchart of a process for training the nodes in a neural network to be decisive, according to one aspect of this disclosure.

FIG. 32 is a flowchart of an illustrative embodiment of a procedure that trains nodes in a neural network to be decisive. The process illustrated in FIG. 32 could be performed by a computer system, such as the computer system 4100 shown in FIG. 41. This procedure applies to nodes that have activation functions such as the sigmoid function or the tan h function in which there are two extreme activation levels with a neutral activation in between. In this embodiment, a node may have more than one objective, including the back propagation the error cost function from the output target, soft tying to other nodes, and additional objectives applied to middle layers of the network, as illustrated in FIG. 34. A node is decisive on a data example if the direction of the combined derivative of any back propagated objectives and any regularization terms is in the direction that would cause an update of the learned parameters to increase the difference between the node activation and the neutral activation value for the node. For purpose of defining the property of being decisive, a group of nodes such as illustrated in example 2801 is considered as a unit, with the derivative of combining node marked "+" taken as the derivative for the unit. In the illustrative embodiment, a neutral point in the activation function is defined. For example, the neutral point for a sigmoid or tan h activation is the inflection point, an activation of 0.5 for the sigmoid or 0.0 for tan h. For a ReLU, the neutral point is the break point at 0.0.

In some embodiments that select nodes based on decisiveness, the selection is based on a specified set of data examples, such as the entire training set, or all the examples in a category or all the examples in a cluster. In some embodiments, the selection criterion for a node to be decisive with respect to a set of data examples is that the node is decisive for all but a specified fraction of the examples in the set. The node is indecisive for the set of examples if it is indecisive for more than the specified fraction of the examples in the set.

At block 3201, the computer system 4100 adds a decisiveness objective to each selected node. In an illustrative embodiment, this objective of decisiveness is in the form of multiplying the combined derivative of any back propagated objectives or regularizations terms by a constant larger than 1.0 on each data item on which the node is not decisive. The size of the multiplicative constant or other penalty is controlled by a hyperparameter. In some embodiments, the amount of the correction is also based on amount of deviation of the activation from the neutral point. For example, some embodiments use an L1 penalty that is proportional to the absolute value of the difference between activation and the neutral point. Some embodiments use an L2 penalty that is proportional to the square of the difference between the activation value and the neutral point. No penalty is added if the derivative of the network objective with respect to the node activation agrees with the activation.

Figure 33:
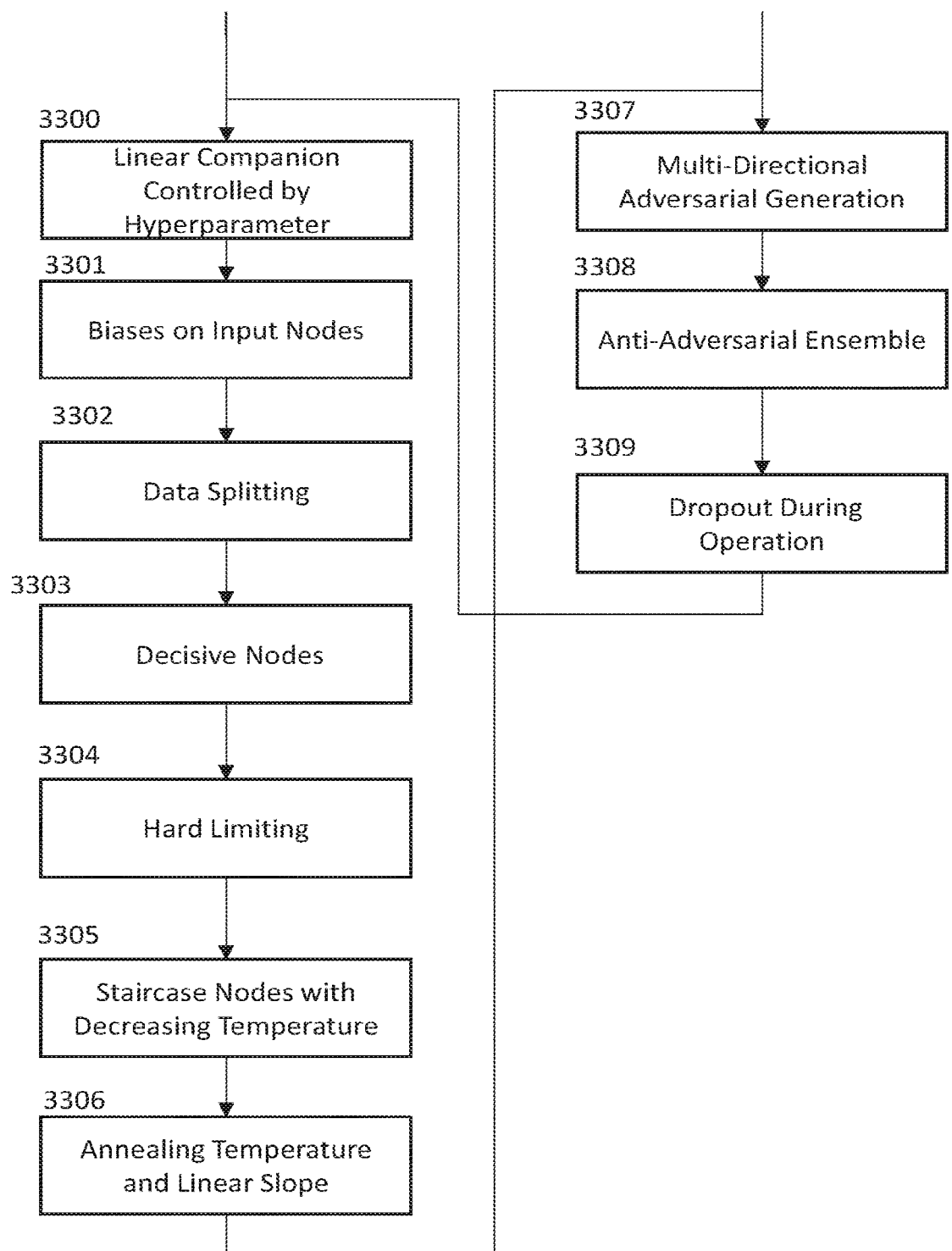
FIG. 33 illustrates a flowchart of a process for training individual nodes and/or a network as a whole to be resistant to adversarial examples, according to one aspect of this disclosure.

At block 3202, the computer system 4100 creates a hyperparameter to control the strength of the penalty. This hyperparameter has different values in block 3203 and block 3206. In some embodiments, it may also vary during the course of the overall training. For example, some embodiments impose no decisiveness or less decisiveness during early training but gradually increase the decisiveness penalty later. Some embodiments impose decisiveness only near the end of training, for example, to achieve robustness against adversarial examples as illustrated in FIG. 33.

At block 3203, the computer system 4100 trains with a low to moderate value for the strength of the decisiveness penalty. The purpose of this training is to get most of the nodes to be decisive through a slower process that allows more exploration of parameter space before imposing a stronger penalty.

At block 3204, the computer system 4100 selects the nodes that are still not decisive after the training in block 3203.

At block 3205, the computer system 4100 optionally clones some or all the nondecisive nodes and does selective data-split training as illustrated in FIG. 24.

At block 3206, the computer system 4100 sets a stronger decisiveness penalty and trains with that penalty.

In some embodiments of incremental development in which a network is incrementally grown, such as in block 181 of FIG. 1E and blocks 153 and 156 of FIG. 1F, nodes in older portions of the network are trained to be more decisive before the network is expanded. This makes these older nodes more stable as the newer portions of the network are being trained. In other embodiments, it may be more desirable to keep the older portions of the network more fluid. The process is under control of hyperparameters that can be optimized as the situation requires.

FIG. 33 is a flowchart of anti-adversarial tactics in an illustrative embodiment of this invention. The various techniques illustrated in FIG. 33 could be performed by a computer system, such as the computer system 4100 shown in FIG. 41.

The process of FIG. 33 is in two parts. There is a first process beginning at block 3300 that makes one or more individual nodes more resistant to adversarial examples. There is also a second process beginning at block 3307 that trains the network as a whole to be more resistant to adversarial examples. The process of FIG. 33 can start at either block 3300 or at block 3307. When one part of the process is completed, then the other part can be done. In some embodiments, the two parts are repeated in succession multiple times. In other embodiments, only one of the two processes is executed.

At block 3300, the computer system 4100 receives a list of one or more nodes to make more robust. If no nodes are specified, the computer system 4100 itself specifies a set of nodes that are not decisive, in the sense described in FIG. 32, at block 3300. In some embodiments, the computer system 4100 selects nodes for which the partial derivative of the error cost function with respect to the node is larger in magnitude than a specified value at block 3300. In some embodiments, the computer system 4100 may add one or more nodes to the list of specified nodes that it receives at block 3300. In such embodiments, the computer system 4100 may add nodes that are not decisive or nodes with large magnitude partial derivatives, or both, at block 3300.

In some aspects, at block 3300, the computer system 4100 can add a linear companion node or an extra linear term to the activation function of each of the one or more specified nodes. An example of a linear companion node is the compound node structure 2801 shown in FIG. 28. The linear component helps the one or more specified nodes learn to become more decisive during training. The slope of the linear component is controlled by a hyperparameter. In some embodiments, the slope of all linear components is eventually set to zero to make the network more robust against small changes.

At block 3301, the computer system 4100 adds biases to the input nodes. These biases adjust the level of each input node so that the partial derivative of the output objective with respect to each input node is zero, when averaged across the training data. This sets the stage for data splitting based on input nodes as well as interior nodes.

At block 3302, the computer system 4100 performs data splitting. An illustrative embodiment of the process of data splitting was discussed, for example, in association with block 152 of FIG. 1F and another illustrative embodiment is described in more detail in FIG. 24. Data splitting introduces extra nodes that help to lower the error rate into the network. Data splitting also has the effect of helping the network reduce the magnitude of gradients on individual data items by clustering data into groups with similar gradients that can then be trained to a local minimum by stochastic gradient descent.

At block 3303, the computer system 4100 trains nodes to be more decisive, such as via the process illustrated in FIG. 32. Decisive nodes are substantially more resistant to adversarial examples than nondecisive nodes.

At block 3304, the computer system 4100 replaces the activation function of some or all node activation functions with an activation function with hard limits. For example, a sigmoid activation function could be replaced by hardsig(x) =max(0.01, min(0.99, sig(x))). A node with an activation at its hard limit is obviously resistant to small adversarial changes. In some embodiments, the activation function includes a linear component with a small slope controlled by a hyperparameter that will eventually be set to zero.

At block 3305, the computer system 4100 introduces "staircase" activation functions, i.e., the sum of a monotonic piece-wise constant function and a sigmoid function on the fractional part of the argument, which produces a smooth staircase-like function with the temperature of the sigmoid as a control on the degree of smoothing. In some embodiments, the computer system 4100 utilizes an annealing schedule for the temperature, eventually reducing the temperature to zero, which causes the staircase function to become a discontinuous piece-wise flat step function at block 3305. Some embodiments use staircase functions in the lowest layers, where they have the most impact in preventing change in output due to small adversarial changes in the input. A zero-temperature staircase activation function for each input node, for example, would eliminate any change smaller than the step size.

At block 3306, the computer system 4100 performs annealing in general and also reduces the slope of any linear components, eventually converging them to zero. Block 3306 then passes control to block 3307.

Block 3307 can either start the process or can follow block 3306. At block 3307, the computer system 4100 generates adversarial examples. In the illustrative embodiment, the computer system 4100 makes adversarial changes at block 3307 by making a small change in each of the input variables. The direction of change for each input variable is determined by back propagating a partial derivative from a selected output objective function.

An adversarial example for any input pattern can be generated simply by back propagating the objective for correct classification of the current input pattern. That process will produce an adversarial example if the sum of the small changes times their respective gradient components is enough to drop the output score for the correct answer to below the score of the best scoring wrong answer. However, the technique just described chooses only one adversarial direction for each pattern.

Instead, at block 3307, the computer system 4100 preferably chooses as a target an output function that specifies scores for each member of a subset of incorrect answers.

Thus, the computer system 4100 can generate adversarial examples in any of $2^{n-1}$ subspaces, where n is the number of categories for the classification, at block 3307. For example, the computer system 4100 could let the output objective be for all the selected wrong answers to get the same score, and still have $2^{n-1}$ different adversarial directions, at block 3307. By randomly choosing the subset of wrong answers, the computer system 4100 can generate a virtually unlimited number of adversarial examples for each data example to help train the network to be robust against adversarial changes at block 3307.

At block 3308, the computer system 4100 makes the system robust in a different way. The adversarial examples generated based on the partial derivatives of the output function with respect to the input values, either the simple one-dimensional example, or the multidimensional examples of block 3307, are specific to the configuration of the network for which the partial derivatives are computed. An adversarial example computed that way would not necessarily cause other members of an ensemble to make the same mistake. From a theoretical point of view, using an ensemble instead of a single network does not avoid the problem of adversarial examples. Any ensemble can be embedded into a single network by implementing the ensemble voting computation as a combining network, as illustrated in FIG. 31. Back propagation on that combined network could then find adversarial examples to the whole ensemble. As a practical matter, at block 3308, the computer system 4100 creates resistance to adversarial examples by training an ensemble to be resistant to the adversarial examples generated at block 3307. Once the ensemble is trained, the computer system 4100 can then generate examples that are adversarial to the whole ensemble and train the ensemble on them at block 3307.

At block 3309, the computer system 4100 uses dropout, a process normally used only during training, for classification during operational use as well as during training. Dropout sets the activation to zero for a randomly selected set of the nodes. From one point of view dropout randomly selects a network from an ensemble of $2^m$ networks, where m is the number of nodes in the network. An adversarial example computed for one of these networks would not necessarily work for another. An actual ensemble can be built from a number of dropout networks that are randomly selected after the adversarial example is presented. Thus, the adversarial example cannot be computed specific to the gradients of randomly selected ensemble.

Block 3309 passes control to block 3300, unless a stopping criterion for multiple passes through the loop has been met.

FIG. 34 is a block diagram of an illustrative example of a type of neural networks useful in various embodiments of this invention. The system illustrated in FIG. 34 could be implemented on a computer system, such as the computer system 4100 shown in FIG. 41. The neural network 3401 has node sets, such as output nodes 3403 and output nodes 3404, in middle layers of the network that have target values 3402 like output nodes. In some embodiments, these inner-layer output node sets 3403 and 3404 back propagate the partial derivatives of their error cost functions to nodes in lower layers of the network, giving those lower-layer nodes multiple objectives, including this objective that is not as distant as the objective from final output layer. The relative strengths of the multiple objectives are controlled by hyperparameters. Having multiple objectives reduces the effective number of degrees of freedom, reducing the tendency to overfit. Having a less distant objective reduces wandering in parameter space during training. In some embodiments, the inner-layer node sets 3403 and 3404 that have output target objectives also have back propagation objectives from nodes in higher layers.

In some illustrative embodiments, these inner-layer output node sets 3403 and 3404 result from one or more layers being added above the output layer in an existing network. For example, in FIG. 31 a combining network is added to an ensemble while each member of the ensemble continues to have an objective of matching its output to the target. In some embodiments of incremental development (e.g., block 181 of FIG. 1E, block 153 of FIG. 1F, or block 156 of FIG. 1F), the added nodes may be one or more layers added on top of the former output layer. In some illustrative embodiments, the former output layer continues to receive an error cost function as well as receiving back propagation from the new layers. In some embodiments, sets of output nodes with externally specified targets may be put anywhere in the inner layers of the network. The output targets for the inner layer nodes may be different from the targets for the final output. For example, in some embodiments, inner layer nodes may have targets as feature detectors.

Similarly, in some illustrative embodiments, input nodes 3405 and 3406 with externally specified activation values may be put anywhere in the network. The input values may be values copied from the regular input layer or may be values from a different source, such as a stand-alone support network computing features shared with other networks.

Figure 35:
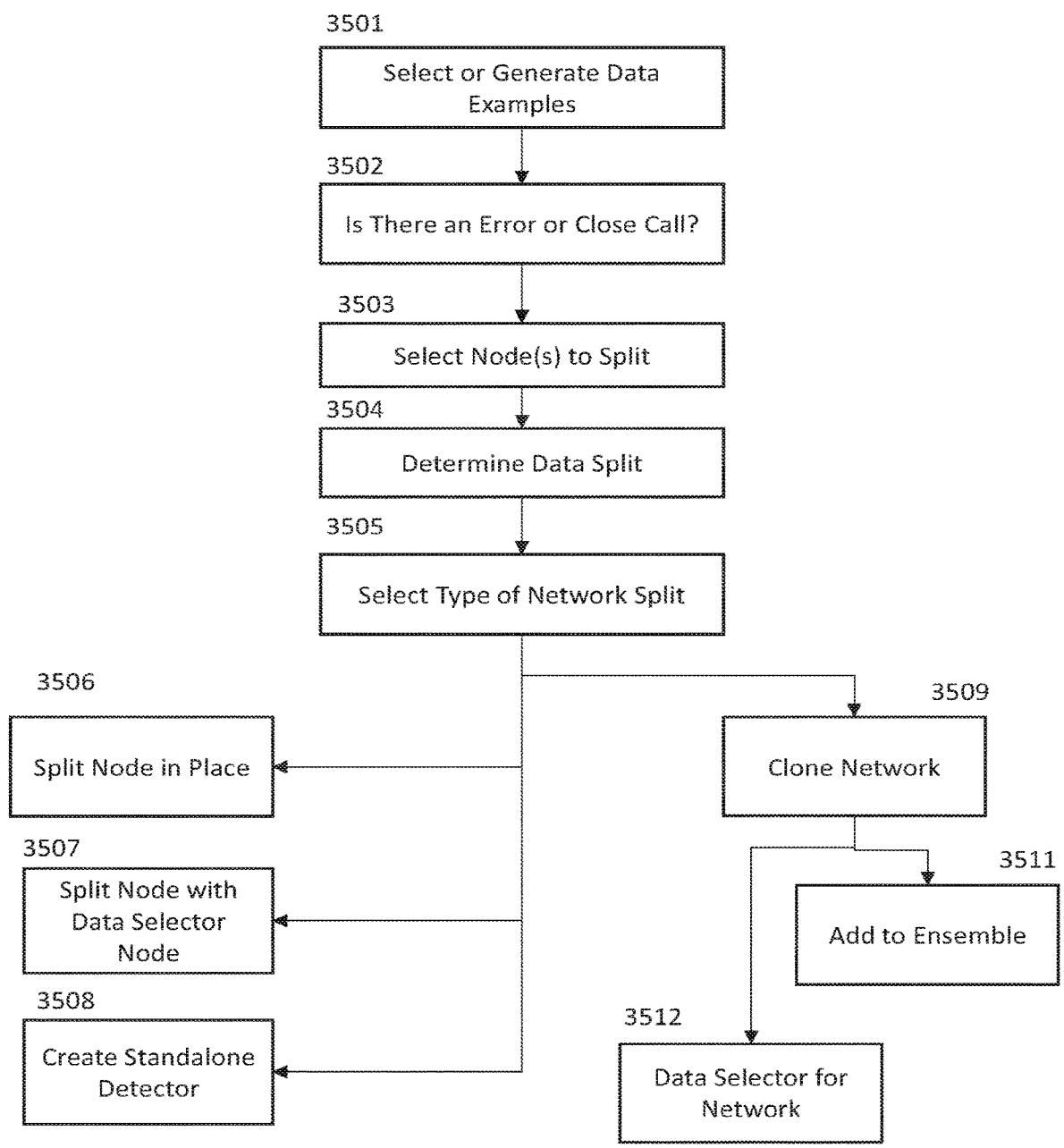
FIG. 35 illustrates a flowchart of process for repeated data splitting and incremental growth of a network or ensemble that results in continued improvement in performance on a training set, according to one aspect of this disclosure.

FIG. 35 is a flowchart of an illustrative embodiment of a process of repeated data splitting and incremental growth of a network or ensemble that results in continued improvement in performance on a training set. The process illustrated in FIG. 35 could be performed by a computer system, such as the computer system 4100 shown in FIG. 41. In some embodiments, the resultant network or ensemble is used as the unrestricted system U in block 192 of FIG. 1A.

At block 3501, the computer system 4100 selects data from an existing set of training data, or expands the set of data if more data is available or can be generated, for example, by automatic data augmentation. At block 3501, the computer system 4100 selects data examples on which the classifier makes an error or has a close call.

At block 3502, the computer system 4100 asks whether there is an example of an error or close call. This query can be answered by, for example, a system like the system disclosed in FIG. 1G. As long as there is an error or close call, the process of improvement may continue.

At block 3503, the computer system 4100 selects one or more nodes for data splitting, using criteria such as illustrated in FIG. 24.

At block 3504, the computer system 4100 determines the data split, that is, which data examples go into each subset of the data split. For example, the computer system 4100 may use the procedure illustrated in block 2401 of FIG. 24 at block 3504. In some embodiments, the computer system 4100, at block 3504, forms a vector of partial derivatives of the error cost function with respect to the set of nodes selected in block 3503. The data examples are then clustered based on the directions of the vectors of the partial derivatives.

At block 3505, the computer system 4100 selects the type of network splitting to be used. If a node is to be split within an existing network, the control proceeds to block 3506, 3507, or 3508. If a new network is to be created to form an ensemble or to add a member to an ensemble, then control goes to block 3509. Blocks 3506, 3507, and 3508 illustrate three ways that a network may be grown and trained following a data split.

For each node to be split, at block 3506, the computer system 4100 copies the node in place, with each copy of the node having the same connections as the original node. Then the network with the two new nodes is trained, but for some amount of training following the data split, the back propagation is controlled by a procedure like controlled dropout. For this interval of training, each of the two new nodes only receives back propagation from one part of the split data. In some embodiments, if more than one node is being split, each node may have an individualized split of the data.

At block 3507, the computer system 4100 also makes a copy of each node to be split. In addition, the computer system 4100 adds a data selection node, as illustrated by node 5 in FIG. 28, at block 3507. The data selection node is first trained to classify the data according to the data split for the node being cloned. Then the data selection node continues training as part of the on-going training of the network.

At block 3508, the computer system 4100 creates a new node that is a dedicated detector for one of the parts of the data split. As an illustrative embodiment, the computer system 4100 can use a procedure like the one illustrated in FIG. 18 at block 3508. In some embodiments, the procedure of block 3508 is used when a single data example, and perhaps its individual data augmentation examples, is one side of the data split. In these embodiments, the detector node is trained to detect the side of the data split containing the selected data example and its augmentation examples. This illustrative embodiment allows error correction on an individual data example while minimizing the effect on other data examples and thus lessening the risk of errors caused by overfitting. By itself, the dedicated detector may not generalize well to new data. However, when used in an unrestricted system U as described in FIG. 1A, the resulting more restricted system may learn to generalize to new data. In addition, if the system with the dedicated detector is used as network 2701 in FIG. 27B, it may be able to transfer knowledge, including knowledge represented by the dedicated detector, to network 2706 of FIG. 27B. Network 2706 may have an architecture that enables it to generalize that knowledge to new data.

At block 3509, the computer system 4100 clones the entire network, with the two copies, at least for some amount of training, each selectively being trained on only one subset of the data split. Some embodiments use this procedure so that the new network can be trained producing what may be substantial changes in the network without disturbing the knowledge that the original network has learned.

After the network is cloned, control goes to either block 3511 or block 3512.

At block 3511, the computer system 4100 adds the new network to an ensemble.

At block 3512, the computer system 4100 creates a larger network containing the original network and the copy of the network and a data selection node such as used in block 3507.

In one embodiment, the process illustrated in FIG. 35 is repeatedly iterated until a stopping criterion is met. In each iteration, the performance on training is improved, producing an unrestricted system U with arbitrarily high performance. In some embodiments, in some iterations, a corresponding restricted system R is also built and trained, for example, by the process illustrated in FIG. 27B.

Figure 36:
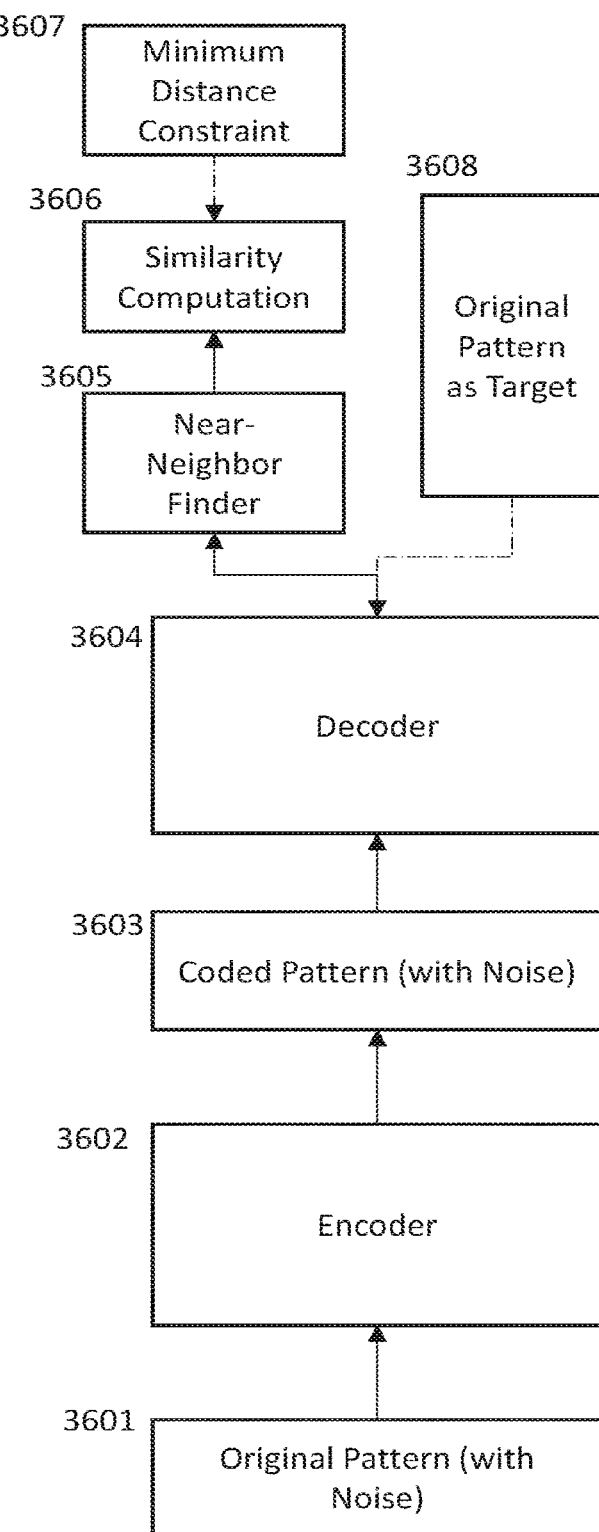
FIG. 36 illustrates a block diagram of a variational autoencoder (VAE) or SCAN having an additional objective, according to one aspect of this disclosure.

FIG. 36 is a block diagram of VAE or SCAN with an additional objective. The system illustrated in FIG. 36 could be implemented on a computer system, such as the computer system 4100 shown in FIG. 41. Blocks 3601, 3602, 3603, 3604, and 3608 comprise a conventional VAE or SCAN, depending of the method of constraining the latent variables in the stochastic block 3603. The difference from a regular VAE or SCAN in the illustrative embodiment shown in FIG. 36 comprises the blocks 3605, 3606, and 3607.

At block 3605, the computer system 4100 finds the nearest neighbor it can in the training set to the output pattern generated by block 3604. At block 3606, the computer system 4100 computes the distance between that near neighbor and the output pattern based on a distance measure that may depend on the embodiment. In some embodiments, the distance measure may be the Euclidean distance or some other metric in the data space of the input variables. In some embodiments, the distance measure may be in a particular encoding, such as a feature vector. In some embodiments, block 3606 finds near neighbor candidates retrieving them as the output from a robust associative memory such as illustrated in FIG. 29.

Whatever the distance measure, at block 3607, the computer system 4100 compares the distance to a constraint that sets a minimum allowed value for the distance. The computer system 4100 adds an extra penalty term to the cost function if the minimum distance constraint is violated at block 3607. This prevents the generator from simply copying the input and helps the generator learn to generalize from the training data. VAE or SCAN systems including an addition objective function, such as the system described in connection with FIG. 36, could be utilized, for example, as a system to detect plagiarism by being able to detect patterns that are close, but not exact, matches to the original pattern.

Figure 37:
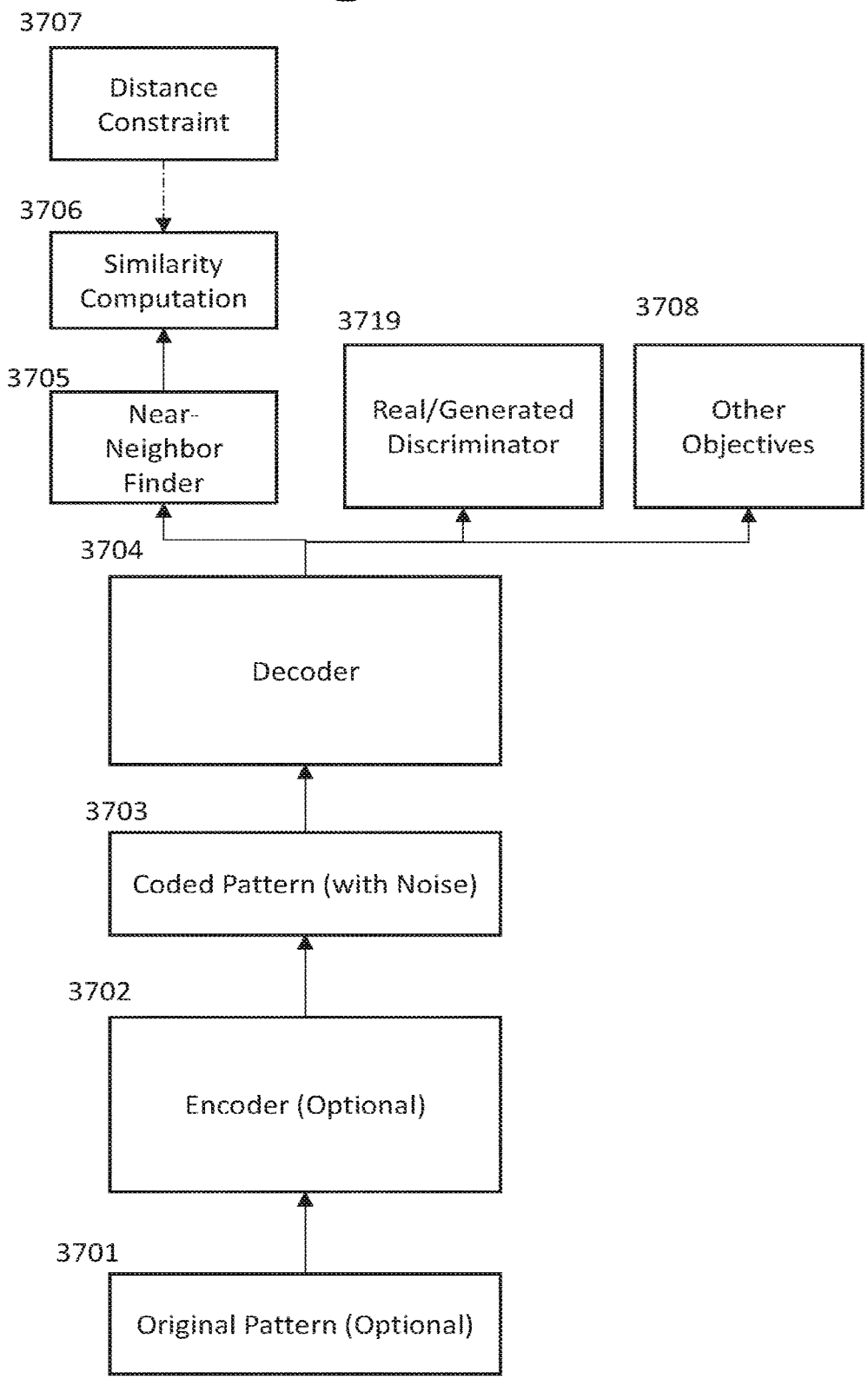
FIG. 37 illustrates a block diagram of a generator including a real-vs-generated discriminator, according to one aspect of this disclosure.

FIGS. 37 and 38 are generators that use a real-vs-generated discriminator such as is used in a GAN. However, they each also have other objectives that help prevent mode collapse during their training. The systems illustrated in FIGS. 37 and 38 could be implemented on a computer system, such as the computer system 4100 shown in FIG. 41.

FIG. 37 is similar to FIG. 36, except for the addition of the real-vs-generated discriminator 3719. The original pattern objective of block 3608 is replaced by the more general "other objectives" of block 3708. Various embodiments of FIG. 37 can represent enhancements to a VAE, a SCAN, or a GAN. For a VAE or a SCAN, blocks 3701 and 3702 are only used in training. For a GAN they are not used at all. The three types have different stochastic blocks 3703. A GAN generates a vector of random variables directly without training latent variables as output from an encoder 3702. The SCAN and the VAE have different constraints in the training of the latent variables.

Like FIG. 36, FIG. 37 has a component, blocks 3705, 3706, and 3707, that can be utilized to allow the system to function as an anti-plagiarism detector. This component prevents the real-vs-generated discriminator 3719 from causing the network to merely memorize the training data. In some embodiments, the real-vs-generated discriminator 3719 has been trained on dataset disjoint from near neighbor set. The block 3708 supplies additional objectives. In an illustrative embodiment enhancing a VAE or a SCAN, the additional objectives include the autoencoder target of producing a copy of the input and may include other additional objectives. In general, the extra objectives of block 3708 help any of the three types of generator generalize from the training examples and help prevent the mode collapse that might be caused by the real-vs-generated objective 3719.

FIG. 38 is another example of a block diagram that can represent an enhanced version of any of the generator types. FIG. 38 adds two new types of objective. Block 3822 is trained to detect noise or distortion. In some embodiments, it is trained as a discriminator with supervised training including original images and noisy and distorted versions of the same images. Block 3821 is a different kind of objective, it uses a classifier, but the classifier is trained separately, not with the objective used in the training shown in FIG. 38. In the training in FIG. 38, the objective from which block 3821 back propagates to the generator is a multitarget objective. That is, in block 3821, the target output for the classifier is not a single category but rather includes target activation levels for multiple categories. For example, the objective may be for category A and category B to both have an activation of 0.5. Because no data example in the training data for the classifier 3821 should have such an ambiguous score, block 3821 imposes an implicit constraint that the generated pattern not match the training data for classifier 3821. The training data for classifier 3821 can include the training data for the real-vs-generated discriminator 3819. The multicategory target of classifier 3821 then prevents an output pattern that matches an example in the training data for discriminator 3819 from being an optimum for the overall objective.

FIGS. 36, 37, and 38 provide three illustrative examples of ways in which multiobjective enhancements to GANs, VAEs, and SCANs can be trained to generalize from their training data and to avoid mode collapse with a real-vs-generated discriminator as one of their objectives.

FIG. 39 summarizes some of the techniques that facilitate training very deep neural networks in various embodiments of this invention. The techniques described in connection with FIG. 39 could be performed by a computer system, such as the computer system 4100 shown in FIG. 41. To aid the discussion, the techniques are organized into four lists that operate in various ways that complement each other. Although the assignment in general groupings is useful to guide the discussion, it is not definitive. For example, learning by imitation can be done from a smaller network to a larger network, facilitating incremental growth, or from a larger network to a smaller network to help correct overfitting.

Because to the high degree of nonlinearity of the functions computed by a deep neural network, the training process tends to do a lot of exploration. That is, the point in parameter space tends to wander during training, moving back and forth, rather than following a smooth path. Block 3901 lists techniques that tend to help the training process follow a smoother path:

1. Temporarily increase temperature: In some embodiments, the activation function is a sigmoid with a temperature: $\sigma(x)=1/(1+\exp(-x/T))$, where $T$ is a hyperparameter, as illustrated in the pseudocode above. In some embodiments, the temperature is customized for each node. This customization enables a learning coach to control the temperature for a node so that partial derivatives with respect to the activation of the node stay in the middle region of the sigmoid, yielding larger partial derivatives for the nodes that need it, tending to give smoother, faster learning in the early stages.
2. Gradient normalization by layer: Gradient normalization by layers, illustrated in the pseudocode, prevents the gradients from growing successively larger or smaller at a potentially exponent rate as they are back propagated through successive layers.
3. Nodes with objectives: When the output objective is back propagated through many layers, the connection between the final output objective and the activation of nodes many layers away is very indirect, giving the qualitative effect of an unmoored boat drifting in the waves. Nodes in middle layers that have direct objectives in addition to the back propagated objective have a stabilizing effect. In some embodiments, the direct objectives in a middle layer are a copy of the final output objective. When a network is grown incrementally by layers, as in some embodiments of block 181 of FIG. 1E and block 156 of FIG. 1F, this middle layer objective helps the middle layer nodes retain the knowledge they learned before extra layers were added. FIG. 34 shows an illustrative embodiment of a network with nodes in middle layers having output objectives. Soft tying of node activations also gives nodes in middle layers objectives in addition to the back propagation of the error cost function.
4. Dropout: Dropout is a known technique that has been empirically shown to improve performance of deep learning in many cases, although there are several competing theories for the reason of its success. In embodiments of this invention, dropout is generalized and controlled, both through customized hyperparameters that can directly control which nodes are dropped and through data selection nodes that control dropout in a way that is trained to the data.
5. Noisy data selection: Although data selection nodes generalize dropout and thus have an effect of smoothing the training process, their primary use in embodiments of this invention is to support data splitting and the training that follows. Data splitting contributes to incrementally growing larger, deeper networks. Noisy data selection nodes, another generalization of dropout, also contribute to smoothing the training process. Dropout randomly selects whether to drop a node. A data selection node has a data-depended activation between 0 and 1 that is like a fractional dropping of each. A noisy selection node has a random component added to its selection process. In some embodiments, the random component produces weights of 0 or 1, like dropout but with probabilities may be dependent on the activation value of the data selection node.
6. Copying across layers: Copying activation values directly across layers applies to operational use of deep learning as much as to learning. It cuts down the path between nodes separated by multiple layers and thus reduces problems from the length of the connection path.

Supplying knowledge to the inner layers of a deep neural network clearly aids the learning task and clearly helps even more with deeper networks. Block 3902 lists a few examples of importing external knowledge that are used in various embodiments of this invention:

1. Learning by imitation: Learning by imitation can transfer knowledge from a smaller network to a larger network, which facilitates growing a deeper neural network. It also can be used to transfer knowledge from an ensemble of shorter, wider networks to a single, deeper, thinner network with a smaller total number of parameters. With fewer parameters, the deeper network may even have less of a tendency to overfit.
2. Soft ties to other networks: Among the embodiments of soft tying, nodes in different networks can be soft-tied when the networks are analyzing the same data example. In a distributed system with many classifiers working in parallel, such as illustrated in FIG. 2, there can be many instances of such soft tying. Soft tying is efficient in distributed networks because the information takes very few bytes to communicate.

3. Feature nodes (semi-supervised learning): Feature nodes are an example of nodes that can be soft-tied across different networks. More generally, feature nodes can be trained with supervised or semi-supervised learning from other networks doing classification on the same data or from a support network or another machine learning system that is dedicated to detecting the feature.

Several embodiments of this invention make structural changes in a network that grow it gradually while also potentially lowering its error rate. Block 3903 lists some example techniques that combine growth and learning in the same process:

1. Incremental learning
   a. A few layers at a time: Increasing the depth of a neural network is only one aspect of incremental learning. Growing a network a few layers at a time without the need for retraining is the key to an illustrative embodiment of a method able to keep growing a neural network without any limit. Doing this growth while also continually lowering the error rate requires the integration of many other techniques in this disclosure.
2. Data splitting: Data splitting is the key to repeatedly lowering the error rate, with no limit except perfect performance on the training data, as illustrated in FIG. 35. It can also be utilized to continually lower the error rate as a network is incrementally grown deeper.
3. Ensemble with combining network: Any ensemble can be converted into a single network by adding on top a combing network that emulates or improves on the ensemble voting scheme, as illustrated in FIG. 31. The performance of this new, larger, deeper network can be improved in turn by expanding it into an ensemble, using data splitting, for example, and other methods. This alternation of single network and ensemble is another paradigm for unending continued improvement in performance while increasing the depth, as illustrated in FIG. 40.
4. Soft ties within a network: Soft ties of nodes within a network can be done for both node activations and for connection weights. They reduce the number of effective degrees of freedom while also sharing knowledge within the network, letting the nodes that acquire some knowledge share that knowledge with other nodes.
5. Internal autoencoders: Autoencoders acquire knowledge by unsupervised learning. An autoencoder network within a larger neural network can auto-encode any set of nodes within the network, not just the input nodes. Autoencoders acquire knowledge and learn to represent that knowledge efficiently. With an autoencoder inside a larger network, that knowledge is available to other nodes in the network, as illustrated in FIG. 6F.

Various kinds of special nodes are used for several purposes in embodiments of this invention. Block 3904 lists some examples:

1. Feature nodes (unsupervised): Feature nodes have already been mentioned as benefitting from and contributing to sharing external knowledge. However, feature nodes can also be trained by unsupervised learning, without external knowledge. For example, features can be discovered and trained jointly with clusters. Features can also be learned by internal autoencoders, especially an autoencoder with a sparse bottle-neck layer.
2. Sparse node sets: Sparse node sets can learn features whether they are a bottle-neck layer of an autoencoder or just stand-alone sparse node sets. Sparse node sets also lower the effective number of degrees of freedom while also providing an efficient encoding of knowledge.
3. Softmax node sets: Internal node sets that have their activations combined with a softmax function also naturally learn features, provide a representation of knowledge that can be compactly encoded by the index of the most activated node, and lower the effective number of degrees of freedom.
4. Compound nodes: Any single regular node can be replaced by a compound node that can perfectly emulate the node being replaced while adding additional capabilities. Some embodiments can arrange to lower the error rate wherever such a compound node is introduced as a replacement to a regular node.
5. Data selection nodes: Data selection is valuable as a tool in data splitting. Multiple data selection nodes can substantially reduce the amount of computation by selecting only a small fraction of a network or an ensemble to perform computation on any one data example. In addition, data selection nodes provide a means for a network to program itself.

The embodiments of the systems described herein are based upon four main techniques for improving or augmenting the performance of machine learning systems, which then in turn combine and entwine many additional techniques that are shared among the main techniques. The main techniques are (1) aggressive development, as illustrated in FIG. 1A, (2) incremental unlimited improvement, as illustrated in FIG. 35, (3) incremental growth, for example in the depth of a neural network, as illustrated in FIG. 27B, and (4) cooperative generators that can generate an unlimited amount of data to support the growth.

Each main technique by itself can make dramatic improvement in the performance of a machine learning system. However, they can also be combined together to have an exponential effect on the performance of a machine learning system. For example, continual incremental improvement as illustrated in FIG. 35 only guarantees improved performance on training data. However, when integrated with aggressive development, continual incremental improvement provides the ability to build and train an excellent unrestricted system U. The bracketing of system U and more restricted systems in the embodiment of aggressive development illustrated in FIG. 1A provides a means to leverage the excellent performance on training data to improved performance on development data.

FIG. 40 is a flowchart for an illustrative embodiment of another method of unlimited incremental improvement. The process illustrated in FIG. 40 could be performed by a computer system, such as the computer system 4100 shown in FIG. 41. The process of FIG. 40 is based on incremental growth of ensembles as illustrated by, for example, blocks 152 and 153 of FIG. 1F alternating with combining the ensemble into a single network as illustrated in, for example, FIG. 31.

In one illustrative embodiment, at block 4001, the computer system 4100 incrementally grows an ensemble from a single system or smaller ensemble by creating one or more new ensemble members as illustrated by blocks 152 and 153 of FIG. 1F. The data split operation of block 152, as explained in more detail in FIG. 24, causes the new ensemble members to specialize on selected subsets of the data. In some embodiments, the structure 2802 of FIG. 28, with a data selection node, continues the specialization training. However, any ensemble growing method may be used and, accordingly, some embodiments of the process illustrated in FIG. 40 use other methods for growing the ensemble. There are many ensemble growing methods that are known to those skilled in the art of machine learning. In one embodiment, each ensemble member is a neural network or other machine learning system that can be trained by back propagation.

At block 4002, the computer system 4100 tests whether the performance improvement due to incrementally growing the ensemble is saturating and reaching diminishing returns. If not, control is returned to block 4001 for further growth of the ensemble. If the improvement from adding additional members to the ensemble is reaching diminishing returns, control is passed to block 4003.

At block 4003, the computer system 4100 combines the ensemble into a single network, for example by the method illustrated in FIG. 31. In some embodiments, this combined network can be used, for example, as system U in FIG. 1A.

In some aspects of the illustrated process, block 4004 is omitted from or otherwise skipped during the execution of the process by the computer system 4100. At block 4004, the computer system 4100 optionally transfers the knowledge to one or more systems that are more restricted as illustrated, for example, by blocks 193 and 194 of FIG. 1A. The knowledge transfer may be done, for example, by the methods illustrated in FIGS. 1B, 27A, and 27B.

In one illustrative embodiment, at block 4005, the computer system 4100 optimizes the performance of system U and the one or more restricted systems as measured by performance on a development set by, for example, using the methods illustrated in FIGS. 1A, 1C, 1D, 1E, 1F, and various other figures of this disclosure. In some embodiments, at block 405, the computer system 4100 optimizes the performance on training data, rather than development data. In some of these embodiments, the process can always make an incremental improvement, for example by using the methods illustrated in FIGS. 24, 31, and 35, unless the system is already at a global optimum with respect to the training data. The process eventually converges to globally optimum performance on the training data or, in other words, to an optimum of the unrestricted system U.

Until a stopping criterion is met, block 4005 then returns control to block 4001 to build an ensemble from the one or more systems trained in block 4005. In some embodiments, the final combined network is used as the unrestricted system U in block 192 of FIG. 1A to start a final round of aggressive development. In some embodiments, the stopping criterion may be whether convergence has occurred, in the sense that the process makes no improvement in performance from one iteration to the next. Since in some embodiments an improvement is always achievable at each step except at a global optimum, the convergence in these embodiments must be at the global optimum. In some embodiments, the stopping criterion may be that the amount of computation or the size of the system reaches a predefined limit.

At any of the blocks 4001, 4004, or 4005, the computer system 4100 may add to the set of training data either by using one or more generators for data augmentation or by incrementally adding former development sets to the training set, as illustrated by block 134 of FIG. 1F.

FIG. 41 is a diagram of a computer system 4100 that could be used to implement the embodiments described above. The illustrated computer system 4100 comprises multiple processor units 4102A-B that each comprises, in the illustrated embodiment, multiple (N) sets of processor cores 4104A-N. Each processor unit 4102A-B may comprise onboard memory (ROM or RAM) (not shown) and offboard memory 4106. The onboard memory may comprise primary, volatile, and/or non-volatile storage (e.g., storage directly accessible by the processor cores 4104A-N). The offboard memory 4106 may comprise secondary, non-volatile storage (e.g., storage that is not directly accessible by the processor cores 404A-N), such as ROM, HDDs, SSD, flash, etc. The processor cores 4104A-N may be CPU cores, GPU cores, and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 4110 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 4104A-N may train and/or implement different networks or subnetworks or components. For example, in one embodiment with reference to FIG. 20, the cores 4104A-N of the first processor unit 4102A may implement the generators 2001-2003 and the cores 4104A-N of the second processor unit 4102B may implement the detectors 2011-2013. Further, different sets of cores 4104A-N in the first processor unit 4102A may be responsible, respectively, for each generator 2001-2003 and different sets of cores 4104A-N in the second processor unit 4102B may be responsible, respectively, for each detector 2011-2013. As another example, in one embodiment with reference to FIG. 7, the cores 4104A-N of the first processor unit 4102A may implement the generator 701 and the cores 4104A-N of the second processor unit 4102B may implement the regression machine learning system 706. As yet another example, in one embodiment with reference to FIG. 9, the cores 4104A-N of the first processor unit 4102A may implement the stochastic autoencoder 901, the cores 4104A-N of the second processing unit 4102B may implement the regression machine learning system 706, the cores of yet another processing unit (not shown) may implement the denoising system 908, and the cores of yet another processing unit (not shown) may implement a real vs. generated discriminator for the other objectives 910. As yet another example, in one embodiment with reference again to FIG. 9, the cores 4104A-N of the first processing unit 4102A may implement the stochastic autoencoder 901, the first set of cores 4104A of the second processing unit 4102B may implement the regression machine learning system 706, the second set of cores 4104B of the second processing unit 4102B may implement the denoising system 908, and another set of cores 4104N of second processing unit 4102B may implement a real vs. generated discriminator for the other objectives 910. One or more host processors 4110 may coordinate and control the processor units 4102A-N.

In other embodiments, the system 4100 could be implemented with one processor unit 4102A-N. In embodiments where there are multiple processor units, the processor units could be co-located or distributed. For example, the processor units 4102 may be interconnected by data networks, such as a LAN, WAN, the Internet, etc., using suitable wired and/or wireless data communication links. Data may be shared between the various processing units 4102 using suitable data links, such as data buses (preferably high-speed data buses) or network links (e.g., Ethernet).

The software for the various computer systems 4100 described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "processing," "computing," "calculating," "determining," or the like, refer to the action and processes of a computer system e.g., the computer system 4100 of FIG. 41), or similar electronic computing device, that manipulates and transforms data represented as physical (electronic) quantities within the computer system's registers and memories into other data similarly represented as physical quantities within the computer system memories or registers or other such information storage, transmission or display devices.

Figure 42:
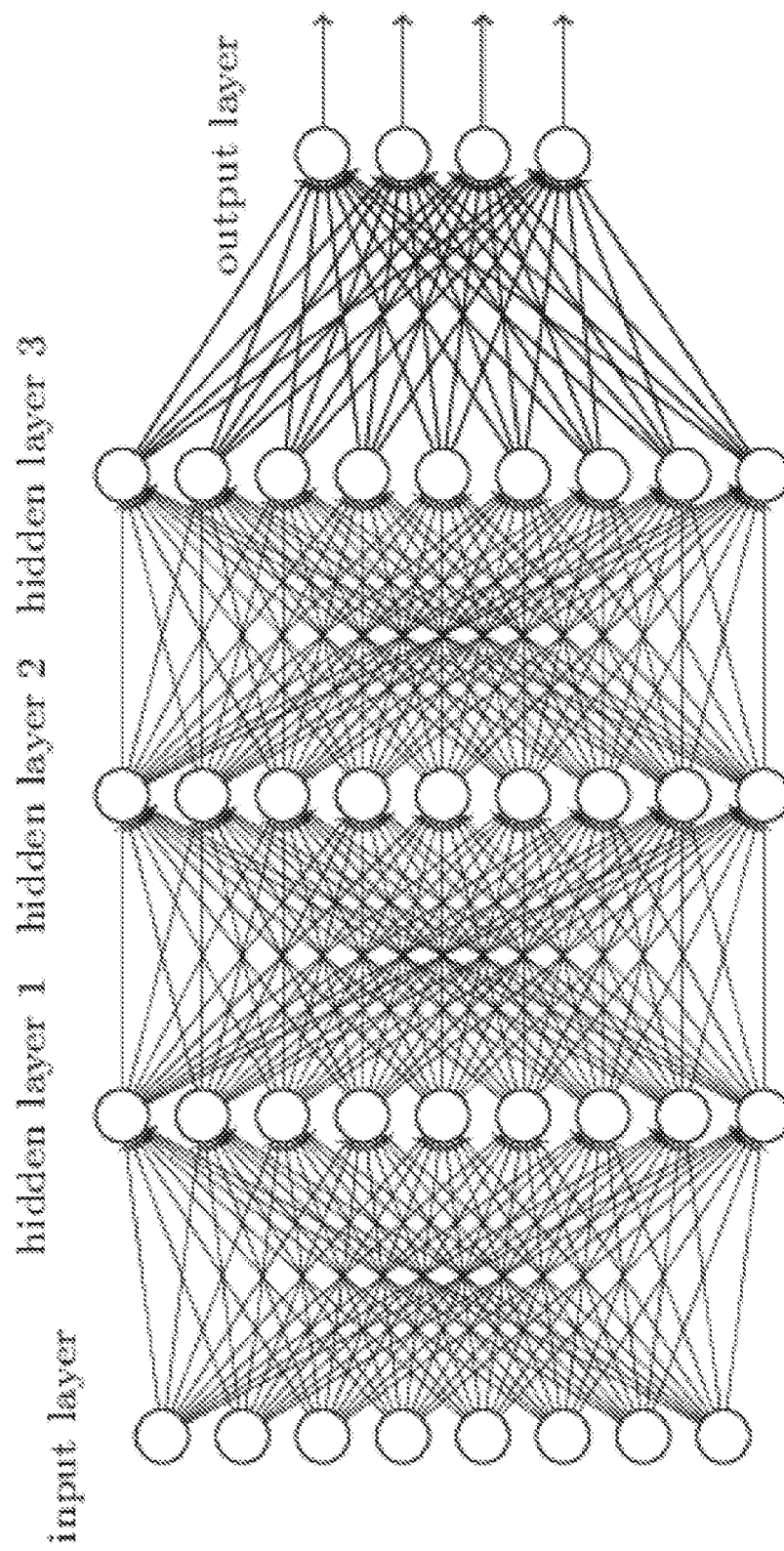
FIG. 42 illustrates diagram of a deep neural network of the type that might be used in various aspects of the present disclosure.

FIG. 42 is illustrates an example of a multilayer feed-forward deep neural network. Many components of the current invention may comprise neural networks, such as the example neural network shown in FIG. 6A. A neural network is a collection of nodes and directed arcs. The nodes in a neural network are often organized into layers. In a feed-forward neural network, the layers may be numbered from bottom to top, when diagramed as in FIG. 42. Each directed arc in a layered feed-forward neural network goes from a source node in a lower layer to a destination node in a higher layer. The feed-forward neural network shown in FIG. 42 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by the computer system 4100 shown in FIG. 41. Other parameters that control the training process are called hyperparameters.

A feed-forward neural network may be trained by the computer system 4100 using an iterative process of stochastic gradient descent with one iterative update of the learned parameters for each minibatch. The full batch of training data is typically arranged into a set of smaller, disjoint sets called minibatches. An epoch comprises the computer system 4100 doing a stochastic gradient descent update for each minibatch contained in the full batch of training data. For each minibatch, the computer estimates the gradient of the objective for a training data item by first computing the activation of each node in the network using a feed-forward activation computation. The computer system 4100 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are known to those skilled in the art of training neural networks.

Thus, based on the above description, it is clear that aspects of the present invention can be used to improve many different types of machine learning systems, including deep neural networks, in a variety of applications. For example, aspects of the present invention can improve recommender systems, speech recognition systems, and classification systems, including image and diagnostic classification systems, to name but a few examples.

Various aspects of the subject matter described herein are set out in the following aspects, implementations, and/or examples, which can be interchangeably combined together in various combinations:

In one example, a computer-implemented method of restricting learning by a neural network, wherein the neural network comprises a first node, comprises: (i) training, by a computer system, the neural network on a training data set; and (ii) adding, by the computer system during training, a relaxation term to a back-propagated derivative of an objective function with respect to a learned parameter of each of the first node of the neural network and a second node, the relaxation term adding a penalty to a cost function of each of the learned parameter of the first node and the learned parameter of the second node according to whether the learned parameters for the first and second nodes diverge from each other. In another example, a computer-implemented method of restricting learning by a neural network, wherein the neural network comprises a first node, comprises: (i) training, by a computer system, the neural network on a training data set and (ii) adding, by the computer system during training, a relaxation term to a back-propagated derivative of an objective function with respect to an activation value of each of the first node of the neural network and a second node, the relaxation term adding a penalty to a cost function for each of the first node and the second node according to whether the activation values for the first and second nodes diverge from each other.

In one aspect, the method further comprises controlling, by the computer system, a weight of the relaxation term via a hyperparameter.

In one aspect, the hyperparameter comprises a multiplicative scale factor applied to the relaxation term.

In one aspect, the neural network comprises the second node.

In one aspect, the neural network comprises a first neural network and a second neural network comprises the second node.

In one aspect, the method further comprises adding, by the computer system during training, a second relaxation term to a back-propagated derivative of an objective function with respect to a learned parameter of each of the first node and a third node, the relaxation term adding a penalty to a cost function of each of the first node and the third node according to whether the learned parameters for the first and third nodes diverge from each other.

In one aspect, the relaxation term is added to the back-propagated derivative of the objective function with respect to the learned parameter of each of the first node and the second node for each data example in the training data set.

In one aspect, the relaxation term is added to the back-propagated derivative of the objective function with respect to the learned parameter of each of the first node and the second node for a subset of data examples in the training data set.

In one aspect, the subset of data examples for which the relaxation term is added corresponds to a classification category into which the training data set has been divided.

In one aspect, the subset of data examples for which the relaxation term is added corresponds to a data cluster into which the training set has been divided by a machine learning system trained to cluster the training data set according to cluster assignment values.

In one aspect, the learned parameter comprises a connection weight of each of the first node and the second node.

In one aspect, the relaxation term requires that the connection weights of the first node and the second node be equal.

In one example, a computer-implemented method for developing machine learning systems comprises: (i) creating, by a computer system, a first machine learning system; (ii) creating, by the computer system, a second machine learning system; (iii) selecting, by the computer system, one or more restrictions applied to the second machine learning system via a learning coach; wherein the one or more restrictions selected by the learning coach cause the second machine learning system to produce fewer errors on data that is disjoint from a training data set; (iv) determining, by the computer system, whether the performance of the second machine learning system is better than the performance of the first machine learning system beyond a statistical significance threshold on the training data set; and (v) creating, by the computer system, a third machine learning system, the third machine learning system being either more or less restricted than the second machine learning system according to whether the performance of the second machine learning system is better than the performance of the first machine learning system on the training data set.

In one aspect, the method further comprises: (i) determining, by the computer system, whether the performance of the second machine learning system is better than the performance of the first machine learning system beyond a statistical significance threshold on a testing data set, the testing data set disjoint from the training data set; and (ii) creating, by the computer system, the third machine learning system, the third machine learning system being either more or less restricted than the second machine learning system according to whether the performance of the second machine learning system is better than the performance of the first machine learning system on the testing data set.

In one aspect, the second machine learning system produces more errors on the training data set.

In one aspect, the first machine learning system and the second machine learning system each comprise a classifier.

In one aspect, the method further comprises smoothing, by the computer system, the decision boundary of the second machine learning system.

In one aspect, the one or more restrictions selected by the learning coach comprise the second machine learning system comprising fewer parameters than the first machine learning system.

In one aspect, the one or more restrictions selected by the learning coach comprise the second machine learning system being trained to meet additional objectives other than its objective of matching the output of the first machine learning system.

In one aspect, the one or more restrictions selected by the learning coach comprise the second machine learning system producing a decision boundary in its output vector space that is smoother than the first machine learning system.

In one aspect, the one or more restrictions selected by the learning coach comprise regularization applied to learned parameters of the second machine learning system.

In one aspect, the regularization comprises L2 regularization.

In one aspect, the one or more restrictions selected by the learning coach comprise the second machine learning system being trained to be more robust to noise or adversarial data examples than the first machine learning system.

In one aspect, the method further comprises augmenting, by the computer system, the training data set with data examples generated via a generator, wherein the one or more restrictions selected by the learning coach comprise a standard deviation of a probability distribution of the generated data examples for the second machine learning set being lower than for the generated data examples for the first machine learning system.

In one aspect, the one or more restrictions selected by the learning coach comprise one or more lower-level features that are represented with feature detection classifiers within the second machine learning system.

In one aspect, the one or more restrictions selected by the learning coach comprise a relaxation term added to a back-propagated derivative of an objective function with respect to a learned parameter of each of a first node and a second node of the second machine learning system, the relaxation term adding a penalty to a cost function of each of the first node and the second node according to whether the learned parameters for the first and second nodes diverge from each other.

In one aspect, the learned parameter comprises a connection weight of each of the first node and the second node.

In one aspect, the one or more restrictions selected by the learning coach comprise a relaxation term added to a back-propagated derivative of an objective function with respect to an activation value of each of the first node of the neural network and a second node, the relaxation term adding a penalty to a cost function for each of the first node and the second node according to whether the activation values for the first and second nodes diverge from each other.

In one aspect, the one or more restrictions selected by the learning coach comprise activation values of one or more randomly selected nodes of the second machine learning system being set to zero.

In one aspect, the one or more restrictions selected by the learning coach comprise noise added to activation values of one or more randomly selected nodes of the second machine learning system.

In one aspect, the one or more restrictions selected by the learning coach comprise one or more fixed value nodes added to the second machine learning system, the one or more fixed value nodes comprising activation values that are independent of activations in an underlying layer of the second machine learning system.

In one aspect, the second machine learning system comprises an input layer, one or more inner layers, and an output layer; and the one or more restrictions selected by the learning coach comprise nodes in the one or more inner layers that are trained to meet additional objectives differing from an objective of the output layer.

In one aspect, the objective of the output layer comprises matching an output of the first machine learning system.

In one aspect, the one or more restrictions selected by the learning coach comprise randomly selected data examples from the second training data set being removed or reduced in influence.

In one aspect, the method further comprises: (i) dividing, by the computer system, the training data set into disjoint development data subsets; (ii) training, by the computer system, the second machine learning system on successive disjoint development data subsets; (iii) determining, by the computer system, whether a current disjoint development data subset accurately predicts the second machine learning system's performance on new data; and (iv) according to whether the current disjoint data subset accurately predicts the second machine learning system's performance on new data, stopping, by the computer system, training on the current disjoint development data subset and beginning training on a successive current disjoint development data subset.

In one aspect, the first machine learning system comprises a first classifier and the second machine learning system comprises a second classifier and the method further comprises: (i) generating, by the computer system, simulated data via a first generator; (ii) generating, by the computer system, augmented data via a second generator, the augmented data generated from real data; (iii) supplying, by the computer system, the simulated data to the first classifier; (iv) supplying, by the computer system, either the simulated data or the augmented data to the second classifier; and (v) according to whether the second classifier receives the simulated data or the augmented data, training, by the computer system, the second classifier on an output of the first classifier or a classification category of the real data from which the augmented data was generated.

In one aspect, the first classifier comprises a first neural network comprising a first node and the second classifier comprises a second neural network comprising a second node, and the method further comprises: adding, by the computer system during training, a relaxation term to a back-propagated derivative of an objective function with respect to a learned parameter of each of the first node of the first neural network and the second node of the second neural network, the relaxation term adding a penalty to a cost function of each of the learned parameter of the first node and the learned parameter of the second node according to whether the learned parameters for the first and second nodes diverge from each other.

In one aspect, the first classifier comprises a first neural network comprising a first node and the second classifier comprises a second neural network comprising a second node, and the method further comprises: adding, by the computer system during training, a relaxation term to a back-propagated derivative of an objective function with respect to an activation value of each of the first node of the first neural network and the second node of the second neural network, the relaxation term adding a penalty to a cost function for each of the first node and the second node according to whether the activation values for the first and second nodes diverge from each other.

In one aspect, the first classifier and the second classifier are different types of machine learning systems.

In one aspect, the first classifier comprises an ensemble.

In one aspect, the method further comprises repeating, by the computer system, the method until a stopping criterion is satisfied.

In one aspect, the stopping criterion comprises whether there is a statistically significant difference between the performance of a less restricted learning system on the training data set and the performance of a more restricted machine learning system on an independent test data set.

In one aspect, the stopping criterion comprises whether a predetermined performance goal has been achieved.

In one aspect, the stopping criterion comprises whether a predetermined limit on a number of iterations or an amount of computation has been reached.

In one aspect, the second machine learning system comprises a neural network, the neural network comprising a plurality of nodes interconnected into a plurality of layers, and the method further comprises: (i) training, by a computer system, the neural network on the training data set; and (ii) replacing, by a computer system, a replaced node of the neural network with a replacement set of nodes during training of the neural network, the replacement set of nodes providing a compound output.

In one aspect, the replacement set of nodes comprises a first node corresponding to a detection, a second node corresponding to neutral, and a third node corresponding to a rejection.

In one aspect, the replaced node comprises a rectified linear unit, each node of the replacement set of nodes comprises a limited range and the replacement set of nodes comprises monotonically increasing biases.

In one aspect, the method further comprises: (i) training, by the computer system, the second machine learning system on the training data set; (ii) obtaining, by the computer system, a data example from the training data set during training of the second machine learning system; (iii) determining, by the computer system, whether to compare the data example to all data within the training data set; (iv) training, by the computer system, an associative memory, the associative memory configured to retrieve a stored pattern from an input; (v) generating, by the computer system, a generated data example similar to the data example via a generator; (vi) retrieving, by the computer system, a retrieved data example from the associative memory corresponding to the generated data example; (vii) measuring, by the computer system, a degree of closeness between the generated data example and the retrieved data example; and (viii) determining, by the computer system, whether the retrieved data example and the data example are in a designated data set.

In one aspect, the method further comprises iteratively generating, by the computer system, generated data examples until a desired number of the generated data examples to the designated set have been identified.

In one aspect, the method further comprises: (i) iteratively generating, by the computer system, generated data examples and determining, by the computer system, whether the retrieved data example corresponding to the generated data examples are in the designated data set; and (ii) determining, by the computer system, whether the data example is clusterable according to a number of the generated data examples that are in the designated data set.

In one example, a computer-implemented method for transferring learning between a first machine learning classifier system and a second machine learning classifier system, the second machine learning classifier system differing from the first machine learning classifier system, comprises: (i) obtaining, by a computer system, a training data set; and (ii) training, by the computer system, the second machine learning classifier system on the training data set with a target of agreeing with the first machine learning classifier system on the training data set.

In one aspect, the method further comprises: (i) generating, by the computer system, an augmented data set from the training data set via a first generator; and (ii) training, by the computer system, the second machine learning classifier system on the augmented data set with the target of agreeing with the first machine learning classifier system on the augmented data set.

In one aspect, the method further comprises: (i) generating, by the computer system, a first augmented data set from the training data set via a first generator; (ii) generating, by the computer system, a second augmented data set from the training data set via a second generator; (iii) training, by the computer system, the first machine learning classifier system on the first augmented data set; and (iv) training, by the computer system, the second machine learning classifier system on both the first augmented data set and the second augmented data set, wherein the target for the training of the second machine learning classifier system comprises: an output of the first machine learning classifier system when the second machine learning classifier system is trained on the first augmented data set; and a category of a data example from the second augmented data set when the second machine learning classifier system is trained on the second augmented data set.

In one aspect, the first machine learning classifier system is an original neural network and the second machine learning classifier system is an expanded neural network of the original neural network.

In one aspect, the original neural network comprises a first node and the expanded neural network comprises a second node, and the method further comprises: adding, by the computer system during training, a relaxation term to a back-propagated derivative of an objective function with respect to a learned parameter of each of the first node of the original neural network and the second node of the expanded neural network, the relaxation term adding a penalty to a cost function of each of the learned parameter of the first node and the learned parameter of the second node according to whether the learned parameters for the first and second nodes diverge from each other. In one aspect, the original neural network comprises a first node and the expanded neural network comprises a second node, and the method further comprises: adding, by the computer system during training, a relaxation term to a back-propagated derivative of an objective function with respect to an activation value of each of the first node of the original neural network and the second node of the expanded neural network, the relaxation term adding a penalty to a cost function for each of the first node and the second node according to whether the activation values for the first and second nodes diverge from each other.

In one aspect, the learned parameter comprises a connection weight of each of the first node and the second node.

In one example, a computer-implemented method for incrementally improving a first neural network, the method comprising: (a) copying, by a computer system, the first neural network to generate a second neural network, the first neural network and the second neural network forming an ensemble; (b) adding, by the computer system, a combining machine learning system to the ensemble, the combining machine learning system receiving an output of each of the first neural network and the second neural network; (c) training, by the computer system, the combining machine learning system, the first neural network, and the second neural network; (d) creating, by the computer system, a new neural network comprising the combining machine learning system, the first neural network, and the second neural network; and (e) repeating, by the computer system, steps (a)— (d) with the new neural network created at step (d) as the first neural network that is copied in step (a) following step (d) until a stopping criterion is met.

In one aspect, the method further comprises: (i) adding, by the computer system, additional output nodes to each of the first neural network and the second neural network; and (ii) training, by the computer system, the additional output nodes to learn a best combined output of the combining machine learning system.

In one aspect, the method further comprises initializing, by the computer system, the combining machine learning system to correspond to a predetermined combining rule for the ensemble.

In one aspect, the combining machine learning system comprises a neural network.

In one aspect, the combining machine learning system comprises special function nodes, the special function nodes comprising a non-linear activation function.

In one aspect, the special function nodes represent a predetermined combining rule for the ensemble.

In one aspect, the combining machine learning system comprises a data selector node connected to a first node and a second node, the data selector node configured to selectively dropout one of the first node or the second node according its activation.

In one example, a computer-implemented method for optimizing a plurality of ensemble machine learning systems for a joint objective comprises: (i) adding, by a computer system, a combining machine learning system to the plurality of ensemble machine learning systems, the combining machine learning system receiving an output of each of the plurality of ensemble machine learning systems; and (ii) training, by the computer system, the combining machine learning system and the plurality of ensemble machine learning systems by back propagating partial derivatives of a cost function representing the joint objective through the combining machine learning system to each of the plurality of ensemble machine learning systems.

In one aspect, the combining machine learning system comprises special function nodes configured to represent a combining rule of the plurality of ensemble machine learning systems.

In one aspect, the method further comprises initializing, by the computer system, the combining machine learning system to match a combining rule or a voting rule of the plurality of ensemble machine learning systems.

In one aspect, the method further comprises incrementally adding, by the computer system, a new ensemble machine learning system to the plurality of ensemble machine learning systems during training of the combining machine learning system and the plurality of ensemble machine learning systems.

In one aspect, the method further comprises: (i) calculating, by the computer system, a confidence score for each of the plurality of ensemble machine learning systems via the combining machine learning system; and (ii) assigning, by the computer system, a weight to the output of each of the plurality of ensemble machine learning systems according to the confidence scores.

In one example, a computer-implemented method of improving a neural network, the method comprising: splitting, by a computer system, a training data set into N training data subsets, where N>1, based on similarity of gradient direction; expanding, by the computer system, the neural network to generate an expanded neural network, the expanded neural network comprising an expanded portion and an original portion; and training, by the computer system, the expanded portion of the expanded neural network on one of the N training data sub sets.

In one aspect, the method further comprises training, by the computer system, the expanded portion and the original portion of the expanded neural network on the training data set.

In one aspect, the method further comprises copying, by the computer system, the neural network prior to expanding the neural network.

In one aspect, the method further comprises initializing, by the computer system, the expanded neural network to be equivalent to the neural network prior to training the expanded portion of the expanded neural network.

In one aspect, initializing the expanded neural network to be equivalent to the neural network comprises: copying, by the computer system, all of the nodes and connections from the neural network to the expanded neural network to define the original portion of the neural network; and setting, by the computer system, the expanded portion of the expanded neural network to an identity function.

In one aspect, setting the expanded portion of the expanded neural network to the identity function comprises adding, by the computer system, a bias to each node in the expanded portion such that an output of each node is equal to its input.

In one aspect, setting the expanded portion of the expanded neural network to the identity function comprises connecting, by the computer system, each node in the expanded portion to a summing neuron with each connection to each summing neuron initially having a weight of zero.

In one aspect, setting the expanded portion of the expanded neural network to the identity function comprises initializing, by the computer system, an activation function of each node in the expanded portion to the identity function.

In one aspect, the expanded neural network comprises a larger number of nodes and corresponding connections than the neural network.

In one example, a computer-implemented method for improving a performance of a neural network on a training data set comprises: obtaining, by a computer system, data from the training data set; determining, by the computer system, whether the neural network makes an error or has a confidence measure less than a threshold for a data example from the data; selecting, by the computer system, a node of the neural network according to a selection criteria; copying, by the computer system, the node to form a copy node; splitting, by the computer system, the training data set into N training data subsets, where N>1, based on similarity of gradient direction; wherein one of the N training data subsets corresponds to the node and another of the N training data subsets corresponds to the copy node; and training, by the computer system, the neural network on the training data such that each of the node and the copy node only receives back propagation for its corresponding training data subset.

In one aspect, obtaining the data from the training data set comprises selecting, by the computer system, a subset of the training data set.

In one aspect, obtaining the data from the training data set comprises generating, by the computer system, augmented data from the training data set via a generator.

In one aspect, the method further comprises: receiving, by the computer system, an output of the neural network at a confidence estimation system; receiving, by the computer system, an auxiliary output of the neural network at a confidence estimation system; back propagating, by the computer system, derivatives of an error cost function from the confidence estimation system to the auxiliary output; and calculating, by the computer system, the confidence measure according to the auxiliary output of the neural network via the confidence estimation system.

In one aspect, the selection criteria comprises whether the node is at a neutral point in their activation functions for the data.

In one aspect, the copy node is added to the neural network. In one aspect, the copy node is added to a new neural network.

In one example, a computer-implemented method for determining confidence in an output of a machine learning system, the machine learning system configured to output a standard output and an auxiliary output, comprises: providing, by a computer system, data to the machine learning system from one or more data sources, the data comprising target data and non-target data for the machine learning system; receiving, by a confidence-estimating machine learning system implemented by the computer system and trained by the computer system to determine whether the output of the machine learning system is correct, the standard output and the auxiliary output of the machine learning system according to the provided data; calculating, by the confidence-estimating machine learning system implemented by the computer system, a confidence score according to whether the standard output and the auxiliary output are correct; and back propagating, by the confidence-estimating machine learning system implemented by the computer system, a derivative of a loss function to the auxiliary output of the machine learning system; wherein back propagating the derivative of the loss function to the auxiliary output does not alter the standard output of the machine learning system.

In one aspect, the machine learning system comprises a classifier or a detector.

In one aspect, the auxiliary output comprises a first output and the machine learning system is further configured to output a second auxiliary output, and the method further comprises: providing, by the computer system, the second auxiliary output to a supplemental estimator; calculating, by supplemental estimator implemented by the computer system, a supplemental confidence score; and training, by the computer system, the confidence-estimating machine learning system according to the supplemental confidence score.

In one aspect, the method further comprises back propagating, by the confidence-estimating machine learning system implemented by the computer system, the derivative of the loss function to the supplemental estimator and the second auxiliary output of the machine learning system.

In one aspect, the supplemental estimator comprises a previously trained machine learning system. In one aspect, the supplemental estimator comprises a statistical test.

In one aspect, the method further comprises varying a ratio of target data and non-target data provided to the machine learning system.

In one aspect, the method further comprises computing, by the confidence-estimating machine learning system implemented by the computer system, a non-linear regression estimating a probability of error measure averaged over a probability distribution of the target data and the non-target data provided to the machine learning system.

In one aspect, the method further comprises collecting statistics, by the confidence-estimating machine learning system implemented by the computer system, regarding internal values of the machine learning system observed from the auxiliary output.

In one aspect, the method further comprises outputting, by the confidence-estimating machine learning system implemented by the computer system, the collected statistics regarding the internal values of the machine learning system to an external system.

In one aspect, back propagating the derivative of the loss function to the auxiliary output does not alter the standard output of the machine learning system because the back propagation does not proceed form the auxiliary output through the machine learning system.

In one example, a computer-implemented method for creating feature detection nodes for a neural network comprises: receiving, by a computer system, a feature specification, the feature specification defining which data examples in a data set exhibit a feature and which of the data examples do not exhibit the feature; selecting, by the computer system, nodes in the neural network to serve as the feature detection nodes for the feature; adding, by the computer system, a relaxation term to a back-propagated derivative of an objective function with respect to an activation value of each of the selected nodes, the relaxation term adding a penalty to a cost function for each of the selected nodes according to whether the activation values for the selected nodes diverge from each other; training, by the computer system, the neural network on the data set; clustering, by the computer system, the data examples in the data set via the neural network; generating, by the computer system, an augmented data set comprising additional data from the data set; training, by the computer system, the neural network on the augmented data set; and exporting, by the computer system, the feature specification for each of the selected nodes from the trained neural network.

In one aspect, receiving the feature specification comprises receiving the feature specification from an external source. In one aspect, the external source comprises a machine learning classifier trained on labeled data examples and configured to apply labels to received data. In one aspect, receiving the feature specification comprises clustering data examples into a plurality of classification categories via a clustering algorithm.

In one aspect, the method further comprises adding, by the computer system, additional nodes to the neural network as the feature detection nodes.

In one example, a computer-implemented method for developing a machine learning system comprises: generating, by a computer system, generated data within a threshold of an example datum via a generator; and training, by the computer system, the machine learning system on the generated data.

In one aspect, the generator comprises a variational autoencoder. In one aspect, the generator comprises a stochastic categorical autoencoder network.

In one aspect, the method further comprises controlling, by the computer system, a standard deviation of the generated data relative to the example datum via a hyperparameter.

In one aspect, the method further comprises training, by the computer system, the generator with negative examples. In one aspect, the negative examples inhibit the generator from generating generated data that is in a different category than the example datum. In one aspect, the negative examples inhibit the generator from generating generated data that is too different from the example datum.

In one aspect, the method further comprises: providing, by the computer system, a data set to a first machine learning classifier and a second machine learning classifier, the first machine learning classifier being less restricted than the second machine learning classifier in that the second machine learning classifier produces fewer errors on data that is disjoint from the data set; and identifying, by the computer system, problematic data from the data set that the first machine learning classifier incorrectly classifies and the second machine learning classifier correctly classifies, wherein the example datum is one of the problematic data.

In one aspect, the first machine learning classifier comprises a first node and the second machine learning classifier comprises a second node, the method further comprising: adding, by the computer system, a relaxation term to a back-propagated derivative of an objective function with respect to a learned parameter of each of the first node and the second node, the relaxation term adding a penalty to a cost function of each of the learned parameter of the first node and the learned parameter of the second node according to whether the learned parameters for the first and second nodes diverge from each other.

In one aspect, global regularization has been applied to the second machine learning classifier, and the method further comprises: removing, by the computer system, the global regularization applied to the second machine learning classifier; applying, by the computer system, local regularization to the second machine learning classifier, the local regularization being local to the problematic data.

In one example, a computer-implemented method for developing a machine learning system comprises: applying, by a computer system, an influence weight to each datum of a data set, the influence weight controlling a relative weight for each datum during training; and training, by the computer system, the machine learning system on the data set.

In one aspect, the influence weight is negative.

In one aspect, the method further comprises reducing, by the computer system, the influence weight of any datum of the data set that is causing the machine learning system to produce errors. In one aspect, reducing the influence weight of any datum to zero effectively drops the datum from the data set. In one aspect, the influence weight is controlled by a hyperparameter.

In one example, a computer-implemented method for developing a machine learning system comprising a first machine learning classifier and a second machine learning classifier comprises: providing, by a computer system, a data set to the first machine learning classifier and the second machine learning classifier, the first machine learning classifier being less restricted than the second machine learning classifier in that the second machine learning classifier produces fewer errors on data that is disjoint from the data set; and identifying, by the computer system, problematic data from the data set that the first machine learning classifier incorrectly classifies and the second machine learning classifier correctly classifies.

In one aspect, the method further comprises increasing, by the computer system, local regularization at the problematic data for the second machine learning system.

In one aspect, the method further comprises identifying, by the computer system, a nearby data example in the data set relative to the problematic data that is classified correctly by the first machine learning system. In one aspect, the method further comprises decreasing, by the computer system, an influence weight for the nearby data example. In one aspect, the nearby data example may or may not be in a same category as the problematic data.

In one aspect, the method further comprises identifying, by the computer system, a co-categorized data example in the data set corresponding to a category of the problematic data. In one aspect, the method further comprises decreasing, by the computer system, an influence weight of the co-categorized data example.

In one aspect, the further comprises: training, by the computer system, an associative memory, the associative memory configured to retrieve a stored pattern from an input; generating, by the computer system, a generated data example similar to the problematic data via a generator; retrieving, by the computer system, a retrieved data example from the associative memory corresponding to the generated data example; measuring, by the computer system, a degree of closeness between the generated data example and the retrieved data example; and determining, by the computer system, whether the retrieved data example and the data example are both in the category. In one aspect, the method further comprises generating, by the computer system, the data set from an example datum via a generator.

In one example, a computer-implemented method for developing a machine learning system comprising a first machine learning classifier and a second machine learning classifier comprises: providing, by the computer system, a data set to the first machine learning classifier and the second machine learning classifier, the first machine learning classifier being less restricted than the second machine learning classifier in that the second machine learning classifier produces fewer errors on data that is disjoint from the data set; identifying, by the computer system, problematic data from the data set, the problematic data being data that the first machine learning classifier incorrectly classifies and the second machine learning classifier correctly classifies or data on which either the first machine learning classifier or the second machine learning classifier has a confidence measure less than a threshold; and identifying, by the computer system, a plurality of classification categories for the problematic data.

In one aspect, the method further comprises: receiving, by the computer system, an output of at least one of the first machine learning classifier or the second machine learning classifier at a confidence estimation system; receiving, by the computer system, an auxiliary output of the at least one of the first machine learning classifier or the second machine learning classifier at a confidence estimation system; back propagating, by the computer system, derivatives of an error cost function from the confidence estimation system to the auxiliary output; and calculating, by the computer system, the confidence measure according to the auxiliary output of the at least one of the first machine learning classifier or the second machine learning classifier via the confidence estimation system.

In one aspect, the plurality of classification categories comprises a correct classification for the problematic data. In one aspect, the plurality of classification categories comprise a category of the problematic data for which the first machine learning classifier or the second machine learning classifier assigns an above average classification score.

In one aspect, the method further comprises generating, by the computer system, additional data from each of the plurality of classification categories for the problematic data. In one aspect, the additional data is generated via a generator.

In one aspect, the method further comprises calculating, by the computer system, a decision boundary between the plurality of classification categories for the problematic data. In one aspect, the method further comprises calculating, by the computer system, a decision boundary between the plurality of classification categories in a region of the problematic data. In one aspect, the method further comprises calculating, by the computer system, vectors orthogonal to the decision boundary. In one aspect, the method further comprises identifying, by the computer system, areas along the decision boundary where a change in magnitude of a direction of the vectors exceeds a threshold change. In one aspect, the method further comprises smoothing, by the computer system, the decision boundary.

In one aspect, the method further comprises calculating, by the computer system, a probability distribution of data examples from the data set for each of the plurality of classification categories within a threshold distance of the problematic data. In one aspect, the method further comprises: determining, by the computer system, whether any of the problematic data are isolated errors according to the probability distribution; and ignoring, by the computer system, any isolated errors. In one aspect, the method further comprises: determining, by the computer system, whether there are at least a threshold number of data examples for each of the classification categories within the threshold distance of the problematic data; and creating, by the computer system, a cluster model for any of the plurality of classification categories for which there are at least the threshold number of data examples.

In one aspect, the method further comprises training, by the computer system, one or more detectors configured to identify the problematic data. In one aspect, training the one or more detectors comprises providing, by the computer system, the problematic data to the one or more detectors as a template from which the one or more detectors are trained. In one aspect, training the detector comprises: obtaining, by the computer system, a plurality of generators, each of the plurality of generators corresponding to one of the classification categories stochastically selecting, by the computer system, a selected generator from the plurality of generators, each of the plurality of generators corresponding to one of the classification categories; generating, by the computer system, a generated data example via the selected generator; providing, by the computer system, the generated data example and a real data example from the classification category corresponding to the selected generator to each of the plurality of classifiers; outputting, by the computer system, a detection output via each of the one or more detectors according to whether the generated data example and the real data example correspond to the classification category associated with each of the one or more detectors; determining, by the computer system, a maximum activation of each detection output from each of the one or more detectors; back propagating, by the computer system, a derivative of a first loss function to which of the one or more detectors output the maximum activation; normalizing, by the computer system, the detection outputs from the one or more detectors; and back propagating, by the computer system, a derivative of a second loss function to the one or more detectors according to whether the normalized detection outputs for the generated data example or the real data example were classified correctly by the one or more detectors. In one aspect, each of the plurality of generators corresponds to one of the one or more detectors defining a generator-detector pair; and each generator-detector pair corresponds to one of the classification categories.

In one aspect, the method further comprises changing, by the computer system, labels for the classification categories for the problematic data. In one aspect, changing labels for the classification categories for the problematic data comprises: classifying, by the computer system, the problematic data by a third machine learning classifier; determining, by the computer system, whether classification scores output by the third machine learning classifier for the problematic data satisfy a criteria; and according to whether the classifications cores satisfy the criteria, changing, by the computer system, the labels for the classification categories for the problematic data. In one aspect, the first machine learning classifier comprising a first node and the second machine learning classifier comprising a second node, and the method further comprises: adding, by the computer system, a relaxation term to a back-propagated derivative of an objective function with respect to an activation value of each of the first node and the second node for the problematic data for which the labels of the classification categories were changed, the relaxation term adding a penalty to a cost function for each of the first node and the second node according to whether the activation values for the first and second nodes diverge from each other. In one aspect, the method further comprises: training, by a computer system, the machine learning system on the data set; and iteratively growing, by the computer system, the machine learning system and re-training, by the computer system, the grown machine learning system on the data set. In one aspect, the machine learning system comprises an ensemble machine learning system; and growing the ensemble machine learning system comprises adding, by the computer system, one or more ensemble members to the ensemble machine learning system. In one aspect, the ensemble machine learning system comprises a plurality of neural networks connected together to form an ensemble. In one aspect, the machine learning system comprises a neural network;

and growing the machine learning system comprises adding, by the computer system, new nodes to the neural network. In one aspect, the method further comprises partitioning, by the computer system, the data set into a plurality of data subsets. In one aspect, the method further comprises: determining, by the computer system, whether stochastic gradient descent during training of the machine learning system is trying to make changes in a first direction for some data examples of the data set and in second direction on other data examples of the data set, wherein the data set is partitioned accordingly.

In one example, a computer-implemented method for developing a machine learning classifier comprises: training, by a computer system, a support machine learning classifier to partition data; partitioning, by the computer system, a data set into a plurality of data subsets with the support classifier; and training, by the computer system, the machine learning classifier on the plurality of data subsets.

In one aspect, the support classifier is configured to partition data into arbitrary subsets.

In one aspect, the method further comprises training the machine learning classifier comprises successively training, by the computer system, the machine learning classifier on each of the data subsets.

In one aspect, the machine learning classifier comprises a plurality of ensemble members and training the machine learning classifier on the plurality of data subsets comprises: assigning, by the computer system, one of the data subsets to each of the ensemble members; and training, by the computer system, the ensemble members of the machine learning classifier on the data subsets. In one aspect, the support machine learning classifier and the machine learning classifier comprise identical classification tasks. In one aspect, each of the ensemble members of the machine learning classifier is trained to verify or correct a preliminary classification performed by the support machine learning classifier.

In one example, a computer-implemented method for developing a machine learning classifier comprises: providing, by a computer system, a data set to a first machine learning classifier and a second machine learning classifier, the first machine learning classifier being less restricted than the second machine learning classifier in that the second machine learning classifier produces fewer errors on data that is disjoint from the data set; training, by the computer system, a plurality of generators to generate data from the data set, each of the plurality of generators corresponding to one of a plurality of classification categories associated with the data set; and generating, by the computer system, generated data via the generators.

In one aspect, training the plurality of generators comprises: stochastically selecting, by the computer system, a selected generator from the plurality of generators, each of the plurality of generators corresponding to one of the plurality of classification categories; generating, by the computer system, a generated data example via the selected generator; providing, by the computer system, the generated data example and a real data example from the classification category corresponding to the selected generator to each of the first machine learning classifier and the second machine learning classifier; outputting, by the computer system, a detection output via each of the plurality of classifiers according to whether the generated data example and the real data example correspond to the classification category associated with each of the first machine learning classifier and the second machine learning classifier; determining, by the computer system, a maximum activation of each detection output from each of the first machine learning classifier and the second machine learning classifier; back propagating, by the computer system, a derivative of a first loss function to which of the first machine learning classifier and the second machine learning classifier output the maximum activation; normalizing, by the computer system, the detection outputs from the first machine learning classifier and the second machine learning classifier; and back propagating, by the computer system, a derivative of a second loss function to the first machine learning classifier and the second machine learning classifier according to whether the normalized detection outputs for the generated data example or the real data example were classified correctly by the first machine learning classifier and the second machine learning classifier.

In one aspect, the method further comprises tuning, by the computer system, hyperparameters associated with the first machine learning classifier and the second machine learning classifier via the generated data.

In one aspect, the method further comprises determining, by the computer system, effectiveness of a regularization method applied to the second machine learning classifier via the generated data.

In one example, a computer-implemented method for developing a machine learning system comprising a plurality of hyperparameters for controlling a performance of the machine learning system comprises: grouping, by a computer system, the plurality of hyperparameters into disjoint hyperparameter subsets; and estimating, by the computer system, a partial derivative for each of the hyperparameter subsets by: performing, by the computer system, a base evaluation of the machine learning system on a data set with the hyperparameters set to specified values; performing, by the computer system, a plurality of evaluations of the machine learning system with non-zero perturbations to applied values of each of the hyperparameters; and estimating, by the computer system, a partial derivative with respect to each of the hyperparameters according to a change in the evaluations of the machine learning system for each of the hyperparameters compared to the base evaluation.

In one aspect, the method further comprises utilizing, by the computer system, stochastic gradient descent to optimize the hyperparameters according to the estimated partial derivative for each of the hyperparameter subsets.

In one example, a computer-implemented method for incrementally developing a machine learning system comprises: training, by a computer system, the machine learning system on a training data set with a plurality of classification categories; and iteratively increasing, by the computer system, a complexity of the plurality of classification categories and re-training, by the computer system, the machine learning system on the training data set.

In one aspect, the machine learning system comprises a neural network. In one aspect, the complexity of the classification categories corresponds to a number of parameters associated with each of the classification categories.

In one example, a computer-implemented method for creating a cooperative generator-classifier system comprises: receiving, by a computer system, a data example output from one of a plurality of generators; training, by the computer system, a classifier to determine from which of the plurality of generators the data example was generated; comparing, by the computer system, outputs from the plurality of generators; and back propagating, by the computer system, an error cost to the plurality of generators according to whether the outputs from the plurality of generators differ from each other.

In one aspect, the plurality of generators comprises a plurality of different generator types.

In one aspect, the classifier comprises a deep neural network; and training the deep neural network comprises using, by the computer system, stochastic gradient descent with updates done in minibatches and with partial derivatives of an error cost function computed by back propagation.

In one aspect, the plurality of generators is configured to generate an unlimited number of data examples.

In one aspect, the method further comprises iteratively training, by the computer system, each of the classifier and the plurality of generators.

In one aspect, the method further comprises back propagating, by the computer system, error cost of an additional classifier objective or additional data for training of the classifier.

In one aspect, the method further comprises back propagating, by the computer system, error cost of an additional generator objective for training of the plurality of generators. In one aspect, the additional objective comprises negative feedback.

In one aspect, the classifier is one of a plurality of classifiers, each of the plurality classifiers configured to provide a detection output indicating whether the data example corresponds to a classification category associated with each of the plurality of classifiers, and the method further comprises: stochastically selecting, by the computer system, a selected generator from the plurality of generators, each of the plurality of generators corresponding to one of the classification categories; generating, by the computer system, a generated data example via the selected generator; providing, by the computer system, the generated data example and a real data example from the classification category corresponding to the selected generator to each of the plurality of classifiers; outputting, by the computer system, the detection output via each of the plurality of classifiers according to whether the generated data example and the real data example correspond to the classification category associated with each of the plurality of classifiers; determining, by the computer system, a maximum activation of each detection output from each of the plurality of classifiers; back propagating, by the computer system, a derivative of a first loss function to which of the plurality of classifiers output the maximum activation; normalizing, by the computer system, the detection outputs from the plurality of classifiers; and back propagating, by the computer system, a derivative of a second loss function to the plurality of classifiers according to whether the normalized detection outputs for the generated data example or the real data example were classified correctly by the plurality of classifiers. In one aspect, each of the plurality of generators corresponds to one of the plurality of classifiers defining a generator-detector pair; and each generator-detector pair corresponds to one of the classification categories.

In one aspect, the method further comprises: selecting, by the computer system, data examples; selecting, by the computer system, N classification categories for the data examples; assigning, by the computer system, the data examples to the classification categories with a weight for each of the data examples of 1/N; selecting, by the computer system, one or more other objectives; creating, by the computer system, a multi-objective loss function, wherein the one or more other objectives are each represented as additional terms to a loss function; training, by the computer system, the classifier on training data to cluster the training data according to the multi-objective loss function; and re-assigning, via the trained classifier implemented by the computer system, the data examples to the classification categories. In one aspect, the one or more other objectives comprise avoiding a data example being classified in a first classification category when a data example should be classified in a second classification category; and the additional terms to the loss function comprise a penalty for classification of the data example in the first classification category. In one aspect, the one or more objectives comprise avoiding creation of classification categories including a number of data examples less than a threshold; and the additional terms to the loss function comprise a reward for maximizing entropy of a distribution of the data examples among the classification categories. In one aspect, the classifier comprises a neural network classifier, the neural network classifier comprising a plurality of nodes interconnected into a plurality of layers; the one or more objectives comprise regularizing the data examples; and the additional terms to the loss function comprise a penalty, for a predetermined subset of the data examples, for a learned parameter of a first node and a second node of the neural network diverging from each other.

In one aspect, the method further comprises: receiving, by the computer system, data examples from an emulated generator of the plurality of generators; processing, by the computer system, the data examples through a neural network; adding, by the computer system, noise to the neural network as the data examples are processed therethrough; and back propagating, by the computer system, the data examples through a decoder network to the neural network. In one aspect, the emulated generator is selected from the group consisting of an autoencoder, a stochastic categorical autoencoder network, a variational autoencoder, and a denoising autoencoder. In one aspect, the method further comprises adding, by the computer system, noise to the data examples received from the emulated generator prior to processing the data examples through the neural network.

In one example, a computer-implemented method for generating data at a decision boundary comprises: obtaining, by a computer system, a classifier configured to: distinguish between data corresponding to a first category and a second category; and provide classification scores for the data according to each of the first category and the second category; training, by the computer system, a generator to generate data examples where a magnitude of a difference between the classifications scores for the first category and the second category provided by the classifier is less than a difference threshold; back propagating, by the computer system, partial derivatives through the classifier; obtaining, by the computer system, an orthogonal vector to the decision boundary between the first category and the second category according to the back propagated partial derivatives; characterizing, by the computer system, the decision boundary between the first category and the second category for the data examples; and generating, by the computer system, text data examples near the characterized decision boundary.

In one aspect, obtaining the classifier comprises training the classifier to distinguish data between the first category and the second category.

In one aspect, characterizing the decision boundary comprises: fitting, by the computer system, a hyperplane to the data examples; and measuring, by the computer system, a spread from the hyperplane. In one aspect, characterizing the decision boundary comprises determining, by the computer system, where a rate of change magnitude of the orthogonal vector is greater than a rate of change threshold.

In one aspect, the method further comprises changing, by the computer system, training conditions of the generator.

In one aspect, the method further comprises measuring, by the computer system, changes in the classification scores for test data examples.

In one aspect, the first category and the second category each comprise classification categories. In one aspect, the first category and the second category each comprise data clusters.

In one example, a computer-implemented method for causing nodes of a neural network to be less likely to change in response to further training of the neural network comprises: identifying, by a computer system, indecisive nodes of the neural network, the indecisive nodes comprising the nodes where a combined derivative of any back-propagated objectives and any regularization terms is not in a direction that would cause an update of learned parameters to increase a difference between a node activation and a neutral activation value for each of the nodes; adding, by the computer system, a decisiveness objective to the indecisive nodes, the decisiveness objective comprising a multiplicative constant larger than one; setting, by the computer system, the multiplicative constant to a first value; and training, by the computer system, the neural network.

In one aspect, the method further comprises: identifying, by the computer system, the indecisive nodes; increasing, by the computer system, the multiplicative constant to a second value, the second value being larger than the first value; and training, by the computer system, the neural network.

In one aspect, the multiplicative constant is controlled by a hyperparameter.

In one aspect, the method further comprises adding, by the computer system, a regularization term to each node of the neural network, wherein the regularization term is positive if the node is one of the indecisive nodes.

In one example, a computer-implemented method for training a generator comprises: generating, by a computer system, a pattern from an input via the generator; supplying, by the computer system, the pattern to a first classifier and a second classifier, the first classifier and the second classifier configured to output classification scores according to the pattern; back propagating, by the computer system, an objective from each of the first classifier and the second classifier to the generator, the objective corresponding to a targeted amount of difference between the classification scores of the first classifier and the second classifier.

In one aspect, the objective is configured to train the generator to generate a pattern on which the first classifier and the second classifier agree. In one aspect, the objective is configured to train the generator to generate a pattern on which the first classifier and the second classifier disagree.

In one aspect, the method further comprises back propagating, by the computer system, an additional objective to the generator.

In one example, a computer-implemented method for transferring knowledge between a first classifier and a second classifier comprises: (i) generating, by a computer system, simulated data via a first generator; (ii) generating, by the computer system, augmented data via a second generator, the augmented data generated from real data; (iii) supplying, by the computer system, the simulated data to a first classifier; (iv) supplying, by the computer system, either the simulated data or the augmented data to the second classifier; and (v) according to whether the second classifier receives the simulated data or the augmented data, training, by the computer system, the second classifier on an output of the first classifier or a classification category of the real data from which the augmented data was generated.

In one aspect, the first classifier can comprise a first neural network and the second classifier can comprise a second neural network. Further, the aforementioned method can further comprise adding, by the computer system during training, a term to a learned parameter of each of a first node of the first neural network and a second node of the second neural network, the term penalizing each of the first node and the second node according to whether the learned parameters for the first and second nodes diverge from each other.

In another aspect, the first classifier and the second classifier can be different types of machine learning systems.

In another aspect, the first classifier can comprise an ensemble.

In one example, a computer-implemented method for incrementally developing a machine learning system comprises: (i) obtaining, by a computer system, a data set comprising a training data set and a plurality of development data sets; (ii) training, by the computer system, the machine learning system on the training data set; and (iii) iteratively adding, by the computer system, one of the plurality of development sets to the training data set and re-training, by the computer system, the machine learning system on the training data set.

In one aspect, the machine learning system comprises a neural network.

In one aspect, obtaining the data set comprises generating, by the computer system, the plurality of development data sets from the training data set via a data generation system.

In one aspect, the data generation system comprises one or more generators and one or more classifiers configured to cooperate to achieve a shared goal.

In one example, a computer-implemented method for emulating a generative adversarial network comprises: (i) receiving, by a computer system, data examples from a generative adversarial network; (ii) processing, by the computer system, the data examples through a neural network;

(iii) adding, by the computer system, noise to the neural network as the data examples are processed therethrough; and (iv) back propagating, by the computer system, the data examples through a real-vs-generated classifier to the neural network, the real-vs-generated classifier configured to determine whether the data examples from the generative adversarial network are real data examples or generated data examples.

In one aspect, the method further comprises adding, by the computer system, noise to the data examples received from the generative adversarial network prior to processing the data examples through the neural network.

In one example, a computer-implemented method for incrementally developing a machine learning system comprises: (i) training, by a computer system, the machine learning system on a training data set; and (ii) iteratively growing, by the computer system, the machine learning system and re-training, by the computer system, the grown machine learning system on the training data set.

In one aspect, the machine learning system comprises an ensemble machine learning system and growing the ensemble machine learning system comprises adding, by the computer system, one or more ensemble members to the ensemble machine learning system. In one aspect, the ensemble machine learning system comprises a plurality of neural networks connected together to form an ensemble.

In one aspect, the machine learning system comprises a neural network and growing the machine learning system comprises adding new nodes to the neural network.

In one aspect, the method further comprises partitioning the training data set into a plurality of data subsets. In one aspect, the method still further comprises determining, by the computer system, whether stochastic gradient descent during training of the machine learning system is trying to make changes in a first direction for some data examples of the training data and in second direction on other data examples of the training data, wherein the training data set is partitioned accordingly.

Each of the above examples and/or aspects can be implemented on a computer system comprising one or more processor cores one or more memories coupled to the one or more processor cores, the one or more memories storing the machine learning system(s) and instructions that, when executed by the one or more processor cores, cause the computer system to execute the computer-implemented methods.

Further, each of the above examples and/or aspects can be implemented on a distributed computer system a plurality of computer nodes interconnected via connections having varying data bandwidths. The one or more processor cores and/or the one or more memories can be distributed across the computer nodes. Further, in some aspects, the memory of each of the plurality of computer system nodes can store instructions that, when executed by the one or more processor cores, cause the computer system nodes to transmit data between the computer system nodes according to the data bandwidth associated with respective connections between the computer system nodes.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for improving performance of a classifier, wherein the classifier comprises a deep neural network that is trained iteratively through machine learning, wherein the deep neural network of the classifier comprises an input layer, an output layer, and one or more inner layers, wherein the layers comprise interconnected nodes that process and transform input data through weighted connections, the method comprising:

computing, by the classifier implemented by a computer system, first and second scores for each of multiple data examples from a generator, wherein the first score is indicative of whether the data example belongs to a first data cluster and the second score is indicative of whether the data example belongs to a second data cluster, wherein the generator is trained with an objective such that, for each data example generated by the generator, the first and second scores computed by the classifier are equal;

back-propagating, by the computer system, for multiple data examples generated by the generator, partial derivatives from the classifier to obtain a vector, for each data example, that is orthogonal to a decision surface for the classifier;

detecting, by the computer system, a problem with the classifier based on changes in directions of the vectors; and upon detecting a problem, adjusting, by the computer system, the classifier to reduce errors by the classifier caused by overfitting training data.

2. The method of claim 1, further comprising training, through machine learning, by the computer system, the generator to generate the multiple data examples.

3. The method of claim 1, further comprising, prior to back-propagating partial derivatives from the classifier, training the classifier to discriminate between the first and second data clusters.

4. The method of claim 3, wherein training the classifier to discriminate between the first and second data clusters comprises training, by the computer system, the classifier to imitate an original machine-learning discriminator that does not comprise a neural network.

5. The method of claim 1, wherein detecting the problem comprises detecting, by the computer system, changes in the directions of the vectors that are greater than a threshold value.

6. The method of claim 1, wherein adjusting the classifier comprises further training, by the computer system, the classifier with a revised hyperparameter.

7. The method of claim 6, wherein adjusting the classifier further comprises measuring, by the computer system, changes in the first and second scores for the further training with the revised hyperparameter.

8. The method of claim 1, wherein adjusting the classifier comprises changing, by the computer system, an architecture of the classifier.

9. The method of claim 1, wherein adjusting the classifier comprises substituting, by the computer system, a new machine learning system for the classifier, wherein the new machine learning system is trained on different data than a prior training of the classifier.

10. The method of claim 1, wherein the first data cluster corresponds to a first classification category and the second data cluster corresponds to a second classification category.

11. The method of claim 1, wherein adjusting the classifier comprises further training, by the computer system, the classifier with additional data examples near the decision surface.

12. The method of claim 11, further comprising generating, by the computer system, the additional data examples with a stochastic autoencoder.

13. The method of claim 2, wherein the classifier computes the first and second scores using a softmax function.

14. The method of claim 13, wherein training the generator comprises training the generator such that the both the first and second scores are 0.5 with the softmax function.

15. The method of claim 1, further comprising generating, by the computer system, a characterization of the decision surface.

16. The method of claim 15, wherein generating the characterization of the decision surface comprises fitting, by the computer system, a hyperplane to the multiple data examples.

17. A computer system for improving performance of a classifier, wherein the classifier comprises a deep neural network that is trained iteratively through machine learning, wherein the deep neural network of the classifier comprises an input layer, an output layer, and one or more inner layers, wherein the layers comprise interconnected nodes that process and transform input data through weighted connections, the computer system comprising:
one or more processor cores; and
computer memory in communication with the one or more processor cores, wherein the computer memory stores instructions that when executed by the one or more processor cores, cause the one or more processor cores to:
compute, by the classifier, first and second scores for each of multiple data examples from a generator, wherein the first score is indicative of whether the data example belongs to a first data cluster and the second score is indicative of whether the data example belongs to a second data cluster, wherein the generator is trained with an objective such that, for each data example generated by the generator, the first and second scores computed by the classifier are equal;
back-propagate, for multiple data examples generated by the generator, partial derivatives from the classifier to obtain a vector, for each data example, that is orthogonal to a decision surface for the classifier; and
detect a problem with the classifier based on changes in directions of the vectors; and
upon detecting a problem, adjust the classifier to reduce errors by the classifier caused by overfitting training data.

18. The computer system of claim 17, wherein the computer memory stores further instructions that when executed by the one or more processing cores, cause the one or more processor cores to train, through machine learning, the generator to generate the multiple data examples.

19. The computer system of claim 17, wherein the computer memory stores further instructions that when executed by the one or more processing cores, cause the one or more processor cores to, prior to back-propagating partial derivatives from the classifier, train the classifier to discriminate between the first and second data clusters.

20. The computer system of claim 19, wherein the computer memory stores further instructions that when executed by the one or more processing cores, cause the one or more processor cores to train the classifier to discriminate between the first and second data clusters by training the classifier to imitate an original machine-learning discriminator that does not comprise a neural network.

21. The computer system of claim 17, wherein the computer memory stores further instructions that when executed by the one or more processing cores, cause the one or more processor cores to detect the problem by detecting changes in the directions of the vectors that are greater than a threshold value.

22. The computer system of claim 17, wherein the computer memory stores further instructions that when executed by the one or more processing cores, cause the one or more processor cores to adjust the classifier by further training the classifier with a revised hyperparameter.

23. The computer system of claim 22, wherein the computer memory stores further instructions that when executed by the one or more processing cores, cause the one or more processor cores to adjust the classifier by measuring changes in the first and second scores for the further training with the revised hyperparameter.

24. The computer system of claim 17, wherein the computer memory stores further instructions that when executed by the one or more processing cores, cause the one or more processor cores to adjust the classifier by changing an architecture of the classifier.

25. The computer system of claim 17, wherein the computer memory stores further instructions that when executed by the one or more processing cores, cause the one or more processor cores to adjust the classifier by substituting a new machine learning system for the classifier, wherein the new machine learning system is trained on different data than a prior training of the classifier.

26. The computer system of claim 17, wherein the first data cluster corresponds to a first classification category and the second data cluster corresponds to a second classification category.

27. The computer system of claim 17, wherein the computer memory stores further instructions that when executed by the one or more processing cores, cause the one or more processor cores to adjust the classifier by further training the classifier with additional data examples near the decision surface.

28. The computer system of claim 27, wherein the computer memory stores further instructions that when executed by the one or more processing cores, cause the one or more processor cores to generate the additional data examples with a stochastic autoencoder.

29. The computer system of claim 18, wherein the classifier computes the first and second scores using a softmax function.

30. The computer system of claim 29, wherein the computer memory stores further instructions that when executed by the one or more processing cores, cause the one or more processor cores to train the generator by training the generator such that the both the first and second scores are 0.5 with the softmax function.

31. The computer system of claim 17, wherein the computer memory stores further instructions that when executed by the one or more processing cores, cause the one or more processor cores to generate a characterization of the decision surface.

32. The computer system of claim 31, wherein the computer memory stores further instructions that when executed by the one or more processing cores, cause the one or more processor cores to generate the characterization of the decision surface comprises fitting a hyperplane to the multiple data examples.

33. The method of claim 2, wherein:
the method further comprises, prior to back-propagating partial derivatives from the classifier, training the classifier to discriminate between the first and second data clusters;
training the generator comprises training the generator with a first set of one or more processor cores of the computer system; and
training the classifier comprising training the classifier with a second set of one or more processor cores of the computer system.

34. The method of claim 33, wherein the classifier comprises an image classifier.

35. The method of claim 33, wherein the classifier comprises a diagnostic classifier.

36. The method of claim 33, wherein:
the first set of one or more processor cores comprises a first graphics processing unit; and
the second set of one or more processor cores comprises a second graphics processing unit.

* * * * *